United States Patent [19]

Vold

[11] Patent Number: 4,937,759

[45] Date of Patent: Jun. 26, 1990

[54] INDUSTRIAL ROBOT WITH CONTROLLER

[75] Inventor: Havard I. Vold, Milford, Ohio

[73] Assignee: Robotics Research Corporation, Milford, Ohio

[21] Appl. No.: 207,311

[22] Filed: Jun. 15, 1988

Related U.S. Application Data

[62] Division of Ser. No. 830,703, Feb. 18, 1986, abandoned.

[51] Int. Cl.$^5$ ............................................. G05B 13/02
[52] U.S. Cl. ............................... 364/513; 364/167.01; 901/15
[58] Field of Search ............... 364/513, 474.19, 167.01; 318/568; 901/15

[56] References Cited

U.S. PATENT DOCUMENTS 4,412,293 10/1983 Kelley et al. .......................... 364/513
4,479,176 10/1984 Grimshaw .............................. 364/148
4,554,625 11/1985 Otten .................................... 364/513

Primary Examiner—John R. Lastova
Attorney, Agent, or Firm—Timothy J. O'Hearn

[57] ABSTRACT

A controller retrieves from memory a series of discrete end effector positions consisting of location and orientation of the end effector. Joint angle values are computed in real time corresponding to intermediate points along the path in a manner which provides smooth end effector motion, avoids the problems of singularities and efficiently accommodates kinematic redundancy. In particular, end effector reorientation between successive goal points is smoothly accomplished by rotating the end effector about the eigenvector of the two successive end effector orientations.

2 Claims, 15 Drawing Sheets

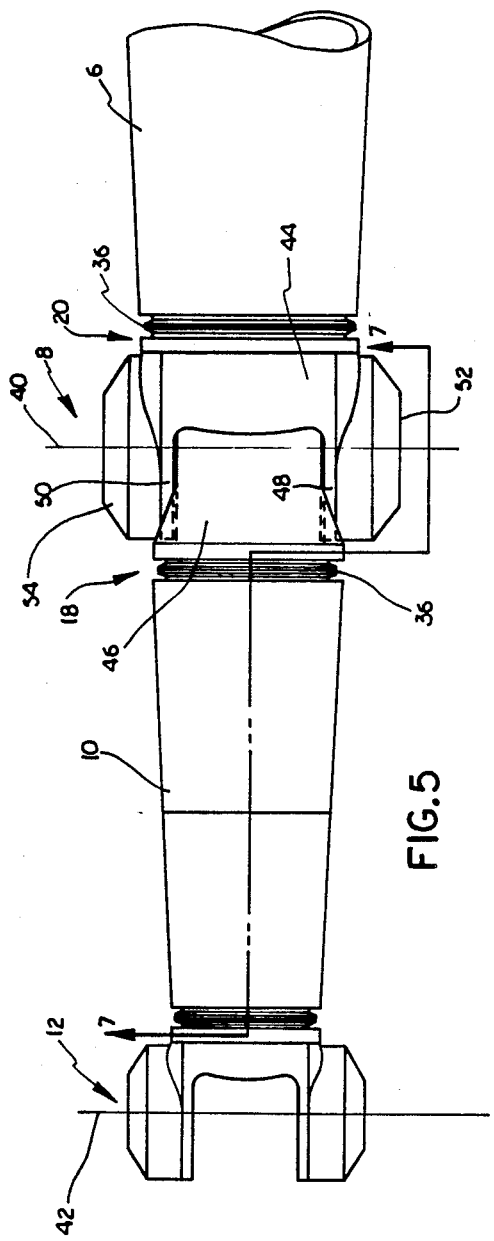
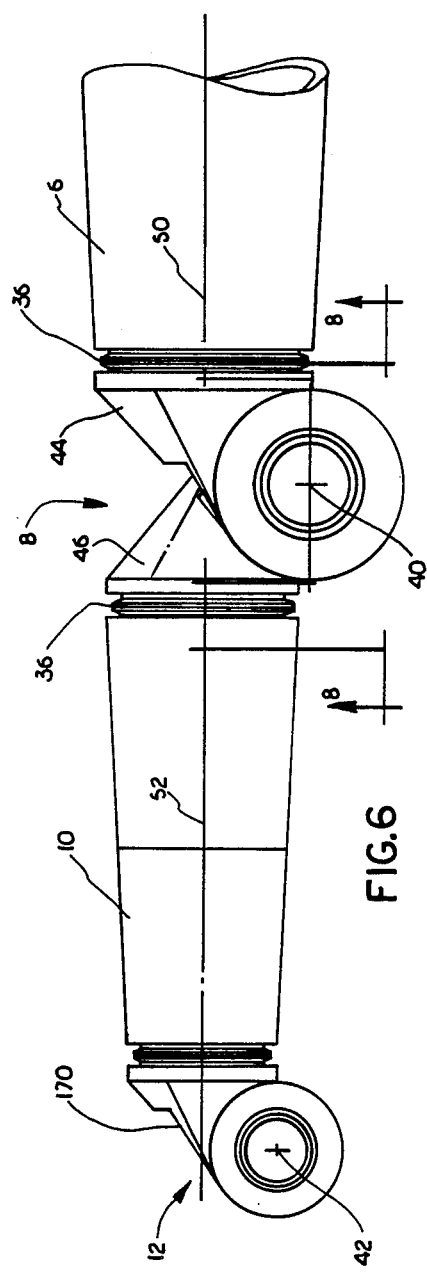

INDUSTRIAL ROBOT WITH CONTROLLER

This is a divisional of co-pending application Ser. No. 06/830,703 filed on 2/18/86, now abandoned, and is related to application Ser. No. 06/830,659, filed on 2/18/86.

BACKGROUND OF THE INVENTION

The present invention relates to industrial robots or computer-controlled manipulators and, more particularly, to the design and control of an articulated mechanical arm of an indeterminant number of axes, capable of being configured with kinematic redundancy.

Industrial robot arm designs have followed a few basic types. Industrial robots can be classified according to their mechanical linkage geometries, i.e., the particular arrangements of structural elements and joints which connect them and the associated motion control systems required to coordinate joint action to produce straight line motion and other controlled paths at the toolpoint. In the most general purpose and versatile manipulators, six degrees of freedom are incorporated in the linkage configuration to provide complete control of the position in space and orientation of the tool mounted at the end of the manipulator.

One elementary form of manipulator employs a set of three slides connected at prismatic or sliding joints. These slides are disposed in a nominally orthogonal arrangement to position the "wrist" of the device, a second set of three orthogonally disposed rotational axes which determine tool orientation. This mechanism geometry provides a roughly rectilinear working volume. Such a device is typified by the IBM RS 1 robot. The "cartesian" geometry of such a device has a number of distinct advantages over other types. Most important of these is that no coordinate transformations are necessary to produce useful controlled motions at the toolpoint. Instead, linear and circular interpolation of the positioning axes is sufficient.

A second common mechanical geometry provides a wrist, as described above, linked to two slides which are disposed at a right angle and connected at a prismatic joint. These slides are affixed to a revolute joint in the base of the device which provides rotation about a vertical axis. The workspace of such a manipulator is roughly "cylindrical" in shape. Such a device is typified by the Prab Model FA robot.

In a third common mechanical geometry, the wrist described above is positioned in space by a slide connected at a prismatic joint to a revolute joint which, in turn, is mounted at a right angle to and rotated around a vertical axis by a second revolute joint in the base of the device. Theoretically, this type of "polar" geometry produces a spherical work space. In practice, mechanical design considerations generally restrict the useful workspace to a spherical shell less certain significant conical sections. Such a device is typified by the Unimation Unimate 1000 robot.

More sophisticated motion control systems are required for arms with cylindrical and polar linkage geometries than for arms with cartesian geometries because coordinate transformations must be performed to generate straight line movements at the toolpoint. However, as a class, manipulators which employ one or more slides connected at prismatic joints exhibit certain significant performance limitations. These are due, in part, to the relatively large size and high weight, and the resulting high motive power required of such a design to convey and locate in space a tool or workpiece of a given mass. They are also due to the fact that the positioning slides often interfere with other objects in and around the working area, including the workpiece itself.

Of the manipulator types described above, the cartesian systems tend to be the least spatially efficient linkage configurations, since the workspace is often completely surrounded by a large framework of positioning slides and supporting structure. Of the group described above, the polar type, which employs only a single slide, is the most efficient and least intrusive in the workspace. To minimize the spatial efficiency problem, a few polar geometry devices have been designed in which the slide collapses upon itself when retracted to minimize interference problems. In one form, for example, a set of colinear slide segments telescope. This form is characterized by the Maker, which is manufactured by U.S. Robot. In another form, a thin-wall steel tube that forms the slide when extended is caused to collapse in section to a flat sheet which can be rolled onto a drum when retracted. This device is typified by the Martin Marietta/NASA Viking Lander arm. Mechanical implementations of these designs tend to have relatively poor static and dynamic performance characteristics, however, due either to the number of additional prismatic joints incorporated to provide telescoping or to the very thin-wall slide cross-section.

To improve the performance and workspace interference characteristics of manipulators, a linkage geometry which permits considerably more efficient mechanical designs has been devised in which a series of rigid link segments connected by revolute joints is used to position the wrist. This is known as a revolute or jointed arm manipulator and is the type of the present invention. In a general-purpose manipulator of this type the wrist positioning mechanism typically consists of two links connected by a revolute joint, with a terminal end of one of these links mounted on a second revolute joint fixed in plane with the first, itself mounted at a right angle on and rotated about a vertical axis by a third revolute joint in the base. Manipulators which employ this linkage geometry are more like the human arm than the earlier designs described above, but function kinematically more like a "backhoe" than a human limb, since the linkage configuration operates in a fixed plane. Theoretically, such a jointed arm linkage geometry produces a spherical working envelope. Like cylindrical and polar geometry manipulators, the jointed arm manipulator requires a relatively complex controller which must perform coordinate transformations to produce straight lines or other controlled path behavior at the toolpoint. The principle advantages of the jointed arm manipulator geometry relate to the fact that when the arm linkage which positions the wrist is retracted, it folds upon itself, permitting arms to be relatively compact for a given working envelope and light-weight for a given payload.

Two distinct mechanical embodiments of the jointed arm geometry have gained acceptance in the industry. In one, the actuators which drive many of the arm and wrist joints are mounted some distance from the joints themselves. In such designs, motors and gear reducers mounted at the "shoulder" transmit power to the joints through the effect of a four-bar linkage configuration or through pushrods and bellcranks, or by chains, timing belts, or other "tendon" arrangements. An example of such a device is the ASEA IRb 6 robot. This design has the advantage that the relatively bulky and heavy motors, drives, and velocity feedback hardware need not be packaged with and supported by the more distal arm structure. Consequently, motive power requirements for a given payload may be reduced. Nevertheless, the drive train which is employed to transmit power to a remote joint itself imposes a number of significant performance limitations. The feasible range of motion of joints is often limited by geometric ratio changes or over-center conditions in the power transmission mechanism, resulting in arm assemblies with relatively restricted, toroidal working envelopes. Transmission mechanisms also add considerable inertia, compliance and mechanical inaccuracy to the drive train, to the detriment of static and dynamic performance. Moreover, since the transducer which is used to determine toolpoint position is often mounted at the origin of the transmission, compliance and mechanical inaccuracy in the transmission significantly reduces the precision of the device.

In the second common embodiment of the jointed arm linkage geometry, substantially all of the actuators which drive the arm and wrist joints are located on or within the arm structure adjacent the joints. In some cases, actuators are located directly at the joints; in other cases, they are located in adjacent "in-board" link segments. This arrangement overcomes the problem of limited joint travel and, as a result, certain mechanisms of this type exhibit useful working envelopes that approach a sphere. The joint-mounted or link-mounted drive design also reduces or eliminates problems associated with power transmission inertia and compliance. An example of such a device is the Unimation PUMA 600 robot.

Although jointed arm geometry provides a more efficient operation than cartesian or polar configurations in terms of maneuverability, working envelope, and overall dexterity, it requires a more sophisticated controller, capable of performing elaborate and time-consuming coordinate transformations to position the toolpoint. The relative complexity and high cost of computer control systems required for accurate and, to an increasing extent, adaptive control of the toolpath in jointed-arm manipulators have had a significant influence on the particular linkage geometries utilized in most commercial arm designs. Linkage designs have generally been adopted which simplify the process of coordinate transformation and reduce the number and rate of computations that must be performed. For example, common jointed-arm linkage geometries avoid "off-set" pitch joints, a feature which greatly complicates transformation. Thus, by imposing specific constraints on the linkage geometry, explicit mathematical expressions (i.e. closed form, analytic expressions) can be obtained for the coordinate transformations which simplify the control system.

However, such efforts to constrain mechanical design for the sake of control system efficiency exhibit several shortcomings. The linkage geometries that allow for explicit solutions to the transformation equations often are not optimal for performance and cost. In addition, explicit expressions can not be easily adjusted for mechanical imprecisions in the manipulator. Moreover, it is doubtful that any closed form solution exists for the transformation equations of any redundant manipulator. Furthermore, intrinsic to all jointed arm manipulators is a condition known as a singularity. Conventional control systems and manipulators will encounter regions in their working envelope containing "singularities" which prevent effective operation of the controller. A singularity is the condition of the loss of one or more degrees of freedom of movement in one direction and redundancy of movement in another. Singularities are encountered in the work envelope when the manipulator assumes particular positions. When a singularity is encountered by a manipulator, one or more of the joints of the machine is effectively eliminated from contributing to the movement the manipulator is directed to execute. Thus, when a singularity is approached, a six-axis manipulator is reduced to five degrees of freedom of movement, a fiveaxis machine to four, etc. Conventional controllers are unable to operate efficiently when sets of singularities are encountered in the work envelope because the equations typically used to control motion have no mathematical solution at a singularity. Thus, while many mechanical designs have been influenced by an effort to simplify the mathematics associated with the control of the manipulator, mathematical control problems persist.

Moreover, as the mechanical design and linkage geometry improve the versatility of the manipulator, the problems of singularities are increased. Where these problems have been confronted in the current technology, the approach typically has been to anticipate and trap the singularity conditions. That is, the controller is programmed to anticipate the impending occurrence of a singularity and special routines are provided to avoid near singular conditions. However, such a technique fails to take advantage of the fact that a redundant manipulator arm, by its very nature, has an advantage over singularities if properly controlled. Conventional manipulators fail to take advantage of the benefits provided by the use of seven or more axes of movement because the controllers of such robots are unable to deal effectively with the complexity introduced in the control mathematics by the presence of seven or more degrees of freedom. In accordance with the present invention, it has been found to be better to adopt an optimum mechanical design, unconstrained by concerns about mathematical complexity, and to confront the mathematical problems of coordinate transformation, redundancy, singularities and mechanical imprecisions by the adoption of iterative control methods.

In addition to the four basic types of general-purpose manipulator described above, each of which provides six degrees of freedom at the toolpoint, many other linkage geometries have been devised for special applications. In the design of most of such special-purpose arms, an effort is made to employ a linkage geometry having the minimum number of driven joints necessary to perform the particular task of that application. Significant cost savings result from such an effort through a reduction both in the number and size of structural components, motors, power supplies, servo feedback hardware and in the complexity of the control system required. Special-purpose manipulator designs have evolved, for example, for the relatively simple kinematic function of loading and unloading workpieces from lathes. One type employs a two-axis, cartesian mechanism in which the primary slide is mounted parallel to the lathe spindle centerline. A second common type uses two links connected at revolute joints, plus one short slide, to handle short chucked parts. Because of their uniquely tailored mechanical designs, neither of these specialized manipulators requires the controller to perform coordinate transformations. In both, the orientation of the linkage geometry itself produces appropriate tool paths for the given application when each joint is driven independently in the proper sequence. With such designs it is possible that the joints may not require an analog servocontrol network.

As a second example, it has been determined that for a large class of MIG welding operations in the factory, control of rotation of the welding tip about its axis is not necessary and consequently, that a three-axis arm with a two-axis wrist provides sufficient tool control. Many other examples exist of manipulator designs being optimized for a specific task or class of tasks. In most cases, a geometry providing less than six degrees of freedom at the tool is employed and the physical sizes of the links and/or slides, as well as their load capacities, are matched to the specific application. Accordingly, a unique design is required for each such specialized application.

Previous manipulator designs exhibit a number of significant limitations and shortcomings in addition to those mentioned above. Jointed arm manipulators, incorporating six revolute joints and providing six degrees of freedom at the toolpoint, while more efficient than other general-purpose linkage configurations, are substantially less maneuverable and dexterous than biological analogs they ideally would emulate, notably the human arm or an elephant trunk. As previously stated, present jointed arm devices function much like backhoes, from a kinematic viewpoint, in that the arm linkage operates in a fixed plane which is rotated about one major vertical axis by the base revolute joint. With most of such devices, a given location and orientation of the tool corresponds to a single discrete set of joint angles and an associated discrete arm configuration. In a few of such devices, a given position and orientation of the tool can be achieved by two discrete arm configurations. An example of a device with two possible arm configurations for a single toolpoint position is the Unimation PUMA 600. In that device, while the revolute joints remain in a fixed plane, the "elbow" joint can be disposed either "up" or "down". Nevertheless, if for a prescribed position of the tool, an obstacle in the workspace interferes or the workpiece itself interferes with the arm segments, the arm is not capable of reaching the point without collision. Unlike the human arm, such conventional jointed arm manipulators do not have sufficient degrees of freedom to reach around the interfering object. This limitation is illustrated in FIG. 16. The human arm is considered to have seven degrees of freedom from shoulder to wrist, providing a range of elbow attitudes and resulting arm configurations for a given hand position and orientation. The elephant trunk, having more than seven degrees of freedom, can assume more complex configurations, and can "snake" between objects. Many automation tasks demand the dexterity of a human arm; some require even greater freedom of action. The lack of arm maneuverability and tool-handling dexterity in existing general-purpose computer-controlled manipulators presents serious limitations in their performance and adaptability to numerous applications.

The addition of one or more "redundant" joints in a manipulator has a number of significant benefits beyond improved maneuverability. In the same way that an extra degree of freedom provides means to reconfigure the arm to reach around an obstacle, the arm can be reconfigured to dispose joints in a way which distributes torque or velocity requirements among arm joints in the most equitable manner. A man reconfigures his arm in the process of lifting a heavy object to keep the forces and moments applied to each and every joint at a minimum. The man uses the redundancy in his arm to maximize "leverage". In a six degree of freedom jointed arm, operating in plane like a backhoe, no such reconfiguration and redistribution of forces and torques is possible. Thus, the mechanism's lifting capacity, associated with any particular point in its working envelop and discrete arm configuration, may be unreasonably limited because only a few joints are contributing to the exercise. With a kinematically-redundant manipulator, in contrast, while it may not be possible to lift a given load with one configuration of joints, it may be possible with another configuration and the arm can be reconfigured to do so. Similarly, in executing a high-speed move, the peak toolpoint velocity attainable by a six degree of freedom arm is ultimately determined at any one point in the path trajectory by the maximum speed of one joint. In a six degree of freedom arm, the motion requirements at any one point in the path again may not be well distributed among the joints, but no reconfiguration and redistribution is possible. The addition of redundant joints, therefore, promises to enhance greatly the efficiency of the manipulator, providing increased payload and applied tool force, as well as increased toolpoint speed, for a given amount of motive power and length of arm.

Another problem intrinsic to six degree of freedom arms which may be reduced by kinematic redundancy is related to joint travel limits. In the majority of mechanical embodiments of jointed arms, few, if any, of the revolute joints provide more than one full rotation. Many typical joints provide no more than 180 degrees of rotation. This feature limits the ability of the arm to accomplish certain motions. For example, if the prescribed path of movement specifies certain tool orientations, such as an orientation perpendicular in three axes to some arbitrary straight line in the workspace, then at some point in the straight line trajectory, one of the joints in the arm will reach its limit of travel and the desired path can be followed no further. This may be the case even when other joints remain close to their centers of travel. Kinematic redundancy provides a means to redistribute motion requirements in such a way as to maximize the use of all individual joint travel limits, thereby increasing the effective working envelop and tool-handling dexterity of the manipulator.

The implementation of kinematic redundancy in manipulator mechanisms can take many forms. Indeed, it can be achieved by the addition of one additional joint of any type at any location in any six degree of freedom arm linkage. Two colinear revolute joints in series will suffice. Such an additional degree of freedom need not be controlled in real time to achieve kinematic redundancy. A conventional manipulator providing six degrees of freedom under simultaneous control mounted on a slide that indexes the arm to different fixed positions during operation on the workpiece, offers a sort of primitive redundancy. However, in order to achieve human-arm-like dexterity from a conventional six degree of freedom general-purpose jointed arm manipulator, an additional revolute joint may be inserted between the shoulder "pitch" joint and the elbow "pitch" joint to allow the rotational axes of those two joints to move out of plane with respect to one another. This permits the elbow to be rotated out of plane, or "orbited", as shown in FIG. 18, providing the freedom to avoid obstacles and reach goalpoints on the back side of objects in the workspace, as shown in FIG. 17. In many accepted jointed arm designs, such as the ASEA IRb robots, the transmission linkages which are employed to transmit power to the remote arm joints make it difficult, if not impossible, to incorporate such a roll joint in the upper arm segment.

In order to achieve "intelligent", human-arm-like behavior with a kinematically-redundant arm, real-time sensory-interactive control is necessary. Such adaptive control of kinematic redundancy in manipulators demands that all of the seven or more joints be operated simultaneously and in concert by a real-time motion planning controller in response to information about internal arm conditions and to information from higher control levels and "off-board" sensors. The motion controller must handle both trajectory planning and coordinated joint control. It should reduce a programmed goalpoint to a set of coordinated joint commands, in real-time.

Conventional jointed arm robots also typically suffer certain significant limitations in performance related to the control stability and precision of movement of the manipulator. Many designs fail to provide servocontrol techniques which allow the high accuracy, repeatability and precision of movement required for applications such as metrology or assembly of small parts. The servocontrol systems of such manipulators may have limited operational bandwidth or may fail to employ important feedback control capabilities. As previously noted, some jointed arm designs incorporate mechanical features that further degrade stability and precision resulting from drive train compliance, structural compliance, and mechanical inaccuracies which are not effectively controlled by conventional machine tool servocontrol systems.

SUMMARY OF THE INVENTION

It is an object of the present invention to provide a manipulator with an arm geometry suitable for both general-purpose and a variety of special-purpose applications. It is a related object to provide an easily servicable modular manipulator design with standardized interchangeable arm segments which may be combined in various ways to construct manipulators of various sizes and load capacities. It is also a related object to provide a self-contained, durable manipulator capable of operating in crowded environments, harsh environments, and highly sanitized environments.

It is a further object of the present invention to provide a general-purpose manipulator with improved maneuverability, dexterity and repeatability. More specifically, it is an object to provide a manipulator and controller which may be configured to operate with seven or more axes, undeterred by the control problems which are introduced by kinematic redundancy. An allied object is to provide a manipulator with improved accuracy and repeatability.

In addition, it is also an object of the present invention to provide a manipulator and servocontrol which provide improved responsiveness of operation and smoothness of motion, enabling greater tool path speed and accuracy of movement.

Additional objects, advantages and novel features of the invention will be set forth in part in the description which follows, and in part will become apparent to those skilled in the art upon examination of the following, or may be learned by practice of the invention. The objects and advantages of the invention may be realized by means of the devices and methods described in the claims.

To achieve the above objects, the manipulator of this invention comprises an electronic controller and a set of unitized and integrated joint drive modules which can be assembled in series to form an arm. The manipulator is based upon an arm geometry design concept which enables the configuration of manipulators suitable to handle all general-purpose and special-purpose applications from three standardized joint types—roll, pitch, and transverse—assembled in different configurations. Each roll joint of the present invention consists of co-linear internal and external structural shells equipped for relative rotation by a reduction gearing assembly. Each pitch joint is disposed with its axis of rotation substantially perpendicular to and offset from the roll joint axes and consists of two relatively rotating parts, also driven by a reduction gearing assembly of essentially identical form to that employed in the roll joint. The present invention provides a design in which roll and pitch joints typically are joined in an alternating series to provide as many degrees of freedom and as much resulting maneuverability as is required by the particular application. The pitch joint axes of rotation are offset from the rotational axes of the roll joints. Each roll joint provides a minimum of 360 degrees of rotation. The offset and rotational range of each pitch joint permits adjacent roll joints to be folded back to be parallel to each other as shown in FIG. 19.

Each pitch joint may be provided with an ear module consisting of a body portion and a clevis arrangement of two parallel ears extending from the body portion. A case module, including a bell portion and a tubular portion extending from the bell portion, is provided such that the tubular portion may be mounted between the parallel ears of the ear module. A drive means also is provided for relative rotation between the case module and ear module and a resolver is provided at the maximum rotational radius to measure the relative rotation. A clutch is also provided to protect the gear reducer and actuator from damage in overload conditions.

With each roll joint there is provided an internal structural shell adapted to be secured readily to the adjacent case module of a pitch joint. There is also provided an external structural shell adapted to be secured to an adjacent ear module of a pitch joint. A drive means is provided to produce relative rotation between the internal and external structural shells of the roll joint and a resolver is provided to measure the relative rotation. An overload clutch is also provided. The above features permit the roll joint and pitch joints to be linked in a series to produce a manipulator with as many self-powered and easily interchangeable joints as are required for the application at hand.

A digital controller is also provided which guides the tool movement of the assembled manipulator along a path defined by a series of discrete positions designated by the user or, in the case of adaptive operation, by a host control system using sensors. A means is provided for storing the discrete positions in the data memory of the controller as cartesian coordinate values or for receiving such positions from a higher level real-time sensory interactive control. A means is provided for computing cartesian coordinate values of intermediate points between consecutive stored or received points, the intermediate points being spaced apart by equal time durations, so that the user-instructed routine is divided into a series of numerous short steps of movement of the tool relative to a given reference frame.

There also is provided a means for computing the angular displacement required from each pitch joint and roll joint of the manipulator associated with each of the intermediate points comprising the user-instructed path of the tool. A computing means for determining the joint angles is provided which will operate effectively for a manipulator consisting of any number of arm joints, including a redundant manipulator comprised of seven or more joints.

A servocontrol is provided for stablizing the motion of an apparatus such as the manipulator of the present invention. A servocontrol is provided which derives feedback from sensing the motive force on the actuator driven member which is responding to a velocity command signal. The motive force feedback is compared to the command signal and the resulting signal is compensated to provide stability and optimum bandwidth for the servomechanism. There also may be provided velocity and position feedback loops.

The present invention provides numerous advantages and benefits. The independently driven, unitized arm segment design permits the construction of a manipulator with any number of rotational axes suited to both general-purpose and special-purpose applications from a supply of standardized joint modules and components. This reduces the need for complete redesign when a customer requires a manipulator configured differently than those previously manufactured. Furthermore, the joint geometry permits the creation of a manipulator with unusual flexibility. The spherical work envelope provided by the manipulator is more complete than most manipulators, including those using the "three-roll wrist" which provides a sphere, less an approximately 90° cone. Additional advantages also result from the unitized nature of the joints. The joints are provided with mounting features which permit a joint to be easily removed and replaced on an existing manipulator. This provides the ability to replace an inoperative joint quickly and easily. This ability may greatly reduce the down time of the manipulator because an inoperative joint can be replaced and the manipulator can be put back in operation while the troublesome joint is taken away for complete disassembly and repair. Furthermore, this feature permits large scale users of the manipulator of the present invention to stock relatively few standardized parts and joints for maintaining a large group of manipulators.

In this exoskeleton structure the principal flexural load bearing member in the roll joint arm segments is a thin-wall tube having a maximum suitable radius from the joint's axis of rotation. This provides an optimum stiffness to weight ratio in the link section. In both roll and pitch joints, the fully internal drives, transducers and wiring are protected from damage and the temperature of these components can be controlled with internal ventilation. Furthermore, the exoskeleton structure reduces the number of moving surfaces which must be sealed to one per roll joint and two per pitch joint. This helps to protect the internal drives, transducers and wiring from contamination, corrosive vapors and liquids. Indeed, with the selection of proper seals and with internal pressurization, the present invention can be made to be submersible in liquids. Conversely, in applications such as semiconductor manufacturing where the operating environment must be kept clean, the readily sealed exoskeleton structure may be used to keep machine-generated contaminants inside the machine.

The symmetrical bearing arrangement of the pitch joint modules provides maximum static and dynamic performance through balanced bearing and structural loading.

By mounting the resolvers at the maximum radius within each pitch joint and roll joint module, the highest possible ratio between joint and resolver armature can be achieved. Joint rotation is measured directly, in a thermally stable mounting, providing for high measurement accuracy and repeatability.

The relationship of dimensions of successive joints comprising the manipulator, including the offset of the pitch joint axes from the roll joint axes provides a manipulator of unusual maneuverability, dexterity and repeatability. The capability of the controller to control this manipulator in a sensory interactive manner, and indeed, to support kinematically redundant form, permits manipulator configurations, which can easily reach around objects and avoid obstacles as shown in FIG. 17. In addition, the offset of the pitch joint from the central axis of the machine, while presenting mathematical difficulties for the controller, enables the manipulator to fold back upon itself, thus making an arm of a given length and working envelope highly compact and contracted, thus increasing the effective working envelope.

The controller of the present invention also provides other significant operational advantages. As previously mentioned, the controller can effectively and efficiently guide the motion of a redundant manipulator. Moreover, the controller intelligently handles the computational difficulty presented by singularities. The controller also tends to avoid singularities in the work envelope of the manipulator.

Unlike typical machine tool designs, the servocontroller of a highly maneuverable manipulator such as that of the present invention requires special considerations to avoid sluggish and imprecise manipulator motion. The servocontrol of the present invention improves the smoothness and precision of motion of the manipulator by using feedback and compensation techniques to eliminate mechanical roughnesses in the manipulator system.

Additional advantages of the invention will be described in the description below and may become apparent to those skilled in the art upon reading the description or upon practicing the invention.

BRIEF DESCRIPTION OF THE DRAWINGS

FIG. 5 is a top view of a portion of the manipulator arm extended with the rotational axes of adjacent roll joints colinear.

FIG. 6 is a side elevational view of the manipulator arm segment of FIG. 5.

DETAILED DESCRIPTION

Figure 1:
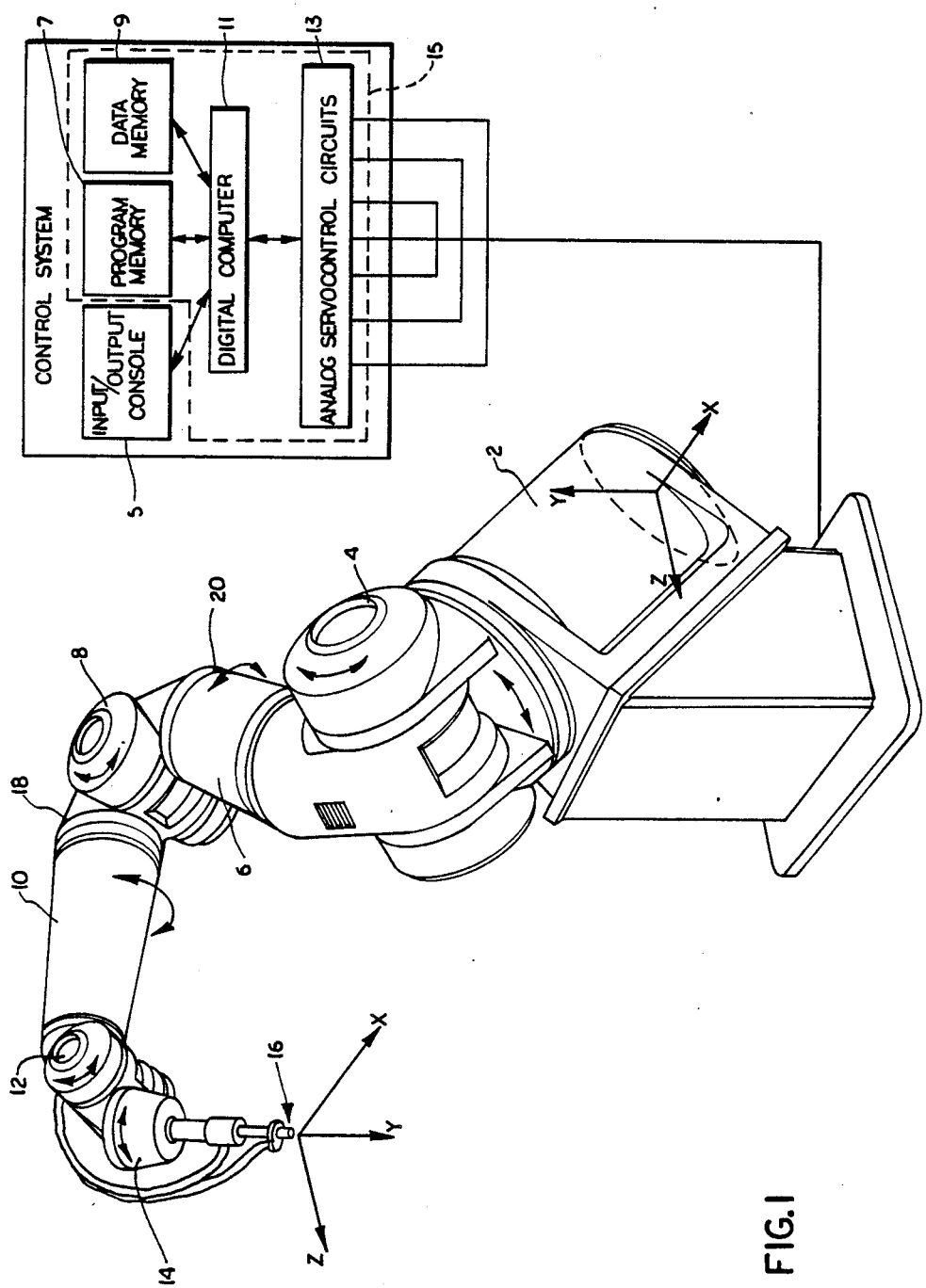
FIG. 1 is a perspective view of the manipulator according to the present invention with a diagrammatic illustration of the control system.

The present invention comprises an articulated anthropomorphic manipulator arm controlled electronically. A perspective view of a typical configuration of the present manipulator arm is shown in FIG. 1. The assembled structure consists of a linked series of arm segments or "joints" which extend from the base 1. The base 1 may be attached to a floor, overhead support structure, mobile track or other suitable support means.

The arm joints comprising the manipulator are of two basic types, roll joints, 2, 6, 10, and 14 and pitch joints, 4, 8, and 12. Except for variations in dimensions, a description of one pitch joint is representative of all pitch joints and a description of one roll joint is representative of all roll joints. That is, a manipulator arm could be built with any number of arm joints constructed according to the joint descriptions contained herein. It may be advantageous in some cases, however, to modify the design of the end joints 2 and 14 to accommodate specific applications or size limitations of components.

The pitch joints and the roll joints are independently powered to provide relative rotation about their longitudinal axes as shown by the arrows in FIG. 1. In a typical assembly such as that shown in FIG. 1, the first arm joint adjacent the base is roll joint 2. Each roll joint provides rotation about its longitudinal axis. The typical arm configuration includes a series of alternating pitch joints and roll joints terminating in an end effector or tool 16 at the distal end of the arm. As seen in FIG. 1, the roll joints typically decrease in cross-sectional area in the direction of the distal end of the arm. Similarly, the successive pitch joints following in that direction each typically reduce in size. On each typical pitch joint, such as pitch 8, the distal mounting collar 18 is smaller in diameter than the proximal mounting collar 20. While the arm joints of the manipulator reduce in size from the proximal to the distal end of the manipulator in the preferred embodiment, this feature is not a requirement of the present invention. By rotation of the various arm joints, the location and orientation of the tool 16 can be adjusted anywhere within the working envelope of the arm.

As illustrated in FIG. 1, and described below in greater detail, the arm joints are exoskeleton in nature. That is, the arm joints are comprised principally of tubular structures which provide the structural support necessary to carry a load at the tool location. Each arm joint is independently driven with its own internal motor and reduction gearing assembly contained within the exoskeleton structure. The exoskeleton structure provides the advantage of a high stiffness to weight ratio for the arm. The exoskeleton structure also protects the drive mechanisms as well as the wiring which, in the preferred embodiment, passes internally through the structure from joint to joint. In addition, the exoskeleton structure permits each of the drive motors to be air cooled, if necessary, by a single air source located in the base 1 of the arm. The exoskeleton design also may be sealed to permit underwater applications of the present invention or it may be positively ventilated to permit use in heavily contaminated environments.

Figure 2:
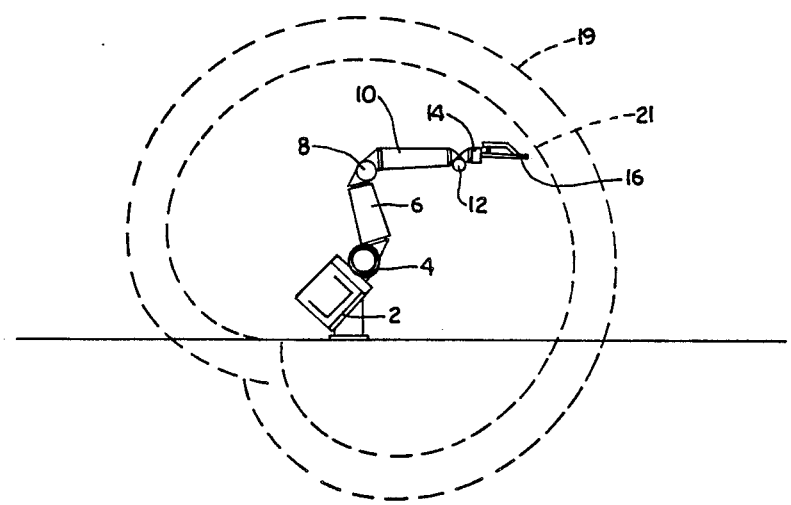
FIG. 2 is a side elevational view of the manipulator configured to include seven axes, illustrating the work envelope of the manipulator.

FIG. 2 illustrates the working envelope of a manipulator arm according to the present invention. As seen from this illustration and others, each of the pitch joints, 4, 8, and 12 is offset from the longitudinal axis of the arm extended with roll joint axes colinear. This offset permits the manipulator arm to be folded back on itself or to be fully extended. This design feature provides a substantially spherical work envelope similar to that provided by a human arm. The outer line 19 represents the reach of the tool tip while the inner line 16 represents the reach when the final pitch joint 12 is folded back toward the roll joint 2.

Figure 3:
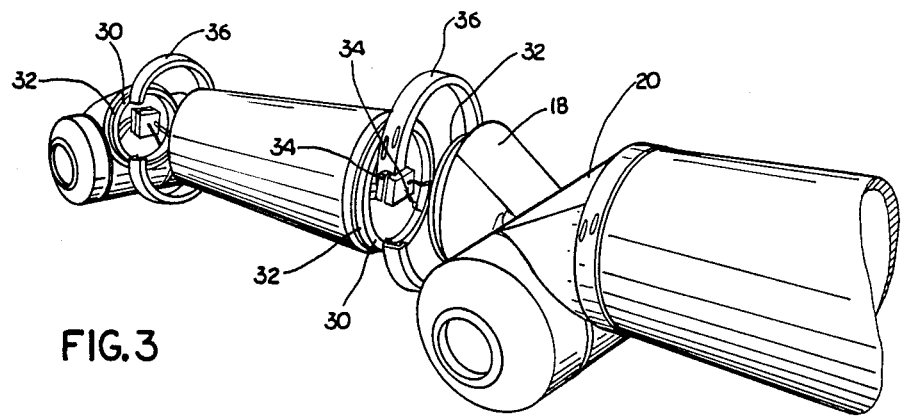
FIG. 3 is an exploded perspective view illustrating the means for assembling consecutive arm joints of the manipulator.

FIG. 3 illustrates the manner in which successive arm joints are connected according to the present invention to build a manipulator. As explained below in greater detail, each roll joint and each pitch joint includes at both ends a mating face 30 and ramped ridge 32. In addition, the wiring necessary to accommodate the successive arm joints is carried internally and is connected to mating coupling assemblies 34 provided at each end of the arm joints. These features permit the arm to be easily constructed of successive arm joints, reducing in size toward the distal arm end.

To attach adjoining arm joints, the joints are brought into close proximity and the wire couplings 34 are engaged. Next the abutting faces 30 are placed in abutment. Finally, a clamp ring 36 is applied over the ramped ridges 32 of the adjoining arm joints and the ring 36 is tightened. In this manner, the successive arm joints are structurally linked and the wiring necessary to drive the more distal arm joints is connected. This clamping arrangement, described in greater detail below, provides the benefit of a uniform, continuous clamping force around the periphery of abutting segment faces 30 with as few as one bolt or other fastener. Consequently, successive arm segments can quickly be removed for repair and replaced with a substitute arm segment from inventory. Those skilled in the art will recognize that other fastening means between successive joints are possible. For example, each abutting end could be provided with an outwardly extending radial flange with a series of holes suitable to accommodate bolts or other appropriate fastening means though such a flange may limit the ability to fold the manipulator back upon itself.

Figure 4:
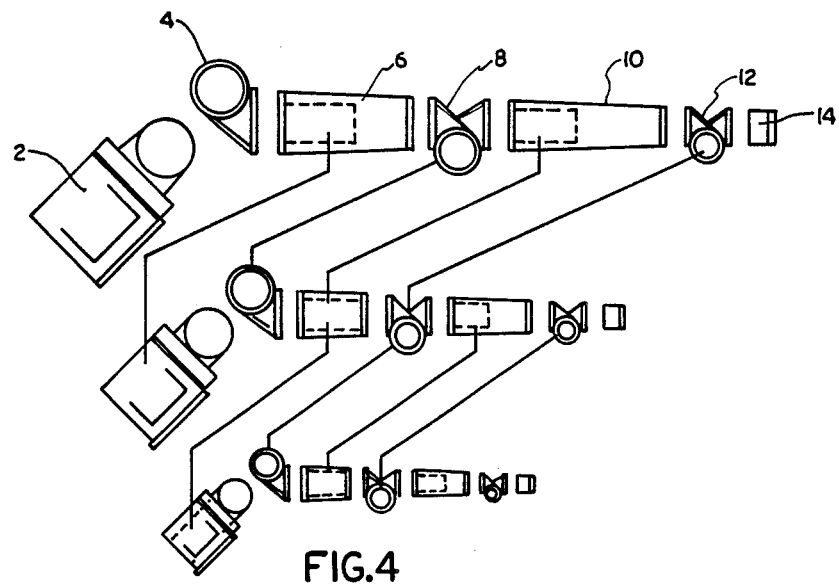
FIG. 4 is a semi-diagrammatic representation of the modularity feature provided by the present invention.

The exoskeleton structure and independent drive means of each joint provides numerous benefits. As previously mentioned, an inoperative arm segment can quickly be removed for repair and replaced with an identical off-the-shelf arm segment. These features, together with the general reduction of size from proximal to distal arm ends, also permit the interchangeability of arm joints and internal drive assemblies across various size and strength classifications of manipulators as illustrated in FIG. 4. As seen in that figure, the pitch joint of a large manipulator nearest the distal end becomes the middle pitch joint of a smaller manipulator, etc. Similarly, the drive assembly of a roll joint near the distal end of a large manipulator becomes the drive assembly of a roll joint nearer the base of a smaller manipulator. Thus, a series of independently driven unitized pitch and roll joints can be produced which can be combined in various ways to provide a broad size and strength range of manipulators. More importantly, the number of successive arm joints combined to comprise a particular manipulator design can be varied widely. For example, for certain simple tasks it may be sufficient to have only three arm joints with a tool attached at the end of the third arm joint. Where greater maneuverability is required, the manipulator arm of the present invention can include any number of successive arm joints. As explained below, the preferred embodiment of the present invention consists of seven or more arm joints. By using seven or more arm joints, a manipulator can be constructed which will be able to reach around obstacles in various ways to apply a tool in a particular location and orientation. Furthermore, the use of seven or more arm joints creates a condition known as "redundancy" which provides numerous operational advantages if properly controlled.

Turning to FIG. 5, there is illustrated a top view of a portion of the manipulator arm extended with the roll joint axes colinear. The roll joints 6 and 10 have reducing cross-sectional areas in the direction of the distal end of the manipulator. The pitch joints 8 and 12 are positioned between each roll joint to provide rotation around their central axes 40 and 42, respectively.

The top view of pitch joint 8 in FIG. 5 provides some indication of the manner in which the pitch joints are constructed and the manner in which they operate. As previously stated, the joint includes a distal mounting collar 18 and a proximal mounting collar 20 which are of diameters suitable to accommodate the adjoining roll joints 10 and 6, respectively. Each pitch joint consists generally of two halves, an ear module 44 and a case module 46, which are joined by bearings and a drive means. The ear module 44 and the case module 46 pivot in relation to each other about the axis 40. A drive means for the pitch joint is contained within the pitch joint. The drive means extends longitudinally beyond the ears 48 and 50 of the ear module 44 and is enclosed by the motor cover 52 and the drive cover 54.

FIG. 6 is a side view of the structure of FIG. 5 and clearly illustrates that the rotational axis 40 of the pitch joint 8 is offset from the rotational axes 50 and 52 of the roll joints.

Figure 7:
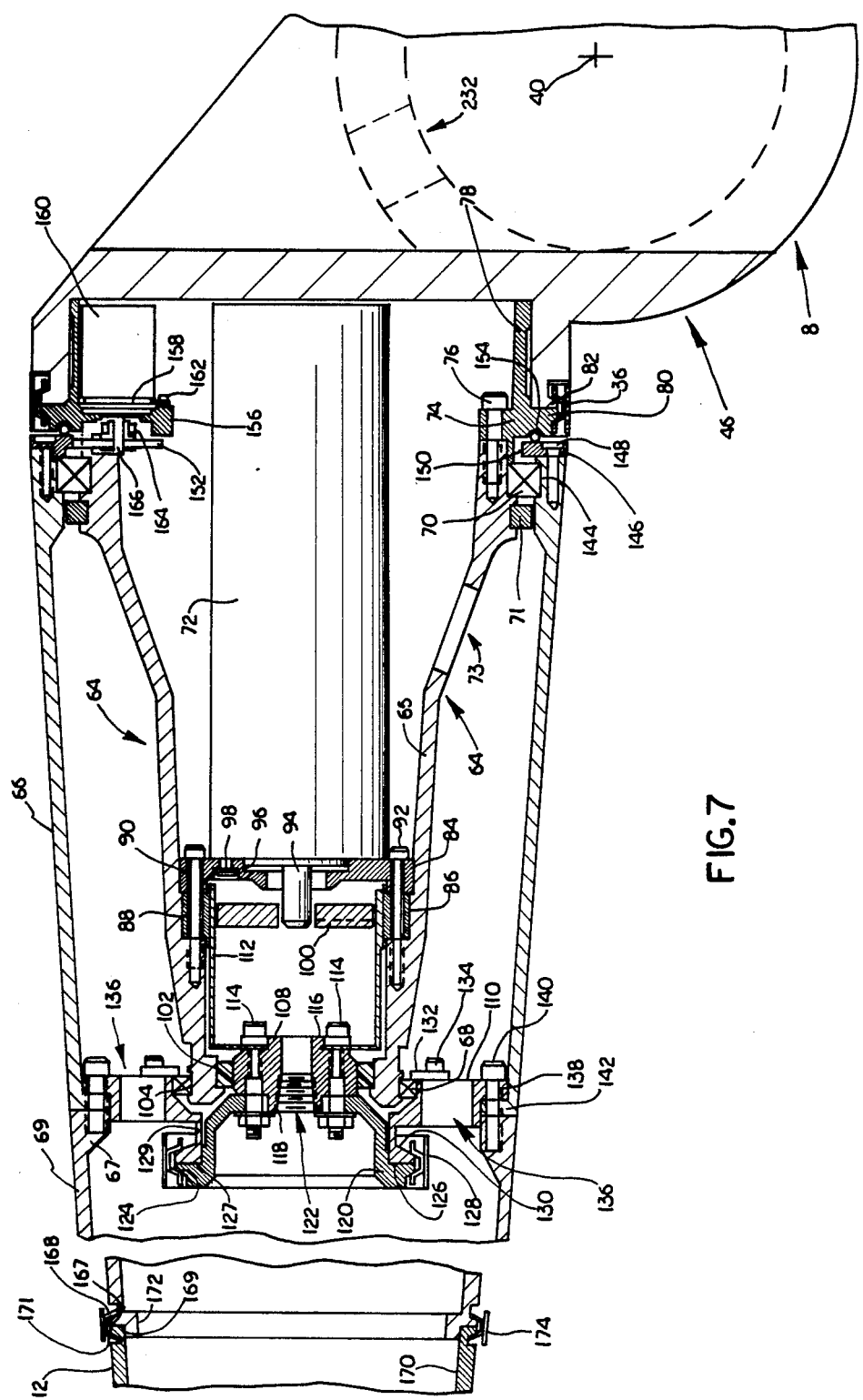
FIG. 7 is a fragmented cross-sectional view of a roll joint taken along section line 6—6 of FIG. 5.

Turning now to FIG. 7, there is illustrated a partial cross-sectional view of the structure of FIG. 5 taken along section line 7—7. The pitch joint 8 is diagrammatically illustrated, including its axis 40. The roll joint 10 is made up of two basic parts, an inner drive housing assembly 64 and an outer skin 66. The inner drive housing and associated assembly 64 is rigidly secured to the case module 46 of pitch joint 8 by clamp ring 36. The outer skin 66 is mounted to the inner drive housing assembly 64 on bearings 68 and 70. When the motor 72 of inner drive housing assembly 64 is energized, the outer skin 66 rotates relative to inner drive housing assembly 64 and case module 46.

Turning to the drive housing assembly 64, there is provided an inner drive housing 65 with an outer bearing diagrammatically indicated at 70 mounted on an exterior bearing surface of drive housing 65. An annular seal 71 also is provided between drive housing 65 and outer skin 66 and a passage 73 is provided for passing wires. The inner race of the bearing 70 is clamped to the drive housing 65 by inner bearing clamp 74. The inner bearing clamp 74 is detachably fastened to the drive housing 65 by a series of bolts 76, or other suitable fastening means. The inner bearing clamp 74 includes an annular skirt 78 adapted to snugly fit within the annular recess provided in case module 46 of pitch joint 8. The inner bearing clamp on its outer periphery includes a sloped ridge 80. Likewise, case module 46 includes a sloped ridge 82 on its outer periphery adjacent the abutting surfaces between the case module 46 and the inner bearing clamp 74. The sloped ridges are adapted to accommodate a clamp ring 36. When the clamp ring 36 is applied and tightened, the inner bearing clamp 74 and the drive housing 65 become rigidly fixed to the case module 46.

Toward the distal end of the drive housing 65 there is provided, on its interior, two stepped annular surfaces 84 and 86 to accommodate the rigid spline 88 and the motor mount plate 90. The rigid spline 88 and motor mount plate 90 are rigidly affixed to the drive housing 65 by a series of bolts 92. The motor mount plate 90 includes a central aperature suitable to accommodate motor drive shaft 94. The motor mount plate 90 also is provided with a stepped recess 96 adapted to accommodate the collar of the motor 72. Motor mount plate 90 also includes an aperature through which suitable fasteners 98 can be applied to rigidly mount motor 72 to the motor mount plate 90. To the end of motor shaft 94 there is attached a wave generator 100 which is an integral part of the harmonic drive assembly. Wave generator 100 and the harmonic drive assembly are explained in greater detail below.

Near the distal end of drive housing 65 there is provided on the interior surface an annular interior seal 102. Likewise, there is provided on the exterior surface an annular bearing seat 104. The interior seal 102 maintains lubrication within the harmonic drive. The distal exterior bearing 68 maintains spacing and allows relative rotation between drive housing 65 and clutch ring 110.

Mounted within the drive housing near the distal end is a harmonic drive assembly. The harmonic drive assembly is a conventional commercially available item. The harmonic drive assembly includes flexspline 112 which is situated such that its exterior gear teeth are axially aligned with the teeth of rigid spline 88. The closed end of flexspline 112 is rigidly mounted via bolts 114 to harmonic drive collar 108. The harmonic drive collar 108 is provided with centering stubs 116 and 118. Centering stub 116 establishes the alignment of flexspline 112 so that flexspline 112 can be secured to harmonic drive collar 108 by bolts 114. Centering stub 118 performs a similar function on the distal side of the harmonic drive collar 108. Around centering stub 118 of harmonic drive collar 108 there is mounted a clutch plate 120 which is rigidly retained to the harmonic drive collar 108 by bolts 114. Harmonic drive collar 108 also includes a threaded central aperature 122 for receiving a sealing plug to retain lubricants and provide access to adjust the wave generator 100.

Clutch plate 120 extends in the distal direction and flares outwardly radially to provide an annular sloped ridge 124 and a radial abutment surface 126. Clutch ring 110 also provides a distal region with a corresponding annular sloped ridge 130 and a cooperating radial abutment surface. When the abutment surfaces 126 and 127 of clutch plate 120 and clutch ring 110 are brought into abutment and a ring clamp 128 is attached to clutch plate 120 and clutch ring 110 engaging sloped ridges 124 and 130, this assembly provides a clutch for transmitting the rotary motion from the motor 72 and harmonic drive assembly to the outer skin 66. This is explained in greater detail below. Clutch ring 110 has mounted on surface 129 several strain gauges which are used for feedback control of the arm motion.

Towards its proximal end, clutch ring 110 provides an annular bearing seat for the outer race of the distal exterior bearing 68. This race is retained on the clutch ring 110 bearing seat by an annular bearing clamp 132 and a plurality of bolts 134 or other suitable fasteners. Clutch ring 110 also includes arcuate aperatures, two of which are shown at 136. These aperatures provide a space for the internal wiring to pass from joint to joint. The outer circumference of clutch ring 110 includes an annular bolt rim 138. The bolt rim 138 contains a number of aperatures suitable to accommodate a series of bolts 140. The bolts 140 pass through clutch ring 110 to threadedly engage internal annular lip 142 of the distal end of outer skin 66 and engages flange 67 of the proximal end of distal outer skin 69.

The outer shell of the roll joint may consist of a single outer skin 66 or may include a distal outer skin 69. In the preferred embodiment, the transverse cross-section of the outer skin 66 and distal outer skin 69 increase in the direction of the proximal end of roll joint 6. At the proximal end on the interior diameter there is provided a bearing seat 144. The outer race of bearing 70 is retained on the bearing seat 144 by an annular outer bearing clamp gear 146 which is rigidly attached to the outer skin 66 by a series of bolts 148. Outer bearing clamp gear 146 is provided with internal gear teeth 150. The internal gear teeth 150 are adapted to mesh with anti-backlash gear 152 which protrudes through arcuate aperatures (not shown) in the inner bearing clamp 74 and drive housing 65. As an additional function, outer bearing clamp gear 146 provides a wear surface for a tube seal 154. Tube seal 154 is held in place by a recess provided in the distal face of inner bearing clamp 74.

Inner bearing clamp 74, in addition to the features described above, is provided with a resolver mounting surface 156. The resolver mounting surface 156 contains an aperature adapted to accommodate a mounting flange and pilot 158 of a standard, commercially available resolver 160. The resolver 160 is retained within the mounting aperature by clamp 162. The anti-backlash gear 152 is mounted to the resolver shaft by clamp 164. With this mounting, the resolver is able to provide a measure of relative rotational position between the drive housing 65 and the outer skins 66 and 69.

In the preferred embodiment, motor 72 includes both a brake and, optionally, a tachometer. In operation, an electrical current is supplied to motor 72 causing the wave generator 100 of the harmonic drive assembly to rotate within the flexspline 112. This action induces a counter-rotating motion in the flexspline 112 which is transmitted to the rigidly attached harmonic drive collar 108. The rotating motion is transmitted through the collar 108 to clutch plate 120. The clutch assembly guards against overloading of the harmonic drive assembly. The clamping force of ring clamp 128 is set to allow slippage between clutch plate 120 and clutch ring 110 in the event the torque load on the roll joint exceeds the torque capabilities of the harmonic drive assembly. If the torque load does not exceed this limit, the clutch assembly transmits the rotational movement of the harmonic drive assembly to the clutch ring 110 and ultimately to outer skin 66. As previously described, this relative rotation between the drive housing assembly 64 and the outer skin 66 assembly is accommodated by outer bearing 70 and distal exterior bearing 68. As the outer skin 66 rotates relative to the drive housing assembly 64, the outer bearing gear clamp 146 moves in relation to the resolver 160 location. The gear mesh between outer bearing gear clamp 146 and anti-backlash gear 152 causes rotation of the resolver shaft 166. In this manner, the resolver 160 can be used to measure rotation of the roll joint 10 and relative rotational position of the outer skin 66 with respect to the drive housing 65.

At the distal end of distal outer skin 69, there is provided an annular abutting face 167, sloped ridge 168, and interior annular lip 172. Ear module 170 of pitch joint 12, as shown in FIG. 5, includes an identical annular abutting face 169 and a corresponding sloped ridge 171. The inner diameter of the ear module 170 is adapted to closely fit on the lip 172. When the ear module 170 and outer skin 66 are mated and the distal ring clamp 174 is applied, the ear module 170, ring clamp 174, and distal outer skin 69 are rigidly joined.

Figure 8:
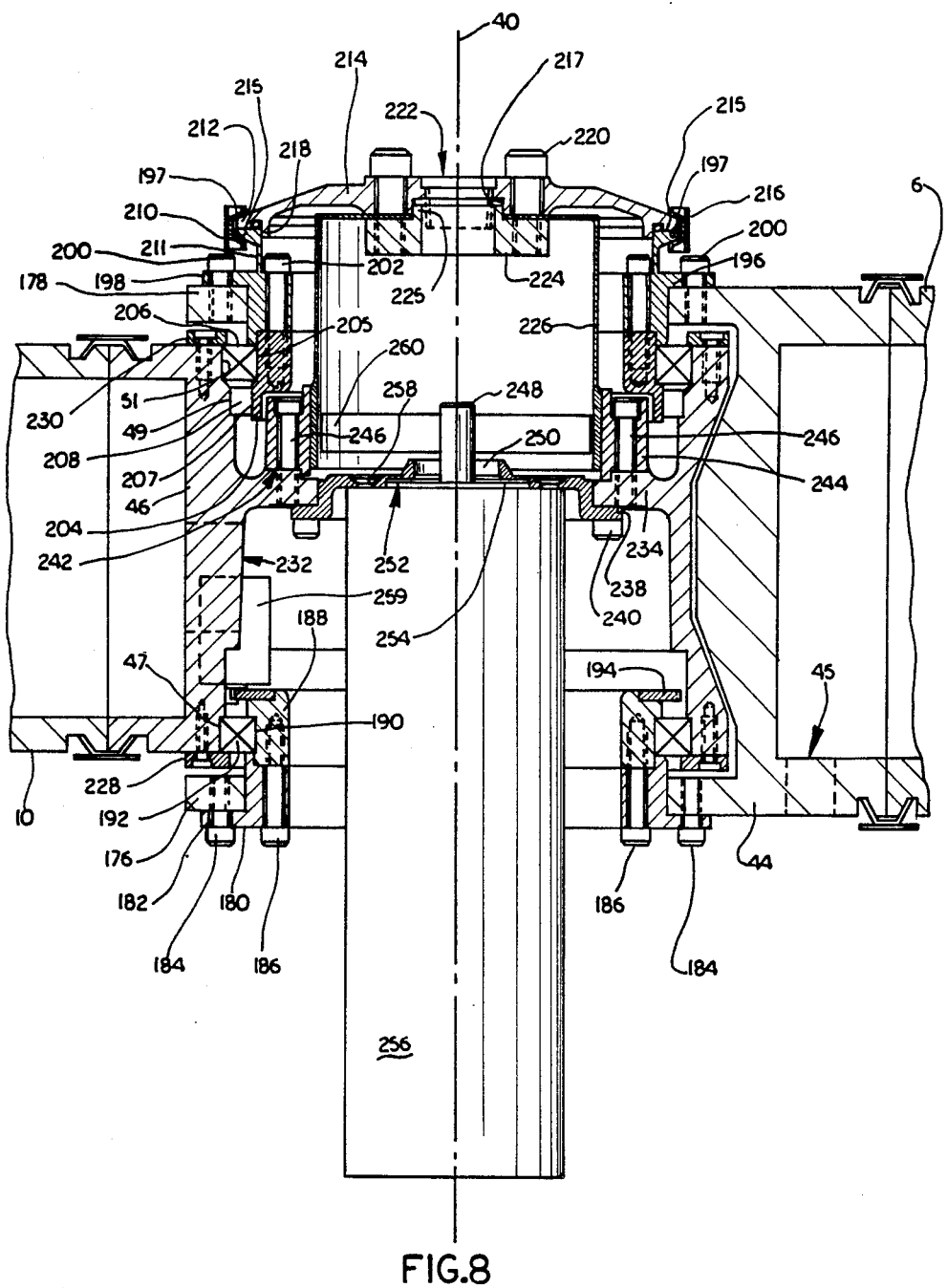
FIG. 8 is a fragmentary elevational view, partly in cross-section, of a pitch joint taken along section line 8—8 of FIG. 6.

Turning now to FIG. 8, there is illustrated a partial cross-sectional view of the pitch joint 8. As with a roll joint 10, the pitch joint 8 includes two major structural parts which rotate relative to each other. These relatively rotating parts are the ear module 44 and case module 46, also visible in FIG. 4. As shown in FIGS. 3, 5, and 6, the ear module 44 of each pitch joint is disposed in the manipulator arm assembly nearest the proximal end of the manipulator arm while the case module 46 is disposed nearest the distal end of the manipulator arm. Thus, for simplicity it is sensible to view the pitch joint as operating with a fixed ear module 44 and a rotating case module 46.

As the name would suggest, the ear module 44 includes two parallel ears, motor ear 176 and drive ear 178 extending outwardly toward the distal side of the pitch joint. Ear module 44 also includes in its bell-shaped portion an aperature 45 for passing wires from the roll joint 6 into the annular cavity of the pitch joint surrounding motor 256. The ears 176 and 178 are disposed in parallel planes which are parallel to the rotational axes of the adjoining roll joints 6 and 10. (See also FIGS. 5 and 6.) Each ear 176 and 178 includes an aperature suitable for accommodating a bearing inner race support assembly.

Turning first to the motor side of the pitch joint (the lower portion of FIG. 8), the motor ear 176 bearing support assembly is shown in detail. The motor ear 176 is provided with an aperature suitable to accommodate a snugly fit inner bearing clamp 180. The motor side inner bearing clamp 180 contains a radially extending flange 182 which abuts the outer surface of the motor ear 176. Spaced aperatures are provided in the flange 182 to allow passage of bolts 184 which are threaded into mating threaded holes around the perimeter of the motor ear 176 aperature. The motor side inner bearing clamp 180 also includes a ring of aperatures for accommodating bearing bolts 186. These bolts draw together the motor side inner bearing clamp 180 and the motor side inner bearing collar 188. Inner bearing collar 188 is provided with an annular bearing seat 190. The inner race of motor side bearing 192 is seated upon the bearing seat 190 and clamped in place by the bolt force holding together the motor side inner bearing collar 188 and the motor side inner bearing clamp 180. The inside face of the motor side inner bearing collar 188 includes a stepped surface suitable to accommodate an external tooth gear 194. The external tooth gear 194 is retained on the motor side inner bearing collar 188 by bolts or other suitable fastening means (not shown).

Turning to the drive side, a similar bearing mounting arrangement is illustrated. The drive side ear 178 includes an aperature suitable to accommodate the intermediate surface of inner bearing clamp/clutch 196. Inner bearing clamp/clutch 196 includes a flange 198 with spaced aperatures suitable to accommodate a number of bolts 200 which engage threaded holes around the periphery of the central aperature in drive ear 178. The inner bearing clamp/clutch 196 is also provided with an internal array of aperatures suitable to accommodate bolts 202 which engage threaded holes in the mating drive side inner bearing collar 204. The drive side inner bearing collar 204 includes on its outer surface a bearing seat 205. The inner race of bearing 206 is mounted on the bearing seat 205 and retained between the drive side inner bearing collar 204 and the inner bearing clamp/clutch 196 by the clamping force of bolts 202. In addition, the drive side inner bearing collar 204 includes a mating surface 207 on its outer diameter near the inner end of the collar. This surface is suited to accommodate an annular seal 208. The end of the inner bearing clamp/clutch 196 includes a flat abutment face 197 and a sloped ridge 210. The flat annular abutment face 197 is adapted to mate with an identical abutment face 215 and a sloped ridge 212 on the harmonic drive clutch plate 214. A ring clamp 216 is secured over the ramped ridges 210 and 212 to provide a clutch mechanism similar to that found in the roll joint of FIG. 7. Surface 211 of inner bearing clamp/clutch 196 includes several strain gauges which are used for feedback control of the arm motion.

In addition to the sloped ridge 212, the harmonic drive clutch plate 214 includes a centering stub 218 the outer diameter of which roughly mates with the adjacent inner diameter of the inner bearing clamp/clutch 196. The harmonic drive clutch plate 214 includes a circular array of aperatures which accommodate bolts 220. Clutch plate 214 also includes a central aperature 222 suitable for a plug to retain lubricant and permit access to the wave generator 260 for adjustment. Bolts 220 extend through clutch plate 214 to engage threaded holes in harmonic drive collar 224. The harmonic drive collar 224 includes a center stub which mates a central recess 217 in the harmonic drive clutch plate 214. These control surfaces ensure centering of the various parts. The harmonic drive clutch plate 214 and harmonic drive collar 224 mate and retain between their surfaces the flexspline 226 of the harmonic drive assembly.

Turning now to the case module 46, there is provided a generally tubular body slightly shorter than the distance between the ears 176 and 178 of the ear module 44. At each end of the tubular case module 46, on the inner diameter, there is provided annular bearing seats 47 and 51 for the outer races of bearings 192 and 206, respectively. On the drive side of the case module 46 inner diameter, there is further provided an annular seal contact surface 49 for seal 208. The outer races of the motor side bearing 192 and the drive side bearing 206 each are retained on their respective bearing seats by the motor side outer bearing clamp 228 and the drive side outer bearing clamp 230, respectively. The case module also includes a slotted region 232 opposite the ear module 44 which accommodates the passage of electrical wires.

The case model 46 includes an integral radial flange 234 which extends inward to provide mounting surfaces. At the center of this flange there is provided an aperature which is concentric with the axis of rotation 40 of the pitch joint 8. The aperature is adapted to accommodate a motor mount plate 238. The motor mount plate 238 includes an annular array of aperatures suitable to accommodate bolts 240 which engage threaded holes in the case module interior flange 234. The case module interior flange 234 also provides on its drive side a surface 242. The rigid spline 244 of the harmonic drive assembly is rigidly mounted to the surface 242 by bolts 246 which extend through the gear to engage threaded holes in the case module interior flange 234.

The motor mount plate 238 includes a central aperature suitable to accommodate passage of the motor drive shaft 248 and a suitable seal 250. The motor mount plate 238 includes a circular recess 252 on its motor side which is provided to accommodate the centering collar 254 of the motor 256. The motor mount plate 238 also provides recessed aperatures through which appropriate screws or bolts 258 can be passed to rigidly mount the drive motor 256 to the motor mount plate 238. Mounted on the motor shaft 248 is a wave generator 260, a part of the harmonic drive assembly.

In operation, an electric current is supplied to motor 256 causing rotation of the motor drive shaft 248 and of the wave generator 260 of the harmonic drive assembly. This creates relative movement between the rigid spline 244 and the flexspline 226 of the harmonic drive. Viewing the ear module 44 as fixed, the result is that the rigid spline 244 rotates around the flexspline 226 inducing rotation of the case module 46 relative to the ear module 44. Bearings 192 and 206 are interposed between the ear module 44 and the case module 46 to accommodate the rotation. If the torque load encountered by the pitch joint exceeds the frictional resistance provided by the clutch assembly, the case module 46 and ear module 44 will remain fixed in their relative location and the harmonic drive clutch plate 214 will rotate relative to the inner bearing clamp/clutch 196. Thus, when the clutch is properly set it will prevent damage to the harmonic drive assembly.

When relative rotation occurs between the ear module 44 and the case module 46, rotation of the shaft of resolver 259 results. This occurs because the resolver 259 is mounted in the case module 46 while the teeth of the anti-backlash gear mounted on the resolver shaft (not shown) engage the external tooth spur gear 194 which is rigidly mounted to the ear module 44. This arrangement provides a means for detecting the relative rotation and the relative rotational position between the case module 46 and ear module 44.

As previously explained, the roll joints and pitch joints described above can be joined in alternating sequence to construct a manipulator arm with any number of arm joints. Those skilled in the art will recognize that a wide variety of arm configurations are possible with the present invention. In addition to the conventional configuration of alternating pitch and roll joints, for example, a manipulator could be constructed from pitch and roll joints of the present invention in which two or more adjoining joints are of the same type, i.e. pitch or roll. Also, a simple yaw joint could be placed between two pitch or roll joints to provide motion about a vertical axis. It would also be apparent to those skilled in the art that a "dead" static joint of any shape could be substituted in the arm. Similarly, the perpendicular relationship between roll joint and pitch joint axes of rotation provided in the preferred embodiment could be altered. This wide variety of configurations is made possible and simple by the exoskeleton design of the arm segments and by the fact that each arm joint is independently powered.

Those skilled in the art will recognize that the unitized nature of the arm joints facilitates the construction of a redundant manipulator which is advantageous in operation but also problematic. Redundancy generally improves the maneuverability of the manipulator. However, to be useful, the manipulator motion must be accurately controlled and redundancy makes that task more difficult. The controller of the present invention is uniquely adapted to deal with redundancy and with other motion attributes of a multi-axis jointed manipulator arm. The controller of the present invention therefore permits operability of the wide variety of arm configurations made possible by the unitized arm segments described above.

FIG. 1 includes a block representation of the control system 3 of the present invention. The control system 3 is an integral part of an operational manipulator arm. Without a control system, a manipulator arm has little utility.

As represented by FIG. 1, the control system 3 can be viewed for simplicity of explanation as having several discrete elements. The control system 3 of the present invention includes an input/output console 5 to permit communication with an operator or to accommodate various process or machine inputs. It also includes a digital computer 11 which processes a user-program contained in the data memory 9 in accordance with the control programs contained in program memory 7. The user-program directs the actions of the manipulator. The control system 3 also includes analog servocontrol circuits 13 which provide communication with the arm joints and tool 16. Numerous additional peripheral devices may be included to interface the manipulator to the control system 3. For purposes of this discussion, the program memory 7, data memory 9, digital computer 11, and analog servocontrol circuits 13 will be collectively referred to as the controller 15, shown within the phantom box.

The operating system of the controller 15 includes a mode control program. This program allows for switching the controller 15 between various operating modes such as automatic mode, teach mode, manual mode, etc. During the teach mode, an operator uses input/output console 5 to actuate the drive motors of the various arm joints and thereby move the tool 16 into desired locations and orientations along a desired path (i.e. "Goal Positions"). By so doing, the operator establishes in data memory 9 numerous "Goal Positions" on a path of movement which the manipulator will later follow. For example, if the operator wishes for the manipulator to execute a series of spot welds on an object then return to a home position, the operator will run the manipulator through that routine and cause position data to be stored in data memory 9 only when crucial positions are reached, such as the spot weld position. This exercise establishes Goal Positions defining a routine which the manipulator later will follow. For purposes of this description, the term "position" includes both the three-dimensional location of the tool 16 and the orientation of the tool 16.

Additional functions may also be provided with the teach mode. While numerous other operating modes may be available, only the automatic mode will be described in detail here since that is the principal mode involved in the use of the present invention. Operation of the automatic mode assumes that the operator already has "taught" the manipulator the Goal Positions of the routine it is to carry out and that the appropriate information required for execution of the automatic mode is stored in data memory 9 of the controller 15.

The objective of the automatic mode of the controller 15 is to precisely control the location and orientation of tool 16 in space. Referring to FIG. 1, the objective of the controller 15 is to guide the motion of the manipulator so as to precisely control the position of tool 16. This is accomplished by providing a rapid succession of digital signals, each a result of a complex series of computations, which are converted to analog signals and transmitted to each arm joint via analog servocontrol circuits 13. Using appropriate feedback and compensation techniques, the servocontrol circuits 13 provide a final continuous drive signal to each joint motor.

Figure 9:
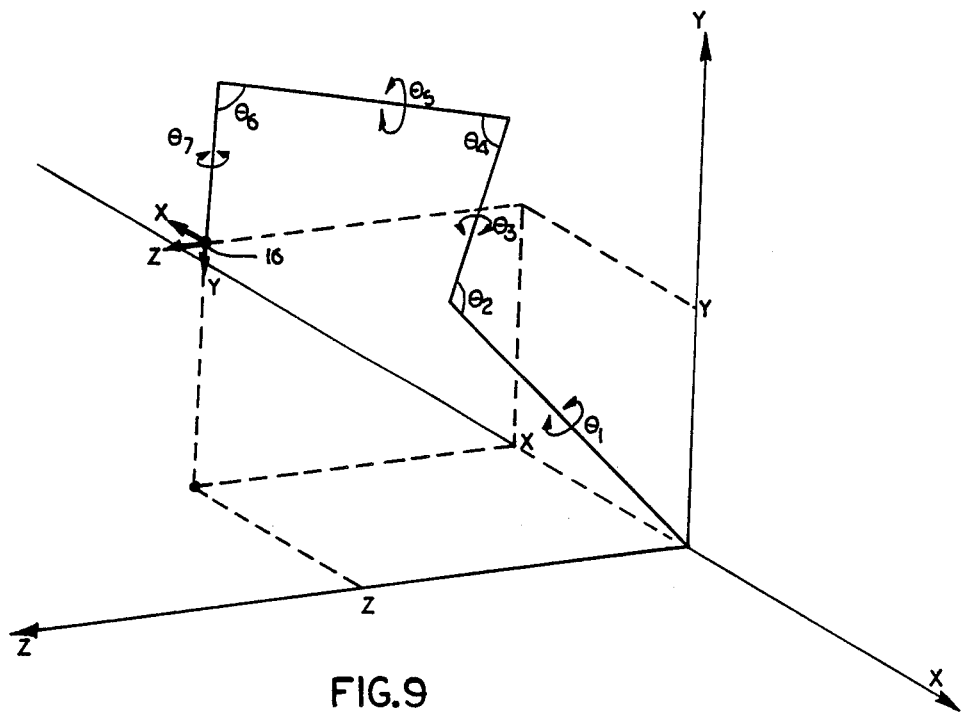
FIG. 9 is a diagrammatic illustration of the relationship in an assembled manipulator between the cartesian coordinate values of the tool 16 relative to the manipulator base and the joint angle values of the pitch joints and roll joints.

The location of the end point of tool 16 in space can be specified with respect to the cartesian coordinate system shown at the manipulator base in FIGS. 1 and 9. That is, the location of the end point of tool 16 can be uniquely defined by values of X, Y and Z in the cartesian coordinate system. The orientation of tool 16 can be defined by reference to a localized cartesian coordinate system whose origin is the end of tool 16 or at the end of the last joint. The orientation can be represented in this local cartesian coordinate system by three values—$i_z$, $j_z$, $k_z$—which equal the length of the projections of a vector of one unit length on the X, Y and Z axes of the localized cartesian coordinate system in which the local Z axis is coincident with the tool centerline. If rolling motion of the tool 16 around its own axis also needs to be controlled, a supplemental set of $i_x$, $j_x$, and $k_x$ values corresponding to a local axis perpendicular to the local Z axis can be added. In general, however, any location and orientation (both direction and roll) of the tool 16 can be satisfactorily defined by a set of six values—the X, Y and Z locations of the tool end point relative to the universal cartesian coordinate system and the $i_z$, $j_z$, and $i_x$ values the tool 16 defined by the local cartesian coordinate system.

FIG. 9 illustrates the geometric relationships involved in the control of a jointed manipulator without the joint offsets present in the illustration. The figure shows the axes of the roll joints of the manipulator of FIG. 1 placed in a cartesian coordinate system. To enable the manipulator to readily adapt to changing Goal Positions or obstacles in its environment it is convenient to define the tool end point 16 location and tool orientation in cartesian coordinates values, X, Y and Z and $i_z$, $j_z$ and $i_x$. However, movement of the tool position is accomplished by changing the roll and pitch joint angles $\theta_1$ through $\theta_7$. The relationships between the tool position and the joint angles of the seven-axis manipulator of the preferred embodiment are defined by the transformation equations below. Similar transformation equations exist to define the geometric relationships involved with manipulators with other numbers of axes or joints. Note that the offset of the pitch joints complicate the formulas and that the formulas are unique to the geometry of the particular machine.

The orientation equation, relating tool orientation to joint angles:

$$[\theta_1]^{-1} [\theta_2]^{-1} \ldots [\theta_7]^{-1} = \begin{bmatrix} i_x & i_y & i_z \\ j_x & j_y & j_z \\ k_x & k_y & k_z \end{bmatrix}$$

where $[\theta_i]$ is the rotational matrix for joint i given by the following equations:

$$\text{for roll joints, } [\theta_i] = \begin{bmatrix} \cos \theta_i & \sin \theta_i & 0 \\ -\sin \theta_i & \cos \theta_i & 0 \\ 0 & 0 & 1 \end{bmatrix}$$

$$\text{for pitch joints } [\theta_i] = \begin{bmatrix} \cos \theta_i & 0 & -\sin \theta_i \\ 0 & 1 & 0 \\ \sin \theta_i & 0 & \cos \theta_i \end{bmatrix}.$$

The location equations, relating tool location to joint angles:

$$\begin{Bmatrix} X \\ Y \\ Z \end{Bmatrix} = [\theta_1]^{-1} \ldots [\theta_7]^{-1} \begin{Bmatrix} X_T \\ Y_T \\ Z_T \end{Bmatrix} + [\theta_1]^{-1} \ldots [\theta_6]^{-1} \begin{Bmatrix} R_6 \\ 0 \\ L_7 \end{Bmatrix} +$$

$$[\theta_1]^{-1} \ldots [\theta_5]^{-1} \begin{Bmatrix} -R_6 \\ 0 \\ L_5 \end{Bmatrix} + [\theta_1]^{-1} \ldots [\theta_4]^{-1} \begin{Bmatrix} R_4 \\ 0 \\ 0 \end{Bmatrix} +$$

$$[\theta_1]^{-1} \ldots [\theta_3]^{-1} \begin{Bmatrix} -R_4 \\ 0 \\ L_3 \end{Bmatrix} + [\theta_1]^{-1}[\theta_2]^{-1} \begin{Bmatrix} -R_2 \\ 0 \\ 0 \end{Bmatrix}.$$

where:
$R_i$ is the distance by which the rotational axis of pitch joint i is offset from the rotational axes of the adjacent roll joints;
$L_i$ is the distance between rotational axes of the two pitch joints adjacent roll joint i; and $$\begin{Bmatrix} X \\ Y \\ Z \end{Bmatrix}$$

represents the distance by which the tool is offset from the end of the last distal manipulator joint.

Movement of the tool 16 in space from one location and orientation to another is accomplished in the manipulator described above by energizing the motors to cause relative rotation within the roll joints and pitch joints. To accomplish movement of the tool 16 between successive Goal Positions stored in data memory 9 as cartesian coordinate values, therefore, it is necessary to determine the appropriate direction and magnitude of rotation of each roll joint and pitch joint. As previously mentioned, there are numerous advantages that arise from the use of manipulators which use rotational joints to effect displacement and orientation of a tool. However, such revolute or anthropomorphic manipulators are difficult to control since the arm joint rotations cannot easily be mathematically correlated to the three-dimensional movements stored in cartesian coordinate values. In other words, it is difficult to mathematically compute quickly the amount by which each of the arm roll and pitch joints should be rotated in order to accomplish a movement in space of the tool tip between successive Goal Positions stored as cartesian coordinate values in data memory 9. It will be readily apparent to anyone skilled in the art that, even in the absence of the kinematic redundancy provided with a manipulator of more than six axes, it is difficult to obtain precise numerical solutions for the joint angle values from the above transformation equations in a timely manner using conventional digital computer technology.

In addition to the difficulty of rapid joint angle computation described above, the seven-axis manipulator of the preferred embodiment presents further control problems. The number of joint angles which must be determined to uniquely define a specified tool position described in cartesian coordinates equals the number of arm joints or axes comprising the manipulator arm. A problem arises when the manipulator arm consists of more arm joints than there are known cartesian coordinate values. For example, if the location and orientation of the tool 16 is completely specified with cartesian coordinate values of X, Y, Z and $i_z$, $j_z$, $i_x$, a manipulator arm consisting of seven joints, as is the case in the preferred embodiment, will yield six equations with seven unknown joint angles which must be calculated to direct the movement of the tool 16. This condition provides kinematic redundancy—advantageous for maneuverability and obstacle avoidance but difficult to control for effective operation.

The controller 15 of the present invention deals effectively with the kinematic redundancy provided when the manipulator is constructed of seven or more joints. It also enables rapid, efficient computation of joint angle values as prescribed by the transformation equations above. Furthermore, the controller 15 of the present invention is able to deal effectively with a condition which arises in the control of both redundant and non-redundant anthropomorphic manipulators known as a singularity. This condition, and its treatment, is described below.

Figure 10:
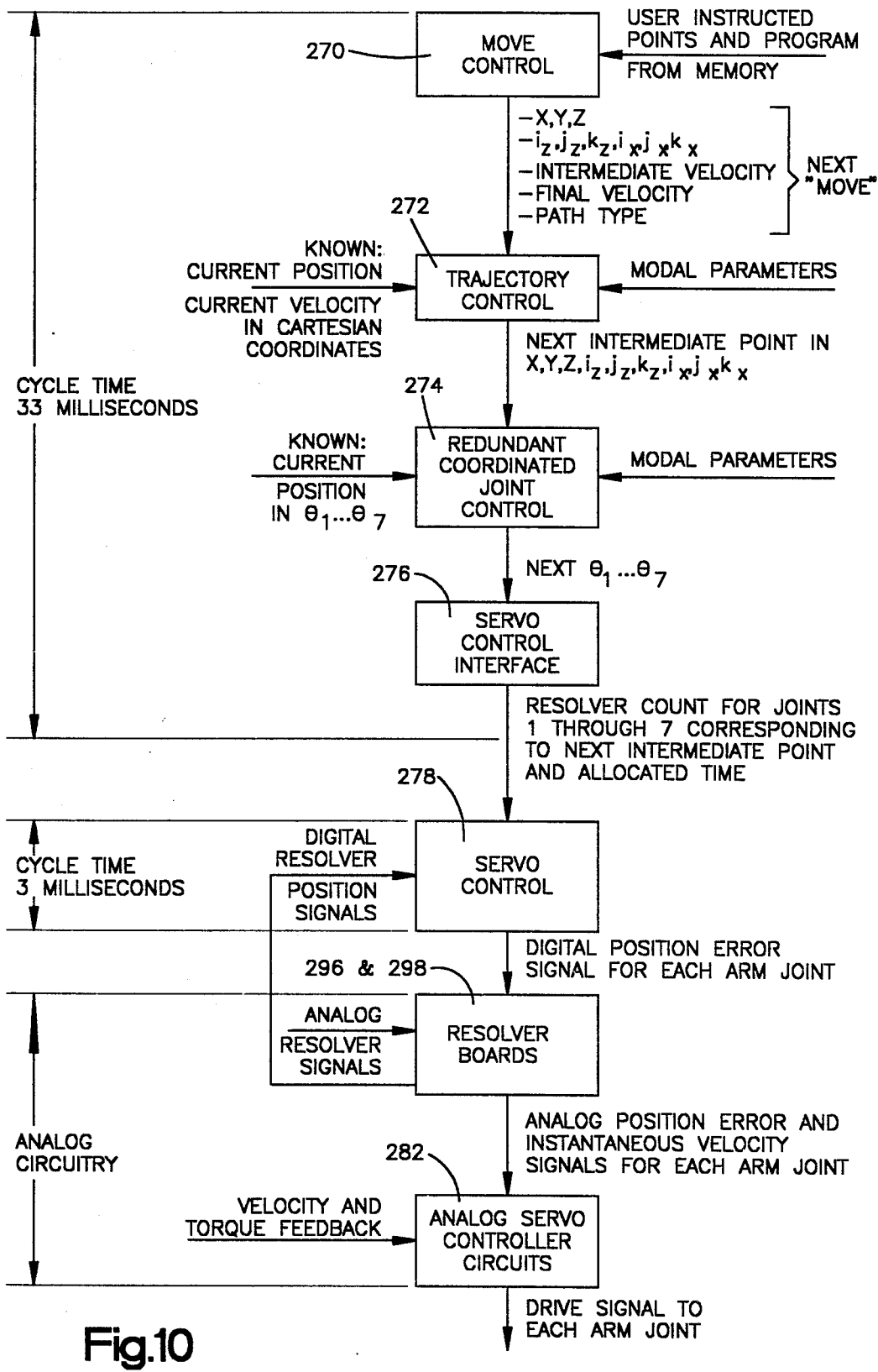
FIG. 10 is a block diagram of the controller of the present invention.

As previously stated, the controller 15 in operation provides a rapid succession of digital signals which eventually result in drive signals to each joint motor. In general, the digital processing carried out in controller 15 operates in the following manner when in the automatic mode. Referring to FIG. 10, the Move Control 270 of controller 15 sequentially retrieves the user-instructed operations and Goal Positions for the tool 16 stored as cartesian coordinates. This and related information are supplied to the Trajectory Control 272 which computes the cartesian coordinates of intermediate points along the instructed path spaced 33 milliseconds apart—the cycle time of the first-tier digital circuitry—(hereinafter "Intermediate Points"). This and related information is supplied to the Redundant Coordinated Joint Control 274 (hereinafter "RCJC") which transforms the set of cartesian coordinate values defining the next Intermediate Point into corresponding joint angle values. The RCJC is able to perform such a computation for a manipulator of any number of joints. These values are transmitted to the Servo Control Interface 276 which adjusts the values for environmental conditions or manipulator physical limits, if necessary. The Servo Control 278 then receives the adjusted joint angle values and generates a digital position error signal for each joint which is proportional to the difference between the actual joint angle value at that instant in time and the value required at the end of the next 3 milli-seconds—the cycle time of the second-tier digital circuitry—to achieve the next Intermediate Point at the appointed time. These digital position error signals are converted to analog signals by the Resolver Boards 280 and transmitted to the Analog Servocontroller Circuits 282 where appropriate feedback and signal compensation is performed, yielding a drive signal for each joint motor. This digital processing is described more fully below and more fully disclosed in the program listings in the Appendix. These programs also could be embodied in a proprietary read-only-memory chip ("ROM").

Figure 11:
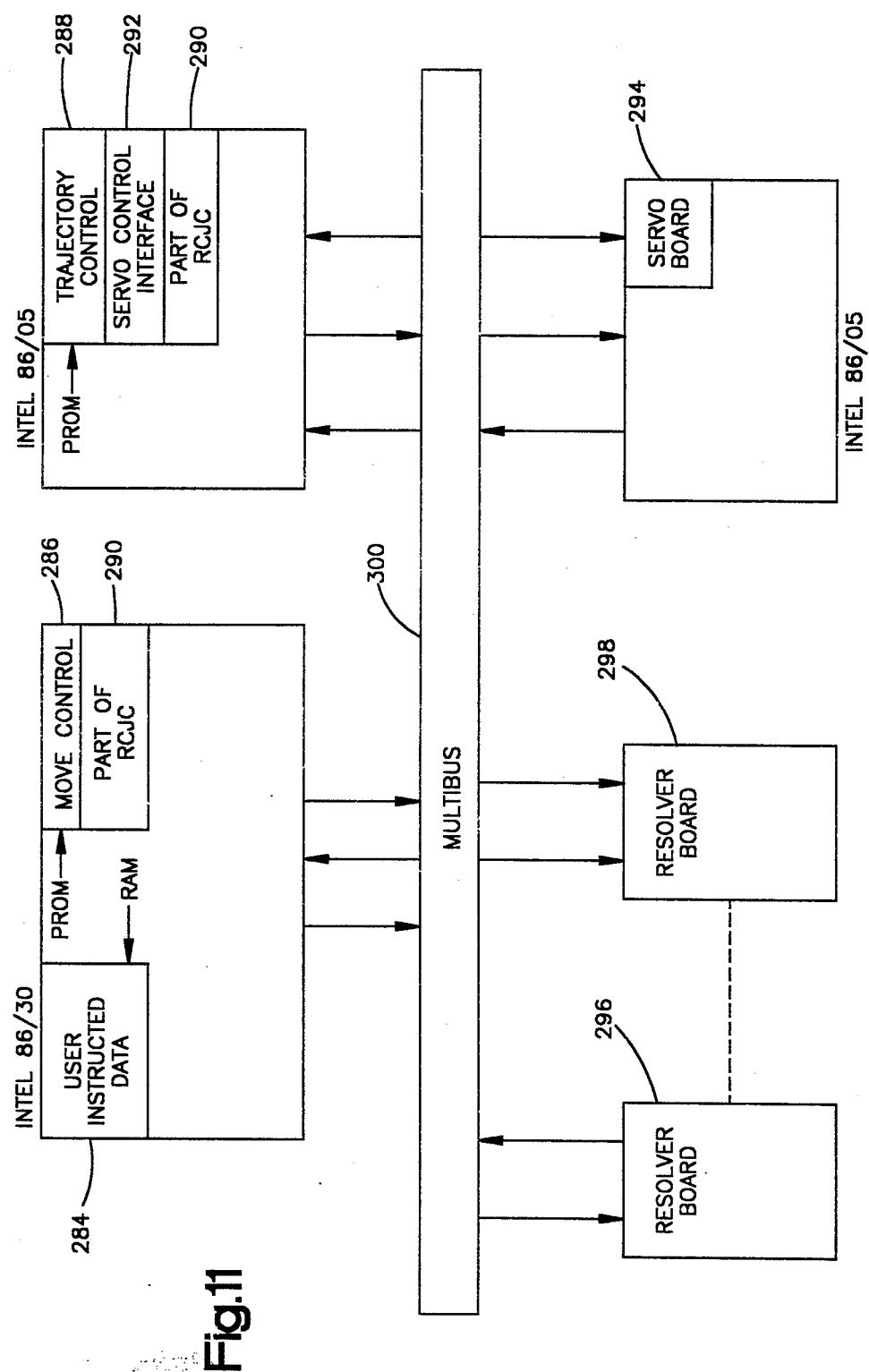
FIG. 11 is a diagrammatic illustration of the computer hardware and circuitry boards comprising a portion of the controller represented in block diagram form in FIG. 10.

In the preferred embodiment of the present invention, the digital processing is performed on the hardware and in the manner diagrammatically illustrated in FIG. 11. An Intel 86/30 circuit board designed by the Intel Corporation with an 8086/8087 co-processor and 128K of dual port memory is run on a 33 milli-second clock cycle in tandem with an Intel 86/05 circuit board with an 8086/8087 co-processor and 16K of static non-dual port memory. The user instructed Goal Position and goal path data 284 are stored on the 86/30 circuit board. The 86/30 circuit board also contains in memory the Move Control program 286 and a portion of the RCJC program 290 which formulates part of a Jacobian matrix.

The 86/05 circuit board contains in memory the Trajectory Control program 288, the remaining portions of the RCJC program 290 and all of the Servo Control Interface program 292. The 86/30 and the 86/05 are connected to communicate by a designated protocol on a multibus 300. Also connected to the multibus 300 are the Resolver Boards 296 and 298 described above and an Intel 86/05 circuit operating on a 3 milli-second clock cycle. This 3 milli-second 86/05 contains in memory the Servo Board program 294.

The digital data processing among these components occurs in the following sequence The Move Control program 286 processes the user-instructed data 284 on the Intel 86/30 to compute the next Goal Position and related data. This data is transmitted over the multibus 300 to the Intel 86/05 operating on the 33 millisecond clock cycle. There the data is processed by the Trajectory Control program 288 to provide Intermediate Point cartesian coordinate values. These Intermediate Point values and related data are sent to the 86/30 processor where a portion of the RCJC program 290 processes them to formulate part of a Jacobian matrix necessary for the redundant joint algorithm described below. The other portion of the RCJC program 290 on the 33 milli-second 86/05 simultaneously formulates the remaining portion of the Jacobian matrix. The portion of the Jacobian matrix formulated by the 86/30 processor is transferred via the multibus 300 to the 33 milli-second 86/05 where it is combined with the other portion of the Jacobian matrix and used in the RCJC program 290 to determine the Intermediate Point joint angle values in accordance with the redundant joint algorithm described below. The Intermediate Point joint angle values then are processed in the 33 milli-second 86/05 using the Servo Control Interface program 292 to compute the corresponding resolver positions for each arm segment and the time allocated to attain those resolver positions. Normally, the time allocated will be 33 milliseconds—the time set for cycling of the Intermediate Point joint angle recomputation. However, a longer time period may be allocated if it is necessary to achieve greater joint angle accuracy through additional iterations of the RCJC program 290 or if it is necessary to scale back the time to adjust for motion commands which are beyond the physical limits of the arm. The resolver positions and allocated time are transmitted over the multibus 300 to the 3 milli-second 86/05. The 3 milli-second 86/05 compares that data to the true current resolver position data most recently received over the multibus 300 from the resolvers via the Resolver Boards 296 and 298. The 3 milli-second 86/05 processes these signals as provided by the Servo Board program 294 and generates digital position error values for each of the arm joints every three milliseconds. The digital position error values for each arm joint are transmitted over the multibus 300 to the appropriate Resolver Board 296 or 298. There the digital signals are converted to analog signals and further processed in the Analog Servocontroller Boards 282 as explained below to provide a final drive signal to each joint.

A description in greater detail of the operation and various features of the programs 286 through 294 is presented below. In addition, a complete enabling disclosure can be found in the Appendix where a listing of each of the programs 288 through 294 indicated in FIG. 11 is presented.

The Move Control

The Move Control 270 operates primarily as an interface between the Trajectory Control 272 and the instructions and Goal Position data supplied by the user. Referred to FIG. 10, the Move Control 270 sequentially retrieves and interprets the instructions stored by the user in data memory 9 in order to identify the Goal Position that is next in time. In addition, the Move Control 270 supplies the user-instructed intermediate velocity to be maintained by the tool 16 during movement toward the next Goal Position and supplies the user-instructed final velocity to be achieved upon reaching the Goal Position. Furthermore, the Move Control 270 specifies a type of approach path to be followed, such as straight line or joint space. For purposes of this description, the collection of data defining the movement of tool 16 between two consecutive user-instructed Goal Positions will be referred to as the "Move Data" and a "Move" will refer to the interval of movement defined by the two consecutive user-instructed Goal Points and corresponding velocities and path definitions.

The Trajectory Control

The Move Data computed by the Move Control 270 define the next Move to be made by the manipulator arm. This data periodically is received by the Trajectory Control 272. At each interval of computation by the controller 15, (the first-tier of the controller 15 operates on a 33 milli-second clock cycle) the most recent known tool 16 position, defined in global cartesian coordinates (X, Y, Z) and local orientation values ($i_z$, $j_z$, $i_x$), and the most recent known velocity are carried in the memory of the Trajectory Control 272. Using the current position and velocity information and the Move Data for the next Move provided by the Move Control 270, the Trajectory Control 272 calculates the coordinate values in cartesian coordinates which the tool 16 must attain at the end of the next successive 33 milli-second time interval in order to reach the user-instructed Goal Position in accordance with the Move Data and pre-programmed joint acceleration rates. In this manner, a Move between successive user-instructed Goal Points A and B, for example, is divided into the numerous "Intermediate Points" spaced 33 milli-seconds apart.

An example of the computations executed by the Trajectory Control to compute the Intermediate Points of each Move may be described in general terms. For simplicity of illustration, the computations will be described in connection with a typical Move. The Move used for illustrative purposes is a Move of the tool end point 16 from point A to point B with a zero velocity at the beginning of the Move (i.e. at point A), a zero velocity at the end of the Move (i.e. at point B) and an intermediate velocity of $V_I$. As mentioned above, the movement between any two successive user-instructed Goal Positions occurs in a finite number of small intermediate steps spaced 33 milli-seconds apart. Each of the Intermediate Points defining these intermediate movements are recalculated by the controller 15 at each 33 millisecond interval. Thus, a Move consists of numerous Intermediate Points along a particular path which are computed only milliseconds before they actually are reached by the tool 16.

To be able to compute the Intermediate Points during the Move, the Trajectory Control 272 first calculates certain parameters associated with the velocity profile of the Move. In the example shown in FIG. 12, the graph illustrates the velocity profile of the illustrative move from A to B. The initial velocity, $V_o$, and final velocity, $V_f$, are zero, and the intermediate velocity equals $V_i$. At the beginning of the Move, the values of $V_o$ and $V_f$ are known. By counting the passage of time from the beginning of the Move and correlating the elapsed time with the velocity profile of the Move, the distance to the next Intermediate Point can be computed.

Figure 12:
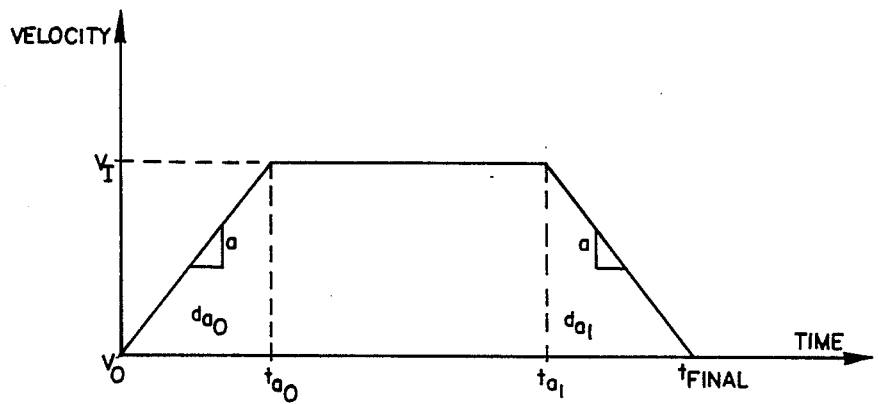
FIG. 12 is a graph used for illustrative purposes for explanation of the trajectory control means.

The trajectory method can be understood by reference to FIG. 12. The distance of any given Intermediate Point along the Move path from the preceding Intermediate Point, to be attained 33 milli-seconds later, depends upon the location of the tool tip on the velocity profile of FIG. 12 at that instant in time. For example, if we look at the first 33 milli-second interval of movement from the starting point A, the next intermediate tool tip location will be a very short distance from point A because the arm at that instant in time will be moving at a low velocity. However, during the middle of the Move from A to B, the tool tip is commanded to move at a velocity of $V_i$. During that segment of the Move, the distance between any two consecutive 33 millisecond Intermediate Points will be much greater. In either case, the distance to the next consecutive Intermediate Point from the starting point A is proportional to the percentage of area subsumed under the velocity curve at that instant in time. This technique is independent of the path type.

The Trajectory Control 272, therefore, first calculates certain key parameters associated with the velocity profile of the particular Move type about to be executed. These Move parameters are: $t_a{}^0$, $t_a{}^1$, $t_{final}$, $d_a{}^{0k}$, and $d_a{}^1$. It will be apparent to one skilled in the art from viewing FIG. 12 and the formulas below how these Move parameters may be calculated.

$$\frac{V_I - V_0}{a} = ta_0$$

$$\frac{(V_I - V_0)^2}{a} = da_0$$

$$\frac{(V_I - V_f)^2}{a} = da_1$$

Once these critical time points of the velocity profile are calculated they are used in the Trajectory Control 272 to compute the Intermediate Points of the Move. The detailed operation of the Trajectory Control program can be seen from the listing in the Appendix.

The Trajectory Control program also discloses a novel method of tool orientation. As previously stated, successive goal positions are defined by location values and orientation values. The tool orientation method of the present invention accomplishes reorientation between successive goal positions in a smooth continuous motion, following a geodesic path. The method entails (i) finding a vector about which the tool orientation triad of the current position can be rotated to attain the tool orientation triad of the next successive goal position and (ii) finding the magnitude and direction of rotation required about that axis. These items of information are computed using an Eigenvector technique in which the axis of rotation is given by the Eigenvector and the angle of rotation is given by the Eigenvalue. Using this information, the tool is re-oriented between successive goal positions in a smooth, continuous motion at a rate consistent with the motion along the path between successive goal positions.

The Redundant Coordinated Joint Control

Refering again to FIG. 10, the cartesian coordinate values of the next Intermediate Point are transmitted from the Trajectory Control 272 to the Redundant Coordinated Joint Control 274 ("RCJC"). The RCJC 274 contains in memory the angular values of the arm joints, ("joint angles") associated with the most recent Intermediate Point. The RCJC also has stored in memory certain "modal parameters" associated with the given Move. Modal parameters are conditions defined independently of the operator-instructed Goal Points and path type, but which ultimately affect the coordination of movement of the arm. Modal parameters include the tool 16 offset location and direction; the linear, orientation, and arm segment acceleration rates; the accuracy tolerance; the tool vector roll constraint (on or off); and the joint spring stiffnesses and spring origins. Some of these items are used by the Trajectory Control 272 and others are used by the RCJC 274.

Given these modal parameters and the most recent known joint angle values, the RCJC 274 calculates the joint angle values which must be achieved to reach the cartesian coordinate values determined for the next Intermediate Point by the Trajectory Control 272. To understand the method by which the RCJC computes these Intermediate Point joint angles, some background information about manipulator motion and associated mathematics is required.

As previously stated, the preferred embodiment of the present invention consists of a manipulator with seven arm joints—i.e. a kinematically redundant manipulator. This presents control difficulties because the transformation equations which relate cartesian coordinate values to joint angles have seven unknown variables (joint angles $\theta_1$ through $\theta_7$) but only six known variables (cartesian coordinate values of the tool 16 endpoint). If such kinematic redundancy is present, it can be handled by specifying an extra mathematical criteria to compute the joint angles. In the preferred embodiment of the present invention, an extra criteria (an "objective function") is used to control redundancy. This will be explained more fully below.

Another problem which must be considered in controlling the motion of a jointed, multi-axis manipulator arm such as that shown in FIG. 1 is a condition known as "singularity". Singularity is the condition of the loss of one or more degrees of freedom of movement in one direction and redundancy in another direction. Sets of singularities occur only at unique joint angles. Its occurrence depends upon the geometry of the arm (i.e. the dimensions of manipulator); the position of the arm at that instant in time; and the direction of movement the arm is called upon to make at that instant; and other possible factors.

The loss of mobility which is a property of a singularity is undesirable and should be avoided in the movement of the manipulator arm. Numerous joint configurations will give rise to a singularity regardless of the number of arm joints of which the manipulator is comprised. With a multi-axis arm such as that described above moving in three dimensional space, many singularity points exist.

When a manipulator arm approaches a set of singularities, one or more of the joints of the machine is effectively eliminated from contributing to the movement the arm is directed to execute. Thus, when a singularity is approached, a six-axis machine effectively is reduced to five degrees of freedom of movement, a five-axis machine to four, etc. In addition, as a singularity is approached, the arm velocities required for movement in the problematic direction approach infinity. As a practical matter, this means that the speed of movement of the tool 16 which the manipulator is capable of producing is greatly reduced as the arm approaches a singularity. While a redundant seven-axis machine has the inherent advantages over singularities, singularities still present a problem. For example, it is possible to encounter double singularities which eliminate two degrees of freedom, effectively reducing a seven-axis machine to a five-axis machine.

In addition to the problem of lost mobility presented by a singularity, the linear transformation equations used to determine the joint angle values have no mathematical solution at the point of singularity. Consequently, a digital computer called upon to calculate joint angle values using conventional numerical techniques typically will be unable to do so when it encounters a singularity.

As previously mentioned, the difficulty of joint angle calculation created by the presence of redundancy can be handled by introducing into the solution method an extra mathematical criteria for resolving the joint angle values. This extra criteria is called an objective function. An objective function is an equation which states a relationship between variables in a manner which permits the function to be solved for a maximum or minimum value, as specified, subject to certain constraints. In the preferred embodiment of the present invention, a convex objective function is used to deal with redundancy and cope with singularities which is based upon a "minimum spring energy" concept of manipulator operation. Under this approach, the extra mathematical criteria introduced into the algorithm used for calculating joint angle values is the requirement that each arm joint behave as though it were held to a fixed home position by a rotational spring coaxially mounted on the arm joint. This behavior can be achieved by specifying as the additional mathematical criteria that the joint angles be determined so as to minimize the value of a specific convex objective function subject to constraints derived from the transformation equations. That is, the constraint equations are linear approximations of the transformation equations.

Selection of a minimum spring energy convex objective function reference to a fixed origin has been found to provide numerous advantages. Most notably, use of such an objective function with the manipulator described above results in a conservative system which is repeatable to a designated point with a high degree of accuracy. Also, such an objective function causes the manipulator to distribute joint work and joint velocities among all arm joints in a reasonable manner. In addition, it tends to prevent the joints of the manipulator from reaching the limits of their permissible range of motion.

While the minimum spring energy convex objective function has been found to provide excellent operating characteristics of a jointed multi-axis manipulator arm, including improved repeatability, that discovery alone does not handle the problem of singularities. Sets of singularities still may be encountered in the operation of the manipulator and will result in an equation set with no mathematical solution. However, the preferred embodiment of the present invention incorporates a redundant joint algorithm which, together with the spring energy objective function, smoothly and effectively handles and tends to avoid sets of singularities.

Redundant Joint Algorithm

The redundant joint algorithm is executed in the RCJC 274. It provides a method for calculating the joint angles required of the arm joints in order to achieve the next Intermediate Point calculated by the Trajectory Control 272.

As explained above, the equation set used to compute the joint angles consists of a convex objective function which is to be optimized subject to constraint equations. The objective function selected is based upon a physical analogy to spring energy but the redundant joint algorithm of the present invention will work effectively with any objective function expressed as a positive semi-definite quadratic form. More specifically, the equation set of the preferred embodiment uses a positive semi-definite quadratic form with a diagonal coefficient matrix as the objective function. The constraint equations of the equation set consist of linear approximations of the transformation equations—in other words, the Jacobian operator of the transformation equations. Thus, the mathematical problem to which the solution algorithm addresses itself may be stated using matrix notation as:

$$\text{Maximize: } \tfrac{1}{2} \sum_{i=1}^{n} k_i ((\Delta\theta_i + \theta_i) - \theta_{i0})^2 \quad (1)$$

$$\text{Subject to: } [J^*]\{\Delta\theta\} = \{\Delta X\} \quad (2)$$

Where:
n is the number of joints, normally seven or greater;
$k_i$ is the spring stiffness for the $i^{th}$ joint;
$\theta_i$ is the known current position of the $i^{th}$ joint;
$\Delta\theta_i$ is the unknown change in angle for the $i^{th}$ joint from its current position;
$\theta_{io}$ is the known spring origin (i.e. the angle corresponding to zero hypothethical spring force) for the $i^{th}$ joint;
$\{\Delta\theta\}$ is the vector of the unknown change in angle for each joint from its current position;
$\{\Delta X\}$ is the vector of the change in cartesian coordinates of the tool position between the current position and the next position;
$[J^*]$ is the Jacobian matrix evaluated at the current position. The Jacobian is an $m \times n$ matrix where m is the number of constraints (normally six or less) and n is the number of arm joints (normally greater than m). The Jacobian is defined by the following expression:

$$[J] = \begin{bmatrix} \frac{\partial f_1}{\partial \theta_1} & \frac{\partial f_1}{\partial \theta_2} & \cdots & \frac{\partial f_1}{\partial \theta_n} \\ \vdots & & & \vdots \\ \frac{\partial f_m}{\partial \theta_1} & & \cdots & \frac{\partial f_m}{\partial \theta_n} \end{bmatrix}$$

Where f is the vector of functions mapping joint variables into cartesian coordinates.

Given this statement of the problem, the first step in the solution algorithm involves a change of variables which results in the spring stiffnesses $k_i$ becoming unity and in the offsets of the joint angles from their spring origins (i.e. $(\{\Delta\theta\}+\{\theta\}-\{\theta_0\})$) becoming zero. To accomplish this change of variables we let $$[K] = [\ 1/\sqrt{k_i}\ ] \quad (3)$$

That is, [K] is a diagonal matrix whose entries are one over the square roots of the spring stiffness $k_i$. Then, we may let $$\{D\}=[K]^{-1}(\{\Delta\theta\}+\{\theta\}-\{\theta_0\}) \quad (4)$$

or $$\{\Delta\theta\}=-(\{\theta\}-[K]\{D\}-\{\theta_0\}) \quad (5)$$

The problem then may be restated as:

$$\text{minimize } \tfrac{1}{2} \sum_{i=1}^{n} D_i^2 \quad (6)$$

$$\text{Subject to } [J^*][K]\{D\} = \{\Delta X\} - [J^*]\{\theta_0\} + [J^*]\{\theta\}. \quad (7)$$

By letting $[J^*][K] = [A]$ and letting $\{\Delta X - [J^*]\{\theta_0\} + [J^*]\{\theta\} = \{B\}$ The problem is further simplified to finding a seven dimensional vector [D] that minimizes $$\tfrac{1}{2} \sum_{i=1}^{n} D_i^2 \quad (8)$$

$$\text{Subject to } [A]\{D\} = \{B\} \quad (9)$$

$$\tfrac{1}{2} \sum_{i=1}^{n} D_i^2 \quad (8)$$

$$\text{Subject to } [A]\{D\} = \{B\} \quad (9)$$

It can be proved that this objective function is minimized by choosing $\{D\}=[F]^t\{G\}$, where $[F]=[E][A]$, $[F][F]^t=[I]$ and $\{G\}=[E]\{B\}$; i.e., [F] is an orthonormal basis for the row space of [A].

Multiplying eq. (9) by matrix [E], $$[E][A]\{D\}=[E]\{B\}$$

substituting $[F]=[E][A]$ and $\{G\}=[E]\{B\}$ we get $$[F]\{D\}=\{G\}. \quad (10)$$

The proof of the proposition stated above goes as follows. Let $[F^\perp]$ be an $(n-m)$ by n matrix whose columns are orthogonal to [F] i.e.: $[F]\cdot[F^\perp]^t=0)$. And let $$\{D\}^*=[F]^t\cdot\{G\}+[F^\perp]^t\cdot\{H\} \quad (11)$$

where {H} is an $(n-m)$ vector. To show that $\{D\}^*$ is a general solution to equation (10), substitute into $\{D\}^*$ into (10):

$$[F]\{D\}^*=[F][F]^t\{G\}+[F][F^\perp]^t\{H\} \quad (12)$$

now using the properties for [F], namely $$[F][F]^t=[I] \text{ and } [F][F^\perp]^t=0,$$

$$[F][F]^t\{G\}=[I]\{G\}=\{G\}$$

$$[F][F^\perp]^t\{H\}=[0]\{H\}=\{0\}.$$

Therefore, $\{D\}^*$ is a general solution to the transformed constraint equation (10) where {H} is an arbitrary vector.

Given that, the problem is reduced to finding a value of {H} which minimizes $$\tfrac{1}{2} \sum_{i=1}^{n} D_i^2$$

or equivalently $\frac{1}{2}D^tD$.

Substituting $\{D\}^*$ into the objective function, $$\frac{1}{2}([F]^t\{G\}+[F^\perp]^t\{H\})^t([F]^t\{G\}+[F^\perp]^t\{H\}) \quad (13)$$

expanding terms and using the properties for $[F]$ and $[F^\perp]$ previously defined, equation (13) reduces to $$\frac{1}{2}(\{G\}^t\{G\} + \{H\}^t\{H\}) \quad (14)$$

Since $\{H\}^t\{H\} = \sum_{i=1}^{n-m} H_i^2 \geq 0$ the minimum occurs when $\{H\}=0$.

Therefore, the objective function $$\frac{1}{2}\sum_{i=1}^{n} D_i^2$$

is a minimum when $\{H\}=0$.

The matrix $[E]$ does not need to be determined explicitly. Rather, if elementary row operations are performed on eq. (9) such that $[A]$ is transformed into $[F]$, then $[B]$ is transformed into $[G]$ without determining $[E]$. Furthermore, the matrix multiplication $[F]^t\{G\}$ to determine $\{D\}$ can be performed concurrently with the matrix transformation of $[A]$ to $[F]$.

As stated above, the redundant joint algorithm executed by the RCJC 274 requires the application of a series of transformation to the matrix equation $[A]\{D\}=\{B\}$ so that it becomes $[F]\{D\}=\{G\}$ where $[F]$ has orthonormal rows (i.e. $[F][F]^t=[I]$). This is done by subtracting from rows 2 through 6 of matrix $[A]$ multiples of the first row so that the first row becomes orthogonal to the remaining rows. Next, multiples of row 2 are subtracted from rows 3 through 6 so that the second row now becomes orthogonal to the remaining row. This process is completed with each successive row of the matrix.

The factors used to compute the multiples of each row in the above process are calculated as follows. By definition, the factor $\alpha$ in the formula below is such that when a given row, a, is multiplied by the factor $\alpha$ and subtracted from a given row, b, rows a and b will be orthogonal. The orthogonality condition means that the dot product of the two vectors is zero. That is, $a(b-\alpha a)^t=0$ or $ab^t-\alpha aa^t=0$ or $\alpha=(ab^t)/(aa^t)$.

When the successive operations described above are performed on the matrix $[A]$ and the vector $\{B\}$, the resulting matrix equation $[F]\{D\}=\{G\}$ provides the basis for computation of the required joint angles. Furthermore, this process provides a means for recognizing and treating a singularity. If the vector magnitude of one of the rows in matrix $[A]$ becomes nearly zero during the execution of the steps described above, that indicates that a singularity has been encountered and a degree of freedom has been lost. When that condition arises, the nearly zero row of the $[A]$ matrix being converted into $[F]$ eliminated from the matrix and a minimum solution to the objective function is calculated with one less constraint equation.

After $\{D\}$ is determined, a change of variables is performed using equation (5) providing the joint angles $\{\Delta\theta\}$. This solution method is iterative, converging on the final solution. To reach the final solution, therefore, the values of $\Delta\theta_i$ determined at the end of the first iteration may be added to the values of $\theta_i$ and the algorithm may be repeated if greater accuracy is needed until $\Delta\theta_i$ approaches zero. Portions of the listing of the RCJC program in the Appendix deviates somewhat from the purely mathematical description above.

Those skilled in the art will recognize that the redundant joint algorithm described above provides the ability to recognize the occurrence of singularities with relative computational ease and speed. Those skilled in the art will realize that the redundant joint algorithm will yield that benefit with any objective function which is expressed as a positive semi-definite quadratic form. Once the near singularity is detected as provided in the algorithm the problematic constraint equation is stricken from the constraint matrices. The effect of this is to reduce the number of known values in the equation set by one and thereby create a hypothetical added redundancy. Using ordinary mathematical solution techniques this would cause an imbalance between the number of equations and the number of unknowns which would be impossible to solve even with a manipulator consisting of six or less axes. However, the minimum spring energy convex objective function described above permits the modified set of equations (with the induced hypothetical redundancy) to be solved by application of the redundant joint algorithm.

In other words, those skilled in the art will recognize that this combination of objective function and solution technique also is quite effective for dealing with singularities arising in non-redundant manipulators. For example, a six-axis machine operating with all location values and tool orientation values specified is not operating in redundancy and therefore does not need the extra solution criteria provided by an objective function. Such a machine, nonetheless, will encounter singularities which are likely to make solution of the transformation equations impossible. With the redundant joint algorithm described above, the presence of a singularity will induce a hypothetical redundancy into the equation set. The hypothetical redundancy will be handled by the spring energy objective function or any other objective function expressed as a sum of squares using the redundant joint algorithm. Thus, the redundant joint algorithm of the present invention not only provides numerous improved operating characteristics and performance capabilities but also enables intelligent treatment of singularities in machines of any number of axes and does so with relative computational ease, speed and efficiency.

The Servo Control Interface

Returning to FIG. 10, the Servo Control Interface 276 receives from the RCJC 274 the joint angle values for each arm joint required to attain the next Intermediate Point. The Servo Control Interface 276 executes a series of calculations to determine whether the arm joints are physically capable of moving to the Intermediate Point within the 33 milli-second cycle time on which the first-tier of the controller 15 runs. The Servo Control Interface 276 accomplishes this calculation by comparing the next required Intermediate Point defined as joint angle values to the previously commanded joint angles. If one or more of the arm joints is incapable of achieving the next Intermediate Point joint angle value called for by the RCJC 274, the Servo Control Interface 6 suspends the operation of the 33 milli-second first-tier clock, preventing it from initiating the next round of computations in the Move Control 270, Trajectory Control 272 and RCJC 274. The Servo Control Interface 6 suspends operation of the clock a sufficient number of cycles to permit the problematic joint to attain the joint value position called for by the most recent command from the RCJC 274. At the same time, the Servo Control Interface 276 modifies the joint angle instructions to the remaining arm joints to ensure that they reach the next Intermediate Point simultaneously with the problematic arm joint. This safeguarding procedure is referred to as "scaling". With or without scaling, the Servo Control Interface 276 calculates the next resolver positions for each of the arm joints required to satisfy the Trajectory Control 272 and RCJC 74 and indicates the time allocated to reach the next resolver position. This information is supplied for all arm joints.

The Servo Control

The next resolver position for each arm joint and the time allocated to attain that position are supplied to the Servo Control 278 from the Servo Control Interface 276. In contrast to the control system elements identified above, the Servo Control 278 of the preferred embodiment operates on a much faster clock cycle—in the range of 3 milli-seconds. For the controller 15 to operate properly, the slower clock must run at a speed which is an integer multiple of the faster clock. The Servo Control 278 receives constant input from each arm joint resolver indicating the present true position of that resolver and arm joint. By linear interpolation, the Servo Control 278 computes the resolver value for each arm joint that should be achieved at the end of each 3 milli-seconds cycle in order for each of the arm joints to achieve the resolver value and corresponding joint angles specified by the Servo Control Interface 276 by the end of the 33 milli-second time interval. The Servo Control 278 transmits to two Resolver Boards 296 & 298 a digital position error signal which is proportional to the difference between the most recent known joint positions and the joint positions required 3 milli-seconds later.

The Resolver Boards

The present invention provides two Resolver Boards, 296 & 298 which are identical and perform identical functions. Two Resolver Boards 296 & 298 are provided to share the seven arm joints. The position of the Resolver Boards 296 & 298 in the flow of signals is illustrated in FIG. 10. The Resolver Boards 296 & 298 each receive a constant analog signal from the arm joint resolvers. The Resolver Boards 296 & 298 convert this to a digital signal indicative of the current resolver position and provide that information to the Servo Control 278 as described above.

Upon receiving the digital position error signals for each joint from the Servo Control 278 every 3 milli-seconds, the Resolver Boards 296 & 298 convert that signal to analog position error signals. This signal is transmitted to Analog Compensation Boards 282 and ultimately results in a drive signal to the joint motors. In addition, the Resolver Boards 296 & 298 generate a continuous analog signal indicative of the instantaneous angular velocity of each arm joint.

Figure 13:
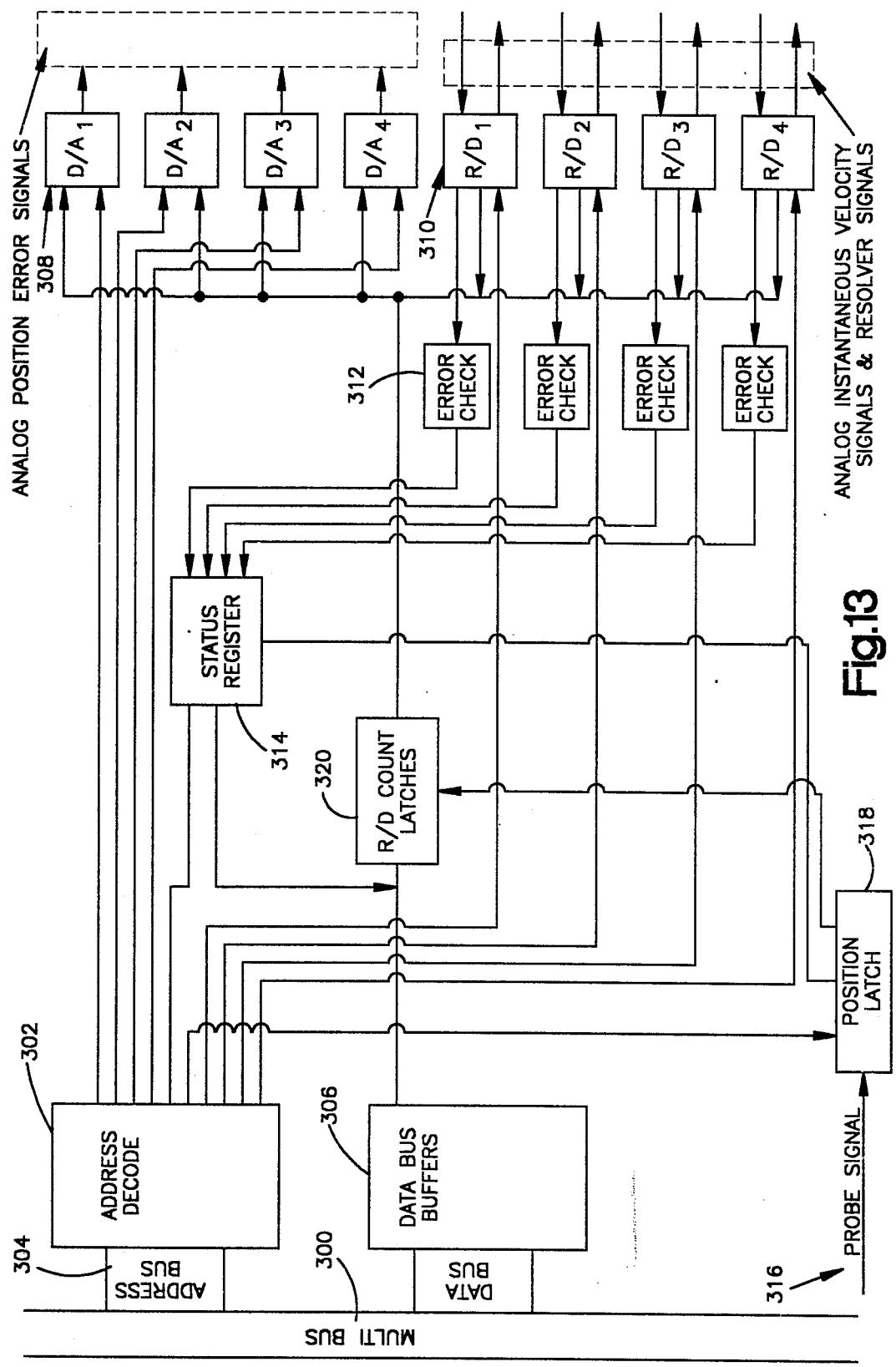
FIG. 13 is a block diagram of the circuitry required to interface the digital portion of the controller to the analog servocontrol circuits.

Turning now to FIG. 13, one of the Resolver Boards 296 & 298 is shown in greater detail. The Resolver Boards 296 & 298 are identical and each include the functions shown by the block diagrams in FIG. 13. The address decode 302 monitors address signals sent on the address bus 304 portion of a multibus 300, described above, and responds to a predetermined address signal which indicates that the Resolver Board and a particular component of the Resolver Board are to be accessed. The address decode 302 occurs in two parts. The first part is a base address which indicates that signals are to be received by the Resolver Board. Second, the address decode 302 selects the individual component contained on the Resolver Board which is designated by the address signal. Once an individual component of the Resolver Board is selected by the address decode 302, data transmission occurs via the databus buffers 306.

The digital position error signals generated by the Servo Control 278 mentioned above are transmitted sequentially to the digital to analog chips 308 ("D/A chips") contained on the Resolver Board. The D/A chips 308 are conventional commercially available items which convert a digital signal to a corresponding analog signal. One such signal is generated for each arm joint of the manipulator. Each analog signal is transmitted to the Analog Servocontrol Circuits 282 shown in FIGS. 10 and 15.

As previously explained, each arm joint includes a resolver. The resolver is a conventional commercially available device which provides two analog output signals indicative of the precise angular position of its arm joint. These signals are transmitted to the resolver to digital chips 310 ("R/D chips") provided on the Resolver Board. Each arm joint has a resolver and a corresponding R/D chip 310. The R/D chip 310 of the arm joint provides a continuous digital count derived from the analog resolver signals indicative of the resolver position and, thus, the arm joint angle. This digital count is transmitted via the databus buffers 306 and the multibus 300 to the Servo Control 278 and used, as described above, by the Servo Control 278 program to generate a digital position error signal. Each of the R/D chips 310 also provide an instantaneous analog velocity signal indicative of the instantaneous angular velocity of each arm joint which is transmitted to the Analog Compensation Boards 282.

Each R/D chip 310 has a specific tracking rate. The tracking rate is the rate at which the R/D chip 310 can process the analog signal received from the resolver and provide a corresponding digital value. When an arm joint moves at a speed which results in resolver signal variations which exceed the tracking rate, the R/D chip 310 generates a DC signal the magnitude of which is indicative of the lag between the actual resolver position and the instantaneous digital value produced by the R/D chip 310. This DC signal is transmitted for each arm joint to the error check 312. The error check 312 consists of a comparator circuit which compares the DC signal to a predetermined value. If the DC signal exceeds the predetermined value, the error check 312 latches a flip-flop on the status register 314. In the next cycle of digital signal transmission between the Resolver Board and the Servo Control 278, the Servo Control 278 receives a signal from the status register 314 via the databus buffers 306 informing it of the count lag and the Servo Control 278 responds accordingly.

Each of the R/D chips 310 also include a "busy line". When the busy line signal is on, it indicates that the R/D chip 310 is updating its digital count. The busy line and the count latches 320 (one is provided for each joint) can be used to prevent a read error resulting from a change in one or more of the digital values during a read. That is, the count latches 320 are set to update every time the busy line signal turns off from their associated R/D chip 310. In this manner, the processor reads the resolver counts directly from the count latches rather than from the R/D chip 310.

In certain applications, the manipulator of the present invention may be used for high accuracy metrology and the tool 16 carried on the end of the manipulator may be a touch probe. The count latches 320 may be used in such cases to capture the digital resolver values generated by the R/D chips 310 that existed at the moment the probe made contact with its target. In FIG. 13, a probe signal 316 is provided when the probe makes contact with its target. That signal is transmitted to a position latch 318. When the position latch 318 is triggered, a signal from the position latch 318 is transmitted to the count latches 320 and a signal is transmitted to the status register 314 to record the fact that a probe signal 316 was received. On the next cycle of the controller 15, the Servo Control 278 receives a signal from the status register 314 indicating that the probe has made contact. The Servo Control 278 program treats the digital signals received from the count latches associated with each joint in that cycle as an identification of the arm joint positions at the moment of probe contact. The position latch 318 then is unlatched and the count latches 320 proceed to update their digital values to match the R/D chips 310.

The Analog Servocontrol Circuits

Refering again to FIG. 10 the Analog Servocontrol Circuits 282 receive from the Resolver Boards 296 and 298 an analog position error signal generated by the D/A chips 308 and an instantaneous velocity signal for each arm joint. The Analog Servocontrol Circuits 282 amplify the position error signal and, using the instantaneous velocity signal and the torque feedback signal explained below, compensate that signal to ensure stability—thereby providing a final drive signal to each arm joint motor.

The electromechanical system of a manipulator such as that of the present invention typically is a second order or higher order feedback control system, as those terms are used in the vernacular of control engineering. As such, the electromechanical system is susceptible to operational instability if the physical characteristics of the system and the drive signals provided to the joint motors are not properly controlled.

In many servomechanisms similar to the present invention, instability problems are minimized because the mechanical drive structure is very stiff and thus its resonant frequency is very high; beyond a point of serious concern. The forward path of the control loop of such a system may be compensated, (e.g. by a low frequency lag compensation network) thereby making the system behave as a first order system within the bandwidth of interest. This approach has the disadvantage of slowing the response of the servomechanism because it reduces the bandwidth of the system.

Such conventional servocontrol techniques are inappropriate with the manipulator described above. The mechanical drive system of the manipulator of the present invention is relatively compliant due to the flexibility of the harmonic drive. Consequently, the resonant frequency of the mechanical drive system is relatively low. Furthermore, the harmonic drive creates vibration and control problems that would be far less severe in a structure which used other power transmission means. That is, in addition to the typical excitation sources of drive signal frequency content and various mechanical roughnesses in the system, the harmonic drive causes sinusoidal excitation as a result of an inherent transmission deviation at the rate of n cycles per motor revolution where n is the number of lobes on the wave generators 100 or 260.

Because of these features, a typical servocontrol and compensation scheme consisting of a position feedback loop and a velocity feedback loop would be ineffective and sluggish if applied to the structure of the present invention. Conventional control strategies would not allow the resonance to be controlled and, in fact, may amplify the problem of the harmonic drive sinusoidal excitation.

To overcome these and related problems, the servocontroller of the present invention utilizes a torque feedback loop in addition to velocity and position feedback loops and in addition to a current loop included as part of a current amplifier. While all three feedback loops are used together in normal operation, the torque loop could be used alone for applications of the manipulator which call for application of a specified force to an object. Furthermore, the torque loop feedback control concept of the present invention could be advantageously employed in nearly any type of actuator driven mechanical apparatus; it is not limited to the revolute manipulator described above. By using the torque loop as the innermost loop, the motor and harmonic drive configuration of each arm joint operates as a torque producing plant rather than a motion producing plant. The torque feedback loop not only remedies the sinusoidal excitation to the structure which otherwise would be induced by the harmonic drive, it also improves the response of the servomechanism because it permits the position and velocity feedback loops to operate in a frequency range far beyond what would otherwise be possible. The use of the torque loop also significantly reduces the effects of friction and compliance in the servomechanism, enabling the present invention to operate with much greater accuracy and repeatability. Furthermore, the torque loop feedback improves the operating characteristics of the manipulator even when mounted on a soft foundation.

Figure 14:
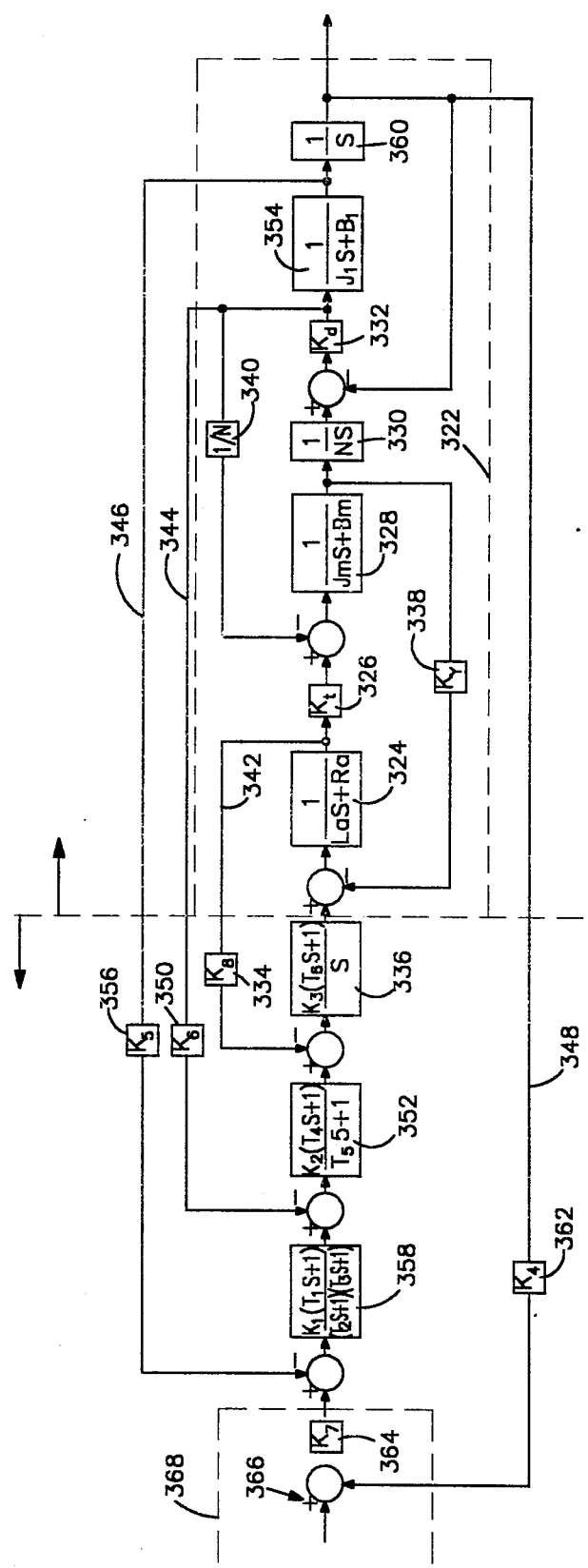
FIG. 14 is a block diagram of the system comprising the manipulator, the digital controller, and the servocontrol circuits.

FIG. 14 is a block diagram of the present invention including the servocontrol elements. Each block of the block diagram contains the transfer function of the associated mechanical, electrical or electromechanical element of the entire system expressed as Laplace transforms. The symbols which correspond directly to physical properties of the portion of the system whose operation is being controlled are defined below.

$L_a$—Armature Inductance
$R_a$—Armature Resistance
$K_t$—Motor Torque Constant
$J_m$—Motor and Wave Generator Inertia
$B_m$—Motor and Wave Generator Viscous Friction
$K_v$—Voltage Constant
N—Drive Ratio $K_d$—Drive Spring Constant
$J_j$—Joint Inertia
$B_j$—Joint Viscous Friction Those skilled in the art will recognize that the same or equivalent compensation systems could be represented by block diagrams different from that shown in the figure.

For simplicity, the portion of the block diagram contained within phantom box 322 may be viewed as the primary physical system of a single arm joint controlled by the servocontroller of the present invention. Blocks 324 and 326 represent the armature inductance and resistance and the torque constant of the drive motor, respectively. Block 328 represents the inertia and viscous friction of the drive motor and the harmonic drive wave generator. Block 330 represents the gear ratio of the harmonic drive and the time integration of velocity to position. Block 332 represents the spring constant associated with the harmonic drive and the other power transmission components leading up to the point where the strain gauges are applied.

Blocks 334, 336, and 338 and the associated feedback lines represent dynamic characteristics of a typical current amplifier/motor combination. Block 340 represents the axis torque reflected through the gear ratio to the motor.

As shown in the figure, the servocontrol of the present invention uses forward path compensation. Compensation also could be accomplished by placing compensation networks in the feedback loops to achieve the same functions.

As previously stated, the servocontrol of the present invention uses four feedback loops—a current loop 342, a torque loop 344, a velocity loop 346, and a position loop 348. The torque loop 344 represents the torque feedback. Block 350 represents the gain of the feedback transducer which is proportional to the torque in the drive at the point where the harmonic drive connects to the arm joint. Block 352 represents the torque loop compensation network.

Block 354 represents the inertia and friction of the manipulator arm segment. Velocity loop 346 represents the arm segment velocity feedback. Block 356 represents the gain of the velocity feedback transducer which is proportional to the velocity of the arm segment. Block 358 represents the velocity loop compensation network.

Finally, Block 360 represents the time integration of velocity to position. Block 362 is the gain of the position feedback transducer and 364 represents a gain in the forward path which determines the speed of response of the position loop. The arrow 366 represents the commanded position signal. The portion of the block diagram contained within the phantom box 368 represents functions which are performed in the digital portion of the controller 15.

Those skilled in the art will recognize that numerous alternative circuits and control schemes could be developed to accomplish the torque, velocity, and position and current feedback control of the present invention using conventional compensation design techniques such as those explained in Ogata, *Modern Control Engineering*, Prentice-Hall Inc. 1970, the relevant portions of which are incorporated herein by reference. If desired, for example, the values of the block diagram terms associated with the electromechanical system of each joint can be determined experimentally and used to mathematically derive an appropriate compensation network. Alternatively, the frequency response and phase characteristics of the portion of the system to be controlled can be experimentally determined and graphically represented by Bode plots, which would form the basis for design of appropriate forward path or feedback path compensation networks. Other design methods also could be employed.

Figure 15:
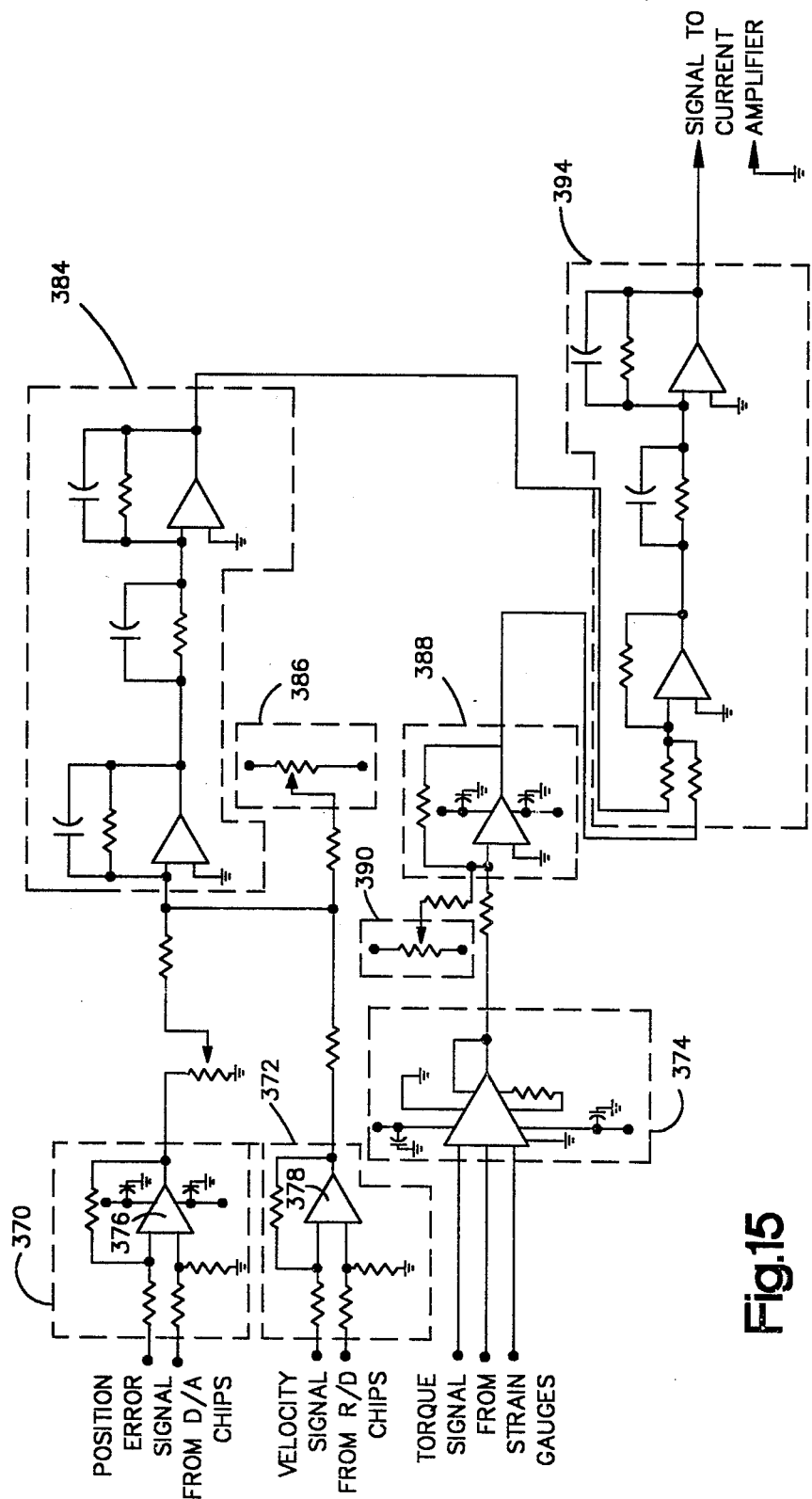
FIG. 15 is a schematic diagram of the servocontrol circuits of the present invention.
Figure 16:
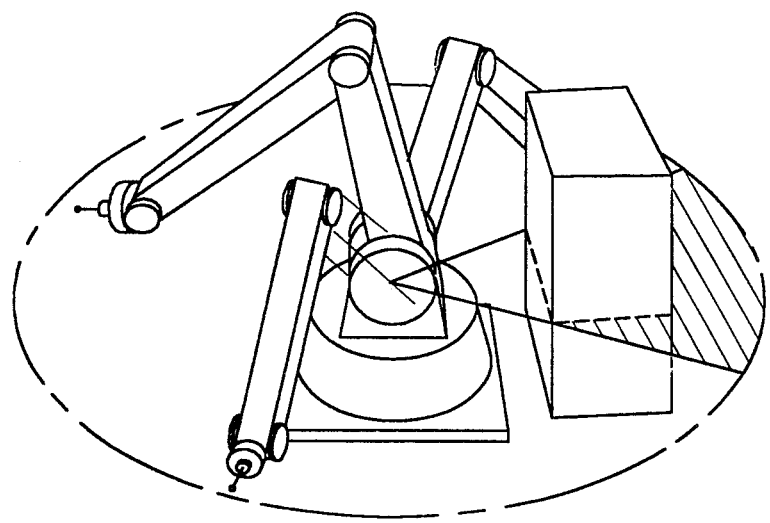
FIG. 16 is an illustration of the maneuverability limitations of a typical jointed-arm manipulator.
Figure 17:
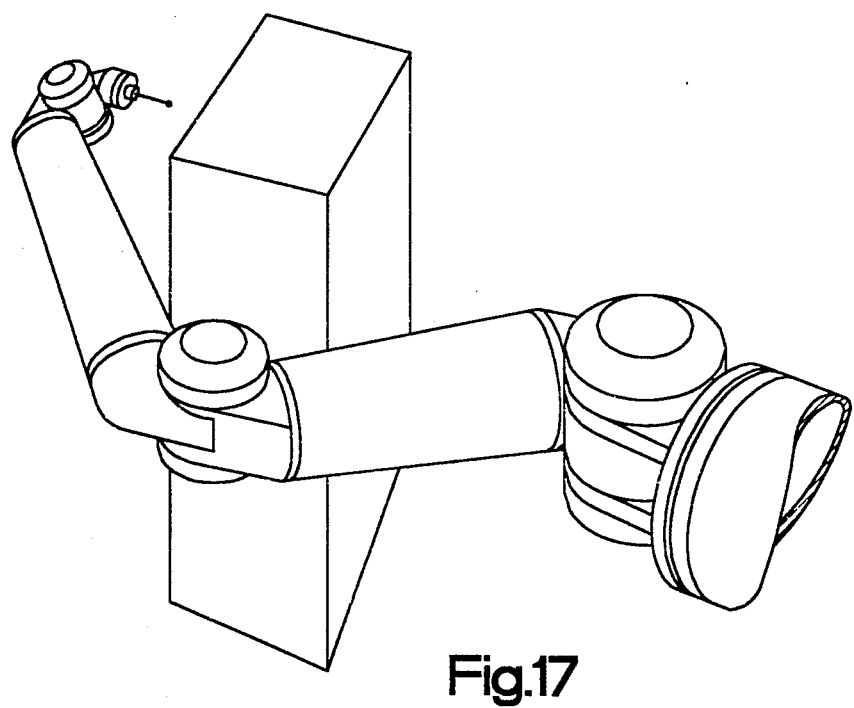
FIG. 17 is an illustration of the maneuverability features of the present invention.
Figure 18:
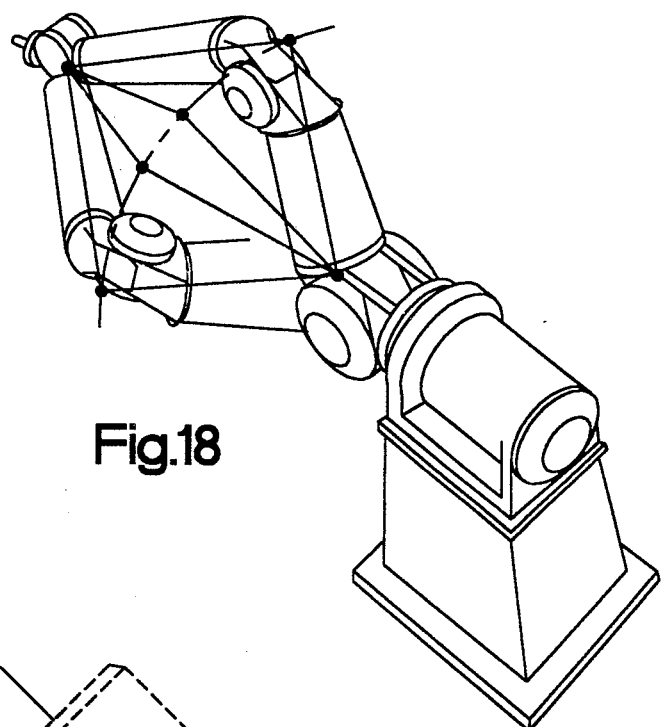
FIG. 18 is an illustration of the ability of the present invention to "orbit" the "elbow" of the manipulator out of a fixed plane of operation.
Figure 19:
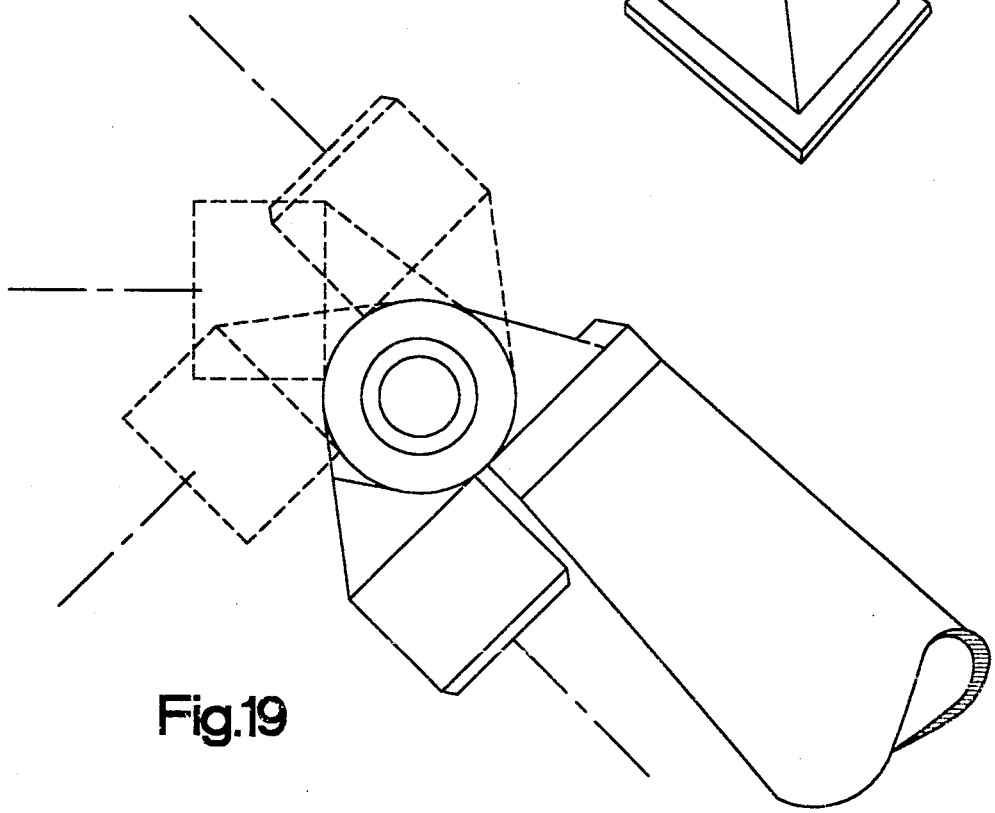
FIG. 19 is an illustration of the ability of adjacent roll joints of the present invention to fold back to a parallel position.

The preferred embodiment of the servocontrol circuitry of the present invention is schematically illustrated in FIG. 15. For descriptive purposes, the schematic diagram may be logically divided into several portions outlined by the phantom boxes.

As indicated in the block diagram of FIG. 14 and shown in FIG. 15, the circuitry receives a position error signal from the D/A chips, a velocity signal from the R/D chips and a torque signal from the strain gauges. The position error signal is supplied to a differential amplifier amplifier shown in phantom box 370. Likewise, the velocity signal and torque signal are supplied to the differential amplifier and instrumentation amplifier shown in phantom boxes 372 and 374, respectively. Each of the differential amplifiers 370 and 372 includes an operational amplifier, indicated at 376 and 378, and an array of one or more resistors and capacitors. Instrumentation amplifier 374 is designed to provide greater gain than amplifiers 370 and 372 because the signals received from the strain gauges are quite small.

The signal provided by the differential amplifiers 370 and 372 is supplied to the velocity loop compensation network shown in phantom box 384 and adjusted by balance 386. Balance 386 permits the circuitry to be adjusted to provide zero output when there is zero position error.

The velocity loop compensation network 384 consists of a lag network of a particular type known as a lag-lead-lag network. A low frequency lag, consisting of an operational amplifier, resistor and capacitor, is provided to increase the signal gain at low frequencies, thus improving the static stiffness of the manipulator. This is followed by a medium frequency lead network, consisting of a resistor and capacitor, to improve stability and reduce overshoot of the manipulator. Finally, a high frequency lag network, consisting of an operational amplifier, resistor and capacitor, is provided as a filter. A velocity loop compensation network consisting of only a lag network or only a lag-lead network would also be functional but would not be as effective as the lag-lead-lag network illustrated.

The amplified torque signal from differential amplifier 374 is supplied to the lag network consisting of an operational amplifier, resistors and capacitors shown in phantom box 388 and is adjusted by balance 390. This network serves as a high frequency filter. The resulting signal is supplied to the torque loop compensation network shown in phantom box 394.

The torque loop compensation network 394 consists of a lead network of a particular type known as a lead-lag, preceded by a differential amplifier. A low frequency lead, consisting of a resistor and capacitor receives the signal from a differential amplifier. This is followed by a lag network consisting of an operational amplifier, resistor and capacitor. The resulting signal is supplied to a conventional current amplifier which produces the final drive signal to the joint motor. The purpose and effect of the torque loop compensation network is to alter the frequency response and phase characteristics of the open loop forward path to avoid a condition of instability and to maximize the operational bandwidth of this inner-most feedback loop. By maximizing the operational bandwidth of the torque loop, the bandwidth of the velocity and position loops are permitted to be higher than would otherwise be possible, thus improving the speed of response of the manipulator.

The values of the network components are determined experimentally or by mathematical or computer modeling. The values are unique for each structure being controlled. Therefore, the values are not indicated here.

The foregoing description of a preferred embodiment and alternative embodiments of the invention have been presented for purposes of illustration and description. The description is not intended to be exhaustive or to limit the invention to the precise form disclosed. Obviously, many modifications and variations are possible in light of the above teaching. The embodiment presented above was chosen and described in order to best explain the principles of the invention and its practical application to thereby enable others skilled in the art to best utilize the invention in various embodiments and with various modifications as are suited to the particular use contemplated.

APPENDIX

The attached listings include the Trajectory Control, the Redundant Coordinated Joint Control, the Servo Control Interface and the Servo Control. The listing are either in Intel assembly language for the 8086/8087 coprocessors or in PLM.

TRAJECTORY CONTROL

```
PL/M-86 COMPILER      ORIENT$MOD
                      TRAJECTORY ORIENTATION ORIENT iRMX 86 PL/M-86 V2.3 COMPILATION OF MODULE ORIENT$MOD
OBJECT MODULE PLACED IN ORIENT.OBJ
COMPILER INVOKED BY:  :LANG:PLM86 ORIENT.P86 DEBUG TYPE OPTIMIZE(0) LARGE PAGELENGTH(84) PRINT(:BSPR:ORIENT.LST)

$RAM
            $TITLE('ORIENT$MOD')
            $SUBTITLE('TRAJECTORY ORIENTATION ORIENT')
    1       ORIENT$MOD:
            DO;
            /* ORIENT-TRAJECTORY ORIENTATION ORIENT */
            /* ORIENT-012085-1500 RRC/JAMES FARRELL */
            /* ORIENT-012085-1500 RRC/JAMES FARRELL */

$INCLUDE (:BSINC:COPYRIGHT.PLM)
        =   /*         ********************************
        =   *****  (C) COPYRIGHT 198_ ROBOTICS RESEARCH CORPORATION    *****
        =   *****            ALL RIGHTS RESERVED                       *****
        =               ********************************
        =   */

/* DESCRIPTION

ACCESS */

$INCLUDE (:INC:SINCOS.EXT)
    2  1 =  SINCOS: PROCEDURE(N,A$PT,S$PT,C$PT) EXTERNAL;
    3  2 =      DECLARE N INTEGER;
    4  2 =      DECLARE (A$PT,S$PT,C$PT) POINTER;
        =   /* N, INTEGER VARIABLE,U-NUMBER OF ANGLES
        =      A, REAL ARRAY,U-ANGLES IN RADIANS (0.0(=A(=2*PI)
        =      S, REAL ARRAY,D-SINE OF ANGLES
        =      C, REAL ARRAY,D-COSINE OF ANGLES */

5  2 =  END SINCOS;
            $INCLUDE (:INC:MV3.EXT)
    6  1 =  MV3: PROCEDURE(A$PT,B$PT,C$PT) EXTERNAL;
    7  2 =      DECLARE (A$PT,B$PT,C$PT) POINTER;
```

```
            = /* MV3 RETURNS THE PRODUCT OF TWO (3X3) MATRICES.
            =    [C]=[A][B] */

8   2 =       END MV3;

9   1         ORIENT:PROCEDURE(X$PT,THETA,AX$PT,BX$PT) PUBLIC;
 10   2         DECLARE (X$PT,AX$PT,BX$PT) POINTER;
 11   2         DECLARE X BASED X$PT(1) REAL;
 12   2         DECLARE AX BASED AX$PT(1) REAL;
 13   2         DECLARE BX BASED BX$PT(1) REAL;
 14   2         DECLARE THETA REAL;

15   2         DECLARE (T)(9) REAL ;
 16   2         DECLARE (S,C) REAL ;

17   2         CALL SINCOS(1,@THETA,@S,@C);
 18   2         T(2)=BX(2);
 19   2         T(5)=BX(5);
 20   2         T(8)=BX(8);

21   2         T(0)=C*BX(0)-S*BX(1);
 22   2         T(3)=C*BX(3)-S*BX(4);
 23   2         T(6)=C*BX(6)-S*BX(7);
 24   2         T(1)=S*BX(0)+C*BX(1);
 25   2         T(4)=S*BX(3)+C*BX(4);
 26   2         T(7)=S*BX(6)+C*BX(7);
 27   2         CALL MV3(@AX,@T,@X);
 28   2         END ORIENT;
 29   1         END ORIENT$MOD;
```

MODULE INFORMATION:

CODE AREA SIZE     = 013FH    319D
    CONSTANT AREA SIZE = 0000H      0D
    VARIABLE AREA SIZE = 002CH     44D
    MAXIMUM STACK SIZE = 0026H     38D
    66 LINES READ
    0 PROGRAM WARNINGS
    0 PROGRAM ERRORS

DICTIONARY SUMMARY:

290KB MEMORY AVAILABLE
    3KB MEMORY USED    (1%)
    0KB DISK SPACE USED

END OF PL/M-86 COMPILATION

PL/M-86 COMPILER    TRJLIN$MOD
                    TRAJECTORY CONTROL ALONG A STRAIGHT LINE

IRMX 86 PL/M-86 V2.3 COMPILATION OF MODULE TRJLIN$MOD
OBJECT MODULE PLACED IN TRJLIN.OBJ
COMPILER INVOKED BY:  :LANG:PLM86 TRJLIN.P86 DEBUG TYPE OPTIMIZE(0) LARGE PAGELENGTH(84) PRINT(:BSPR:TRJLIN.LST)

$RAM
            $TITLE('TRJLIN$MOD')
            $SUBTITLE('TRAJECTORY CONTROL ALONG A STRAIGHT LINE')
            TRJLIN$MOD:
            DO;
            /* TRJLIN-COMPUTE NEXT INTERMEDIATE TCP POSITION ALONG A LINE */
            /* TRJLIN-082685-1400 RRC/JAMES FARRELL */
            /* TRJLIN-102384-1100 RRC/JAMES FARRELL */
            /* TRJLIN-081684-1500 RRC/JAMES FARRELL */

$INCLUDE (:BSINC:COPYRIGHT.PLM)
          = /*      *******************************
          = ***   (C) COPYRIGHT 198_ ROBOTICS RESEARCH CORPORATION   ***
          = ***              ALL RIGHTS RESERVED                     ***
          =        *******************************
          = */

/* DESCRIPTION

TRJLIN COMPUTES THE NEXT TCP XYZ LOCATION AND ORIENTATION ALONG A
            STRAIGHT LINE PATH.

ACCESS

```
CALL TRJLIN(ISRT,@XYZ0,@CS0,@XYZ1,@CS1,@V,@XYZI,@CSI,@IVEL,@IFIN);
ISRT,WORD VARIABLE,U=1-START OF PATH (PRECALCULATE DISTANCES AND TIMES)
                                (USED ALSO FOR SENSORY INTERACTION)
                        ,U=0-CONTINUE WITH PRECALCULATED TRAJECTORY PATH
XYZ0,REAL ARRAY,U-STARTING TCP XYZ LOCATION IN CJ1 CS
CS0,REAL ARRAY,U-STARTING TCP ORIENTATION TRIAD VECTORS
XYZ1,REAL ARRAY,U-GOAL POINT XYZ LOCATION IN CJ1 CS
CS1,REAL ARRAY,U-GOAL POINT TCP ORIENTATION TRIAD VECTORS
V,REAL ARRAY,U-START,INTERMEDIATE,FINAL LINEAR VELOCITIES
XYZI,REAL ARRAY,D-NEXT INTERMEDIATE TCP XYZ LOCATION IN CJ1 CS
CSI,REAL ARRAY,D-NEXT INTERMEDIATE X&Y&Z AXES UNIT VECTORS IN CJ1 CSI
IVEL,REAL VARIABLE,D-VELOCITY AT END OF INTERMEDIATE MOVE
IFIN,INTEGER VARIABLE,D-STATUS 1- GOAL POINT NEXT COMMANDED POSITION
                               2- GOAL POINT NOT THE NEXT COMMANDED POSITION */
        $INCLUDE (:BSINC:TR004.EXT)
 2  1 = TR004:PROCEDURE(ISRT,VEL$PT,ACC,T,TDIS,FVEL$PT) REAL EXTERNAL;
 3  2 = DECLARE ISRT WORD;
 4  2 = DECLARE (VEL$PT,FVEL$PT) POINTER;
 5  2 = DECLARE (T,TDIS,ACC) REAL;
 6  2 = END TR004;
        $INCLUDE (:INC:SETUP.EXT)
 7  1 = SETUP:PROCEDURE(A$PT,B$PT,PHI$PT,AX$PT,BX$PT) EXTERNAL;
 8  2 = DECLARE (A$PT,B$PT,PHI$PT,AX$PT,BX$PT) POINTER;
 9  2 = END SETUP;
        $INCLUDE (:INC:ORIENT.EXT)
10  1 = ORIENT:PROCEDURE(X$PT,THETA,AX$PT,BX$PT) EXTERNAL;
11  2 = DECLARE (X$PT,AX$PT,BX$PT) POINTER;
12  2 = DECLARE THETA REAL;
13  2 = END ORIENT;
        $INCLUDE (:INC:FSCL.EXT)
14  1 = FSCL:PROCEDURE(NUM,scl,A$PT,B$PT) EXTERNAL;
15  2 = DECLARE NUM INTEGER;
16  2 = DECLARE scl REAL;
17  2 = DECLARE (A$PT,B$PT) POINTER;

= /* FSCL RETURNS A SCALED VECTOR OF LENGTH N.
    =      {B}=scl*{A} */

18  2 = END FSCL;
        $INCLUDE (:INC:VDIF.EXT)
19  1 = VDIF: PROCEDURE(A$PT,B$PT,C$PT) EXTERNAL;
20  2 = DECLARE (A$PT,B$PT,C$PT) POINTER;

= /* VDIF RETURNS THE 3D VECTOR DIFFERENCE
    =      {C}={A}-{B} */

21  2 = END VDIF;
        $INCLUDE (:INC:FDIF.EXT)
22  1 = FDIF: PROCEDURE(N,A$PT,B$PT,C$PT) EXTERNAL;
23  2 = DECLARE N WORD;
24  2 = DECLARE (A$PT,B$PT,C$PT) POINTER;

= /* FDIF RETURNS THE DIFFERENCE BETWEEN TWO 'N' DIMENSIONAL VECTORS
    =      {C}={A}-{B} */

25  2 = END FDIF;
        $INCLUDE (:INC:VMAG.EXT)
26  1 = VMAG:PROCEDURE (A) REAL EXTERNAL;
27  2 = DECLARE A POINTER;

= /* VMAG RETURNS THE LENGTH OF A 3D VECTOR */

28  2 = END VMAG;

$INCLUDE (:BSINC:CONFG.DEC)
29  1 = DECLARE
    =   NJ WORD EXTERNAL, /* NUMBER OF JOINTS */
    =   NAJ WORD EXTERNAL, /* NUMBER OF ACTIVE JOINTS */
    =   AJL(10) WORD EXTERNAL, /* ACTIVE JOINT LIST (I.E. 1,2,4,5,6 ETC) */
    =   SAJ(10) WORD EXTERNAL, /* ACTIVE/INACTIVE JOINT STATUS */
    =   -J0(10) WORD EXTERNAL, /* HOME POSITION OF JOINTS */
    =   (R0,R2,R4,R6,R8,R10,L1,L3,L5,L7,L9) REAL EXTERNAL, /* JOINT OFFSETS */
    =   (XDIR,YDIR,ZDIR) REAL EXTERNAL; /* LINEAR BASE SLIDE DIRECTIONS */
        $INCLUDE (:BSINC:MODAL.DEC)
30  1 = DECLARE
    =   (TX,TY,TZ) REAL EXTERNAL, /* XYZ TOOL OFFSET */
    =   (TI,TJ,TK) REAL EXTERNAL, /* NORMALIZED IJK TOOL VECTOR OFFSET DIRECTION */
    =   (RI,RJ,RK) REAL EXTERNAL, /* NORMALIZED IJK TOOL ROLL VECTOR OFFSET DIRECTION */
    =   ACCFLAG WORD EXTERNAL, /* ACCURACY FLAG (ON=1,OFF=0) */
    =   ACCTOL REAL EXTERNAL, /* ACCURACY TOLERANCE (INCHES) IF ACCFLAG=1 */
```

```
           =   ROLLFLAG WORD EXTERNAL,  /* TOOL ROLL CONSTRAINT FLAG (ON=1,OFF=0) */
           =   J$POS(10) REAL EXTERNAL, /* INACTIVE JOINT POSITIONS */
           =   LG$JA$ORG(10) REAL EXTERNAL, /* LAST GOAL POINT ACTIVE JOINT ORIGINS */
           =   NG$JA$ORG(10) REAL EXTERNAL, /* GOAL POINT ACTIVE JOINT ORIGINS */
           =   JA$STIF(10) REAL EXTERNAL, /* ACTIVE JOINT STIFFNESS */
           =   JA$ORG(10) REAL EXTERNAL, /* ACTIVE JOINT ORIGINS */
           =   LOOPTIME REAL EXTERNAL, /* LOOPTIME */
           =   LIN$ORI$SCL REAL EXTERNAL, /* LINEAR TO ORIENTATION VELOCITY SCALE FACTOR */
           =   LIN$ORB$SCL REAL EXTERNAL, /* LINEAR TO ORBIT VELOCITY SCALE FACTOR */
           =   LIN$ACC REAL EXTERNAL, /*ACCELERATION VALUE INCHES/SEC**2 */
           =   ORI$ACC REAL EXTERNAL, /* ORIENTATION ACCELERATION RADIANS/SEC**2 */
           =   ANG$ACC REAL EXTERNAL;/* ANGULAR (JOINT) ACCELERATION RADIAN/SEC**2 */
               $INCLUDE (:PSINC:LIMIT.DEC)
   31   1   =   DECLARE
           =   JNT$VEL$LIM(10) REAL EXTERNAL, /* JOINT VELOCITY LIMITS(RAD/SEC , IN/SEC)*/
           =   JNT$POS$LIM$LOW(10) REAL EXTERNAL, /* LOWER JOINT LIMIT(RADIANS,INCHES) */
           =   JNT$POS$LIM$HI(10) REAL EXTERNAL; /* HIGHER JOINT LIMIT(RADIANS,INCHES) */

32   1   DECLARE DISMIN REAL INITIAL (5.0E-02);
   33   1   DECLARE ANGMIN REAL INITIAL (5.0E-02);

34   1   TRJLIN:PROCEDURE(ISRT,XYZ0$PT,CS0$PT,XYZ1$PT,CS1$PT,V$PT,
                      XYZI$PT,CSI$PT,IVEL$PT,IFIN$PT) PUBLIC;
   35   2   DECLARE (ISRT) WORD;
   36   2   DECLARE (XYZ0$PT,CS0$PT,XYZ1$PT,CS1$PT,V$PT,XYZI$PT,CSI$PT,IVEL$PT
                    ,IFIN$PT) POINTER;
   37   2   DECLARE XYZ0 BASED XYZ0$PT(1) REAL;
   38   2   DECLARE XYZ1 BASED XYZ1$PT(1) REAL;
   39   2   DECLARE XYZI BASED XYZI$PT(1) REAL;
   40   2   DECLARE CS0 BASED CS0$PT(1) REAL;
   41   2   DECLARE CS1 BASED CS1$PT(1) REAL;
   42   2   DECLARE CSI BASED CSI$PT(1) REAL;
   43   2   DECLARE V BASED V$PT(1) REAL;
   44   2   DECLARE IVEL BASED IVEL$PT REAL;
   45   2   DECLARE IFIN BASED IFIN$PT WORD;

46   2   DECLARE (DIS,TOTDIS,T,DELT,VELMOD,ACCMOD) REAL;
   47   2   DECLARE (ATHETA,DTHETA,STHETA,S$ORI$ACC,S$ANG$ACC) REAL;
   48   2   DECLARE ANG(2) REAL;
   49   2   DECLARE (PHI,THETA) REAL AT (@ANG);
   50   2   DECLARE D(3) REAL,ADUM REAL,RATIO REAL;
   51   2   DECLARE V$ANG(3) REAL;
   52   2   DECLARE (AX,BX)(9) REAL;
   53   2   DECLARE (D$ORG)(10) REAL;
   54   2   DECLARE (NAJ2,ICASE) WORD;
   55   2   DECLARE (I,MM) INTEGER;
   56   2   DECLARE (TEMP,LARGE) REAL;

57   2   IF(ISRT=1)THEN
   58   2   LSTART:DO;
   59   3   NAJ2=2*NAJ;
             /* XYZ COMPONENTS OF STRAIGHT LINE PATH*/
   60   3   CALL VDIF(@XYZ1,@XYZ0,@D);
             /* INTERPOLATE SPRING ORIGINS */
   61   3   CALL FDIF(NAJ,@NG$JA$ORG,@LG$JA$ORG,@D$ORG);
             /* DEFAULT TO NORMAL LINEAR MOVE */
   62   3   ICASE=0;
             /* GOAL POINT DISTANCE */
   63   3   TOTDIS=VMAG(@D);
             /* INITIALIZE TIME */
   64   3   T=0.0;
             /* DEFAULT TO NOT END OF PATH */
   65   3   IFIN=0;
             /* FIND ROTATION ANGLE */
   66   3   CALL SETUP(@CS0,@CS1,@PHI,@AX,@BX);
             /* CHECK IF ONLY AN ORIENTATION MOVE */
   67   3   IF(TOTDIS<DISMIN)THEN DO;
             /* FORCE PATH TO BE STOP POINT TO STOP POINT */
   69   4   V(0)=0.0;
   70   4   V(2)=0.0;
             /* ORIENTATION MOVE */
   71   4   ICASE=1;
             /* ANGULAR TRAVEL DISTANCE */
   72   4   ATHETA=ABS(PHI);
             /* SCALE ORIENTATION ANGLE */
   73   4   STHETA=ATHETA/LIN$ORI$SCL;
             /* SCALE ORIENTATION ACCELERATION */
   74   4   S$ORI$ACC=ORI$ACC/LIN$ORI$SCL;
             /* CHECK IF AN ORBIT MOVE */
   75   4   IF(ATHETA<=ANGMIN)THEN DO;
   77   5   ICASE=2;
   78   5   ATHETA=0.0;
             /* DETERMINE THE LARGE ANGULAR DISPLACEMENT */
   79   5   DO I=0 TO NAJ-1;
```

```
 80   6        TEMP=ABS(D$ORG(I));
 81   6        IF(TEMP)ATHETA)THEN ATHETA=TEMP;
 82   5        END;
               /* SCALE ORBIT ANGLE */
 84   5        STHETA=ATHETA/LIN$ORB$SCL;
               /* SCALE ANGULAR ACCELERATION */
 85   5        S$ANG$ACC=ANG$ACC/LIN$ORB$SCL;
 86   5        END;
 87   4        END;
 88   3        END LSTART;

/* NEXT TIME INTERVAL */
 89   2        T=T+LOOP$TIME;

90   2        ICASE:DO CASE ICASE;
 91   3        CASE0:DO;
               /* LINEAR MOVE */
               /* COMPUTE THE NEXT LINEAR PATH DISTANCE */
 92   4        DIS=TR004(ISRT,@V,LIN$ACC,T,TOTDIS,@IVEL);
               /* COMPUTE THE NEXT INTERMEDIATE POINT LOCATION */
 93   4        RATIO=DIS/TOTDIS;
 94   4        IF(RATIO)=1.0)THEN DO;
 96   5        RATIO=1.0;
 97   5        IFIN=1;
               /* SET UP LAST GOAL POINT JOINT CONSTANTS */
 98   5        CALL MOVW(@NG$JA$ORG,@LG$JA$ORG,NAJ2);
 99   5        CALL MOVW(@NG$JA$ORG,@JA$ORG,NAJ2);
100   5        END;
               /* INTERPOLATE THE JOINT CONSTANTS */
101   4        ELSE DO;
102   5        DO I=0 TO NAJ-1;
103   6        JA$ORG(I)=LG$JA$ORG(I)+RATIO*D$ORG(I);
104   6        END;
105   5        END;
106   4        DO I=0 TO 2;
107   5        XYZI(I)=XYZ0(I)+RATIO*D(I);
108   5        END;
               /*GET INTERMEDIATE TCP X&Y AXES */
109   4        IF(PHI()0.0)THEN DO;
111   5        THETA=RATIO*PHI;
112   5        CALL ORIENT(@CSI,THETA,@AX,@BX);
113   5        END;
114   4        ELSE DO;
115   5        CALL MOVW(@CS1,@CSI,18);
116   5        END;

117   4        RETURN;
118   4        END CASE0;

119   3        CASE1:DO;
               /* ORIENTATION MOVE */
               /* SET UP XYZ LOCATION */
120   4        CALL MOVW(@XYZI,@XYZI,6);
               /* FIND THE NEXT ANGULAR POSITION */
121   4        DTHETA=TR004(ISRT,@V,S$ORI$ACC,T,STHETA,@IVEL);
               /* RATIO OF NEXT ANGLE TO TOTAL ANGULAR MOVEMENT */
122   4        RATIO=DTHETA/STHETA;
123   4        IF(RATIO)=1.0)THEN DO;
125   5        RATIO=1.0;
126   5        IFIN=1;
               /* SET UP LAST GOAL POINT JOINT CONSTANTS */
127   5        CALL MOVW(@NG$JA$ORG,@LG$JA$ORG,NAJ2);
128   5        CALL MOVW(@NG$JA$ORG,@JA$ORG,NAJ2);
129   5        END;
               /* INTERPOLATE THE JOINT CONSTANTS */
130   4        ELSE DO;
131   5        DO I=0 TO NAJ-1;
132   6        JA$ORG(I)=LG$JA$ORG(I)+RATIO*D$ORG(I);
133   6        END;
134   5        END;
               /*GET INTERMEDIATE TCP AXES */
135   4        IF(PHI()0.0)THEN DO;
137   5        THETA=RATIO*PHI;
138   5        CALL ORIENT(@CSI,THETA,@AX,@BX);
139   5        END;
140   4        ELSE DO;
141   5        CALL MOVW(@CS1,@CSI,18);
142   5        END;
143   4        RETURN;
144   4        END CASE1;

145   3        CASE2:DO;
               /* ORBIT MOVE */
               /* SET UP XYZ LOCATION OF GOAL POINT */
```

```
146  4    CALL MOVW(@XYZ1,@XYZI,6);
          /* SET NEXT AXES VECTORS EQUAL TO GOAL AXES VECTORS*/
147  4    CALL MOVW(@CS1,@CSI,18);
          /* FIND THE NEXT ANGULAR POSITION */
148  4    DTHETA=TR004(ISRT,@V,S$ANG$ACC,T,STHETA,@IVEL);
          /*RATIO OF NEXT ANGLE TO TOTAL ANGULAR MOVEMENT */
149  4    RATIO=DTHETA/STHETA;
150  4    IF(RATIO)=1.0)THEN DO;
152  5    RATIO=1.0;
153  5    IFIN=1;
          /* SET UP LAST GOAL POINT JOINT CONSTANTS */
154  5    CALL MOVW(@NG$JA$ORG,@LG$JA$ORG,NAJ2);
155  5    CALL MOVW(@NG$JA$ORG,@JA$ORG,NAJ2);
156  5    END;
          /* INTERPOLATE THE JOINT CONSTANTS */
157  4    ELSE DO;
158  5    DO I=0 TO NAJ-1;
159  6    JA$ORG(I)=LG$JA$ORG(I)+RATIO*D$ORG(I);
160  6    END;
161  5    END;
162  4    RETURN;
163  4    END CASE2;
164  3    END LCASE;

165  2    END TRJLIN;
166  1    END TRJLIN$MOD;
```

MODULE INFORMATION:

CODE AREA SIZE     = 0604H   1540D
    CONSTANT AREA SIZE = 0030H     48D
    VARIABLE AREA SIZE = 00DCH    220D
    MAXIMUM STACK SIZE = 0042H     66D
    298 LINES READ
    0 PROGRAM WARNINGS
    0 PROGRAM ERRORS

DICTIONARY SUMMARY:

**KB MEMORY AVAILABLE

8KB MEMORY USED    (2%)
    0KB DISK SPACE USED

END OF PL/M-86 COMPILATION

PL/M-86 COMPILER    TR004$MOD
                    RETURN EXPECTED PATH LENGTH BETWEEN END POINTS AT TIME T iRMX 86 PL/M-86 V2.3 COMPILATION OF MODULE TR004MOD
OBJECT MODULE PLACED IN TR004.OBJ
COMPILER INVOKED BY:  :LANG:PLM86 TR004.P86 DEBUG TYPE OPTIMIZE(0) LARGE PAGELENGTH(84) PRINT(:BSPR:TR004.LST)

$TITLE('TR004$MOD')
          $SUBTITLE('RETURN EXPECTED PATH LENGTH BETWEEN END POINTS AT TIME T')
   1      TR004$MOD:
          DO;
          /* TR004-COMPUTE EXPECTED PATH LENGTH BETWEEN END POINTS AT TIME T*/
          /* TR004-082885-1500 RRC/JAMES FARRELL */

$INCLUDE (:BSINC:COPYRIGHT.PLM)
        = /*    **********************************
        = ***   (C) COPYRIGHT 198_  ROBOTICS RESEARCH CORPORATION   ***
        = ***            ALL RIGHTS RESERVED                         ***
        =      **********************************
        = */

/* DESCRIPTION

TR004 COMPUTES THE EXPECTED TCP PATH DISTANCE TO BE TRAVELED AT TIME T
          BASED ON THE STARTING,INTERMEDIATE,FINAL VELOCITY,THE MODAL ACC/DEC VALUE AND
          THE DISTANCE TO BE TRAVELED. ALSO THE VELOCITY AT TIME T IS ALSO RETURNED.

ACCESS

DIST=TR004(ISRT,@VEL,ACC,T,TDIS,@FVEL)
          ISRT, INTEGER VARIABLE,U-1-START OF PATH (PRECALCUATE DISTANCES AND TIMES)
                                 ,U-0-NOT FIRST MOVE OF PATH-USE PRECALCULATED PARAMETERS

```
            VEL,REAL ARRAY,U-START,INTERMEDIATE,FINAL VELOCITIES OF TCP PATH
            ACC,REAL VARIABLE,U-ACC/DEC VALUE
            T,REAL VARIABLE,U-TIME TRAVELED
            TDIS,REAL VARIABLE,U-TOTAL PATH DISTANCE
            DIST,REAL VARIABLE,D-EXPECTED PATH DISTANCE TRAVELED AT TIME T
            FVEL,REAL VARIABLE,D-VELOCITY AT TIME T */

$INCLUDE (:INC:SQRT.EXT)
 2    1  =  SQRT:PROCEDURE(X) REAL EXTERNAL;
 3    2  =  DECLARE X REAL;

=     /* SQRT RETURNS THE SQUARE ROOT */

4    2  =  END SQRT;

5    1     TR004:PROCEDURE(ISRT,VEL$PT,ACC,T,TDIS,FVEL$PT) REAL PUBLIC;

6    2     DECLARE ISRT WORD;
 7    2     DECLARE (ACC,T,TDIS) REAL;
 8    2     DECLARE (VEL$PT,FVEL$PT) POINTER;
 9    2     DECLARE VEL BASED VEL$PT(1) REAL;
10    2     DECLARE FVEL BASED FVEL$PT REAL;

11    2     DECLARE (TYPE,SUBTYPE) WORD;
12    2     DECLARE (DIS$TOT,DA0,DA1,DA$TOT,DIST) REAL;
13    2     DECLARE (DIS,D$VEL) REAL;
14    2     DECLARE (V02,VI2,V12) REAL;
15    2     DECLARE (TA0,TA1,T$VEL,T$END) REAL;
16    2     DECLARE (TDIS0,ACC0,ACC1) REAL;
17    2     DECLARE (TEMP,TEMP1) REAL;
18    2     DECLARE VEL0(3) REAL,TA(2) REAL;
19    2     DECLARE (V0,VI,V1) REAL AT (@VEL0);

20    2     IF(ISRT=1)THEN
21    2     LSTART:DO;

/* PRECALCULATE TRAJECTORY PARAMETERS */
            /* SET UP VELOCITIES */
22    3     CALL MOVW(@VEL,@VEL0,6);
            /* SET UP TOTAL PATH DISTANCE */
23    3     CALL MOVW(@TDIS,@TDIS0,2);

/* DETERMINE THE TYPE OF MOVE */
            /* TYPE=1 - V0)=VI & VI(V1 */
            /* TYPE=2 - V0)=VI & VI(=VI */
            /* TYPE=3 - V0(=VI & VI(VI */
            /* TYPE=4 - V0(=VI & VI(=V1 */

24    3     IF(V0)=VI)THEN
25    3     L8:DO;
26    4     IF(VI(V1)THEN TYPE=1;
28    4     ELSE TYPE=2;
29    4     END L8;

30    3     ELSE
            L10:DO;
31    4     IF(V1(VI)THEN TYPE=3;
33    4     ELSE TYPE=4;
34    4     END L10;

/* SET UP THE TRAJECTORY PARAMETERS */
35    3     LCASE:DO CASE TYPE-1;

/* TYPE 1 V0)=VI & V1)VI */
36    4     CASE0:DO;
            /* SETUP ACCELERATION PARAMETERS */
37    5     ACC0=-ACC;
38    5     ACC1=ACC;
39    5     VI2=VI*VI;
40    5     V02=V0*V0;
41    5     V12=V1*V1;
            /* COMPUTE THE DEC DISTANCE */
42    5     DA0=0.5*(VI2-V02)/ACC0;
            /* COMPUTE THE ACC DISTANCE */
43    5     DA1=0.5*(V12-VI2)/ACC1;
            /* COMPUTE TOTAL ACC/DEC DISTANCE TRAVELED */
44    5     DA$TOT=DA0+DA1;
            /* ADJUST INTERMEDIATE VELOCITY IF ACC/DEC GREATER THAN PATH DISTANCE */
45    5     IF(DA$TOT(=TDIS0)THEN
46    5     L15:DO;
            /* CONSTANT VELOCITY DISTANCE */
47    6     D$VEL=TDIS0-DA$TOT;
            /* END OF DEACCELERATION TIME */
```

```
48  6    TA0=(VI-V0)/ACC0;
              /* END OF CONSTANT VELOCITY TIME */
49  6    TSVEL=DSVEL/VI+TA0;
              /* TOTAL TRAVEL TIME */
50  6    TSEND=TSVEL+(V1-VI)/ACC1;
51  6    END L15;

/* ADJUST INTERMEDIATE VELOCITY SO NO CONSTANT VELOCITY TRAVEL */
52  5    ELSE
              L20:DO;
53  6    VI=SQRT((VI2+V02)/2.0+ACC0*TDIS0);
              /* CHECK IF PHYSICALLY REALIZABLE INTERMEDIATE VELOCITY */
54  6    IF((VI<=V0)AND(VI<=V1))THEN
55  6    L25:DO;
56  7    CALL MOVW(@VI,@VEL(1),2);
57  7    VI2=VI*VI;
              /* RECOMPUTE THE TRAVEL TIMES */
58  7    TA0=(VI-V0)/ACC0;
59  7    TSVEL=TA0;
60  7    TSEND=TA0+(V1-VI)/ACC1;
              /* RECOMPUTE DISTANCES */
61  7    DA0=0.5*(VI2-V02)/ACC0;
62  7    DA1=TDIS0-DA0;
63  7    DSVEL=0.0;
64  7    END L25;

65  6    ELSE
              L28:DO;
66  7    IF(V1>=V0)THEN DO;
68  8    TA0=(-V0+SQRT(V02+2.0*ACC*TDIS0))/ACC;
69  8    ACC0=ACC;
70  8    END;
71  7    ELSE DO;
72  8    TA0=(V0-SQRT(V02-2.0*ACC*TDIS0))/ACC;
73  8    ACC0=-ACC;
74  8    END;
              /* RECOMPUTE THE NEW TIME CONSTANTS */
75  7    TSVEL=TA0;
76  7    TSEND=TA0;
              /* NEW FINAL VELOCITY */
77  7    V1=V0+ACC0*TA0;
78  7    CALL MOVW(@V1,@VEL(2),2);
79  7    END L28;
80  6    END L20;
81  5    END CASE0;

/* TYPE 2 V0>=VI & VI>V1 */
82  4    CASE1:DO;
              /* SETUP ACCELERATION PARAMETERS */
83  5    ACC0=-ACC;
84  5    ACC1=-ACC;
85  5    VI2=VI*VI;
86  5    V02=V0*V0;
87  5    V12=V1*V1;
              /* COMPUTE THE 1ST DEC DISTANCE */
88  5    DA0=0.5*(VI2-V02)/ACC0;
              /* COMPUTE THE 2ND DEC DISTANCE */
89  5    DA1=0.5*(V12-VI2)/ACC1;
              /* COMPUTE TOTAL ACC/DEC DISTANCE TRAVELED */
90  5    DASTOT=DA0+DA1;
              /* ADJUST INTERMEDIATE VELOCITY IF ACC/DEC GREATER THAN PATH DISTANCE */
91  5    IF(DASTOT<=TDIS0)THEN
92  5    L115:DO;
              /* CONSTANT VELOCITY DISTANCE */
93  6    DSVEL=TDIS0-DASTOT;
              /* END OF DEACCELERATION TIME */
94  6    TA0=(VI-V0)/ACC0;
              /* END OF CONSTANT VELOCITY TIME */
95  6    TSVEL=DSVEL/VI+TA0;
              /* TOTAL TRAVEL TIME */
96  6    TSEND=TSVEL+(V1-VI)/ACC1;
97  6    END L115;

98  5    ELSE
              L128:DO;
99  6    IF(V1=0.0)THEN DO;
              /* COMPUTE ACCELERATION TO ATTAIN ZERO VELOCITY AT END OF PATH */
101 7    ACC0=-0.5*V02/TDIS0;
102 7    TA0=-V0/ACC0;
103 7    END;
              /* DEACCELERATE TIL END OF PATH */
104 6    ELSE DO;
105 7    TA0=(-V0+SQRT(V02+2.0*ACC0*TDIS0))/ACC0;
106 7    END;
              /* RECOMPUTE THE NEW TIME CONSTANTS */
```

```
107  6    T$VEL=TA0;
108  6    T$END=TA0;
          /* NEW FINAL VELOCITY */
109  6    V1=V0+ACC0*TA0;
110  6    CALL MOVW(@V1,@VEL_(2),2);
111  6    END L128;
112  5    END CASE1;

/* TYPE 3 V0<=VI & V1<VI */
113  4    CASE2:DO;
          /* SETUP ACCELERATION PARAMETERS */
114  5    ACC0=ACC;
115  5    ACC1=-ACC;
116  5    VI2=VI*VI;
117  5    V02=V0*V0;
118  5    VI2=V1*V1;
          /* COMPUTE THE DEC DISTANCE */
119  5    DA0=0.5*(VI2-V02)/ACC0;
          /* COMPUTE THE ACC DISTANCE */
120  5    DA1=0.5*(VI2-VI2)/ACC1;
          /* COMPUTE TOTAL ACC/DEC DISTANCE TRAVELED */
121  5    DA$TOT=DA0+DA1;
          /* ADJUST INTERMEDIATE VELOCITY IF ACC/DEC GREATER THAN PATH DISTANCE */
122  5    IF(DA$TOT<=TDIS0)THEN
123  5    L215:DO;
          /* CONSTANT VELOCITY DISTANCE */
124  6    D$VEL=TDIS0-DA$TOT;
          /* END OF DEACCELERATION TIME */
125  6    TA0=(VI-V0)/ACC0;
          /* END OF CONSTANT VELOCITY TIME */
126  6    T$VEL=D$VEL/VI+TA0;
          /* TOTAL TRAVEL TIME */
127  6    T$END=T$VEL+(V1-VI)/ACC1;
128  6    END L215;

/* ADJUST INTERMEDIATE VELOCITY SO NO CONSTANT VELOCITY TRAVEL */
129  5    ELSE
          L220:DO;
130  6    VI=SQRT((VI2+V02)/2.0+ACC0*TDIS0);
          /* CHECK IF PHYSICALLY REALIZABLE INTERMEDIATE VELOCITY */
131  6    IF((V0<=VI)AND(V1<=VI))THEN
132  6    L225:DO;
133  7    CALL MOVW(@VI,@VEL(1),2);
134  7    VI2=VI*VI;
          /* RECOMPUTE THE TRAVEL TIMES */
135  7    TA0=(VI-V0)/ACC0;
136  7    T$VEL=TA0;
137  7    T$END=TA0+(V1-VI)/ACC1;
          /* RECOMPUTE DISTANCES */
138  7    DA0=0.5*(VI2-V02)/ACC0;
139  7    DA1=TDIS0-DA0;
140  7    D$VEL=0.0;
141  7    END L225;

142  6    ELSE
          L228:DO;
143  7    IF(V1()0.0)THEN DO;
145  8    IF(V1>=V0)THEN ACC0=ACC;
147  8    ELSE ACC0=-ACC;
148  8    TA0=(-V0+SQRT(V02+2.0*ACC0*TDIS0))/ACC0;
          /* COMPUTE FINAL VELOCITY */
149  8    V1=V0+ACC0*TA0;
150  8    CALL MOVW(@V1,@VEL(2),2);
151  8    END;
152  7    ELSE DO;
          /* COMPUTE ACCELERATION NEEDED TO STOP AT END OF PATH */
153  8    ACC0=-0.5*V02/TDIS0;
154  8    TA0=-V0/ACC0;
155  8    END;
          /* RECOMPUTE THE NEW TIME CONSTANTS */
156  7    T$VEL=TA0;
157  7    T$END=TA0;
158  7    END L228;
159  6    END L220;
160  5    END CASE2;

/* TYPE 4 V0<=VI & V1>=VI */
161  4    CASE3:DO;
          /* SETUP ACCELERATION PARAMETERS */
162  5    ACC0=ACC;
163  5    ACC1=ACC;
164  5    VI2=VI*VI;
165  5    V02=V0*V0;
```

```
166   5       VI2=V1*V1;
              /* COMPUTE THE DEC DISTANCE */
167   5       DA0=0.5*(VI2-V02)/ACC0;
              /* COMPUTE THE ACC DISTANCE */
168   5       DA1=0.5*(VI2-VI2)/ACC1;
              /* COMPUTE TOTAL ACC/DEC DISTANCE TRAVELED */
169   5       DA$TOT=DA0+DA1;
              /* ADJUST INTERMEDIATE VELOCITY IF ACC/DEC GREATER THAN PATH DISTANCE */
170   5       IF(DA$TOT(=TDIS0)THEN
171   5       L315:DO;
              /* CONSTANT VELOCITY DISTANCE */
172   6       D$VEL=TDIS0-DA$TOT;
              /* END OF DEACCELERATION TIME */
173   6       TA0=(VI-V0)/ACC0;
              /* END OF CONSTANT VELOCITY TIME */
174   6       T$VEL=D$VEL/VI+TA0;
              /* TOTAL TRAVEL TIME */
175   6       T$END=T$VEL+(V1-VI)/ACC1;
176   6       END L315;

/* ACCELERATE TIL END OF PATH */
177   5       ELSE DO;
178   6       TA0=(-V0+SQRT(V02+2.0*ACC0*TDIS0))/ACC0;
              /* RECOMPUTE THE NEW TIME CONSTANTS */
179   6       T$VEL=TA0;
180   6       T$END=TA0;
              /* NEW FINAL VELOCITY */
181   6       V1=V0+ACC0*TA0;
182   6       CALL MOVW(@V1,@VEL,2);
183   6       END;
184   5       END CASE3;
185   4       END LCASE;
186   3       END LSTART;
              /* COMPUTE NEXT PATH DISTANCE AND VELOCITY */
              /* STARTING ACC/DEC */
187   2       IF(T(=TA0)THEN DO;
              /* VELOCITY AT T TIME */
189   3       FVEL=V0+ACC0*T;
190   3       DIST=T*(V0+0.5*ACC0*T);
191   3       RETURN DIST;
192   3       END;

193   2       IF(T(=T$VEL)THEN DO;
              /* ENDING ACC/DEC */
              /* CHECK IF AT END OF PATH */
195   3       IF(T(=T$END)THEN DO;
197   4       FVEL=V1;
198   4       RETURN TDIS0;
199   4       END;
200   3       T=T-T$VEL;
              /* VELOCITY AT TIME T */
201   3       FVEL=VI+ACC1*T;
202   3       DIST=DA0+DVEL+T*(VI+0.5*ACC1*T);
203   3       RETURN DIST;
204   3       END;
              /* CONSTANT VELOCITY MOVEMENT*/
205   2       T=T-TA0;
206   2       FVEL=VI;
207   2       DIST=DA0+VI*T;
208   2       RETURN DIST;
209   2       END TR004;
210   1       END TR004$MOD;

MODULE INFORMATION:

CODE AREA SIZE     = 0A97H    2711D
    CONSTANT AREA SIZE = 000CH      12D
    VARIABLE AREA SIZE = 0064H     100D
    MAXIMUM STACK SIZE = 001EH      30D
    342 LINES READ
    0 PROGRAM WARNINGS
    0 PROGRAM ERRORS

DICTIONARY SUMMARY:

290KB MEMORY AVAILABLE
    5KB MEMORY USED  (1%)
    0KB DISK SPACE USED

END OF PL/M-86 COMPILATION
```

PL/M-86 COMPILER    SETUP$MOD
                    TRAJECTORY ORIENTATION SETUP iRMX 86 PL/M-86 V2.3 COMPILATION OF MODULE SETUPMOD
OBJECT MODULE PLACED IN SETUP.OBJ
COMPILER INVOKED BY:  :LANG:PLM86 SETUP.P86 DEBUG TYPE OPTIMIZE(0) LARGE PAGELENGTH(84) PRINT(:BSPR:SETUP.LST)

```
              $RAM
              $TITLE('SETUP$MOD')
              $SUBTITLE('TRAJECTORY ORIENTATION SETUP')
  1           SETUP$MOD:
              DO;
              /* SETUP-TRAJECTORY ORIENTATION SETUP */
              /* SETUP-012085-1500 RRC/JAMES FARRELL */
              /* SETUP-012085-1500 RRC/JAMES FARRELL */

$INCLUDE (:BSINC:COPYRIGHT.PLM)
          =   /*    ********************************
          =   *****  (C) COPYRIGHT 198  ROBOTICS RESEARCH CORPORATION   *****
          =   *****              ALL RIGHTS RESERVED                    *****
          =              ********************************
          =   */

/* DESCRIPTION

ACCESS */

$INCLUDE (:INC:SQRT.EXT)
  2   1   =   SQRT:PROCEDURE(X) REAL EXTERNAL;
  3   2   =   DECLARE X REAL;

=   /* SQRT RETURNS THE SQUARE ROOT */

4   2   =   END SQRT;
              $INCLUDE (:INC:VMAG.EXT)
  5   1   =   VMAG:PROCEDURE (A) REAL EXTERNAL;
  6   2   =   DECLARE A POINTER;

=   /* VMAG RETURNS THE LENGTH OF A 3D VECTOR */

7   2   =   END VMAG;
              $INCLUDE (:INC:VDIF.EXT)
  8   1   =   VDIF: PROCEDURE(A$PT,B$PT,C$PT) EXTERNAL;
  9   2   =   DECLARE (A$PT,B$PT,C$PT) POINTER;

=   /* VDIF RETURNS THE 3D VECTOR DIFFERENCE
          =      {C}={A}-{B} */

10   2   =   END VDIF;
              $INCLUDE (:INC:MQERAT2.EXT)
 11   1   =   MQERAT2:PROCEDURE(X,Y) REAL EXTERNAL;
 12   2   =   DECLARE (X,Y) REAL;
 13   2   =   END MQERAT2;
              $INCLUDE (:INC:MTR3.EXT)
          =
 14   1   =   MTR3: PROCEDURE(A$PT,B$PT) EXTERNAL;
 15   2   =   DECLARE (A$PT,B$PT) POINTER;

=   /* MTR3 RETURNS THE TRANSPOSE OF A (3X3) MATRIX.
          =      [B]=TRANS[A] */

16   2   =   END MTR3;
              $INCLUDE (:INC:MV3.EXT)
 17   1   =   MV3: PROCEDURE(A$PT,B$PT,C$PT) EXTERNAL;
 18   2   =      DECLARE (A$PT,B$PT,C$PT)    POINTER;

=   /* MV3 RETURNS THE PRODUCT OF TWO (3X3) MATRICES.
          =      [C]=[A][B] */

19   2   =      END MV3;
              $INCLUDE (:INC:FSCL.EXT)
 20   1   =   FSCL:PROCEDURE(NUM,scl,A$PT,B$PT) EXTERNAL;
 21   2   =   DECLARE NUM INTEGER;
 22   2   =   DECLARE scl REAL;
 23   2   =   DECLARE (A$PT,B$PT) POINTER;

=   /* FSCL RETURNS A SCALED VECTOR OF LENGTH N.
          =      {B}=scl*{A} */
```

```
24   2  =   END FSCL;
            $INCLUDE (:INC:VDOT.EXT)
25   1  =   VDOT: PROCEDURE(A$PT,B$PT)  REAL EXTERNAL;
26   2  =   DECLARE (A$PT,B$PT) POINTER;

=   /* VDOT PERFORMS 3D DOT PRODUCT*/

27   2  =   END VDOT;

28   1      DECLARE ZERO(9) REAL INITIAL (0.0,0.0,0.0,0.0,0.0,0.0,0.0,0.0,0.0);
29   1      DECLARE TOL REAL INITIAL (5.0E-05);

30   1      SETUP:PROCEDURE(A$PT,B$PT,PHI$PT,AX$PT,BX$PT) PUBLIC;
31   2      DECLARE (A$PT,B$PT,PHI$PT,AX$PT,BX$PT) POINTER;
32   2      DECLARE A BASED A$PT(1) REAL;
33   2      DECLARE B BASED B$PT(1) REAL;
34   2      DECLARE AX BASED AX$PT(1) REAL;
35   2      DECLARE BX BASED BX$PT(1) REAL;
36   2      DECLARE PHI BASED PHI$PT REAL;

37   2      DECLARE (Q,CX,AT0,AXT)(9) REAL ;
38   2      DECLARE (S1,S2,D,V1,V2) REAL ;
39   2      DECLARE I WORD;

/* CHECK IF SAME ORIENTATION TRIADS */
40   2      CALL VDIF(@A,@B,@AX);
41   2      V1=VMAG(@AX);
42   2      CALL VDIF(@A(3),@B(3),@AX);
43   2      V2=VMAG(@AX);
44   2      IF(V1<TOL) OR (V2<TOL) THEN DO;
46   3      PHI=0.0;
47   3      RETURN;
48   3      END;
49   2      CALL MTR3(@A,@AT0);
50   2      CALL MV3(@B,@AT0,@Q);
51   2      CALL MOVW(@ZERO,@AX,18);
            /* FIND PIVOT VECTOR */
52   2      Q(0)=Q(0)-1.0;
53   2      S1=ABS(Q(0));
54   2      I=1;
55   2      Q(4)=Q(4)-1.0;
56   2      S2=ABS(Q(4));
57   2      IF(S2<S1)THEN DO;
59   3      S1=S2;
60   3      I=2;
61   3      END;
62   2      Q(8)=Q(8)-1.0;
63   2      S2=ABS(Q(8));
64   2      IF(S2<S1)THEN DO;
66   3      S1=S2;
67   3      I=3;
68   3      END;
            /* COMPUTE THE ROTATION AXIS */
69   2      DO CASE (I-1);
70   3      DO;
71   4      AX(1)=1.0;
72   4      AX(5)=1.0;
73   4      AX(6)=-1.0;
74   4      D=Q(4)*Q(8)-Q(5)*Q(7);
75   4      AX(7)=(Q(6)*Q(1)-Q(7)*Q(2))/D;
76   4      AX(8)=(Q(4)*Q(2)-Q(5)*Q(1))/D;
77   4      END;
78   3      DO;
79   4      AX(0)=1.0;
80   4      AX(5)=1.0;
81   4      AX(7)=-1.0;
82   4      D=Q(2)*Q(6)-Q(2)*Q(6);
83   4      AX(6)=(Q(8)*Q(3)-Q(6)*Q(5))/D;
84   4      AX(8)=(Q(0)*Q(5)-Q(2)*Q(3))/D;
85   4      END;
86   3      DO;
87   4      AX(0)=1.0;
88   4      AX(4)=1.0;
89   4      AX(8)=-1.0;
90   4      D=Q(0)*Q(4)-Q(1)*Q(3);
91   4      AX(6)=(Q(4)*Q(6)-Q(3)*Q(7))/D;
92   4      AX(7)=(Q(0)*Q(7)-Q(1)*Q(6))/D;
93   4      END;
94   3      END;
            /* NORMALIZE AXIS OF ROTATION */
95   2      S1=1.0/VMAG(@AX(6));
96   2      CALL FSCL(3,S1,@AX(6),@AX(6));
            /* FIND BASIS FOR 2D ROTATION SPACE */
```

```
 97  2    S2=VDOT(@AX(3),@AX(6));
 98  2    AX(3)=AX(3)-S2*AX(6);
 99  2    AX(4)=AX(4)-S2*AX(7);
100  2    AX(5)=AX(5)-S2*AX(8);
101  2    S1=1.0/VMAG(@AX(3));
102  2    CALL FSCL(3,S1,@AX(3),@AX(3));
103  2    AX(0)=AX(4)*AX(8)-AX(7)*AX(5);
104  2    AX(1)=AX(6)*AX(5)-AX(3)*AX(8);
105  2    AX(2)=AX(3)*AX(7)-AX(6)*AX(4);

/* GET 2D ROTATION */
106  2    Q(0)=Q(0)+1.0;
107  2    Q(4)=Q(4)+1.0;
108  2    Q(8)=Q(8)+1.0;

109  2    CALL MV3(@Q,@AX,@BX);
110  2    CALL MTR3(@AX,@AXT);
111  2    CALL MV3(@AXT,@BX,@CX);

/* GET ANGLE OF ROTATION */
112  2    PHI=MDERAT2(CX(1),CX(0));
113  2    CALL MV3(@AXT,@A,@SX);

114  2    END SETUP;
115  1    END SETUP$MOD;
```

MODULE INFORMATION:

```
    CODE AREA SIZE     = 0562H    1378D
    CONSTANT AREA SIZE = 0008H       8D
    VARIABLE AREA SIZE = 00CEH     226D
    MAXIMUM STACK SIZE = 002BH      42D
    184 LINES READ
    0 PROGRAM WARNINGS
    0 PROGRAM ERRORS
```

DICTIONARY SUMMARY:

```
    290KB MEMORY AVAILABLE
    5KB MEMORY USED (1%)
    0KB DISK SPACE USED
```

END OF PL/M-86 COMPILATION

REDUNDANT COORDINATED JOINT CONTROL

```
PL/M-86 COMPILER    CJ002$MOD
                    FORWARD TRANSFORMATIONS FOR 5 TO N AXES iRMX 86 PL/M-86 V2.3 COMPILATION OF MODULE CJ002MOD
OBJECT MODULE PLACED IN CJ002.OBJ
COMPILER INVOKED BY: :LANG:PLM86 CJ002.P86 DEBUG TYPE OPTIMIZE(0) LARGE PAGELENGTH(84) PRINT(:BSPR:CJ002.LST)

$RAM
          $TITLE('CJ002$MOD')
          $SUBTITLE('FORWARD TRANSFORMATIONS FOR 5 TO N AXES')
1         CJ002$MOD:
          DO;
          /* CJ002-FORWARD TRANSFORMATIONS */
          /* CJ002-072285-1400 RRC/JAMES FARRELL */

$INCLUDE (:BSINC:COPYRIGHT.PLM)
    =     /*    ***********************************
    =     *****  (C) COPYRIGHT 198_ ROBOTICS RESEARCH CORPORATION  *****
    =     *****           ALL RIGHTS RESERVED               *****
    =           ***********************************
    =     */

/* DESCRIPTION

CJ002 EMPLOYS THE MODIFIED MODIFIED GRAM-SCHMIDT METHOD TO GENERATE THE
          SOLUTION SET OF JOINT ANGLES. THIS ALGORITHM HANDLES A ROLL-PITCH-ROLL-ETC
          COMBINATION OF FIVE TO SEVEN AXES WITH THE OPTION TO ADD A LINEAR SLIDE
          AT THE BASE.
```

ACCESS

```
CALL CJ002(@J0,@XYZ,@IJK,NITER,@JF,IORB,@STAT)
J0,REAL ARRAY,U-INITIAL (ACT/INACT) JOINT SOLUTION ESTIMATE (LENGTH=NJ)
XYZ,REAL ARRAY,U-COMMANDED TCP XYZ LOCATION IN CS:
IJK,REAL ARRAY,U-COMMANDED TOOL Z AND Y AXES NORMALIZED DIRECTIONS
NITER,WORD VARIABLE,U-NUMBER OF ITERATIONS
JF,REAL ARRAY,D-ACTIVE JOINT ANGLE SOLUTION (LENGTH=NAJ)
IORB,WORD,U-ORBIT FLAG
            0-DO NOT COMPUTE JACOBIAN NULL SPACE VECTOR
            1-COMPUTE JACOBIAN VECTOR
STAT,WORD,D-STATUS FROM ZAPIT */
```

|    |   |   |                                                                                       |
|----|---|---|---------------------------------------------------------------------------------------|
|    |   |   | $INCLUDE (:BSINC:ZAPIT.EXT)                                                           |
| 2  | 1 | = | ZAPIT: PROCEDURE(NAJ,NCONS,A$PT,B$PT,T$PT,S$PT,H$PT,STAT$PT) EXTERNAL;                |
| 3  | 2 | = | DECLARE (NAJ,NCONS) WORD;                                                             |
| 4  | 2 | = | DECLARE (A$PT,B$PT,T$PT,S$PT,H$PT,STAT$PT) POINTER;                                   |
| 5  | 2 | = | END ZAPIT;                                                                            |
|    |   |   | $INCLUDE (:INC:SINCOS.EXT)                                                            |
| 6  | 1 | = | SINCOS: PROCEDURE(N,A$PT,S$PT,C$PT) EXTERNAL;                                         |
| 7  | 2 | = | DECLARE N INTEGER;                                                                    |
| 8  | 2 | = | DECLARE (A$PT,S$PT,C$PT) POINTER;                                                     |
|    |   | = | /* N,INTEGER VARIABLE,U-NUMBER OF ANGLES                                              |
|    |   | = |    A,REAL ARRAY,U-ANGLES IN RADIANS (0.0(=A(=2*PI)                                    |
|    |   | = |    S,REAL ARRAY,D-SINE OF ANGLES                                                      |
|    |   | = |    C,REAL ARRAY,D-COSINE OF ANGLES */                                                 |
| 9  | 2 | = | END SINCOS;                                                                           |
|    |   |   | $INCLUDE (:INC:FDIF.EXT)                                                              |
| 10 | 1 | = | FDIF: PROCEDURE(N,A$PT,B$PT,C$PT) EXTERNAL;                                           |
| 11 | 2 | = | DECLARE N WORD;                                                                       |
| 12 | 2 | = | DECLARE (A$PT,B$PT,C$PT) POINTER;                                                     |
|    |   | = | /* FDIF RETURNS THE DIFFERENCE BETWEEN TWO 'N' DIMENSIONAL VECTORS                    |
|    |   | = |    {C}={A}-{B} */                                                                     |
| 13 | 2 | = | END FDIF;                                                                             |
|    |   |   | $INCLUDE (:INC:FSUM.EXT)                                                              |
| 14 | 1 | = | FSUM: PROCEDURE(N,A$PT,B$PT,C$PT) EXTERNAL;                                           |
| 15 | 2 | = | DECLARE N WORD;                                                                       |
| 16 | 2 | = | DECLARE (A$PT,B$PT,C$PT) POINTER;                                                     |
|    |   | = | /* FSUM COMPUTES ADDS TWO 'N' DIMENSIONAL VECTORS                                     |
|    |   | = |    {C}={A}+{B} */                                                                     |
| 17 | 2 | = | END FSUM;                                                                             |
|    |   |   | $INCLUDE (:BSINC:MOTIONINF.DEC)                                                       |
|    |   | = | /* UNITS- INCHES,RADIANS */                                                           |
|    |   | = | /* MODAL PARAMETERS */                                                                |
| 18 | 1 | = | DECLARE                                                                               |
|    |   | = | (TX,TY,TZ) REAL EXTERNAL, /* XYZ TOOL OFFSET */                                       |
|    |   | = | (TI,TJ,TK) REAL EXTERNAL, /* NORMALIZED IJK TOOL VECTOR OFFSET DIRECTION */           |
|    |   | = | (RI,RJ,RK) REAL EXTERNAL, /* NORMALIZED IJK TOOL ROLL VECTOR OFFSET DIRECTION */      |
|    |   | = | ACCFLAG WORD EXTERNAL, /* ACCURACY FLAG (ON=1,OFF=0) */                               |
|    |   | = | ACCTOL REAL EXTERNAL, /* ACCURACY TOLERANCE (INCHES) IF ACCFLAG=. */                  |
|    |   | = | ROLLFLAG WORD EXTERNAL, /* TOOL ROLL CONSTRAINT FLAG (ON=1,OFF=0) */                  |
|    |   | = | J$POS(10) REAL EXTERNAL, /* INACTIVE JOINT POSITIONS */                               |
|    |   | = | LG$JA$ORG(10) REAL EXTERNAL, /* LAST GOAL POINT ACTIVE JOINT ORIGINS */               |
|    |   | = | NG$JA$ORG(10) REAL EXTERNAL, /* GOAL POINT ACTIVE JOINT ORIGINS */                    |
|    |   | = | JA$STIF(10) REAL EXTERNAL, /* ACTIVE JOINT STIFFNESS */                               |
|    |   | = | JA$ORG(10) REAL EXTERNAL, /* ACTIVE JOINT ORIGINS */                                  |
|    |   | = | LOOP$TIME REAL EXTERNAL, /* LOOPTIME */                                               |
|    |   | = | LIN$ORI$SCL REAL EXTERNAL, /* LINEAR TO ORIENTATION VELOCITY SCALE FACTOR */          |
|    |   | = | LIN$ORB$SCL REAL EXTERNAL, /* LINEAR TO ORBIT VELOCITY SCALE FACTOR */                |
|    |   | = | LIN$ACC REAL EXTERNAL, /*ACCELERATION VALUE INCHES/SEC**2 */                          |
|    |   | = | ORI$ACC REAL EXTERNAL,/* ORIENTATION ACCELERATION RADIANS/SEC**2 */                   |
|    |   | = | ANG$ACC REAL EXTERNAL;/* ANGULAR (JOINT) ACCELERATION RADIANS/SEC**2 */               |
|    |   | = | /* CONFIGURATION PARAMETERS */                                                        |
| 19 | 1 | = | DECLARE                                                                               |
|    |   | = | NJ WORD EXTERNAL, /* NUMBER OF JOINTS */                                              |
|    |   | = | NAJ WORD EXTERNAL, /* NUMBER OF ACTIVE JOINTS */                                      |
|    |   | = | AJL(10) WORD EXTERNAL, /* ACTIVE JOINT LIST (I.E. 1,2,4,5,6 ETC) */                   |
|    |   | = | SAJ(10) WORD EXTERNAL, /* ACTIVE/INACTIVE JOINT STATUS */                             |
|    |   | = | HJ0(10) REAL EXTERNAL,/* HOME POSITION OF JOINTS */                                   |
|    |   | = | (R0,R2,R4,R6,R8,R10,L1,L3,L5,L7,L9) REAL EXTERNAL, /* JOINT OFFSETS */                |
|    |   | = | (XDIR,YDIR,ZDIR) REAL EXTERNAL, /* LINEAR BASE SLIDE DIRECTIONS */                    |
|    |   | = | GBL$MX(12) REAL EXTERNAL; /* ROTATIONAL MATRIX AND XYZ OFFSET FROM GLOBAL TO          |
|    |   | = |                              TRANSFORMATION COORDINATE SYSTEM */                      |
|    |   | = | /* LIMIT PARAMETERS */                                                                |

```
20   1   =   DECLARE
         =       JNT$VEL$LIM(10) REAL EXTERNAL,  /* JOINT VELOCITY LIMITS(RAD/SEC , IN/SEC)*/
         =       JNT$POS$LIM$LOW(10) REAL EXTERNAL, /* LOWER JOINT LIMIT(RADIANS, INCHES) */
         =       JNT$POS$LIM$HI(10) REAL EXTERNAL; /* HIGHER JOINT LIMIT(RADIANS, INCHES) */

=   /* SERVO INTERFACE PARAMETERS */
         =   $include (:bsinc:servcomm.dec)
21   1   =1  DECLARE
         =1      CONTROL$BYTE                    BYTE    EXTERNAL,
         =1      SERVO$STATUS$BYTE               BYTE    EXTERNAL,
         =1      COMMAND$DIVIDE$NUMBER           BYTE    EXTERNAL,
         =1      SERVLOCK                        BYTE    EXTERNAL,
         =1      POSITION$COMMANDS(10)           REAL    EXTERNAL;

=   /* USER INTERFACE */
22   1   =   DECLARE
         =       MOT$MODE WORD EXTERNAL, /* MODE INDICATOR,0-REAL TIME,1-TEACH,2-DME */

=   /* FOR TEACH MODE (i.e. MODE=1) */

=       JOG$ENABLE WORD EXTERNAL, /* JOG ENABLE FLAG,0-OFF,1-ON */
         =       JOG$PATH WORD EXTERNAL, /* TYPE OF JOG PATH,0-CARTESIAN,1-JOINT SPACE,2-ORBIT */
         =       JOG$COORD$SYS WORD EXTERNAL, /* JOG COORD SYSTEM,1-GLOBAL LINEAR,2-HAND
         =                             ,3(=LOCAL */
         =       JOG$MOT$TYPE WORD EXTERNAL, /* 0-INCREMENTAL,1-CONTINUOUS */
         =       JOG$NITER WORD EXTERNAL, /* NUMBER OF ITERATIONS FOR JOGGING */
         =       JOG$ROLLFLAG WORD EXTERNAL, /* TOOL ROLL CONSTRAINT FLAG (ON=1,OFF=0) */
         =   /* FOR INCREMENTAL CARTESIAN JOG ,JOG$PATH=0,JOG$TYPE=0 */
         =       DLT$XYZ(3) REAL EXTERNAL, /* NEXT DELTA X,Y,Z POSITION TO ATTAIN */
         =       DLT$YPR(3) REAL EXTERNAL, /* NEXT DELTA YAW,PITCH,ROLL ORIENTATION TO ATTAIN */
         =   /* FOR INCREMENTAL JOINT SPACE JOG,JOG$PATH=1,JOG$TYPE=0 */
         =       DLT$JNT(10) REAL EXTERNAL, /* NEXT DELTA JOINT POSITIONS TO ATTAIN */
         =   /* FOR INCREMENTAL ORBIT JOG,JOG$PATH=2,JOG$TYPE=0 */
         =       DLT$ORB$JNT REAL EXTERNAL, /* LARGEST INCREMENTAL ANGLE OF TRAVEL TO ORBIT ARM */
         =   /* AFTER AN ARM HAS BEEN JOGGED,WHETHER INCREMENTAL OR CONTINUOUS THE FOLLOWING
         =       POSITIONAL INFORMATION WILL BE AVAILABLE */
         =       JOG$SPR$ORG(10) REAL EXTERNAL, /* ACTIVE JOG SPRING ORIGINS */
         =       JOG$XYZ$POS(3) REAL EXTERNAL, /* CURRENT TOOL POINT POSITION IN J1 C.S.*/
         =       JOG$IJK$POS(9) REAL EXTERNAL,/*CURRENT TOOL VECTOR DIRECTION AND
         =                           ROLL DIRECTION IN J1 C.S. */
         =       JOG$PITCH$VECTOR(3) REAL EXTERNAL, /* CURRENT PITCHING PLANE VECTOR */
         =       JOG$JNT$POS(10) REAL EXTERNAL, /* CURRENT ABSOLUTE JOINT ANGLES */
         =       JOG$STATUS WORD EXTERNAL, /* JOG STATUS */
         =       PLAY$FLG WORD EXTERNAL, /* PLAYBACK FLAG,0-OFF,1-PLAYBACK */
         =       DEAD$MAN$FLG WORD EXTERNAL, /* DEAD MAN SWITCH 0-OFF,
         =                                      1-ON CONTINUE WITH MOTION */
         =       PLAY$VEL$FAC REAL EXTERNAL,/*PLAYBACK VELOCITY SCALE FACTOR*/
         =       PLAY$FED$RATE REAL EXTERNAL,/*FEEDRATE OVERRIDE-MAINTAIN SAME PATH */
         =       PLAY$MOVE$PATH WORD EXTERNAL, /* PATH TYPE 0=GLOBAL LINEAR,1=GLOBAL JOINT,2-JOINT*/
         =       PLAY$GOAL$XYZ(3) REAL EXTERNAL, /* XYZ GOAL POINT FOR PATH TYPES 0 & 1 */
         =       PLAY$GOAL$IJK(6) REAL EXTERNAL, /* TOOL DIRECTION & ROLL DIR GOAL POINT */
         =       PLAY$GOAL$JNT(10) REAL EXTERNAL, /* GOAL POINT JOINT POSITIONS */
         =       PLAY$VEL(2) REAL EXTERNAL,/* INTERMEDIATE & FINAL VELOCITY */
         =       PLAY$FIN WORD EXTERNAL, /* COMPLETION STATUS - PLAYBACK PATH COMPLETED */
         =       PLAY$STATUS WORD EXTERNAL; /* STATUS - INTERMEDIATE VELOCITY NOT OBTAINED */

23   1      DECLARE ZERO(7) REAL INITIAL (0.0,0.0,0.0,0.0,0.0,0.0,0.0);
24   1      DECLARE ONE(7) REAL INITIAL (1.0,1.0,1.0,1.0,1.0,1.0,1.0);

25   1      CJ002: PROCEDURE(JO$PT,XYZ$PT,IJK$PT,NITER,JF$PT,IORB,STAT$PT) PUBLIC;
26   2          DECLARE (JO$PT,XYZ$PT,IJK$PT,JF$PT,STAT$PT) POINTER;
27   2          DECLARE (NITER,IORB) WORD;
28   2          DECLARE JO BASED JO$PT(1) REAL;
29   2          DECLARE XYZ BASED XYZ$PT(1) REAL;
30   2          DECLARE IJK BASED IJK$PT(1) REAL;
31   2          DECLARE JF BASED JF$PT(1) REAL;
32   2          DECLARE STAT BASED STAT$PT WORD;

33   2          DECLARE (I,J,K,L,M,N,KK,IDUM) INTEGER;

34   2          DECLARE (C,S,JO$TMP,JA$TMP,JFA,JA$DEL)(7) REAL;
35   2          DECLARE (C1,C2,C3,C4,C5,C6,C7) REAL AT (@C);
36   2          DECLARE (S1,S2,S3,S4,S5,S6,S7) REAL AT (@S);
37   2          DECLARE JA$ORG$DIF (7) REAL;
38   2          DECLARE (NCONS,IJNT,II,NROW2,NROW1,JC,LD$ROLL$FLAG) WORD;
39   2          DECLARE A*X(62) REAL;
40   2          DECLARE F(7) REAL, F0(7) REAL;
41   2          DECLARE (ZO1,ZO2,ZO3,YO1,YO2,YO3,X,Y,Z) REAL;
42   2          DECLARE (A11,A12,A13,A21,A22,A23,A31) REAL;
43   2          DECLARE (A114,A115,A116,A117,A124,A125,A126,A127,A134,A135,A136,A137,
                         A214,A215,A216,A217,A224,A225,A226,A227,A234,A235,A236,A237,
                         A324,A325,A326,A327) REAL;
```

```
                /* SET TO NO ERROR */
44     2        STAT=0;

/*PRECALCULATE SOME KEY TERMS */
                /* SETUP LOCAL TOOL VECTOR ROLL FLAG */
45     2        LOC$ROLLFLAG=ROLLFLAG;
                /* IF AN ORBIT THEN FORCE THE TOOL ROLL VECTOR CONSTRAINT */
46     2        IF(IORB=1)THEN LOC$ROLLFLAG=1;
                /* NUMBER OF CONSTRAINTS */
48     2        NCONS=5+LOC$ROLLFLAG;
                /* TOOL POINT COMMANDED POSITION */
49     2        CALL MOVW(@XYZ,@X,3);
50     2        CALL MOVW(@IJK,@ZD1,3);
51     2        IF(LOC$ROLLFLAG=1)THEN CALL MOVW(@IJK(3),@YC1,3);
                /* SET UP NEXT SET OF INITIAL SOLUTION ESTIMATES */
53     2        CALL MOVW(@J0,@J0$TMP,2*NJ);
                /* SET UP ACTIVE JOINTS */
54     2        DO I=0 TO NAJ-1;
55     3        IPNT=AJL(I)-1;
56     3        CALL MOVW(@J0(IPNT),@J0$TMP(I),2);
57     3        END;
                /* FOR AN ORBIT MOVE FORCE TO ONLY ONE ITERATION */
58     2        IF(IORB=1)THEN NITER=1;
59     2        L8:DO L=1 TO NITER;
                /* PRECALCULATE THE SINE AND COSINE VALUES */
61     3        CALL SINCOS(SIGNED(NJ),@J0$TMP,@S,@C);
62     3        A11=C4*C5*C6*C7-C4*S5*S7-S4*S5*C7;
63     3        A12=-C4*C5*C6*S7-C4*S5*C7+S4*S5*S7;
64     3        A13=C4*C5*S6+S4*C6;
65     3        A21=S5*C6*C7+C5*S7;
66     3        A22=-S5*C6*S7-C5*C7;
67     3        A23=S5*S6;
68     3        A32=S4*C5*C6*S7+S4*S5*C7-C4*S6*S7;
69     3        A114=-S4*C5*C6*C7-S4*S5*S7-C4*S6*C7;
70     3        A115=-C4*S5*C5*C7-C4*C5*S7;
71     3        A116=-C4*C5*S6*C7-S4*C6*C7;
72     3        A117=-C4*C5*C6*S7-C4*S5*C7-S4*S6*S7;
73     3        A124=S4*C5*C6*S7+S4*S5*C7+C4*S6*S7;
74     3        A125=C4*S5*C6*S7-C4*C5*C7;
75     3        A126=C4*C5*S6*S7+S4*C6*S7;
76     3        A127=-C4*C5*C6*C7-C4*S5*S7+S4*S6*C7;
77     3        A134=-S4*C5*S6-C4*C6;
78     3        A135=-C4*S5*S6;
79     3        A136=C4*C5*C6-S4*S6;
80     3        A137=0.0;
81     3        A214=0.0;
82     3        A215=C5*C6*C7-S5*S7;
83     3        A216=-S5*S6*C7;
84     3        A217=-S5*C6*S7+C5*C7;
85     3        A224=0.0;
86     3        A225=-C5*C6*S7-S5*C7;
87     3        A226=S5*S6*S7;
88     3        A227=-S5*C6*C7-C5*S7;
89     3        A234=0.0;
90     3        A235=C5*S6;
91     3        A236=S5*C6;
92     3        A237=0.0;
93     3        A324=C4*C5*C6*S7+C4*S5*C7-S4*S6*S7;
94     3        A325=-S4*S5*C6*S7+S4*C5*C7;
95     3        A326=-S4*C5*S6*S7-C4*C6*S7;
96     3        A327=S4*C5*C6*C7-S4*S5*S7-C4*S6*C7;
                /* ASSEMBLE JACOBIAN MATRIX */
                /* SET UP VARIABLE POINTER */
97     3        J=-1;
                /* COMPUTE THE FIRST COLUMN OF THE PARTIAL MATRIX */

/* FIND PARTIAL OF THETA 1 IF J1 IS ACTIVE */
98     3        IF(SAJ(0)<>0)THEN
99     3        LJ1:DO;
100    4        J=J+1;
101    4        AMX(J)=-S1*C2*C3*X-C1*S3*X+C1*C2*C3*Y-S1*S3*Y;
102    4        J=J+1;
103    4        AMX(J)=S1*C2*S3*X-C1*C3*X-C1*C2*S3*Y-S1*C3*Y;
104    4        J=J+1;
105    4        AMX(J)=-S1*S2*X+C1*S2*Y;
106    4        J=J+1;
107    4        AMX(J)=(S1*C2*C3-C1*S3)*ZD1-(C1*C2*C3-S1*S3)*ZD2;
108    4        J=J+1;
109    4        AMX(J)=C3*S3*(-S1*ZD1+C1*ZD2)-C3*(-C1*ZD1-S1*ZD2);
110    4          IF(LOC$ROLLFLAG=1)THEN DO;
112    5          J=J+1;
113    5          AMX(J)=S1*C2*C3*YC1-C1*C3*C3*YC2-C1*S3*C1+S1*S3*YC2;
114    5          END;
115    4          IF(IORB=1)THEN DO;
```

```
117  5      J=J+1;
118  5      AMX(J)=1.0;
119  5      END;
120  4     END LJ1;

/* FIND PARTIAL OF THETA 2 IF J2 IS ACTIVE */
121  3     IF(SAJ(1)=1)THEN
122  3     LJ2:DO;
123  4     J=J+1;
124  4     AMX(J)=-C1*S2*C3*X-S1*S2*C3*Y-C2*C3*Z;
125  4     J=J+1;
126  4     AMX(J)=C1*S2*S3*X+S1*S2*S3*Y+C2*S3*Z;
127  4     J=J+1;
128  4     AMX(J)=C1*C2*X-S1*C2*Y-S2*Z;
129  4     J=J+1;
130  4     AMX(J)=S2*(C1*ZC1+S1*C3*ZC2)+C2*C3*ZC3;
131  4     J=J+1;
132  4     AMX(J)=-S2*S3*(C1*ZC1+S1*ZC2)-C2*S3*ZC3;
133  4     IF(LOC$ROLLFLAG=1)THEN DO;
135  5     J=J+1;
136  5     AMX(J)=C1*S2*C3*YC1+S1*S2*C3*YC2+C2*C3*YC3;
137  5     END;
138  4     IF(IORB=1)THEN DO;
140  5     J=J+1;
141  5     AMX(J)=1.0;
142  5     END;
143  4     END LJ2;

/* FIND PARTIAL OF THETA 3 IF J3 IS ACTIVE */
144  3     IF(SAJ(2)=1)THEN
145  3     LJ3:DO;
146  4     J=J+1;
147  4     AMX(J)=-C1*C2*S3*X-S1*C3*X-S1*C2*S3*Y+C1*C3*Y-S2*S3*Z-S3*R2;
148  4     J=J+1;
149  4     AMX(J)=-C1*C2*C3*X+S1*S3*X-S1*C2*C3*Y-C1*S3*Y+S2*C3*Z-C3*R2;
150  4     J=J+1;
151  4     AMX(J)=0.0;
152  4     J=J+1;
153  4     AMX(J)=ZC1*(C1*C2*S3+S1*C3)+ZC2*(S1*C2*S3-C1*C3)-S2*S3*ZC3;
154  4     J=J+1;
155  4     AMX(J)=C2*C3*(C1*ZC1+S1*ZC2)+S3*(-S1*ZC1+C1*ZC2)-S2*C3*ZC3;
156  4     IF(LOC$ROLLFLAG=1)THEN DO;
158  5     J=J+1;
159  5     AMX(J)=C1*C2*S3*YC1+S1*C2*S3*YC2+S1*C3*YC1-C1*C3*YC2-S2*S3*YC3;
160  5     END;
161  4     IF(IORB=1)THEN DO;
163  5     J=J+1;
164  5     AMX(J)=1.0;
165  5     END;
166  4     END LJ3;

/* FIND PARTIAL OF THETA 4 IF ACTIVE JOINT */
167  3     IF(SAJ(3)=1) THEN
168  3     LJ4:DO;
169  4     J=J+1;
170  4     AMX(J)=S4*C5*C6*C7*TX-S4*S5*S7*TX+C4*S6*C7*TX
                  -(A124)*TY-S4*C5*S6*TZ
                  -C4*C6*TZ+S4*C5*C6*R6+C4*S6*R6
                  +S4*C5*S6*L7-C4*C6*L7-S4*C5*R6-C4*L5+S4*R4;
171  4     J=J+1;
172  4     AMX(J)=0.0;
173  4     J=J+1;
174  4     AMX(J)=C4*C5*C6*C7*TX-C4*S5*S7*TX-S4*S6*C7*TX
                  -(C4*C5*C6*S7+C4*S5*C7-S4*S6*S7)*TY+C4*C5*S6*TZ-S4*C6*TZ+C4*C5*C6*R6
                  -S4*S6*R6+C4*C5*S6*L7-S4*C6*L7-C4*C5*R6-S4*L5-C4*R4;
175  4     J=J+1;
176  4     AMX(J)=TI*A114+TJ*A124+TK*A134;
177  4     J=J+1;
178  4     AMX(J)=TI*A214+TJ*A224+TK*A234;
179  4     IF(LOC$ROLLFLAG=1)THEN DO;
181  5     J=J+1;
182  5     AMX(J)=RI*A114+RJ*A124+RK*A134;
183  5     END;
184  4     IF(IORB=1)THEN DO;
186  5     J=J+1;
187  5     AMX(J)=1.0;
188  5     END;
189  4     END LJ4;

/* FIND PARTIAL OF THETA 5 IF J5 IS ACTIVE */
190  3     IF(SAJ(4)=1)THEN
191  3     LJ5:DO;
192  4     J=J+1;
```

```
193   4      AMX(J)=C4*S5*C6*C7*TX-C4*S5*S7*TX
                    -(A125)*TY-C4*S5*S6*TZ-C4*S5*C6*R6-C4*S5*S6*L7
                    -C4*S5*R6;
194   4      J=J+1;
195   4      AMX(J)=-C5*C6*C7*TX-S5*S7*TX
                    -(A155)*TY-C5*S6*TZ-C5*C6*R6-C5*S6*L7-C5*R6;
196   4      J=J+1;
197   4      AMX(J)=-S4*S5*C6*C7*TX-S4*C5*S7*TX
                    -(-S4*S5*C6*S7-S4*C5*C7)*TY-S4*S5*S6*TZ-S4*S5*C6*R6-S4*C5*S6*L7
                    +S4*S5*R6;
198   4      J=J+1;
199   4      AMX(J)=TI*A115+TJ*A125+TK*A135;
200   4      J=J+1;
201   4      AMX(J)=TI*A215+TJ*A225+TK*A235;
202   4       IF(LOC$ROLLFLAG=1)THEN DO;
204   5        J=J+1;
205   5        AMX(J)=RI*A115+RJ*A125+RK*A135;
206   5       END;
207   4       IF(IORB=1)THEN DO;
209   5        J=J+1;
210   5        AMX(J)=1.0;
211   5       END;
212   4      END LJ5;

/* FIND PARTIAL OF THETA 6 IF J6 IS ACTIVE */
213   3      IF(SAJ(5)=1)THEN
214   3      LJ6:DO;
215   4       J=J+1;
216   4       AMX(J)=C4*C5*S6*C7*TX+S4*C6*C7*TX-(A126)*TY
                    -C4*C5*C6*TZ+S4*S6*TZ+C4*C5*S6*R6+S4*C6*R6
                    -C4*C5*C6*L7-S4*S6*L7;
217   4       J=J+1;
218   4       AMX(J)=S5*S6*C7*TX-(A226)*TY-S5*C6*TZ+S5*S6*R6-S5*C6*L7;
219   4       J=J+1;
220   4       AMX(J)=-S4*C5*S6*C7*TX+C4*C6*C7*TX
                    -(-S4*C5*S6*S7+C4*C6*S7)*TY+S4*C5*C6*TZ+C4*S6*TZ
                    -S4*C5*S6*R6+C4*C6*R6+S4*C5*C6*L7+C4*S6*L7;
221   4       J=J+1;
222   4       AMX(J)=TI*A116+TJ*A126+TK*A136;
223   4       J=J+1;
224   4       AMX(J)=TI*A216+TJ*A226+TK*A236;
225   4       IF(LOC$ROLLFLAG=1)THEN DO;
227   5        J=J+1;
228   5        AMX(J)=RI*A116+RJ*A126+RK*A136;
229   5       END;
230   4       IF(IORB=1)THEN DO;
232   5        J=J+1;
233   5        AMX(J)=1.0;
234   5       END;
235   4      END LJ6;

/* FIND PARTIAL OF THETA 7 IF ACTIVE JOINT */
236   3      IF(SAJ(6)=1)THEN
237   3      LJ7:DO;
238   4       J=J+1;
239   4       AMX(J)=C4*C5*C6*S7*TX+C4*S5*C7*TX-S4*S6*S7*TX
                    -(A127)*TY;
240   4       J=J+1;
241   4       AMX(J)=S5*C6*S7*TX-C5*C7*TX-(A227)*TY;
242   4       J=J+1;
243   4       AMX(J)=-S4*C5*C6*S7*TX-S4*S5*C7*TX-C4*S6*S7*TX
                    -(S4*C5*C6*C7-S4*S5*S7+C4*S6*C7)*TY ;
244   4       J=J+1;
245   4       AMX(J)=TI*A117+TJ*A127+TK*A137;
246   4       J=J+1;
247   4       AMX(J)=TI*A217+TJ*A227+TK*A237;
248   4       IF(LOC$ROLLFLAG=1) THEN DO;
250   5        J=J+1;
251   5        AMX(J)=RI*A117+RJ*A127+RK*A137;
252   5       END;
253   4       IF(IORB=1)THEN DO;
255   5        J=J+1;
256   5        AMX(J)=1.0;
257   5       END;
258   4      END LJ7;

/* COMPUTE THE RIGHT HAND SIDE FUNCTION VECTOR */
259   3      F(0)=(C1*C2*C3-S1*S3)*X+(S1*C2*C3+C1*S3)*Y-S2*C3*Z
                  -(C4*C5*C6*C7-C4*S5*S7-S4*S6*C7)*TX
                  -(A12)*TY-(C4*C5*S6+S4*C6)*TZ
                  -(C4*C5*C6-S4*S6)*R6-(C4*C5*S6-S4*C6)*L7
                  +C4*C5*R6-S4*L5-C4*R4+R4+C3*R3;
262   3      F(1)=(-C1*C2*S3-S1*C3)*X+(-S1*C2*S3+C1*C3)*Y+S2*S3*Z-(S5*C6*C7+C5*S7)*TX
                  -(A22)*TY-S5*S6*TZ-S5*C6*R6-S5*S6*L7+S5*R6-S3*R3;
```

```
261   3        F(2)=C1*S2*X+S1*S2*Y+C2*Z-(-S4*C5+C6*C7-S4*S5*S7-C4*S6*C7)*TX
                   -(S4*C5*C6*S7-S4*S5*C7-C4*S6*S7)*TY
                   -(-S4*C5*S6+C4*C6)*TZ-(S4*C5*C6+C4*S6)*R5
                   +(S4*C5*S6-C4*C6)*L7-S4*C5*R6-C4*L5-S4*R4-L3;
262   3        F(3)=TI*A11+TJ*A12+TK*A13-C2*C3*(C1*ZC1-S1*ZC2)-S3*(-S1*ZC1-C1*ZC2)-S2*C3*ZC3;
263   3        F(4)=TI*A21+TJ*A22+TK*A23+C2*S3*(C1*ZC1-S1*ZC2)-C3*(-S1*ZC1-C1*ZC2)-S2*S3*ZC3;
264   3        II=4;
265   3        IF(LOC$ROLL_FLAG=1)THEN DO;
267   4        II=II+1;
268   4        F(II)=RI*A11+RJ*A12+RK*A13-C2*C3*(C1*YC1-S1*YC2)
                   -S3*(-S1*YC1+C1*YC2)+S2*C3*YC3;
269   4        END;
270   3        IF(IORB=1)THEN DO;
272   4        II=II+1;
273   4        F(II)=2.0;
274   4        END;

/* NEGATE THE RIGHT-HAND COLUMN */
275   3        NROW0=NCONS-1+IORB;
276   3        DO N=0 TO NROW0;
277   4        F(N)=-F(N);
278   4        END;

/* SOLVE FOR THE NEXT SOLUTION */
279   3        IF(IORB<>1)THEN DO;
281   4        CALL FDIF(NAJ,@JA$TMP,@JA$ORB,@JA$ORB$DIF);
282   4        CALL ZAPIT(NAJ,NCONS,@AMX,@F,@JA$ORG$DIF,@JA$STIF,@JA$DEL,@STAT);
283   4        END;
284   3        ELSE
               L10:DO;
               /* DETERMINE NULL VECTOR IN JACOBIAN SPACE */
               /* SET SPRINGS TO RELATIVE AND SPRINGS AS UNITY TO AVOID CHANGE OF VARIABLES */
285   4        CALL ZAPIT(NAJ,NCONS-IORB,@AMX,@F,@ZERO,@ONE,@JA$DEL,@STAT);
               /* RETURN THE RATIO OF JOINTS TO ORBIT ARM */
286   4        NROW1=NROW0+1;
287   4        II=0;
288   4        DO JJ=NROW0 TO J BY NROW1;
289   5        JF(II)=AMX(JJ);
290   5        II=II+1;
291   5        END;
292   4        RETURN;
293   4        END L10;

/* ASSEMBLE SOLUTION VECTOR */
               /* REMAINING JOINT VALUES -ADD INITIAL JOINT ESTIMATES TO DELTA SOLUTION */
294   3        CALL FSUM(NAJ,@JA$DEL,@JA$TMP,@JFA);

295   3        IF(L(SIGNED(NITER))THEN
296   3        L20:DO;
               /* UPDATE ACTIVE JOINTS IN JOINT CONFIGURATIONS*/
297   4        DO I=0 TO NAJ-1;
298   5        IPNT=AJL(I)-1;
299   5        CALL MOVW(@JFA(I),@JO$TMP(IPNT),2);
300   5        END;
               /* REASSIGN SOLUTION VECTOR AS THE INITIAL ESTIMATE */
301   4        CALL MOVW(@JFA,@JA$TMP,2*NAJ);
302   4        END L20;

303   3        ELSE DO;
304   4        CALL MOVW(@JFA,@JF,2*NAJ);
305   4        END;
306   3        END L8;
307   2        END CJ002;
308   1        END CJ002$*DO;
```

MODULE INFORMATION:

CODE AREA SIZE     = 234C-   9036D
    CONSTANT AREA SIZE = 0064-    100D
    VARIABLE AREA SIZE = 02F2-    754D
    MAXIMUM STACK SIZE = 003C-     60D
    505 LINES READ
    0 PROGRAM WARNINGS
    0 PROGRAM ERRORS

DICTIONARY SUMMARY:

290KB MEMORY AVAILABLE
    11KB MEMORY USED    (3%)
    0KB DISK SPACE USED

END OF PL/M-86 COMPILATION

```
iRMX 86 8086/87/88/186 MACRO ASSEMBLER V2.0 ASSEMBLY OF MODULE ZAPITMOD
OBJECT MODULE PLACED IN ZAPIT.OBJ
ASSEMBLER INVOKED BY:  :LANG:ASM86 ZAPIT.A86 DEBUG TYPE PAGELENGTH(84) PAGEWIDTH(132) PRINT(:SSPR:ZAPIT.LST)

LOC  OBJ              LINE    SOURCE

1 +1  $PAGELENGTH(84) PAGEWIDTH(132) DEBUG TYPE
                        2
                        3
                        4     ;******************* PROGRAM DESCRIPTION *********************
                        5
                        6
                        7     ;ZAPIT EMPLOYS THE GRAMM-SCHMIDT ORTHOGONALITY METHOD TO
                        8     ;SOLVE A (N X M) SYSTEM OF LINEAR EQUATIONS.
                        9     ;ZAPIT IS CALLED IN PLM AS FOLLOWS:
                       10     ;    CALL ZAPIT(M, N, A$PT, B$PT, T$PT, S$PT, H$PT, STAT$PT);
                       11     ;
                       12     ;    WHERE
                       13     ;      M IS A WORD VALUE OF THE NUMBER OF ACTIVE JOINTS (COLUMNS),
                       14     ;      N IS A WORD VALUE OF THE NUMBER OF CONSTRAINTS (ROWS),
                       15     ;      A$PT IS A POINTER TO THE 16 X 7 MATRIX TO BE SOLVED,
                       16     ;      B$PT IS A POINTER TO THE 16 X 1 RIGHT HAND SIDE VECTORS,
                       17     ;      T$PT IS A POINTER TO A TABLE OF 7 HOME POSITION VALUES (IN RADIANS),
                       18     ;      S$PT IS A POINTER TO A TABLE OF 7 SPRING STIFFNESS CONSTANTS,
                       19     ;      H$PT IS A POINTER TO THE ARRAY WHERE THE SOLUTION TO THE MATRIX SHOULD BE SAVED,
                       20     ;      STAT$PT IS A POINTER TO A STATUS RETURN WORD.
                       21
                       22
                       23 +1  $INCLUDE (:BSINC:COPYRIGHT.ASM)
            =1         24     ;     *********************************
            =1         25     ;****   (C) COPYRIGHT 1986 ROBOTICS RESEARCH CORPORATION  *****
            =1         26     ;****          ALL RIGHTS RESERVED                        *****
            =1         27     ;     *********************************
                       28
                       29     ;******************* ZAPIT UPDATE RECORD *********************
                       30
                       31     ;      VERSION #1 (01-28-85)   preliminary.
                       32     ;      VERSION #2 (07-26-85)   Generalize original algorithm to solve
                       33     ;                              variable size matrix based on variable
                       34     ;                              number of active joints in the arm.
                       35
                       36
                       37     NAME    ZAPITMOD
                       38
                       39     ASSUME  CS:ZAPITMOD_CODE, DS:ZAPITMOD_DATA,   SS:STACK
                       40
                       41
                       42
                       43
----                   44     ZAPITMOD_DATA SEGMENT    'DATA'
                       45
----                   46             DATA_FRAME    STRUC
0000                   47                   BPPUSH  DW      ?
0002                   48                   DSPUSH  DW      ?
0004                   49                   RETADDR DD      ?
0008                   50                   STAT_PT DD      ?
000C                   51                   H_PT    DD      ?
0010                   52                   S_PT    DD      ?
0014                   53                   T_PT    DD      ?
0018                   54                   B_PT    DD      ?
001C                   55                   A_PT    DD      ?
0020                   56                   ND      DW      ?
0022                   57                   MD      DW      ?
----                   58             DATA_FRAME    ENDS
                       59
                       60 +1  $INCLUDE(:INC:REAL.DEC)
----        =1         61             SR_OP   STRUC
0000        =1         62                   SR      DD      ?
----        =1         63             SR_OP   ENDS
            =1         64
----        =1         65             LR_OP   STRUC
0000        =1         66                   LR      DQ      ?
----        =1         67             LR_OP   ENDS
            =1         68
0004        =1         69             SRB     EQU     4       ;SHORT REAL BYTE COUNT
0008        =1         70             LRB     EQU     8       ;LONG REAL BYTE COUNT
0002        =1         71             SRW     EQU     2       ;SHORT REAL WORD COUNT
0004        =1         72             LRW     EQU     4       ;LONG REAL WORD COUNT
            =1         73
                       74
                       75
0000 (42                76             ABUF    DD      42 DUP(?)
```

```
                ???????
                )
00A8  (6          77           BBUF    DD      6 DUP(?)
      ???????
             )
00C0  (7          78           TBUF    DD      7 DUP(?)
      ???????
             )
00DC  (7          79           ISTIFF  DD      7 DUP(?)
      ???????
             )
                  80
00F8 ????????     81                   DD      ?
                  82
00FC ????         83           ROWCTR  DW      ?
00FE ????         84           STAT    DW      ?
                  85
0100 ????         86           M       DW      ?
0102 ????         87           N       DW      ?
0104 ????         88           MN      DW      ?
0106 ????         89           LASTROW DW      ?
0108 ????         90           COLOFF  DW      ?
                  91
----              92   ZAPITMOD_DATA   ENDS
                  93
                  94
                  95
----              96   STACK   SEGMENT STACK   'STACK'
                  97
0000 (20          98           DW      20      DUP(?)
     ????
           )
                  99
----             100   STACK   ENDS
                 101
                 102 +1 $EJECT
                 103
----             104   ZAPITMOD_CODE   SEGMENT 'CODE'
                 105
                 106           PUBLIC  ZAPIT
                 107
0000 DF637731    108           TOL     DD      3.6E-9, 3.6E-9, 3.6E-9, 1.0E-12, 1.0E-12, 1.0E-12, 0.0
0004 DF637731
0008 DF637731
000C CCBC8C2B
0010 CCBC8C2B
0014 CCBC8C2B
0018 00000000
                 109
                 110
001C             111           ZAPIT   PROC    FAR
                 112
                 113
001C 1E          114                   PUSH    DS
001D 55          115                   PUSH    BP
001E 8BEC        116                   MOV     BP,SP
                 117
                 118                   ;COPY A AND B BUFFERS TO LOCAL MEMORY
0020 FC          119                   CLD
0021 B8----      120                   MOV     AX,ZAPITMOD_DATA
0024 8ED0        121                   MOV     ES,AX
                 122
0026 BF0000      123                   MOV     DI,OFFSET ZAPITMOD_DATA:ABUF
0029 C5761C      124                   LDS     SI,[BP].A_PT
002C 8B4622      125                   MOV     AX,[BP].M
002F 8B5620      126                   MOV     DX,[BP].N
0032 F7E2        127                   MUL     DX
0034 BA0200      128                   MOV     DX,SRW
0037 F7E2        129                   MUL     DX
0039 8BC8        130                   MOV     CX,AX
003B F3          131                   REP     MOVSW
003C A5
                 132
                 133                   ;COPY B BUFFER (ANSWER ARRAY)
003D BFA800      134                   MOV     DI,OFFSET ZAPITMOD_DATA:BBUF
0040 C57618      135                   LDS     SI,[BP].B_PT
0043 8B4620      136                   MOV     AX,[BP].N         ;NUMBER OF ROWS
0046 BA0200      137                   MOV     DX,SRW
0049 F7E2        138                   MUL     DX
004B 8BC8        139                   MOV     CX,AX
004D F3          140                   REP     MOVSW
004E A5
                 141
                 142                   ;COPY T BUFFER (HOME POSITIONS)
```

```
204F BF0000          143         MOV     DI,OFFSET ZAPITMOD_DATA:TBUF
2052 C57E14          144         LDS     SI,[BP].T_PT
2055 8B4622          145         MOV     AX,[BP].NP              ;NUMBER OF COLUMNS
2058 BA0200          146         MOV     DX,SRW
205B F7E2            147         MUL     DX
205D 8BC8            148         MOV     CX,AX
205F F3              149         REP     MOVSW
2060 A5
                     150
                     151         ;SET DS REGISTER
2061 B8----   R      152         MOV     AX,ZAPITMOD_DATA
2064 8ED8            153         MOV     DS,AX
                     154
                     155         ;SAVE DATA LOCALLY FOR FASTER ACCESS
2066 8B4622          156         MOV     AX,[BP].NP
2069 A30001          157         MOV     M,AX
206C 8B4620          158         MOV     AX,[BP].NP
206F A30201          159         MOV     N,AX
2072 48              160         DEC     AX
2073 BA0400          161         MOV     DX,SRB
2076 F7E2            162         MUL     DX
2078 A30621          163         MOV     LASTROW,AX
                     164
                     165         ;COMPUTE AND SAVE COLUMN OFFSET VALUE (# ROWS TIMES BYTES/ROW)
207B A10001          166         MOV     AX,M
207E BA0400          167         MOV     DX,SRB
2081 F7E2            168         MUL     DX
2083 A30801          169         MOV     COLOFF,AX
                     170
                     171         ;COMPUTE AND SAVE (#*N)-1
2086 A10201          172         MOV     AX,N
2089 8B1E0001        173         MOV     DX,M
208D F7E2            174         MUL     DX
208F 48              175         DEC     AX
2090 A30401          176         MOV     MN,AX
                     177
                     178         ;CLEAR STATUS RETURN
2093 C45E08          179         LES     BX,[BP].STAT_PT
2096 26C7070000      180         MOV     WORD PTR ES:[BX],0
                     181
                     182         ;CLEAR ANSWER (H) ARRAY
209B FC              183         CLD
209C C47E0C          184         LES     DI,[BP].H_PT            ;SET UP FOR STRING STORE OPERATION
                     185                                         ;POINTER TO START OF 'H' ARRAY
209F 8B0E0001        186         MOV     CX,M                    ;COUNT FOR NUMBER OF ACTIVE JOINTS
20A3 B002            187         MOV     AL,SRW                  ; (SHORT REAL WORD COUNT)
20A5 F6E1            188         MUL     CL
20A7 8BC8            189         MOV     CX,AX
20A9 B80000          190         MOV     AX,0
20AC F3              191         REP     STOSW
20AD AB
                     192
                     193         ;PRE-COMPUTE THE RECIPROCAL OF THE SQUARE ROOT OF THE STIFFNESS VALUES
20AE 8B0E0001        194         MOV     CX,M                    ;COUNT = # ACTIVE JOINTS (M)
20B2 C45E18          195         LES     BX,[BP].S_PT            ;POINTER TO STIFFNESS TABLE
20B5 BE0000          196         MOV     SI,0                    ;CLEAR INDEX
20B8            197  STFLOOP:
20B8 9B260900        198         FLD     ES:[BX+SI].SR           ;GET NEXT STIFFNESS VALUE
20BC 9BD9FA          199         FSQRT                           ;COMPUTE SQUARE ROOT
20BF 9BD9E8          200         FLD1                            ;    AND RECIPROCATE
20C2 9BDEF1          201         FDIVRP  ST(1),ST
20C5 9BD99C0C20      202         FSTP    1STIFF[SI]              ;SAVE IT
20CA 9B              203         WAIT
20CB 83C604          204         ADD     SI,SRB
20CE E2E8            205         LOOP    STFLOOP
                     206
                     207         ;
20D0 BB0000          208         MOV     BX,0                    ;OUTER LOOP COUNT
20D3            209  OLOOP:
20D3 9BD987A020      210         FLD     BBUF[BX]                ;PRE-LOAD STACK WITH 'B' ELEMENT
                     211
                     212                                         ;SET UP FOR INNER LOOP
20D8 BE0000          213         MOV     SI,0                    ;CLEAR INDEX
20DB 8B0E0001        214         MOV     CX,M                    ;INNER LOOP COUNT
20DF 8BFB            215         MOV     DI,BX                   ;ADJUST MATRIX POINTER TO NEXT ROW
20E1            216  ILOOP:
20E1 9BD905          217         FLD     ABUF[DI]                ;GET NEXT 'A' MATRIX ELEMENT
20E4 9BD9C0          218         FLD     ST(0)                   ;SAVE ELEMENT
20E7 9BD88C0200      219         FMUL    TBUF[SI]                ;MULTIPLY BY 'T' VALUE
20EC 9BDEC2          220         FADDP   ST(2),ST                ;ADD INTO SUMMATION
20EF 9BD88C0C20      221         FMUL    1STIFF[SI]              ;MULTIPLY 'A' ELEMENT BY 1STIFF VALUE
20F4 9BD91D          222         FSTP    ABUF[DI]                ;SAVE RESULT BACK IN SAVE 'A' ELEMENT
20F7 9B              223         WAIT
```

```
20F8 23352601        224              ADD    DI,COLOFF       ;GO TO 'A' ELEMENT IN NEXT COLUMN
20FC 83C604          225              ADD    SI,SRB          ;NEXT 'M' AND 'ISTIFF' VALUES
20FF E2E0            226              LOOP   LOOP            ;END OF INNER LOOP
                     227
2101 9BD99FA820      228              FSTP   BBUF[BX]        ;SAVE SUMMATION IN CURRENT 'B' ELEMENT
2106 9B              229              WAIT
2107 83C304          230              ADD    BX,SRB          ;END OF OUTER LOOP ?
210A 3B1E2801        231              CMP    BX,COLOFF
210E 72C3            232              JB     LOOP            ;NO- JUMP BACK
                     233
                     234
                     235              ;
2110 C706FC022000    236              MOV    ROWCTR,0        ;ZERO OUT ROW COUNTER
2116                 237      L50:
2116 8B1EFC02        238              MOV    BX,ROWCTR
211A 8B0E2001        239              MOV    CX,M            ;LOOP COUNT
211E 9BD9EE          240              FLDZ                   ;ZERO OUT SUMMATION
2121 8BFB            241              MOV    DI,BX           ;POINTER TO 'A' MATRIX
2123                 242      L60:
2123 9BD905          243              FLD    ABUF[DI]        ;GET NEXT 'A' ELEMENT
2126 9BD9C0          244              FLD    ST(0)           ;SAVE COPY ON STACK
2129 9BDEC9          245              FMULP  ST(1),ST        ;SQUARE A ELEMENT
212C 9BDEC1          246              FADDP  ST(1),ST        ;  AND ADD INTO SUMMATION
212F 03382801        247              ADD    DI,COLOFF       ;GO TO NEXT COLUMN
2133 E2EE            248              LOOP   L60
                     249
2135 9B2ED817        250              FCOM   TOL[BX]         ;SUMMATION > TOL ?
2139 9BDD3EFE00      251              FSTSW  STAT
213E 9B              252              WAIT
213F A1FE00          253              MOV    AX,STAT
2142 9E              254              SAHF
2143 7706            255              JA     L65             ;YES- CONTINUE
2145 9BDBE3          256              FNINIT                 ;NO- JUMP AHEAD
2148 E9A800          257              JMP    L115
                     258
214B                 259      L65:
214B 9BD9FA          260              FSQRT                  ;Q = SQUARE ROOT OF SUMMATION AND RECIPROCATE
214E 9BD9E8          261              FLD1
2151 9BDEF1          262              FDIVRP ST(1),ST
                     263
2154 9BD9C0          264              FLD    ST(0)           ;GET 'Q'
2157 9BD8FA800       265              FMUL   BBUF[BX]
215C 9BD997A800      266              FST    BBUF[BX]        ;B(X) = B(X) * Q
2161 9B              267              WAIT
                     268                                     ;'B' AND 'Q' STILL ON STACK
                     269
2162 8BF3            270              MOV    SI,BX           ;INDEX TO CURRENT ROW IN 'A' MATRIX
2164 C47E8C          271              LES    DI,DBP1.H_PT    ;INDEX TO '-' (SOLUTION) MATRIX
2167 8B0E2001        272              MOV    CX,M            ;LOOP COUNT
216B                 273      L70:
216B 9BD904          274              FLD    ABUF[SI]        ;GET 'A' ELEMENT
216E 9BD8CA          275              FMUL   ST,ST(2)        ;A(X) * Q
2171 9BD914          276              FST    ABUF[SI]        ;SAVE BACK IN MATRIX
2174 9BD809          277              FMUL   ST,ST(1)        ;B(Y) * ( A(X) * Q )
2177 9B26D805        278              FADD   ES:[DI].SR      ;H(Z) + B(Y) * ( A(X) * Q )
217B 9B26D91D        279              FSTP   ES:[DI].SR      ;SAVE NEW '-' ELEMENT
217F 9B              280              WAIT
2180 03362801        281              ADD    SI,COLOFF       ;'A' POINTER TO NEXT COLUMN
2184 83C704          282              ADD    DI,SRB          ;'-' POINTER TO NEXT ELEMENT
2187 E2E2            283              LOOP   L70
                     284
2189 9BDBE3          285              FINIT                  ;CLEAR 8287 STACK
218C 3B1E0601        286              CMP    BX,LASTROW      ;LAST ROW ?
2190 7373            287              JAE    L50END          ;YES- END L50 LOOP
                     288
2192 9BD400          289              MOV    BX,SRB          ;OFFSET TO NEXT ROW ELEMENT AND OUTER LOOP CNT
2195                 290      L80:
2195 A1FD00          291              MOV    AX,ROWCTR
2198 8BF2            292              MOV    SI,AX           ;INDEX TO CURRENT ROW OF 'A' MATRIX
219A 8B2E0001        293              MOV    CX,M            ;LOOP COUNT
219E 9BD9EE          294              FLDZ                   ;INITIALIZE SUMMATION
21A1                 295      L90:
21A1 9BD904          296              FLD    ABUF[SI]        ;GET 'A' ELEMENT
21A4 9BD8A8          297              FMUL   ABUF[BX+SI]     ;MULTIPLY BY ELEMENT IN SUCCEEDING ROW
21A7 9BDEC1          298              FADDP  ST(1),ST        ;ADD INTO SUMMATION
21AA 03362801        299              ADD    SI,COLOFF       ;GO TO NEXT COLUMN
21AE E2F1            300              LOOP   L90
                     301
21B0 9BD916F800      302              FST    G
                     303
21B5 8BF0            304              MOV    SI,AX           ;INDEX TO CURRENT ROW OF 'B' MATRIX
21B7 9BD9C0          305              FLD    ST(0)           ;GET SUMMATION
21BA 9BD8CA800       306              FMUL   BBUF[SI]        ;B(X) * SUMMATION
21BF 9BD8A8A800      307              FSUBR  BBUF[BX+SI]     ;B(X+n) - ( B(X) * SUMMATION )
```

```
0:04 9BD998A820    308            FSTP    BBUF[BX+SI]     ;SAVE IT
0:09 9B            309            WAIT
                   310
0:0A 8BF0          311            MOV     SI,AX           ;INDEX TO CURRENT ROW OF 'A' MATRIX
0:0C 8B0E0201      312            MOV     CX,N            ;LOOP COUNT
0:00               313    L100:
0:00 9BD9C0        314            FLD     ST(0)           ;GET SUMMATION
0:03 9BD88C        315            FMUL    ABUF[SI]        ;A(X) * SUMMATION
0:06 9BD8A8        316            FSUBR   ABLF[BX+SI]     ;A(X+n) - ( A(X) * SUMMATION )
0:09 9BD918        317            FSTP    ABUF[BX+SI]     ;SAVE IT
0:0C 9B            318            WAIT
0:00 03360801      319            ADD     SI,COLOFF       ;NEXT COLUMN
0:E1 E2ED          320            LOOP    L100
                   321
0:E3 9BDBE3        322            FINIT                   ;CLEAR 8087 STACK
0:E6 03C3          323            ADD     AX,BX
0:E8 3B060601      324            CMP     AX,LASTROW      ;END OF L80 LOOP ?
0:EC 7305          325            JAE     L105            ;YES- JUMP AHEAD
0:EE 83C304        326            ADD     BX,SRB          ;NO- INDEX TO NEXT ROW AND LOOP AGAIN
0:F1 EBA2          327            JMP     L80
                   328
0:F3               329    L105:
0:F3 A1FC00        330            MOV     AX,ROWCTR       ;GET ROW NUMBER
0:F6 3B060601      331            CMP     AX,LASTROW      ;ALL DONE ?
0:FA 7309          332            JAE     L50END          ;YES- JUMP AHEAD
0:FC 050400        333            ADD     AX,SRB          ;ROW COUNTER TO NEXT ROW
0:FF A3FC00        334            MOV     ROWCTR,AX
0202 E911FF        335            JMP     L50             ;LOOP AGAIN
                   336
0205               337    L50END:
0205 BB0000        338            MOV     BX,0
0208 C4760C        339            LES     SI,IBPI_H_PT
020B 8B0E0001      340            MOV     CX,N            ;LOOP COUNT
020F               341    L110:
020F 9B26D900      342            FLD     ES:[BX+SI].SR   ;GET 'H' ELEMENT
0213 9BD68FDC00    343            FMUL    ISTIFF[BX]      ;H(X) * ISTIFF(X)
0218 9BD8A7C000    344            FSUB    TBUF[BX]        ;( H(X) * ISTIFF(X) ) - T(X)
021D 9B26D918      345            FSTP    ES:[BX+SI].SR   ;SAVE IN H(X)
0221 9B            346            WAIT
0222 83C304        347            ADD     BX,SRB          ;NEXT X
0225 E2E8          348            LOOP    L110
                   349
0227 5D            350            POP     BP
0228 1F            351            POP     DS
0229 CA0C00        352            RET     28
                   353
                   354
                   355    ZAPIT   ENDP
                   356
                   357    ZAPITMOD_CODE   ENDS
                   358
                   359            END
```

ASSEMBLY COMPLETE, NO ERRORS FOUND iRMX 86 PL/M-86 V2.3 COMPILATION OF MODULE BTRANSMOD
OBJECT MODULE PLACED IN BTRANS.OBJ
COMPILER INVOKED BY:  :LANG:PLM86 BTRANS.P86 DEBUG TYPE OPTIMIZE(0) LARGE PAGELENGTH(84) PRINT(:BSPR:BTRANS.LST)

```
           $RAM
           $TITLE('BTRANS$MOD')
           $SUBTITLE('BACK TRANSFORMATION ROUTINE')

$INCLUDE (:BSINC:COPYRIGHT.PLM)
      =    /*         *******************************
      =    *****   (C) COPYRIGHT 198  ROBOTICS RESEARCH CORPORATION   *****
      =    *****             ALL RIGHTS RESERVED                      *****
      =              *******************************
      =    */

1        BTRANS$MOD:
           DO;

/****************************************************************
    BTRANS - BACK TRANSFORMATION ROUTINE*
    BTRANS - 07-Sep-1985   RRC / JAMES FARRELL
    BTRANS - 07-Sep-1984   RRC / LEO THIEL */

$INCLUDE (:BSINC:COPYRIGHT.PLM)
      =    /*         *******************************
      =    *****   (C) COPYRIGHT 198  ROBOTICS RESEARCH CORPORATION   *****
      =    *****             ALL RIGHTS RESERVED                      *****
```

```
                  =   */
                  =   /*
                      DESCRIPTION

THIS ROUTINE WILL BACK CALCULATE THE TOOL TIP XYZ LOCATION AND TRIAD DIRECTION
                      VECTORS GIVEN A SET OF JOINT ANGLES

ACCESS

CALL BTRANS(@J,@XYZ,@DIR)
                      J,REAL ARRAY,0-INPUT JOINT ANGLES
                      XYZ,REAL ARRAY,0-(3X1) TOOL TIP XYZ COORDINATES
                      DIR,REAL ARRAY,0-(3X3) TOOL TRIAD X & Y & Z AXES

*/

/*DECLARATIONS OF TRANSFORMATION MATRICES AND OFFSET VECTORS  */

2    1              DECLARE T1(9) REAL INITIAL(1.,0.,0.,0.,1.,0.,0.,0.,1.),
                              T2(9) REAL INITIAL (1.,0.,0.,0.,1.,0.,0.,0.,1.),
                              T3(9) REAL INITIAL (1.,0.,0.,0.,1.,0.,0.,0.,1.),
                              T4(9) REAL INITIAL (1.,0.,0.,0.,1.,0.,0.,0.,1.),
                              T5(9) REAL INITIAL (1.,0.,0.,0.,1.,0.,0.,0.,1.),
                              T6(9) REAL INITIAL (1.,0.,0.,0.,1.,0.,0.,0.,1.),
                              T7(9) REAL INITIAL (1.,0.,0.,0.,1.,0.,0.,0.,1.),
                              H2(3) REAL INITIAL (1.,0.,0.),
                              H4(3) REAL INITIAL (1.,0.,0.),
                              H6(3) REAL INITIAL (1.,0.,0.),
                              H8(3) REAL INITIAL (1.,0.,0.),
                              H10(3) REAL INITIAL (1.,0.,0.),
                              H12(3) REAL INITIAL (1.,0.,0.),
                              HT(3) REAL;

/*MATRIX MANIPULATION PROCEDURES    EXTERNAL*/
                      $INCLUDE (:INC:MVY3.EXT)
  3    1  =           MVY3: PROCEDURE(A$PT,B$PT,C$PT) EXTERNAL;
  4    2  =               DECLARE (A$PT,B$PT,C$PT)   POINTER;

=           /*   MVY3 RETURNS THE PRODUCT OF TWO (3X3) MATRICES.
          =                [C]=[A][B]
          =                MVY3 ASSUMES THAT THE MIDDLE COLUMN OF [B] IS  0-1-0 */

5    2  =               END MVY3;
                      $INCLUDE (:INC:MVZ3.EXT)
  6    1  =           MVZ3: PROCEDURE(A$PT,B$PT,C$PT) EXTERNAL;
  7    2  =           DECLARE (A$PT,B$PT,C$PT)   POINTER;

=           /*   MVZ3 RETURNS THE PRODUCT OF TWO (3X3) MATRICES.
          =                [C]=[A][B]
          =                MVZ3 ASSUMES THAT THE LAST COLUMN OF [B] IS  0-0-1  */

8    2  =           END MVZ3;
                      $INCLUDE (:INC:RV3.EXT)
  9    1  =           RV3: PROCEDURE(A$PT,B$PT,C$PT) EXTERNAL;
 10    2  =           DECLARE (A$PT,B$PT,C$PT) POINTER;

=           /* RV3 RETURNS A (3 X 1 ) VECTOR FROM THE PRODUCT OF A (3X3) MATRIX AND
          =              (3 X 1) VECTOR. {c}=[A]{b} */

11    2  =           END RV3;
                      $INCLUDE (:INC:MV3.EXT)
 12    1  =           MV3: PROCEDURE(A$PT,B$PT,C$PT) EXTERNAL;
 13    2  =               DECLARE (A$PT,B$PT,C$PT)   POINTER;

=           /* MV3 RETURNS THE PRODUCT OF TWO (3X3) MATRICES.
          =              [C]=[A][B] */

14    2  =               END MV3;
                      $INCLUDE (:INC:RVY3.EXT)
 15    1  =               RVY3: PROCEDURE(A$PT,B$PT,C$PT) EXTERNAL;
 16    2  =               DECLARE (A$PT,B$PT,C$PT) POINTER;

=           /*   RVY3 RETURNS A (3 X 1 ) VECTOR FROM THE PRODUCT OF A (3X3) MATRIX
          =            *   AND (3 X 1) VECTOR.
          =            *   {c}=[A]{b}
          =            *   NOTE*** THE CENTER TERM OF {b} MUST BE 0.0 */

17    2  =               END RVY3;
                      $INCLUDE (:INC:RVYZ3.EXT)
 18    1  =               RVYZ3: PROCEDURE(A$PT,B$PT,C$PT) EXTERNAL;
 19    2  =               DECLARE (A$PT,B$PT,C$PT) POINTER;
```

```
          =   /*  RVYZ3 RETURNS A (3 X 1) VECTOR FROM THE PRODUCT OF A (3X3) MATRIX
          =       AND (3 X 1) VECTOR.
          =       {c}=[A]{b}
          =       *** ONLY THE FIRST TERM OF {b} MAY BE NON-ZERO *** */
20   2  =       END RVYZ3;
              $INCLUDE (:INC:AV3.EXT)
21   1  =     AV3: PROCEDURE(A$PT,B$PT,C$PT) EXTERNAL;
22   2  =         DECLARE (A$PT,B$PT,C$PT)   POINTER;

=   /*  SUM OF TWO (3 X 1) VECTORS
          =       {c} = {a} + {b} */

23   2  =     END AV3;
              $INCLUDE (:INC:VX.EXT)
24   1  =     VX: PROCEDURE(A$PT,B$PT,C$PT) EXTERNAL;
25   2  =         DECLARE (A$PT,B$PT,C$PT)   POINTER;

=   /* VX RETURNS THE CROSS PRODUCT OF TWO 3D VECTORS.
          =      {C}={A}X{B}  */

26   2  =       END VX;
              $INCLUDE (:INC:VNOR.EXT)
27   1  =     VNOR: PROCEDURE(A$PT,B$PT) EXTERNAL;
28   2  =         DECLARE (A$PT,B$PT) POINTER;

=   /* VNOR NORMALIZES 3D VECTOR
          =      {B}=NOR{A} */

29   2  =       END VNOR;
              $INCLUDE (:INC:SINCOS.EXT)
30   1  =     SINCOS: PROCEDURE(N,A$PT,S$PT,C$PT) EXTERNAL;
31   2  =     DECLARE N INTEGER;
32   2  =     DECLARE (A$PT,S$PT,C$PT) POINTER;
          =   /* N,INTEGER VARIABLE,U-NUMBER OF ANGLES
          =      A,REAL ARRAY,U-ANGLES IN RADIANS (0.0<=A<=2*PI)
          =      S,REAL ARRAY,D-SINE OF ANGLES
          =      C,REAL ARRAY,D-COSINE OF ANGLES */

33   2  =     END SINCOS;

$INCLUDE (:BSINC:MOTCONINF.DEC)
          =   /* UNITS- INCHES,RADIANS */
          =   /* MODAL PARAMETERS */
34   1  =     DECLARE
          =   (TX,TY,TZ) REAL EXTERNAL, /* XYZ TOOL OFFSET */
          =   (TI,TJ,TK) REAL EXTERNAL, /* NORMALIZED IJK TOOL VECTOR OFFSET DIRECTION */
          =   (RI,RJ,RK) REAL EXTERNAL, /* NORMALIZED IJK TOOL ROLL VECTOR OFFSET DIRECTION */
          =   ACCFLAG WORD EXTERNAL, /* ACCURACY FLAG (ON=1,OFF=0) */
          =   ACCTOL REAL EXTERNAL, /* ACCURACY TOLERANCE (INCHES) IF ACCFLAG=1 */
          =   ROLLFLAG WORD EXTERNAL, /* TOOL ROLL CONSTRAINT FLAG (ON=1,OFF=0) */
          =   J$POS(10) REAL EXTERNAL, /* INACTIVE JOINT POSITIONS */
          =   LG$JA$ORG(10) REAL EXTERNAL, /* LAST GOAL POINT ACTIVE JOINT ORIGINS */
          =   NG$JA$ORG(10) REAL EXTERNAL, /* GOAL POINT ACTIVE JOINT ORIGINS */
          =   JA$STIF(10) REAL EXTERNAL, /* ACTIVE JOINT STIFFNESS */
          =   JA$ORG(10) REAL EXTERNAL, /* ACTIVE JOINT ORIGINS */
          =   LOOP$TIME REAL EXTERNAL, /* LOOPTIME */
          =   LIN$ORI$SCL REAL EXTERNAL, /* LINEAR TO ORIENTATION VELOCITY SCALE FACTOR */
          =   LIN$ORB$SCL REAL EXTERNAL, /* LINEAR TO ORBIT VELOCITY SCALE FACTOR */
          =   LIN$ACC REAL EXTERNAL, /* ACCELERATION VALUE INCHES/SEC**2 */
          =   ORI$ACC REAL EXTERNAL,/* ORIENTATION ACCELERATION RADIANS/SEC**2 */
          =   ANG$ACC REAL EXTERNAL;/* ANGULAR (JOINT) ACCELERATION RADIAN/SEC**2 */

=   /* CONFIGURATION PARAMETERS */
35   1  =     DECLARE
          =   NJ WORD EXTERNAL, /* NUMBER OF JOINTS */
          =   NAJ WORD EXTERNAL, /* NUMBER OF ACTIVE JOINTS */
          =   AJL(10) WORD EXTERNAL, /* ACTIVE JOINT LIST (I.E. 1,2,4,5,6 ETC) */
          =   SAJ(10) WORD EXTERNAL, /* ACTIVE/INACTIVE JOINT STATUS */
          =   HJ0(10) REAL  EXTERNAL,/* HOME POSITION OF JOINTS */
          =   (R0,R2,R4,R6,R8,R10,L1,L3,L5,L7,L9) REAL EXTERNAL, /* JOINT OFFSETS */
          =   (XDIR,YDIR,ZDIR) REAL EXTERNAL, /* LINEAR BASE SLIDE DIRECTIONS */
          =   GBL$MX(12) REAL EXTERNAL; /* ROTATIONAL MATRIX AND XYZ OFFSET FROM GLOBAL TO
          =                                TRANSFORMATION COORDINATE SYSTEM */

=   /* LIMIT PARAMETERS */
36   1  =     DECLARE
          =   JNT$VEL$LIM(10) REAL EXTERNAL, /* JOINT VELOCITY LIMITS(RAD/SEC , IN/SEC)*/
          =   JNT$POS$LIM$LOW(10) REAL EXTERNAL, /* LOWER JOINT LIMIT(RADIANS,INCHES) */
          =   JNT$POS$LIM$HI(10) REAL EXTERNAL; /* HIGHER JOINT LIMIT(RADIANS,INCHES) */

=   /* SERVO INTERFACE PARAMETERS */
          =   $include (:bsinc:servcomm.dec)
```

```
37  1  =1   DECLARE
           =1       CONTROL$BYTE                BYTE    EXTERNAL,
           =1       SERVO$STATUS$BYTE           BYTE    EXTERNAL,
           =1       COMMAND$DIVIDE$NUMBER       BYTE    EXTERNAL,
           =1       SERVLOCK                    BYTE    EXTERNAL,
           =1       POSITION$COMMANDS(10)       REAL    EXTERNAL;

=    /* USER INTERFACE */
38  1      =   DECLARE
           =   MOT$MODE WORD EXTERNAL, /* MODE INDICATOR,0-REAL TIME,1-TEACH,2-HOME */

=   /* FOR TEACH MODE (i.e. MODE=1) */

=   JOG$ENABLE WORD EXTERNAL, /* JOG ENABLE FLAG,0-OFF,1-ON */
           =   JOG$PATH WORD EXTERNAL, /* TYPE OF JOG PATH, 0-CARTESIAN,1-JOINT SPACE,2-ORBIT */
           =   JOG$COORD$SYS WORD EXTERNAL, /* JOG COORD SYSTEM,1-GLOBAL LINEAR,2-HAND
           =                               ,3(=LOCAL */
           =   JOG$MOT$TYPE WORD EXTERNAL, /* 0-INCREMENTAL,1-CONTINUOUS */
           =   JOG$NITER WORD EXTERNAL, /* NUMBER OF ITERATIONS FOR JOGGING */
           =   JOG$ROLLFLAG WORD EXTERNAL, /* TOOL ROLL CONSTRAINT FLAG (ON=1,OFF=2) */
           =   /* FOR INCREMENTAL CARTESIAN JOG , JOG$PATH=0,JOG$TYPE=0 */
           =   DLT$XYZ(3) REAL EXTERNAL, /* NEXT DELTA X,Y,Z POSITION TO ATTAIN */
           =   DLT$YPR(3) REAL EXTERNAL, /* NEXT DELTA YAW,PITCH,ROLL ORIENTATION TO ATTAIN */
           =   /* FOR INCREMENTAL JOINT SPACE JOG, JOG$PATH=1,JOG$TYPE=0 */
           =   DLT$JNT(10) REAL EXTERNAL, /* NEXT DELTA JOINT POSITIONS TO ATTAIN */
           =   /* FOR INCREMENTAL ORBIT JOG, JOG$PATH=2,JOG$TYPE=0 */
           =   DLT$ORB$JNT REAL EXTERNAL, /* LARGEST INCREMENTAL ANGLE OF TRAVEL TO ORBIT ARM */
           =   /* AFTER AN ARM HAS BEEN JOGGED,WHETHER INCREMENTAL OR CONTINUOUS THE FOLLOWING
                   POSITIONAL INFORMATION WILL BE AVAILABLE */
           =   JOG$SPR$ORG(10) REAL EXTERNAL, /* ACTIVE JOG SPRING ORIGINS */
           =   JOG$XYZ$POS(3) REAL EXTERNAL, /* CURRENT TOOL POINT POSITION IN J1 C.S.*/
           =   JOG$IJK$POS(9) REAL EXTERNAL,/*CURRENT TOOL VECTOR DIRECTION AND
           =                               ROLL DIRECTION IN J1 C.S. */
           =   JOG$PITCH$VECTOR(3) REAL EXTERNAL, /* CURRENT PITCHING PLANE VECTOR */
           =   JOG$JNT$POS(10) REAL EXTERNAL, /* CURRENT ABSOLUTE JOINT ANGLES */
           =   JOG$STATUS WORD EXTERNAL, /* JOG STATUS */
           =   PLAY$FLG WORD EXTERNAL, /* PLAYBACK FLAG,0-OFF,1-PLAYBACK */
           =   DEAD$MAN$FLG WORD EXTERNAL, /* DEAD MAN SWITCH 0-OFF,
           =                               1-ON CONTINUE WITH MOTION */
           =   PLAY$VEL$FAC REAL EXTERNAL,/*PLAYBACK VELOCITY SCALE FACTOR*/
           =   PLAY$FED$RATE REAL EXTERNAL,/*FEEDRATE OVERRIDE-MAINTAIN SAME PATH */
           =   PLAY$MOVE$PATH WORD EXTERNAL, /* PATH TYPE 0=GLOBAL LINEAR,1=GLOBAL JOINT,2-JOINT*/
           =   PLAY$GOAL$XYZ(3) REAL EXTERNAL, /* XYZ GOAL POINT FOR PATH TYPES 0 & 1 */
           =   PLAY$GOAL$IJK(6) REAL EXTERNAL, /* TOOL DIRECTION & ROLL IJK GOAL POINT */
           =   PLAY$GOAL$JNT(10) REAL EXTERNAL, /* GOAL POINT JOINT POSITIONS */
           =   PLAY$VEL(2) REAL EXTERNAL,/* INTERMEDIATE & FINAL VELOCITY */
           =   PLAY$FIN WORD EXTERNAL, /* COMPLETION STATUS - PLAYBACK PATH COMPLETED */
           =   PLAY$STATUS WORD EXTERNAL; /* STATUS - INTERMEDIATE VELOCITY NOT ATTAINED */

/*PROCEDURE FOR BACK TRANSFORMATIONS*/

39  1      BTRANS: PROCEDURE(J$PT,XYZ$PT,DIR$PT) PUBLIC;

40  2      DECLARE(J$PT,XYZ$PT,DIR$PT)POINTER;
41  2      DECLARE
           J BASED J$PT(1) REAL,
           XYZ BASED XYZ$PT(1) REAL,
           DIR BASED DIR$PT(1) REAL;
42  2      DECLARE
           PROD1(9) REAL,
           PROD2(9) REAL,
           TL$OFF$(9) REAL,
           SUM1(3) REAL,
           SUM2(3) REAL,
           TEMP(3) REAL,
           S(10) REAL,
           C(10) REAL,
           I INTEGER;

/*CALCULATE SINES AND COSINES ONCE ONLY*/

43  2      CALL SINCOS(SIGNED(NJ),@J,@S,@C);

/*DEFINE ALL OFFSET VECTORS*/

44  2      H2(0) = 0.;
45  2      H4(0) = -R2;
46  2      H6(0) = -R4;
47  2      H6(2) = L3;
48  2      H8(0) = R4;
49  2      H10(0) = -R6;
50  2      H10(2) = L5;
51  2      H12(0) = R6;
```

```
52   2      H12(2) = L7;
             /* SET UP TOOL OFFSETS */
53   2      CALL MOVW(@TX,@HT,6);
54   2      CALL MOVW(@TL,@T_SOFF(6),6);
55   2      CALL MOVW(@RT,@T_SOFF(3),6);
56   2      CALL VX(@T_SOFF(3),@T_SOFF(6),@T_SOFF);
57   2      CALL VNOR(@TL$OFF,@T_SOFF);

/*DEFINE ALL TRANSPOSED TRANSFORMATION MATRICES*/

58   2      T1(0) = C(0);
59   2      T1(1) = S(0);
60   2      T1(3) = -S(0);
61   2      T1(4) = C(0);

62   2      T2(0) = C(1);
63   2      T2(2) = -S(1);
64   2      T2(6) = S(1);
65   2      T2(8) = C(1);

66   2      T3(0) = C(2);
67   2      T3(1) = S(2);
68   2      T3(3) = -S(2);
69   2      T3(4) = C(2);

70   2      T4(0) = C(3);
71   2      T4(2) = -S(3);
72   2      T4(6) = S(3);
73   2      T4(8) = C(3);

74   2      T5(0) = C(4);
75   2      T5(1) = S(4);
76   2      T5(3) = -S(4);
77   2      T5(4) = C(4);

78   2      T6(0) = C(5);
79   2      T6(2) = -S(5);
80   2      T6(6) = S(5);
81   2      T6(8) = C(5);

82   2      T7(0) = C(6);
83   2      T7(1) = S(6);
84   2      T7(3) = -S(6);
85   2      T7(4) = C(6);

/*BEGIN REVERSE TRANSFORMATION */

86   2      CALL MVY3(@T1,@T2,@PROD1);
87   2      CALL RVYZ3(@PROD1,@H4,@SUM1);

88   2      CALL MVZ3(@PROD1,@T3,@PROD2);
89   2      CALL RVY3(@PROD2,@H6,@TEMP);
90   2      CALL AV3(@SUM1,@TEMP,@SUM2);

91   2      CALL MVY3(@PROD2,@T4,@PROD1);
92   2      CALL RVYZ3(@PROD1,@H8,@TEMP);
93   2      CALL AV3(@SUM2,@TEMP,@SUM1);

94   2      CALL MVZ3(@PROD1,@T5,@PROD2);
95   2      CALL RVY3(@PROD2,@H10,@TEMP);
96   2      CALL AV3(@SUM1,@TEMP,@SUM2);

97   2      CALL MVY3(@PROD2,@T6,@PROD1);
98   2      CALL RVY3(@PROD1,@H12,@TEMP);
99   2      CALL AV3(@SUM2,@TEMP,@SUM1);

100  2      CALL MVZ3(@PROD1,@T7,@PROD2);
101  2      CALL RV3(@PROD2,@HT,@TEMP);
102  2      CALL AV3(@SUM1,@TEMP,@XYZ);
103  2      CALL MV3(@PROD2,@TL$OFF,@DIR);

104  2      END BTRANS;
105  1      END BTRANS$MOD;

MODULE INFORMATION:

CODE AREA SIZE     = 03BFH    959D
    CONSTANT AREA SIZE = 202CH     44D
    VARIABLE AREA SIZE = 0232H    562D
    MAXIMUM STACK SIZE = 0022H     34D
    348 LINES READ
    0 PROGRAM WARNINGS
    0 PROGRAM ERRORS
```

DICTIONARY SUMMARY:

290KB MEMORY AVAILABLE
    9KB MEMORY USED   (2%)
    0KB DISK SPACE USED

END OF PL/M-86 COMPILATION

SERVO CONTROL INTERFACE

```
iRMX 86 8086/87/88/186 MACRO ASSEMBLER v2.0 ASSEMBLY OF MODULE SERVCONTRLMOD
OBJECT MODULE PLACED IN SERVCONTRL.OBJ
ASSEMBLER INVOKED BY:  :LANG:AS86 SERVCONTRL.A86 DEBUG TYPE PAGELENGTH(84) PAGEWIDTH(132) PRINT(:BSPR:SERVCONTRL.LST)

LOC  OBJ              LINE    SOURCE

1 +1  $PAGELENGTH(84) PAGEWIDTH(132) DEBUG TYPE
                         2
                         3
                         4     ;***************** PROGRAM DESCRIPTION *****************
                         5
                         6     ;                    SERVCONTRL
                         7
                         8 +1  $INCLUDE (:BSINC:COPYRIGHT.ASM)
               =1        9     ;    ********************************
               =1       10     ;****     (C) COPYRIGHT 198_ ROBOTICS RESEARCH CORPORATION  *****
               =1       11     ;****            ALL RIGHTS RESERVED                        *****
               =1       12     ;    ********************************
                        13
                        14     ;BY DAVE HEYL (11-12-84)
                        15
                        16     ;SERVCONTRL.A86 IS AN ASSEMBLY LANGUAGE ROUTINE WHICH CONVERTS THE SEVEN
                        17     ;JOINT ANGLES IN RADIANS TO ABSOLUTE ENCODER PULSES AND SENDS THIS INFORMATION
                        18     ;TO THE SERVO PROCESSOR BOARD.
                        19     ;SERVCONTRL IS CALLED IN PLM AS FOLLOWS:
                        20     ;    CALL SERVCONTRL(@CMD, @STAT, @SERVO$DATA);
                        21     ;
                        22     ; WHERE
                        23     ;    CMD IS THE COMMAND STRUCTURE
                        24     ;    STAT IS THE STATUS STRUCTURE
                        25     ;    SERVO$DATA IS THE 7 JOINT ANGLES IN RADIANS TO BE CONVERTED TO
                        26     ;          ENCODER COUNTS AND SENT TO THE SERVO PROCESSOR BOARD.
                        27
                        28
                        29     ;******************* UPDATE RECORD *******************
                        30
                        31     ; VERSION # 1 (12-26-84)  - FIRST WORKING VERSION
                        32
                        33     ;*************************************************************
                        34
                        35
                        36
                        37     NAME     SERVCONTRLMOD
                        38
                        39
                        40
                        41     EXTRN    HOMJNT:FAR,     CVJREP:FAR,      SERVOTIME:FAR,  SHUTDOWN:FAR
                        42     EXTRN    ABSLIM:FAR,     INCLIM:FAR,      SVCTIME:FAR
                        43
                        44     EXTRN    CONTROLBYTE:BYTE
                        45     EXTRN    SERVOSTATUSBYTE:BYTE
                        46     EXTRN    COMMANDDIVIDENUMBER:BYTE
                        47     EXTRN    SERVLOCK:BYTE
                        48     EXTRN    POSITIONCOMMANDS:DWORD
                        49
                        50
                        51
                        52     ASSUME   CS:SERVCONTROLMOD_CODE,DS:SERVCONTROLMOD_DATA,SS:STACK,ES:NOTHING
                        53
                        54
                        55     SERVCONTROLMOD_DATA      SEGMENT         'DATA'
                        56
                        57           DATA_FRAME     STRUC
0000                    58                BPPUSH   DW      ?
0002                    59                DSPUSH   DW      ?
0004                    60                RETADDR  DD      ?
0008                    61                SERVO_DATA_PT  DD  ?
000C                    62                STAT_PT  DD      ?
0010                    63                CMD_PT   DD      ?
                        64           DATA_FRAME     ENDS
                        65
```

```
                    66          REAL_OP  STRUC
0000                67                   REAL      DD      ?
                    68          REAL_OP  ENDS
                    69
                    70
                    71          JNT_ANGLES         STRUC
0000                72                   J1_ANG    DD      ?
0004                73                   J2_ANG    DD      ?
0008                74                   J3_ANG    DD      ?
000C                75                   J4_ANG    DD      ?
0010                76                   J5_ANG    DD      ?
0014                77                   J6_ANG    DD      ?
0018                78                   J7_ANG    DD      ?
                    79          JNT_ANGLES         ENDS
                    80
                    81
                    82
                    83          CMDSTAT  STRUC
0000                84                   INIT      DD      ?
0004                85                   PROG      DD      ?
0008                86                   MOVE      DD      ?
000C                87                   TRAJ      DD      ?
0010                88                   CORJNT    DD      ?
0014                89                   SERVO     DD      ?
                    90          CMDSTAT  ENDS
                    91
                    92
0000 (7             93          HOMANG   DD        7 DUP(?)
     ????????
     )
                    94
001C (7             95          ENCNTS   DD        7 DUP(?)
     ????????
     )
                    96
0038 ????           97          DELAY    DW        ?
003A ????????       98          DUMMY    DD        ?              ;DUMMY POINTER ADDRESS
                    99
                    100         SERVCONTROLMOD_DATA    ENDS
                    101
                    102
                    103
                    104         STACK    SEGMENT STACK  'STACK'
                    105
0000 (10            106                  DW 10     DUP(?)
     ????
     )
                    107
                    108         STACK    ENDS
                    109
                    110 +1      $EJECT
                    111
                    112
                    113         SERVCONTROLMOD_CODE    SEGMENT 'CODE'
                    114
                    115
                    116         PUBLIC   SERVCONTRL
                    117
                    118
                    119
0000                120         SERVCONTRL         PROC   FAR
                    121
0000 1E             122                  PUSH      DS
0001 B8----    R    123                  MOV       AX,SERVCONTROLMOD_DATA
0004 8ED8           124                  MOV       DS,AX
0006 55             125                  PUSH      BP
0007 8BEC           126                  MOV       BP,SP
                    127
0009 C45E10         128                  LES       BX,[BP].CMD_PT  ;CHECK COMMAND FROM COORDINATED JOINT CONTROL
000C 26894714       129                  MOV       AX,WORD PTR ES:[BX].SERVO
0010 0BC0           130                  OR        AX,AX
0012 7403           131                  JZ        SC5             ;IF COMMAND = 0 THEN CONTINUE
0014 E9EC00         132                  JMP       SCEND           ; ELSE RETURN
                    133
0017                134         SC5:
0017 C45E0C         135                  LES       BX,[BP].STAT_PT ;CLEAR STATUS WORD
001A B80000         136                  MOV       AX,0
001D 26894714       137                  MOV       WORD PTR ES:[BX].SERVO,AX
                    138
0021 C45E08         139                  LES       BX,[BP].SERVO_DATA_PT   ;PUT LIMITS ON ABSOLUTE JOINT ANGLES
0024 06             140                  PUSH      ES
0025 53             141                  PUSH      BX
0026 C45E0C         142                  LES       BX,[BP].STAT_PT
0029 06             143                  PUSH      ES
```

```
002A 53              144         PUSH    BX
002B 9A0000----  E   145         CALL    ABSLIM
                     146
0030 C45E08          147         LES     BX,[BP].STAT_PT   ;ANGLES EXCEED LIMITS ?
0033 26884714        148         MOV     AX,WORD PTR ES:[BX].SERVO
0037 0BC0            149         OR      AX,AX
0039 7408            150         JZ      ABSLIMOK
003B 9A0000----  E   151         CALL    SHUTDOWN
0040 E90000          152         JMP     SCEND
                     153
0043                 154 ABSLIMOK:
0043 B80100          155         MOV     AX,1              ;DIRECTION CODE
0046 50              156         PUSH    AX
0047 C45E08          157         LES     BX,[BP].SERVO_DATA_PT
004A 06              158         PUSH    ES
004B 53              159         PUSH    BX
004C B80000          160         MOV     AX,OFFSET HOMANG
004F 1E              161         PUSH    DS
0050 50              162         PUSH    AX
0051 9A0000----  E   163         CALL    HOMJNT            ;CALL HOMJNT(D_CODE, @SERVO$DATA, @HOM$ANG);
                     164                                   ;GET JOINT ANGLES RELATIVE TO HOME POSITION ANGLES
                     165
0056 B80100          166         MOV     AX,1
0059 50              167         PUSH    AX                ;DIRECTION CODE
005A B80000          168         MOV     AX,OFFSET HOMANG
005D 1E              169         PUSH    DS
005E 50              170         PUSH    AX
005F B81C00          171         MOV     AX,OFFSET ENCNTS
0062 1E              172         PUSH    DS
0063 50              173         PUSH    AX
0064 9A0000----  E   174         CALL    CVJREP            ;CALL CVJREP(D_CODE, @HOM$ANG, @ENCNTS);
                     175                                   ;CONVERT JOINT ANGLES TO ABSOLUTE ENCODER COUNTS
                     176
0069 B81C00          177         MOV     AX,OFFSET ENCNTS  ;PUT INCREMENTAL LIMITS ON CHANGE IN
006C 1E              178         PUSH    DS                ; JOINT ANGLES
006D 50              179         PUSH    AX
006E C45E0C          180         LES     BX,[BP].STAT_PT
0071 06              181         PUSH    ES
0072 53              182         PUSH    BX
0073 9A0000----  E   183         CALL    INCLIM
                     184
0078 C45E0C          185         LES     BX,[BP].STAT_PT   ;CHANGE IN ANGLES EXCEED LIMITS ?
007B 26884714        186         MOV     AX,WORD PTR ES:[BX].SERVO
007F 0BC0            187         OR      AX,AX
0081 7408            188         JZ      SC7
0083 9A0000----  E   189         CALL    SHUTDOWN
0088 EB7990          190         JMP     SCEND
                     191
008B                 192 SC7:
008B 9A0000----  E   193         CALL    SYCTIME           ;WAIT FOR OLD LOOP TIME TO ELAPSE
                     194
0090                 195 LOCKLP:
0090 B8----      E   196         MOV     AX,SEG SERVLOCK
0093 8EC0            197         MOV     ES,AX
0095 B001            198         MOV     AL,1              ;DO WHILE LOCKSET( );
0097 F0              199   LOCK XCHG AL,ES:SERVLOCK
0098 2686060000
009D 3C00            200         CMP     AL,0
009F 75EF            201         JNZ     LOCKLP
                     202
00A1 B8----      E   203         MOV     AX,SEG SERVOSTATUSBYTE
00A4 8EC0            204         MOV     ES,AX
00A6 26A00000    E   205         MOV     AL,ES:SERVOSTATUSBYTE  ;GET SERVO PROCESSOR STATUS
00AA B400            206         MOV     AH,0              ;SAVE STATUS
00AC 3C10            207         CMP     AL,10H            ;SERVO PROCESSOR READY?
00AE 7413            208         JZ      SC10              ;YES- JUMP AHEAD
00B0 3C0F            209         CMP     AL,0FH
00B2 740F            210         JZ      SC10
00B4 C45E0C          211         LES     BX,[BP].STAT_PT
00B7 26894714        212         MOV     WORD PTR ES:[BX].SERVO,AX
00BB 9A0000----  E   213         CALL    SHUTDOWN          ;NO- MUST BE A PROBLEM
00C0 EB4190          214         JMP     SCEND
                     215
00C3                 216 SC10:   ;COMPUTE NEW SERVO ITERATION COUNT
                     217
                     218         ;GET THE CURRENT SERVO ITERATION COUNT
00C3 B80100          219         MOV     AX,1              ;CALL SERVOTIME(1,@COMMANDDIVIDENUMBER)
00C6 50              220         PUSH    AX
00C7 B8----      E   221         MOV     AX,SEG COMMANDDIVIDENUMBER
00CA 50              222         PUSH    AX
00CB B80000          223         MOV     AX,OFFSET COMMANDDIVIDENUMBER
00CE 50              224         PUSH    AX
00CF 9A0000----  E   225         CALL    SERVOTIME
                     226
```

```
00D4 B90E00         227             MOV     CX,14           ;MOVE 7 REAL ENCODER VALUES TO SERVO BUFFER
00D7 BE0000         228             MOV     SI,0
00DA B8----    E    229             MOV     AX,SEG POSITIONCOMMANDS
00DD 8EC0           230             MOV     ES,AX
00DF 8B4410         231     MLOOP:  MOV     AX,WORD PTR ENCNTS[SI]
00E2 2689840000 E   232             MOV     WORD PTR ES:POSITIONCOMMANDS[SI],AX
00E7 83C602         233             ADD     SI,2
00EA E2F3           234             LOOP    MLOOP
                    235
00EC B8----    E    236             MOV     AX,SEG SERVOSTATUSBYTE
00EF 8EC0           237             MOV     ES,AX
00F1 B000           238             MOV     AL,0            ;SET STATUS BACK TO ZERO
00F3 26A20000  E    239             MOV     ES:SERVOSTATUSBYTE,AL
                    240
00F7 B005           241             MOV     AL,05H
00F9 E6DF           242             OUT     0DFH,AL         ;CLEAR INTERRUPT TO SERVO PROCESSOR
                    243
00FB B164           244             MOV     CL,100
00FD D3F8           245             SAR     AX,CL           ;DELAY (100 US)
                    246
00FF B00D           247             MOV     AL,0DH
0101 E6DF           248             OUT     0DFH,AL         ;SET INTERRUPT
                    249
0103                250     SCEND:
0103 B8----    E    251             MOV     AX,SEG SERVLOCK
0106 8EC0           252             MOV     ES,AX
0108 B000           253             MOV     AL,0
010A 26A20000  E    254             MOV     ES:SERVLOCK,AL  ;UNLOCK SERVO SEMAPHORE
                    255
010E 5D             256             POP     BP
010F 1F             257             POP     DS
0110 CA0C00         258             RET     12
                    259
                    260     SERVCONTRL      ENDP
                    261
                    262
----                263     SERVCONTROLMOD_CODE     ENDS
                    264
                    265             END

ASSEMBLY COMPLETE, NO ERRORS FOUND
iRMX 86 8086/87/88/186 MACRO ASSEMBLER V2.0 ASSEMBLY OF MODULE HOMJNTMOD
OBJECT MODULE PLACED IN HOMJNT.OBJ
ASSEMBLER INVOKED BY:  :LANG:ASM86 HOMJNT.A86 DEBUG TYPE PAGELENGTH(84) PAGEWIDTH(132) PRINT(:BSPR:HOMJNT.LST)

LOC  OBJ            LINE    SOURCE

1 +1    $PAGELENGTH(84) PAGEWIDTH(132) DEBUG TYPE
                    2
                    3
                    4       ;******************** PROGRAM DESCRIPTION ********************
                    5       ;
                    6       ;       HOMJNT - HOME JOINT ANGLES
                    7
                    8 +1    $INCLUDE (:BSINC:COPYRIGHT.ASM)
              =1    9       ;       **********************************
              =1    10      ;****   (C) COPYRIGHT 198  ROBOTICS RESEARCH CORPORATION *****
              =1    11      ;****            ALL RIGHTS RESERVED                    *****
              =1    12      ;       **********************************
                    13
                    14      ;DAVE HEYL (11-12-84)
                    15
                    16      ;HOMJNT.A86 IS AN ASSEMBLY LANGUAGE ROUTINE WHICH CONVERTS BACK AND FORTH
                    17      ;BETWEEN ABSOLUTE JOINT ANGLES AND JOINT ANGLES REFERENCED TO THE HOME
                    18      ;POSITION JOINT ANGLES, FOR ALL SEVEN JOINTS.
                    19      ;HOMJNT IS CALLED IN PLM AS FOLLOWS:
                    20      ;    CALL HOMJNT(D_CODE, J$ANG$PT, HANG$PT);
                    21      ;
                    22      ;    WHERE
                    23      ;        D_CODE IS A DIRECTION CODE WHERE '1' INDICATES A CONVERSION FROM
                    24      ;                ABSOLUTE ANGLES TO 'HOMED' ANGLES.  A CODE OTHER THAN '1'
                    25      ;                CONVERTS BACK TO ABSOLUTE JOINT ANGLES.
                    26      ;        J$ANG$PT IS A POINTER TO THE SEVEN JOINT ANGLES
                    27      ;        HANG$PT IS A POINTER TO THE CORRESPONDING ENCODER POSITIONS COMPUTED
                    28      ;                IN THIS MODULE.
                    29
                    30
                    31      ;********************* UPDATE RECORD *********************
                    32
                    33      ; VERSION # 1 (11-19-84)  -  preliminary
                    34
                    35      ;*************************************************************
```

```
 36
 37
 38
 39        NAME     HOMJNTMOD
 40
 41
 42        ASSUME   CS:HOM_CODE,DS:HOM_DATA,SS:STACK,ES:NOTHING
 43
 44
 45
 46        HOM_DATA     SEGMENT  'DATA'
 47
 48                 DATA_FRAME   STRUC
0000        49                     BPPUSH    DW      ?
0002        50                     DSPUSH    DW      ?
0004        51                     RETADDR   DD      ?
0008        52                     HANG_PT   DD      ?
000C        53                     JANG_PT   DD      ?
0010        54                     D_CODE    DW      ?
            55                 DATA_FRAME   ENDS
            56
            57                 REAL_OP STRUC
0000        58                     REAL      DD      ?
            59                 REAL_OP ENDS
            60
            61
            62                 JNT_ANGLES   STRUC
0000        63                     J1_ANG    DD      ?
0004        64                     J2_ANG    DD      ?
0008        65                     J3_ANG    DD      ?
000C        66                     J4_ANG    DD      ?
0010        67                     J5_ANG    DD      ?
0014        68                     J6_ANG    DD      ?
0018        69                     J7_ANG    DD      ?
            70                 JNT_ANGLES   ENDS
            71
            72
            73
            74
            75       HOM_DATA    ENDS
            76
            77
            78
            79       STACK    SEGMENT STACK    'STACK'
            80
0000 (2     81                 DW 2   DUP(?)
  ????
  )
            82
            83       STACK    ENDS
            84
            85 +1    $EJECT
            86
            87
            88       HOM_CODE    SEGMENT        'CODE'
            89
            90
            91       PUBLIC   HOMJNT
            92
0000 00000000     93  HOME   JNT_ANGLES (   0.0,
0004 DB0F493F     94      &                 0.7853982,
0008 00000000     95      &                 0.0,
000C DA0FC9BF     96      &                 -1.5707963,
0010 00000000     97      &                 0.0,
0014 DA0FC9BF     98      &                 -1.5707963,
0018 00000000     99      &                 0.0 )
            100
001C        101      HOMJNT   PROC    FAR
            102
001C 1E     103               PUSH    DS
001D 55     104               PUSH    BP
001E 8BEC   105               MOV     BP,SP
            106
0020 8B4610 107               MOV     AX,[BP].D_CODE      ;CHECK DIRECTION FLAG
0023 3D0100 108               CMP     AX,1
0026 7570   109               JNZ     HOMABS              ;IF NOT '1', JUMP AHEAD
            110
            111                                           ;CONVERT ABSOLUTE ANGLES TO HOMED ANGLES
0028 C5760C 112               LDS     SI,[BP].JANG_PT     ;POINTER TO JOINT ANGLES
002B C47E08 113               LES     DI,[BP].HANG_PT     ;POINTER TO ENCODER POSITION VALUES
002E 9D0904 114               FLD     [SI].J1_ANG         ;GET JOINT ANGLE IN RADIANS
0031 9B2ED8260000 115          FSUB    HOME.J1_ANG         ;SUBTRACT HOME POSITION ANGLE
0037 9B26D91D 116              FSTP    ES:[DI].J1_ANG      ;SAVE IT
003B 9B094404 117              FLD     [SI].J2_ANG         ;GET JOINT ANGLE IN RADIANS
```

```
003F 9B2ED8260400    118          FSUB    HOME.J2_ANG         ;SUBTRACT HOME POSITION ANGLE
0045 9326D95D04      119          FSTP    ES:[DI].J2_ANG      ;SAVE IT
004A 9BD9440B        120          FLD     [SI].J3_ANG         ;GET JOINT ANGLE IN RADIANS
004D 9B2ED8260800    121          FSUB    HOME.J3_ANG         ;SUBTRACT HOME POSITION ANGLE
0054 9B26D95D08      122          FSTP    ES:[DI].J3_ANG      ;SAVE IT
0059 9BD9440C        123          FLD     [SI].J4_ANG         ;GET JOINT ANGLE IN RADIANS
005D 9B2ED8260C00    124          FSUB    HOME.J4_ANG         ;SUBTRACT HOME POSITION ANGLE
0063 9B26D95D0C      125          FSTP    ES:[DI].J4_ANG      ;SAVE IT
0068 9BD94410        126          FLD     [SI].J5_ANG         ;GET JOINT ANGLE IN RADIANS
006C 9B2ED8261000    127          FSUB    HOME.J5_ANG         ;SUBTRACT HOME POSITION ANGLE
0072 9B26D95D10      128          FSTP    ES:[DI].J5_ANG      ;SAVE IT
0077 9BD94414        129          FLD     [SI].J6_ANG         ;GET JOINT ANGLE IN RADIANS
007B 9B2ED8261400    130          FSUB    HOME.J6_ANG         ;SUBTRACT HOME POSITION ANGLE
0081 9B26D95D14      131          FSTP    ES:[DI].J6_ANG      ;SAVE IT
0086 9BD94418        132          FLD     [SI].J7_ANG         ;GET JOINT ANGLE IN RADIANS
008A 9B2ED8261800    133          FSUB    HOME.J7_ANG         ;SUBTRACT HOME POSITION ANGLE
0090 9B26D95D18      134          FSTP    ES:[DI].J7_ANG      ;SAVE IT
0095 EB5E90          135          JMP     HJEND
                     136
0098                 137  HOMABS:                             ;CONVERT HOME BASED ANGLES TO ABSOLUTE ANGLES
0098 C5760B          138          LDS     SI,[BP].HANG_PT     ;POINTER TO ENCODER POSITION VALUES
009B C47E0C          139          LES     DI,[BP].JANG_PT     ;POINTER TO JOINT ANGLES
009E 9BD904          140          FLD     [SI].J1_ANG         ;GET JOINT ANGLE IN RADIANS
00A1 9B2ED8060020    141          FADD    HOME.J1_ANG         ;ADD ON HOME POSITION ANGLE
00A7 9B26D91D        142          FSTP    ES:[DI].J1_ANG      ;SAVE ABSOLUTE ANGLE
00AB 9BD94404        143          FLD     [SI].J2_ANG         ;GET JOINT ANGLE IN RADIANS
00AF 9B2ED8060400    144          FADD    HOME.J2_ANG         ;ADD ON HOME POSITION ANGLE
00B5 9B26D95D04      145          FSTP    ES:[DI].J2_ANG      ;SAVE ABSOLUTE ANGLE
00BA 9BD94408        146          FLD     [SI].J3_ANG         ;GET JOINT ANGLE IN RADIANS
00BE 9B2ED8060800    147          FADD    HOME.J3_ANG         ;ADD ON HOME POSITION ANGLE
00C4 9B26D95D08      148          FSTP    ES:[DI].J3_ANG      ;SAVE ABSOLUTE ANGLE
00C9 9BD9440C        149          FLD     [SI].J4_ANG         ;GET JOINT ANGLE IN RADIANS
00CD 9B2ED8060C00    150          FADD    HOME.J4_ANG         ;ADD ON HOME POSITION ANGLE
00D3 9B26D95D0C      151          FSTP    ES:[DI].J4_ANG      ;SAVE ABSOLUTE ANGLE
00D8 9BD94410        152          FLD     [SI].J5_ANG         ;GET JOINT ANGLE IN RADIANS
00DC 9B2ED8061000    153          FADD    HOME.J5_ANG         ;ADD ON HOME POSITION ANGLE
00E2 9B26D95D10      154          FSTP    ES:[DI].J5_ANG      ;SAVE ABSOLUTE ANGLE
00E7 9BD94414        155          FLD     [SI].J6_ANG         ;GET JOINT ANGLE IN RADIANS
00EB 9B2ED8061400    156          FADD    HOME.J6_ANG         ;ADD ON HOME POSITION ANGLE
00F1 9B26D95D14      157          FSTP    ES:[DI].J6_ANG      ;SAVE ABSOLUTE ANGLE
00F6 9BD94418        158          FLD     [SI].J7_ANG         ;GET JOINT ANGLE IN RADIANS
00FA 9B2ED8061800    159          FADD    HOME.J7_ANG         ;ADD ON HOME POSITION ANGLE
0100 9B26D95D18      160          FSTP    ES:[DI].J7_ANG      ;SAVE ABSOLUTE ANGLE
                     161
0105                 162  HJEND:
0105 5D              163          POP     BP
0106 1F              164          POP     DS
0107 CA0A00          165          RET     10
                     166
                     167  HOMJNT  ENDP
                     168
                     169
                     170  HOM_CODE ENDS
                     171
                     172          END

ASSEMBLY COMPLETE, NO ERRORS FOUND iRMX 86 8086/87/88/186 MACRO ASSEMBLER V2.0 ASSEMBLY OF MODULE CVJAEPMOD
OBJECT MODULE PLACED IN CVJAEP.OBJ
ASSEMBLER INVOKED BY: :LANG:ASM86 CVJAEP.A86 DEBUG TYPE PAGELENGTH(84) PAGEWIDTH(132) PRINT(:BSPR:CVJAEP.LST)

LOC  OBJ              LINE  SOURCE

1 +1  $PAGELENGTH(84) PAGEWIDTH(132) DEBUG TYPE
                       2
                       3
                       4     ;***************** PROGRAM DESCRIPTION *****************
                       5
                       6     ;                    CVJAEP - CONVERT JOINT ANGLES TO ABSOLUTE ENCODER PULSES
                       7
                       8 +1  $INCLUDE(:BSINC:COPYRIGHT.ASM)
                  =1   9     ;    ********************************
                  =1  10     ;****    (C) COPYRIGHT 198_ ROBOTICS RESEARCH CORPORATION   *****
                  =1  11     ;****           ALL RIGHTS RESERVED                         *****
                  =1  12     ;    ********************************
                      13
                      14     ;ALGORITHM WRITTEN BY JAMES FARRELL (11-8-84)
                      15     ;CONVERTED TO ASSEMBLY LANGUAGE BY DAVE HEYL (11-12-84)
                      16
                      17     ;CVJAEP.A86 IS AN ASSEMBLY LANGUAGE ROUTINE WHICH CONVERTS BACK AND FORTH
                      18     ;BETWEEN JOINT ANGLES IN RADIANS AND ABSOLUTE ENCODER PULSES FOR ALL SEVEN
                      19     ;JOINTS. THE CONVERSIONS ARE BASED ON THE ENCODER COUNTS PER
```

```
         20    ;REVOLUTION CONSTANTS BELOW.
         21    ;CVJAEP IS CALLED IN PLM AS FOLLOWS:
         22    ;     CALL CVJAEP(D_CODE, J$ANG$PT, J$POS$PT);
         23    ;
         24    ;   WHERE
         25    ;        D_CODE IS THE DIRECTION CODE WHERE "1" INDICATES CONVERSION FROM RADIANS
         26    ;                TO ENCODER CTS. ANY OTHER CODE WILL CONVERT BACKWARDS.
         27    ;        J$ANG$PT IS A POINTER TO THE SEVEN JOINT ANGLES
         28    ;        J$POS$PT IS A POINTER TO THE CORRESPONDING ENCODER POSITIONS COMPUTED
         29    ;                IN THIS MODULE.
         30
         31
         32    ;************************ UPDATE RECORD ************************
         33
         34    ; VERSION # 1 (11-19-84)  -  preliminary
         35
         36    ;****************************************************************
         37
         38
         39
         40    NAME     CVJAEPMOD
         41
         42
         43    ASSUME   CS:CVJ_CODE,DS:CVJ_DATA,SS:STACK,ES:NOTHING
         44
         45
         46
         47    CVJ_DATA        SEGMENT         'DATA'
         48
         49            DATA_FRAME      STRUC
0000     50                    BPPUSH  DW      ?
0002     51                    DSPUSH  DW      ?
0004     52                    RETADDR DD      ?
0008     53                    JPOS_PT DD      ?
000C     54                    JANG_PT DD      ?
0010     55                    D_CODE  DW      ?
         56            DATA_FRAME      ENDS
         57
         58            REAL_OP STRUC
0000     59                    REAL    DD      ?
         60            REAL_OP ENDS
         61
         62
         63            JNT_ANGLES      STRUC
0000     64                    J1_ANG  DD      ?
0004     65                    J2_ANG  DD      ?
0008     66                    J3_ANG  DD      ?
000C     67                    J4_ANG  DD      ?
0010     68                    J5_ANG  DD      ?
0014     69                    J6_ANG  DD      ?
0018     70                    J7_ANG  DD      ?
         71            JNT_ANGLES      ENDS
         72
         73
         74
         75
         76    CVJ_DATA        ENDS
         77
         78
         79
         80    STACK   SEGMENT STACK   'STACK'
         81
0000 (2  82            DW      2       DUP(?)
????
)
         83
         84    STACK   ENDS
         85
         86 +1 $EJECT
         87
         88
         89    CVJ_CODE        SEGMENT         'CODE'
         90
         91
         92    PUBLIC  CVJAEP
         93
0000 24FF8747  94    EN_CONV JNT_ANGLES (     69630.28,
0004 BB621B47  95            &                39778.73,
0008 F6ADF846  96            &                31830.98,
000C F6AD7846  97            &                15915.49,
0010 F6AD7846  98            &                15915.49,
0014 33985946  99            &                13926.05,
0018 33985946 100            &                13926.05 )
```

```
                        101
001C                    102     CVJREP   PROC    FAR
                        103
001C 1E                 104              PUSH    DS
001D 55                 105              PUSH    BP
001E 8BEC               106              MOV     BP,SP
                        107
0020 8B4610             108              MOV     AX,[BP].D_CODE          ;CHECK DIRECTION CODE
0023 3D0100             109              CMP     AX,1
0026 7570               110              JNZ     ENCRAD                  ;JUMP AHEAD IF NOT '1'
                        111
                        112                      ;CONVERT JOINT ANGLES IN RADIANS TO ENCODER COUNTS
0028 C5760C             113              LDS     SI,[BP].JANG_PT         ;POINTER TO JOINT ANGLES
002B C47E08             114              LES     DI,[BP].JPOS_PT         ;POINTER TO ENCODER POSITION VALUES
002E 9BD904             115              FLD     [SI].J1_ANG             ;GET JOINT ANGLE IN RADIANS
0031 9B2ED80E0000       116              FMUL    EN_CONV.J1_ANG          ;MULTIPLY BY ENCODER CONVERSION VALUE
0037 9B26D91D           117              FSTP    ES:[DI].J1_ANG          ;SAVE IT
003B 9BD94404           118              FLD     [SI].J2_ANG             ;GET JOINT ANGLE IN RADIANS
003F 9B2ED80E0400       119              FMUL    EN_CONV.J2_ANG          ;MULTIPLY BY ENCODER CONVERSION VALUE
0045 9B26D95D04          120              FSTP    ES:[DI].J2_ANG          ;SAVE IT
004A 9BD94408           121              FLD     [SI].J3_ANG             ;GET JOINT ANGLE IN RADIANS
004E 9B2ED80E0800       122              FMUL    EN_CONV.J3_ANG          ;MULTIPLY BY ENCODER CONVERSION VALUE
0054 9B26D95D08          123              FSTP    ES:[DI].J3_ANG          ;SAVE IT
0059 9BD9440C           124              FLD     [SI].J4_ANG             ;GET JOINT ANGLE IN RADIANS
005D 9B2ED80E0C00       125              FMUL    EN_CONV.J4_ANG          ;MULTIPLY BY ENCODER CONVERSION VALUE
0063 9B26D95D0C          126              FSTP    ES:[DI].J4_ANG          ;SAVE IT
0068 9BD94410           127              FLD     [SI].J5_ANG             ;GET JOINT ANGLE IN RADIANS
006C 9B2ED80E1000       128              FMUL    EN_CONV.J5_ANG          ;MULTIPLY BY ENCODER CONVERSION VALUE
0072 9B26D95D10          129              FSTP    ES:[DI].J5_ANG          ;SAVE IT
0077 9BD94414           130              FLD     [SI].J6_ANG             ;GET JOINT ANGLE IN RADIANS
007B 9B2ED80E1400       131              FMUL    EN_CONV.J6_ANG          ;MULTIPLY BY ENCODER CONVERSION VALUE
0081 9B26D95D14          132              FSTP    ES:[DI].J6_ANG          ;SAVE IT
0086 9BD94418           133              FLD     [SI].J7_ANG             ;GET JOINT ANGLE IN RADIANS
008A 9B2ED80E1800       134              FMUL    EN_CONV.J7_ANG          ;MULTIPLY BY ENCODER CONVERSION VALUE
0090 9B26D95D18          135              FSTP    ES:[DI].J7_ANG          ;SAVE IT
0095 EB6E90             136              JMP     CVJEND
                        137
0098                    138     ENCRAD:          ;CONVERT ENCODER COUNTS TO JOINT ANGLES IN RADIANS
0098 C57608             139              LDS     SI,[BP].JPOS_PT         ;POINTER TO ENCODER POSITION VALUES
009B C47E0C             140              LES     DI,[BP].JANG_PT         ;POINTER TO JOINT ANGLES
009E 9BD904             141              FLD     [SI].J1_ANG             ;GET ENCODER COUNTS
00A1 9B2ED8360000       142              FDIV    EN_CONV.J1_ANG          ;DIVIDE BY ENCODER CONVERSION VALUE
00A7 9B26D91D           143              FSTP    ES:[DI].J1_ANG          ;SAVE JOINT ANGLE
00AB 9BD94404           144              FLD     [SI].J2_ANG             ;GET ENCODER COUNTS
00AF 9B2ED8360400       145              FDIV    EN_CONV.J2_ANG          ;DIVIDE BY ENCODER CONVERSION VALUE
00B5 9B26D95D04          146              FSTP    ES:[DI].J2_ANG          ;SAVE JOINT ANGLE
00BA 9BD94408           147              FLD     [SI].J3_ANG             ;GET ENCODER COUNTS
00BE 9B2ED8360800       148              FDIV    EN_CONV.J3_ANG          ;DIVIDE BY ENCODER CONVERSION VALUE
00C4 9B26D95D08          149              FSTP    ES:[DI].J3_ANG          ;SAVE JOINT ANGLE
00C9 9BD9440C           150              FLD     [SI].J4_ANG             ;GET ENCODER COUNTS
00CD 9B2ED8360C00       151              FDIV    EN_CONV.J4_ANG          ;DIVIDE BY ENCODER CONVERSION VALUE
00D3 9B26D95D0C          152              FSTP    ES:[DI].J4_ANG          ;SAVE JOINT ANGLE
00D8 9BD94410           153              FLD     [SI].J5_ANG             ;GET ENCODER COUNTS
00DC 9B2ED8361000       154              FDIV    EN_CONV.J5_ANG          ;DIVIDE BY ENCODER CONVERSION VALUE
00E2 9B26D95D10          155              FSTP    ES:[DI].J5_ANG          ;SAVE JOINT ANGLE
00E7 9BD94414           156              FLD     [SI].J6_ANG             ;GET ENCODER COUNTS
00EB 9B2ED8361400       157              FDIV    EN_CONV.J6_ANG          ;DIVIDE BY ENCODER CONVERSION VALUE
00F1 9B26D95D14          158              FSTP    ES:[DI].J6_ANG          ;SAVE JOINT ANGLE
00F6 9BD94418           159              FLD     [SI].J7_ANG             ;GET ENCODER COUNTS
00FA 9B2ED8361800       160              FDIV    EN_CONV.J7_ANG          ;DIVIDE BY ENCODER CONVERSION VALUE
0100 9B26D95D18          161              FSTP    ES:[DI].J7_ANG          ;SAVE JOINT ANGLE
                        162
0105                    163     CVJEND:
0105 5D                 164              POP     BP
0106 1F                 165              POP     DS
0107 CA0A00             166              RET     10
                        167
                        168     CVJREP   ENDP
                        169
                        170
  ----                  171     CVJ_CODE         ENDS
                        172
                        173              END

ASSEMBLY COMPLETE, NO ERRORS FOUND iRMX 86 8086/87/88/186 MACRO ASSEMBLER V2.0 ASSEMBLY OF MODULE SERVOTIMEMOD
OBJECT MODULE PLACED IN SERVOTIME.OBJ
ASSEMBLER INVOKED BY:   :LANG:ASM86 SERVOTIME.A86 DEBUG TYPE PAGELENGTH(84) PAGEWIDTH(132) PRINT(:BSPR:SERVOTIME.LST)

LOC  OBJ                LINE     SOURCE

1 +1   $PAGELENGTH(84) PAGEWIDTH(132) DEBUG TYPE
```

```
;****************** PROGRAM DESCRIPTION ******************
;                                SERVOTIME
;
$INCLUDE(:BSINC:COPYRIGHT.ASM)
;       *********************************
;****   (C) COPYRIGHT 198_ ROBOTICS RESEARCH CORPORATION  *****
;****            ALL RIGHTS RESERVED                      *****
;       *********************************

;BY DAVE HEYL (10-23-84)

;SERVOTIME.ATJ IS AN ASSEMBLY LANGUAGE ROUTINE WHICH SAVES OR RETURNS THE
;CURRENT NUMBER OF 5 MS ITERATIONS THAT THE SERVO PROCESSOR SHOULD MAKE
;FOR EACH MOVE SENT TO IT.
;SERVOTIME IS CALLED IN PLM AS FOLLOWS:
;     CALL SERVOTIME(IOPT, @BYTE);
;
;  WHERE
;       IOPT IS A FLAG WHERE 1 INDICATES A VALUE IS TO BE RETURNED TO THE
;               CALLING ROUTINE, OTHERWISE A VALUE IS SAVED.
;       @BYTE IS A POINTER TO THE LOCATION OF THE BYTE DATA THAT IS TO BE SAVED
;               OR RETURNED.

;****************** SERVOTIME UPDATE RECORD ******************

;       VERSION #1 (11-28-84)  preliminary.

;**************************************************************

NAME    SERVOTIMEMOD

ASSUME  CS:SERVOTIMEMOD_CODE,DS:SERVOTIMEMOD_DATA,SS:STACK,ES:NOTHING

EXTRN   LOOPTIME:FAR

SERVOTIMEMOD_DATA       SEGMENT 'DATA'

DATA_FRAME      STRUC
                BPPUSH  DW      ?
                DSPUSH  DW      ?
                RETADDR DD      ?
                BYTPTR  DD      ?
                IOPT    DW      ?
        DATA_FRAME      ENDS

REAL_OP STRUC
                REAL    DD      ?
        REAL_OP ENDS

NITER   DW      ?               ;# ITERATIONS FOR SERVO PROCESSOR

NBSLOOPTIME     DD      ?

SERVOTIMEMOD_DATA       ENDS

STACK   SEGMENT STACK   'STACK'

DW      1       DUP(?)

STACK   ENDS

SERVOTIMEMOD_CODE       SEGMENT 'CODE'

PUBLIC  SERVOTIME
```

```
0000 8AD7A33B        84
                     85   SERVOLOOPTIME   DD      .005    ;SERVO ON 5 MS LOOP TIME
                     86
                     87
0004                 88   SERVOTIME       PROC    FAR
                     89
0004 1E              90          PUSH    DS
0005 B8----    R     91          MOV     AX,SERVOTIMEMOD_DATA
0008 8ED8            92          MOV     DS,AX
000A 55              93          PUSH    BP
000B 8BEC            94          MOV     BP,SP
                     95
000D 8B460C          96          MOV     AX,[BP].IOPT            ;CHECK IF DATA TO BE SAVED OR RETURNED
0010 3D0100          97          CMP     AX,1
0013 741F            98          JE      STRTRN                  ;JUMP AHEAD IF DATA TO BE RETURNED
                     99
                    100          ;COMPUTE AND SAVE ITERATION COUNT FOR SERVO PROCESSOR
0015 B80100         101          MOV     AX,1
0018 50             102          PUSH    AX
0019 B80200         103          MOV     AX,OFFSET NBSLOOPTIME
001C 1E             104          PUSH    DS
001D 50             105          PUSH    AX
001E 9A0000----  E  106          CALL    LOOPTIME                ;CALL LOOPTIME(1,TIME$PTR)   GET LOOPTIME
                    107
0023 9BD9060200     108          FLD     NBSLOOPTIME             ;NBS BOARD LOOP TIME
0028 9B2ED8360000   109          FDIV    SERVOLOOPTIME           ; DIVIDED BY SERVO LOOP TIME
002E 9BDF1E0000     110          FISTP   NITER                   ; EQUALS THE SERVO ITERATION COUNT (INTEGER)
0033 9B             111          WAIT
                    112
0034                113   STRTRN: ;RETURN DATA PREVIOUSLY SAVED AT NITER
0034 A00000         114          MOV     AL,BYTE PTR NITER       ;GET ITERATION COUNT
0037 C45E08         115          LES     BX,[BP].BYTPTR          ;POINTER TO WHERE DATA TO BE RETURNED
003A 268807         116          MOV     BYTE PTR ES:[BX],AL
                    117
003D                118   STEND:
003D 5D             119          POP     BP
003E 1F             120          POP     DS
003F CA0600         121          RET     6
                    122
                    123   SERVOTIME       ENDP
                    124
                    125
                    126   SERVOTIMEMOD_CODE       ENDS
                    127
                    128          END
```

ASSEMBLY COMPLETE, NO ERRORS FOUND
iRMX 86 8086/87/88/186 MACRO ASSEMBLER V2.0 ASSEMBLY OF MODULE SHUTDOWNMOD
OBJECT MODULE PLACED IN SHUTDOWN.OBJ
ASSEMBLER INVOKED BY: :LANG:ASM86 SHUTDOWN.A86 DEBUG TYPE PAGELENGTH(84) PAGEWIDTH(132) PRINT(:BSPR:SHUTDOWN.LST)

```
LOC  OBJ             LINE   SOURCE

1 +1   $PAGELENGTH(84) PAGEWIDTH(132) DEBUG TYPE
                     2
                     3
                     4
                     5      ;******************* PROGRAM DESCRIPTION *******************
                     6
                     7      ;                             SHUTDOWN
                     8
                     9 +1   $INCLUDE(:BSINC:COPYRIGHT.ASM)
               =1    10     ;       *********************************
               =1    11     ;****   (C) COPYRIGHT 198_ ROBOTICS RESEARCH CORPORATION  *****
               =1    12     ;****          ALL RIGHTS RESERVED                        *****
               =1    13     ;       *********************************
                    14
                    15      ;BY DAVE HEYL (11-27-84)
                    16
                    17      ;SHUTDOWN.A86 IS AN ASSEMBLY LANGUAGE ROUTINE WHICH DISABLES THE ROBOT DRIVES
                    18      ;IN CASE OF AN EMERGNECY.
                    19
                    20
                    21
                    22      ;******************* SHUTDOWN UPDATE RECORD *******************
                    23
                    24      ;       VERSION #1 (11-27-84)  preliminary.
                    25
                    26
                    27      ;**************************************************************
                    28
                    29
                    30      EXTRN   SENDRCOUT:FAR, ER:BYTE
```

```
 31
 32
 33           NAME    SHUTDOWNMOD
 34
 35
 36           ASSUME  CS:SH_CODE,DS:SH_DATA,SS:STACK,ES:NOTHING
 37
 38
 39
 40   SH_DATA SEGMENT 'DATA'
 41
 42           DATA_FRAME      STRUC
 43                   BPPUSH  DW      ?
 44                   RETADDR DD      ?
 45                   NITER_PT        DD      ?
 46           DATA_FRAME      ENDS
 47
 48           REAL_OP STRUC
 49                   REAL    DD      ?
 50           REAL_OP ENDS
 51
 52
 53
 54
 55
 56   SH_DATA ENDS
 57
 58
 59
 60   STACK   SEGMENT STACK   'STACK'
 61
 62           DW      1       DUP(?)
 63
 64   STACK   ENDS
 65
 66
 67
 68   SH_CODE SEGMENT 'CODE'
 69
 70   PUBLIC  SHUTDOWN
 71
 72
 73   SHUTDOWN        PROC    FAR
 74
 75           PUSH    BP
 76           MOV     BP,SP
 77
 78           MOV     AX,SEG EA
 79           MOV     ES,AX
 80           MOV     AL,0            ;CLEAR ARM ENABLE
 81           MOV     ES:EA,AL
 82           CALL    SENDRCOUT       ;OUTPUT IT
 83
 84           POP     BP
 85           RET
 86
 87   SHUTDOWN        ENDP
 88
 89
 90   SH_CODE ENDS
 91
 92           END
```

ASSEMBLY COMPLETE, NO ERRORS FOUND iRMX 86 PL/M-86 V2.3 COMPILATION OF MODULE ABSLIMMOD
OBJECT MODULE PLACED IN ABSLIM.OBJ
COMPILER INVOKED BY:  :LANG:PLM86 ABSLIM.P86 DEBUG TYPE OPTIMIZE(0) LARGE PAGELENGTH(84) PRINT(:BSPR:ABSLIM.LST)

```
              $RAM
     1        ABSLIMMOD: DD;

$INCLUDE(:INC:LITRLS.DAV)
     2  1 =   DECLARE LITER LITERALLY 'LITERALLY';
     3  1 =   DECLARE DECL LITER 'DECLARE';
     4  1 =   DECL PTR LITER 'POINTER';
     5  1 =   DECL STRUC LITER 'STRUCTURE';
     6  1 =   DECL PROC LITER 'PROCEDURE';
     7  1 =   DECL INTG LITER 'INTEGER';
```

```
 8  1  =   DECL SELEC LITER 'SELECTOR';
 9  1  =   DECL RET LITER 'RETURN';
10  1  =   DECL EXTRN LITER 'EXTERNAL';
11  1  =   DECL TRUE LITER '1';
12  1  =   DECL FALSE LITER '0';
           $INCLUDE (:BSINC:COPYRIGHT.PLM)
        =  /*   ***********************************
        =  *****  (C) COPYRIGHT 198  ROBOTICS RESEARCH CORPORATION   *****
        =  *****         ALL RIGHTS RESERVED                         *****
        =        ***********************************
        =  */
           /* ABSOLUTE JOINT LIMITS IN DEGREES ARE LISTED BELOW. THE LIMITS SET BY
              THIS PROGRAM SHOULD OBVIOUSLY BE WITHIN THESE LIMITS. THE PROGRAM CHECKS THE
              LIMITS IN RADIANS AND THEREFORE LIMITS SPECIFIED IN DEGREES MUST BE CONVERTED
              TO RADIANS (MULTIPLY BY PI/180) BEFORE ENTRY INTO THE DECLARATIONS BELOW.

J1$LO$LIM    -180
                  J1$HI$LIM    +180

J2$LO$LIM    -45
                  J2$HI$LIM    +135

J3$LO$LIM    -180
                  J3$HI$LIM    +180

J4$LO$LIM    -0
                  J4$HI$LIM    -180

J5$LO$LIM    -360
                  J5$HI$LIM    +360

J6$LO$LIM    -2
                  J6$HI$LIM    -180
           */

13  1   DECL
            J1$LO$LIM REAL INITIAL (-3.2543275),
            J1$HI$LIM REAL INITIAL (-3.0543275),
            J2$LO$LIM REAL INITIAL (-0.698132),
            J2$HI$LIM REAL INITIAL (+2.268928),
            J3$LO$LIM REAL INITIAL (-3.2543275),
            J3$HI$LIM REAL INITIAL (+3.0543275),
            J4$LO$LIM REAL INITIAL (-0.2072665),
            J4$HI$LIM REAL INITIAL (-3.2543275),
            J5$LO$LIM REAL INITIAL (-6.19592:5),
            J5$HI$LIM REAL INITIAL (+6.19592:5),
            J6$LO$LIM REAL INITIAL (-2.2072665),
            J6$HI$LIM REAL INITIAL (-3.2543275);

14  1   ABSLIM: PROC (JNTANG$PTR, STAT$PTR) PUBLIC;

15  2   DECL (JNTANG$PTR, STAT$PTR) POINTER;

16  2   DECL JNTANG BASED JNTANG$PTR (7) REAL;
17  2   DECL STAT BASED STAT$PTR STRUC (
            INIT(2) WORD,
            PROG(2) WORD,
            MOVE(2) WORD,
            TRAJ(2) WORD,
            CORJNT(2) WORD,
            SERVO(2) WORD);
18  2   IF (JNTANG(0) ( J1$LO$LIM) OR (JNTANG(0) ) J1$HI$LIM) THEN
19  2       DO;
20  3         STAT.SERVO(0) = 51;
21  3         RETURN;
22  3       END;

23  2   IF (JNTANG(1) ( J2$LO$LIM) OR (JNTANG(1)   J2$HI$LIM) THEN
24  2       DO;
25  3         STAT.SERVO(0) = 52;
26  3         RETURN;
27  3       END;

28  2   IF (JNTANG(2) ( J3$LO$LIM) OR (JNTANG(2) ) J3$HI$LIM) THEN
29  2       DO;
30  3         STAT.SERVO(0) = 53;
31  3         RETURN;
32  3       END;

33  2   IF (JNTANG(3) ) J4$LO$LIM) OR (JNTANG(3) ( J4$HI$LIM) THEN
34  2       DO;
```

```
35    3          STAT.SERVO(0) = 54;
36    3          RETURN;
37    3          END;

38    2       IF (JNTANG(4) < J5$LO$LIM) OR (JNTANG(4) > J5$HI$LIM) THEN
39    2          DO;
40    3          STAT.SERVO(0) = 55;
41    3          RETURN;
42    3          END;

43    2       IF (JNTANG(5) < J6$LO$LIM) OR (JNTANG(5) > J6$HI$LIM) THEN
44    2          DO;
45    3          STAT.SERVO(0) = 56;
46    3          RETURN;
47    3          END;

48    2       END ABSLIM;

49    1    END ABSLIMMOD;

MODULE INFORMATION:

CODE AREA SIZE     = 01C4H     452D
     CONSTANT AREA SIZE = 0000H       0D
     VARIABLE AREA SIZE = 0030H      48D
     MAXIMUM STACK SIZE = 000EH      14D
     118 LINES READ
     0 PROGRAM WARNINGS
     0 PROGRAM ERRORS

DICTIONARY SUMMARY:

290KB MEMORY AVAILABLE
     4KB MEMORY USED   (1%)
     0KB DISK SPACE USED

END OF PL/M-86 COMPILATION
iRMX 86 PL/M-86 V2.3 COMPILATION OF MODULE INCLIMMOD
OBJECT MODULE PLACED IN INCLIM.OBJ
COMPILER INVOKED BY: :LANG:PLM86 INCLIM.P86 DEBUG TYPE OPTIMIZE(0) LARGE PAGELENGTH(84) PRINT(:BSPR:INCLIM.LST)

$RAM
1             INCLIMMOD: DO;

$INCLUDE(:INC:LITRLS.DAV)
2    1  =     DECLARE LITER LITERALLY 'LITERALLY';
3    1  =     DECLARE DECL LITER 'DECLARE';
4    1  =     DECL PTR LITER 'POINTER';
5    1  =     DECL STRUC LITER 'STRUCTURE';
6    1  =     DECL PROC LITER 'PROCEDURE';
7    1  =     DECL INTG LITER 'INTEGER';
8    1  =     DECL SELEC LITER 'SELECTOR';
9    1  =     DECL RET LITER 'RETURN';
10   1  =     DECL EXTRN LITER 'EXTERNAL';
11   1  =     DECL TRUE LITER '1';
12   1  =     DECL FALSE LITER '0';
              $INCLUDE(:INC:LOOPTIME.EXT)
13   1  =     LOOPSTIME:PROCEDURE(N,TIME$PT) EXTERNAL;
14   2  =     DECLARE N WORD;
15   2  =     DECLARE TIME$PT POINTER;
16   2  =     END LOOPSTIME;

$INCLUDE (:BSINC:COPYRIGHT.PLM)
       =      /*  ***********************************
       =      *****  (C) COPYRIGHT 198_  ROBOTICS RESEARCH CORPORATION  *****
       =      *****            ALL RIGHTS RESERVED                      *****
       =      ***************************************
       =      */

17   1     DECL POSITION$COMMANDS(7) REAL EXTRN;

18   1     DECL LTIME REAL;

/*
           SET LIMIT VALUES AT DESIRED ENCODER COUNTS PER SECOND. ROUTINE WILL USE
           LOOPTIME TO CHECK THE LIMITS. THE ENCODER COUNTS FOR ONE FULL REVOLUTION OF
           EACH JOINT ARE AS FOLLOWS:
```

```
                    J1 - 437500
                    J2 - 250000
                    J3 - 200000
                    J4 - 100000
                    J5 - 100000
                    J6 - 87500

AND THE MAXIMUM ENCODER COUNTS PER SECOND ARE AS FOLLOWS:
                    J1 - 150390.63
                    J2 -  58333.33
                    J3 -  73333.33
                    J4 -  45833.00
                    J5 -  46875.00
                    J6 - 116666.67
                    J7 -  48500.00

LIMITS NOW SET AT 9/10 OF THE MAXIMUM VELOCITY OF EACH MOTOR
    */

19  1   DECL
            J1$INC$LIM REAL INITIAL (150390.63),
            J2$INC$LIM REAL INITIAL (58333.33),
            J3$INC$LIM REAL INITIAL (73333.33),
            J4$INC$LIM REAL INITIAL (45833.00),
            J5$INC$LIM REAL INITIAL (46875.00),
            J6$INC$LIM REAL INITIAL (116666.67),
            J7$INC$LIM REAL INITIAL ( 48500.00);

20  1   DECL FACTOR0 REAL INITIAL (0.90);

21  1   INCLIM: PROC (NEWCNT$PTR, STAT$PTR) PUBLIC;

22  2   DECL (NEWCNT$PTR, STAT$PTR) POINTER;
23  2   DECL NEWCNT BASED NEWCNT$PTR (7) REAL;
24  2   DECL STAT BASED STAT$PTR STRUC (
            INIT(2) WORD,
            PROG(2) WORD,
            MOVE(2) WORD,
            TRAJ(2) WORD,
            CORJNT(2) WORD,
            SERVO(2) WORD);
25  2   DECL FACTOR REAL;

26  2   CALL LOOPTIME(1,@LTIME);
27  2   FACTOR=FACTOR0*LTIME;

28  2       IF ABS( NEWCNT(0) - POSITION$COMMANDS(0) ) > (J1$INC$LIM * FACTOR) THEN
29  2           DO;
30  3               STAT.SERVO(0) = 41;
31  3               RETURN;
32  3           END;

33  2       IF ABS( NEWCNT(1) - POSITION$COMMANDS(1) ) > (J2$INC$LIM * FACTOR) THEN
34  2           DO;
35  3               STAT.SERVO(0) = 42;
36  3               RETURN;
37  3           END;

38  2       IF ABS( NEWCNT(2) - POSITION$COMMANDS(2) ) > (J3$INC$LIM * FACTOR) THEN
39  2           DO;
40  3               STAT.SERVO(0) = 43;
41  3               RETURN;
42  3           END;

43  2       IF ABS( NEWCNT(3) - POSITION$COMMANDS(3) ) > (J4$INC$LIM * FACTOR) THEN
44  2           DO;
45  3               STAT.SERVO(0) = 44;
46  3               RETURN;
47  3           END;

48  2       IF ABS( NEWCNT(4) - POSITION$COMMANDS(4) ) > (J5$INC$LIM * FACTOR) THEN
49  2           DO;
50  3               STAT.SERVO(0) = 45;
51  3               RETURN;
52  3           END;

53  2       IF ABS( NEWCNT(5) - POSITION$COMMANDS(5) ) > (J6$INC$LIM * FACTOR) THEN
54  2           DO;
55  3               STAT.SERVO(0) = 46;
56  3               RETURN;
57  3           END;

58  2       IF ABS( NEWCNT(6) - POSITION$COMMANDS(6) ) > (J7$INC$LIM * FACTOR) THEN
```

```
59   2          DO;
60   3            STAT.SERVO(0) = 47;
61   3            RETURN;
62   3          END;

63   2       END INCLIM;

64   1    END INCLIMMOD;
```

MODULE INFORMATION:

```
    CODE AREA SIZE     = 01D0H     464D
    CONSTANT AREA SIZE = 0004H       4D
    VARIABLE AREA SIZE = 0028H      40D
    MAXIMUM STACK SIZE = 0016H      22D
    131 LINES READ
    0 PROGRAM WARNINGS
    0 PROGRAM ERRORS
```

DICTIONARY SUMMARY:

```
    290KB MEMORY AVAILABLE
    4KB MEMORY USED  (1%)
    2KB DISK SPACE USED
```

END OF PL/M-86 COMPILATION iRMX 86 PL/M-86 V2.3 COMPILATION OF MODULE SYCSTIMEMOD
OBJECT MODULE PLACED IN SYCTIME.OBJ
COMPILER INVOKED BY: :LANG:PLM86 SYCSTIME.P86 DEBUG TYPE OPTIMIZE(0) LARGE PAGELENGTH(84) PRINT(:BSPR:SYCSTIME.LST)

```
          $TITLE('SYCSTIME$MOD')
          $SUBTITLE('LOOP TIME SYNCRONIZATION ')
  1       SYCSTIME$MOD:
          DO;
          /*SYCSTIME-SYNCHRONIZE LOOPTIME /*
          /*SYCSTIME-022085-1021 RRC/JAMES FARRELL */

$INCLUDE (:BSINC:COPYRIGHT.PLM)
      =   /* *********************************
      =   *****   (C) COPYRIGHT 198_  ROBOTICS RESEARCH CORPORATION   *****
      =   *****              ALL RIGHTS RESERVED               *****
      =   **********************************
      =   */

/* DESCRIPTION

SYCSTIME SYNCHRONIZES THE LOOP TIME BASED ON A REAL TIME CLOCK'

ACCESS

CALL SYCSTIME */

$INCLUDE (:INC:SERVOTIME.EXT)
  2  1 =  SERVOTIME:PROCEDURE(IOPT,LOOP$CNT$PT) EXTERNAL;
  3  2 =    DECLARE IOPT WORD;
  4  2 =    DECLARE LOOP$CNT$PT POINTER;
  5  2 =  END SERVOTIME;

6  1    DECLARE TICK WORD EXTERNAL;
  7  1    DECLARE TACK BYTE EXTERNAL;
  8  1    DECLARE TFLAG WORD EXTERNAL;

9  1    SYCSTIME: PROCEDURE PUBLIC;

/* WAIT FOR CURRENT LOOP TIME TO COMPLETE */
 10  2    DO WHILE TFLAG = 0;
 11  3    END;

/* SET UP NEXT LOOPTIME */
 12  2    CALL SERVOTIME(2,@TACK);
 13  2    TACK = TACK - 1;
 14  2    TFLAG = 0;

15  2    END SYCSTIME;
 16  1    END SYCSTIME$MOD;
```

MODULE INFORMATION:

```
    CODE AREA SIZE    = 004BH      75D
    CONSTANT AREA SIZE = 0008H      8D
    VARIABLE AREA SIZE = 0000H      0D
    MAXIMUM STACK SIZE = 000EH     14D
    46 LINES READ
    0 PROGRAM WARNINGS
    0 PROGRAM ERRORS
```

DICTIONARY SUMMARY:

```
    290KB MEMORY AVAILABLE
    3KB MEMORY USED   (1%)
    0KB DISK SPACE USED
```

END OF PL/M-86 COMPILATION iRMX 86 PL/M-86 V2.3 COMPILATION OF MODULE INT59MOD
OBJECT MODULE PLACED IN INT59.OBJ
COMPILER INVOKED BY:  :LANG:PLM86 INT59.P86 DEBUG TYPE OPTIMIZE(2) LARGE PAGELENGTH(84) PRINT(:BSPR:INT59.LST)

```
                    $NOINTVECTOR
                    $RAM

1               INT59$MOD: DO;

$INCLUDE(:BSINC:COPYRIGHT.PLM)
            =       /*   **********************************
            =       *****  (C) COPYRIGHT 198_  ROBOTICS RESEARCH CORPORATION  *****
            =       *****              ALL RIGHTS RESERVED                    *****
            =            **********************************
            =       */
                    $INCLUDE(:INC:LITRLS.DAV)
    2   1   =       DECLARE LITER LITERALLY 'LITERALLY';
    3   1   =       DECLARE DECL LITER 'DECLARE';
    4   1   =       DECL PTR LITER 'POINTER';
    5   1   =       DECL STRUC LITER 'STRUCTURE';
    6   1   =       DECL PROC LITER 'PROCEDURE';
    7   1   =       DECL INTG LITER 'INTEGER';
    8   1   =       DECL SELEC LITER 'SELECTOR';
    9   1   =       DECL RET LITER 'RETURN';
   10   1   =       DECL EXTRN LITER 'EXTERNAL';
   11   1   =       DECL TRUE LITER '1';
   12   1   =       DECL FALSE LITER '0';

$INCLUDE(:INC:RQSETINT.EXT)
   13   1   =       RQ$SET$INTERRUPT: PROCEDURE
            =               (LEVEL, INT$TASK$FLG, INT$HNDLR, HNDLR$DS, EX$PTR) EXTERNAL;
   14   2   =       DECLARE LEVEL WORD,
            =               INT$TASK$FLG BYTE,
            =               INT$HNDLR POINTER,
            =               HNDLR$DS WORD,
            =               EX$PTR POINTER;
   15   2   =       END RQ$SET$INTERRUPT;
                    $INCLUDE(:INC:RQRSETINT.EXT)
   16   1   =       RQ$RESET$INTERRUPT: PROCEDURE (LEVEL, EX$PTR) EXTERNAL;
   17   2   =       DECLARE LEVEL WORD,
            =               EX$PTR POINTER;
   18   2   =       END RQ$RESET$INTERRUPT;
                    $INCLUDE(:INC:RQSETEXCHAND.EXT)
   19   1   =       RQ$SET$EXCEPTION$HANDLER: PROCEDURE (INFO$PTR, EX$PTR) EXTERNAL;

20   2   =           DECLARE INFO$PTR POINTER, EX$PTR POINTER;

21   2   =       END RQ$SET$EXCEPTION$HANDLER;
                    $INCLUDE(:INC:RQGETEXCHAND.EXT)
   22   1   =       RQ$GET$EXCEPTION$HANDLER: PROCEDURE (INFO$PTR, EX$PTR) EXTERNAL;

23   2   =           DECLARE INFO$PTR POINTER, EX$PTR POINTER;

24   2   =       END RQ$GET$EXCEPTION$HANDLER;
                    $INCLUDE(:INC:RQEXITINT.EXT)
   25   1   =       RQ$EXIT$INTERRUPT: PROCEDURE (LEVEL, EX$PTR) EXTERNAL;
   26   2   =       DECLARE LEVEL WORD,
            =               EX$PTR POINTER;
   27   2   =       END RQ$EXIT$INTERRUPT;

28   1           DECL (CLOCK, TICK, TOCK) WORD PUBLIC;
   29   1           DECL TACK BYTE PUBLIC;
   30   1           DECL TFLAG WORD PUBLIC INITIAL(1);
```

```
31   1     DECL STATUS WORD;

32   1     INIT$INT59: PROC PUBLIC;

33   2        DECLARE INT$HANDLER POINTER;
34   2        DECLARE CNT WORD;

35   2        DECLARE EXC$INFO STRUCTURE (
                    OFFSET WORD,
                    BASE WORD,
                    MODE BYTE);
36   2        DECLARE MODE$SAVE BYTE;
37   2        CLOCK, TICK, TOCK = 0;

38   2        CALL RQ$GET$EXCEPTION$HANDLER( @EXC$INFO, @STATUS);
39   2        MODE$SAVE = EXC$INFO.MODE;
40   2        EXC$INFO.MODE = 0;
41   2        CALL RQ$SET$EXCEPTION$HANDLER( @EXC$INFO, @STATUS);

42   2        CNT = 768;         /* SET UP COUNTER 1 FOR 5 MS INTERRUPT */
43   2        OUTPUT(@D6H) = 76H;
44   2        OUTPUT(@D2H) = LOW(CNT);
45   2        OUTPUT(@D2H) = HIGH(CNT);
46   2        OUTPUT(@DFH) = @EH;   /* ENABLE GATE OF COUNTER */

/* CALL RQ$RESET$INTERRUPT(38H, @STATUS); */
47   2        INT$HANDLER = INTERRUPT$PTR(INT59);
48   2        CALL RQ$SET$INTERRUPT(38H, 0, INT$HANDLER, 0, @STATUS);

49   2        EXC$INFO.MODE = MODE$SAVE;
50   2        CALL RQ$SET$EXCEPTION$HANDLER( @EXC$INFO, @STATUS);

51   2     END INIT$INT59;

52   1     INT59: PROC INTERRUPT 59 PUBLIC;

53   2        DECL (TACK$REF, OLD$TFLAG) WORD;
54   2        DECL I BYTE;

55   2        TICK = TICK + 1;         /* INCREMENT 5 MS CLOCK */

/* LOOPTIME SYNCRONIZATION CONTROLLED BY TACK$REF AND TACK, SIGNALED BY
                 TFLAG */
56   2        IF (TFLAG = 0) AND (OLD$TFLAG = 1) THEN TACK$REF = TICK + TACK;
58   2        IF TICK = TACK$REF THEN TFLAG = 1;
60   2        OLD$TFLAG = TFLAG;

61   2        IF TICK >= TOCK THEN          /* CHECK FOR 100 MS UP */
62   2           DO;
63   3              TOCK = TOCK + 20;
64   3              CLOCK = CLOCK + 1;      /* UPDATE 100 MS CLOCK */
65   3              OUTPUT(@DFH) = (I AND 0000$1000B) OR @6H;
66   3              I = I XOR @FFH;
67   3           END;

68   2        CALL RQ$EXIT$INTERRUPT( 38H, @STATUS);

69   2     END INT59;

70   1     END INT59$MOD;

MODULE INFORMATION:

CODE AREA SIZE      = 0154H    340D
    CONSTANT AREA SIZE  = 0000H      0D
    VARIABLE AREA SIZE  = 001CH     28D
    MAXIMUM STACK SIZE  = 002AH     42D
    127 LINES READ
    0 PROGRAM WARNINGS
    0 PROGRAM ERRORS

DICTIONARY SUMMARY:

290KB MEMORY AVAILABLE
    5KB MEMORY USED   (1%)
    0KB DISK SPACE USED

END OF PL/M-86 COMPILATION
```

```
iRMX 86 8086/87/88/186 MACRO ASSEMBLER V2.0 ASSEMBLY OF MODULE LOOPTIMEMOD
OBJECT MODULE PLACED IN LOOPTIME.OBJ
ASSEMBLER INVOKED BY:  :LANG:ASM86 LOOPTIME.A86 DEBUG TYPE PAGELENGTH(84) PAGEWIDTH(132) PRINT(:BSPR:LOOPTIME.LST)

LOC  OBJ              LINE     SOURCE

1 +1   $PAGELENGTH(84) PAGEWIDTH(132) DEBUG TYPE
                       2
                       3      NAME    LOOPTIMEMOD
                       4
                       5      ASSUME  CS:LOOPTIMEMOD_CODE,DS:LOOPTIMEMOD_DATA,SS:STACK,ES:NOTHING
                       6
                       7 +1   $INCLUDE (:BSINC:COPYRIGHT.ASM)
                =1     8      ;       ************************************
                =1     9      ;****   (C) COPYRIGHT 198_ ROBOTICS RESEARCH CORPORATION  *****
                =1    10      ;****           ALL RIGHTS RESERVED                        *****
                =1    11      ;       ************************************
                      12
----                  13      LOOPTIMEMOD_DATA      SEGMENT      'DATA'
                      14
----                  15              DATA_FRAME    STRUC
0000                  16                      BPPUSH  DW    ?
0002                  17                      RETADDR DD    ?
0006                  18                      T_PT    DD    ?
000A                  19                      IOCTRL  DW    ?
----                  20              DATA_FRAME    ENDS
                      21
                      22              REAL_OP STRUC
0000                  23                      REAL    DD    ?
----                  24              REAL_OP ENDS
                      25
                      26
                      27
                      28
                      29
----                  30      LOOPTIMEMOD_DATA      ENDS
                      31
                      32
                      33
----                  34      STACK   SEGMENT STACK    'STACK'
                      35
0000 (1               36              DW      1       DUP(?)
     ????
     )
                      37
----                  38      STACK   ENDS
                      39
                      40
                      41
----                  42      LOOPTIMEMOD_CODE      SEGMENT      'CODE'
                      43
                      44      PUBLIC  LOOPTIME
                      45
0000 9A99993E         46      TIME    DD      0.300
                      47
                      48
0004                  49      LOOPTIME        PROC    FAR
                      50
0004 55               51              PUSH    BP
0005 8BEC             52              MOV     BP,SP
                      53
0007 C45E06           54              LES     BX,[BP].T_PT
000A 8B460A           55              MOV     AX,[BP].IOCTRL      ;CHECK IF SET OR RETURN OPERATION
000D 3D0100           56              CMP     AX,1                ;1 = RETURN CURRENT LOOPTIME
0010 7512             57              JNE     LT10
                      58
0012 2EA10000         59              MOV     AX,WORD PTR TIME
0016 268907           60              MOV     ES:[BX],AX
0019 2EA10200         61              MOV     AX,WORD PTR TIME+2
001D 26894702         62              MOV     ES:[BX+2],AX
0021 EB1090           63              JMP     LTEND
                      64
0024                  65      LT10:
0024 268B07           66              MOV     AX,ES:[BX]          ;SAVE NEW LOOPTIME IN 'TIME'
0027 2EA30000         67              MOV     WORD PTR TIME,AX
002B 268B4702         68              MOV     AX,ES:[BX+2]
002F 2EA30200         69              MOV     WORD PTR TIME+2,AX
                      70
0033                  71      LTEND:
0033 5D               72              POP     BP
0034 CA0600           73              RET     6
                      74
```

```
                    75    LOOPTIME       ENDP
                    76
                    77
                    78    LOOPTIMEMOD_CODE    ENDS
                    79
                    80           END
```

ASSEMBLY COMPLETE, NO ERRORS FOUND

SERVO CONTROL

:RMX 86 PL/M-86 V2.3 COMPILATION OF MODULE GENERALPROCEDURES
OBJECT MODULE PLACED IN GENPR2.OBJ
COMPILER INVOKED BY:  :LANG:PLM86 GENPR2.P86 RAM LARGE OPTIMIZE(3) DB OVERFLOW SYMBOLS

```
              $TITLE('GENERAL DIGITAL PROCEDURES')
              $NOINTVECTOR
    1         GENERAL$PROCEDURES: DO;
              /****************************************************************
               *                                                              *
               *     MODULE: GENERAL$PROCEDURES                               *
               *                                                              *
               *     THIS IS A MODULE OF GENERAL PROCEDURES USED BY THE SERVO PROCESSOR *
               *                                                              *
               *  ))) PUBLIC PROCEDURESS IN THIS MODULE:                      *
               *                                                              *
               *     ENCODER$INPUT$9702 -  INPUTS ENCODER AND MARKER INFORMATION *
               *                           FROM THE NORTH COAST AUTOMATION 9702 *
               *                           ENCODER INTERFACE BOARD FOR INITIAL *
               *                           ALIGNMENT                          *
               *                                                              *
               *     (C) COPYRIGHT 198_ ROBOTICS RESEARCH CORPORATION         *
               *                 ALL RIGHTS RESERVED                          *
               *                                                              *
               ****************************************************************/

/************************
               * EXTERNAL PROCEDURES  *
               ************************/

2    1    DECLARE MAINPROGRAM LABEL EXTERNAL;

3    1    SERVO$LOOP: PROCEDURE INTERRUPT 34 EXTERNAL;
    4    2    END SERVO$LOOP;

5    1    INPUT$NEW$POSITION$COMMAND: PROCEDURE INTERRUPT 33 EXTERNAL;
    6    2    END INPUT$NEW$POSITION$COMMAND;

/************************
               * EXTERNAL VARIABLES   *
               ************************/

7    1    DECLARE ENCODER$MARKER$VALUE(7)    REAL    EXTERNAL,
                      ENCODER$MARKER$STATUS(7)   BYTE    EXTERNAL,
                      AXIS$POSITION(7)           REAL    EXTERNAL,
                      SERVO$STATUS$BYTE          BYTE    EXTERNAL;

/************************
               * LOCAL VARIABLES      *
               ************************/

8    1    DECLARE ENCODER$MAP$1(8)       BYTE   AT (0E0000H),
                      ENCODER$COUNT$0$LOW    BYTE   AT (@ENCODER$MAP$1(0)),
                      ENCODER$COUNT$0$HIGH   BYTE   AT (@ENCODER$MAP$1(1)),
                      ENCODER$0$STATUS       BYTE   AT (@ENCODER$MAP$1(3)),
                      ENCODER$COUNT$1$LOW    WORD   AT (@ENCODER$MAP$1(4)),
                      ENCODER$COUNT$1$HIGH   BYTE   AT (@ENCODER$MAP$1(5)),
                      ENCODER$1$STATUS       BYTE   AT (@ENCODER$MAP$1(7)),
                      ENCODER$0$D2A$LOW      BYTE   AT (@ENCODER$MAP$1(0)),
                      ENCODER$0$D2A$HIGH     BYTE   AT (@ENCODER$MAP$1(1)),
                      ENCODER$1$D2A$LOW      BYTE   AT (@ENCODER$MAP$1(4)),
                      ENCODER$1$D2A$HIGH     BYTE   AT (@ENCODER$MAP$1(5));

9    1    DECLARE ENCODER$MAP$2(8)       BYTE   AT (0E0010H),
                      ENCODER$COUNT$2$LOW    BYTE   AT (@ENCODER$MAP$2(0)),
                      ENCODER$COUNT$2$HIGH   BYTE   AT (@ENCODER$MAP$2(1)),
                      ENCODER$2$STATUS       BYTE   AT (@ENCODER$MAP$2(3)),
```

```
                    ENCODER$COUNT$3$LOW     WORD    AT (@ENCODER$MAP$2(4)),
                    ENCODER$COUNT$3$HIGH    BYTE    AT (@ENCODER$MAP$2(5)),
                    ENCODER$3$STATUS        BYTE    AT (@ENCODER$MAP$2(7)),
                    ENCODER$2$D2A$LOW       BYTE    AT (@ENCODER$MAP$2(0)),
                    ENCODER$2$D2A$HIGH      BYTE    AT (@ENCODER$MAP$2(1)),
                    ENCODER$3$D2A$LOW       BYTE    AT (@ENCODER$MAP$2(4)),
                    ENCODER$3$D2A$HIGH      BYTE    AT (@ENCODER$MAP$2(5));

10 :       DECLARE ENCODER$MAP$3(8)         BYTE    AT (0E0020H),
                    ENCODER$COUNT$4$LOW     BYTE    AT (@ENCODER$MAP$3(0)),
                    ENCODER$COUNT$4$HIGH    BYTE    AT (@ENCODER$MAP$3(1)),
                    ENCODER$4$STATUS        BYTE    AT (@ENCODER$MAP$3(3)),
                    ENCODER$COUNT$5$LOW     WORD    AT (@ENCODER$MAP$3(4)),
                    ENCODER$COUNT$5$HIGH    BYTE    AT (@ENCODER$MAP$3(5)),
                    ENCODER$5$STATUS        BYTE    AT (@ENCODER$MAP$3(7)),
                    ENCODER$4$D2A$LOW       BYTE    AT (@ENCODER$MAP$3(0)),
                    ENCODER$4$D2A$HIGH      BYTE    AT (@ENCODER$MAP$3(1)),
                    ENCODER$5$D2A$LOW       BYTE    AT (@ENCODER$MAP$3(4)),
                    ENCODER$5$D2A$HIGH      BYTE    AT (@ENCODER$MAP$3(5));

11 :       DECLARE ENCODER$MAP$4(8)         BYTE    AT (0E0030H),
                    ENCODER$COUNT$6$LOW     BYTE    AT (@ENCODER$MAP$4(0)),
                    ENCODER$COUNT$6$HIGH    BYTE    AT (@ENCODER$MAP$4(1)),
                    ENCODER$6$STATUS        BYTE    AT (@ENCODER$MAP$4(3)),
                    ENCODER$COUNT$7$LOW     WORD    AT (@ENCODER$MAP$4(4)),
                    ENCODER$COUNT$7$HIGH    BYTE    AT (@ENCODER$MAP$4(5)),
                    ENCODER$7$STATUS        BYTE    AT (@ENCODER$MAP$4(7)),
                    ENCODER$6$D2A$LOW       BYTE    AT (@ENCODER$MAP$4(0)),
                    ENCODER$6$D2A$HIGH      BYTE    AT (@ENCODER$MAP$4(1)),
                    ENCODER$7$D2A$LOW       BYTE    AT (@ENCODER$MAP$4(4)),
                    ENCODER$7$D2A$HIGH      BYTE    AT (@ENCODER$MAP$4(5));

12 :       DECLARE ENCODER$POSITION(7)      WORD    PUBLIC,
                    OLD$ENCODER$POSITION(7)  WORD,
                    OLD$ENCODER$MARKER$VALUE(7) REAL,
                    MARKER$VALUE(7)          WORD;

13 :       DECLARE MESSAGE$0(38) BYTE DATA(' IS THIS THE RIGHT MARKER FOR AXIS #1 ?'),
                    MESSAGE$1(38) BYTE DATA(' IS THIS THE RIGHT MARKER FOR AXIS #2 ?'),
                    MESSAGE$2(38) BYTE DATA(' IS THIS THE RIGHT MARKER FOR AXIS #3 ?'),
                    MESSAGE$3(38) BYTE DATA(' IS THIS THE RIGHT MARKER FOR AXIS #4 ?'),
                    MESSAGE$4(38) BYTE DATA(' IS THIS THE RIGHT MARKER FOR AXIS #5 ?'),
                    MESSAGE$5(38) BYTE DATA(' IS THIS THE RIGHT MARKER FOR AXIS #6 ?'),
                    MESSAGE$6(38) BYTE DATA(' IS THIS THE RIGHT MARKER FOR AXIS #7 ?'),
                    MESSAGE$7(38) BYTE DATA(' 8630 SETUP PROCEDURE COMPLETE       '),
                    MESSAGE$8(38) BYTE DATA(' ENCODERS ALIGNMENT COMPLETE         '),
                    MESSAGE$9(38) BYTE DATA(' MOVE AXIS TO HOME MARKER            '),
                    MESSAGE$10(38) BYTE DATA(' MARKER ERROR DETECTED              '),
                    MESSAGE$11(38) BYTE DATA(' ENCODER QUADRATURE ERROR DETECTED  '),
                    MESSAGE$12(38) BYTE DATA(' ******* EMERGENCY STOP ********    '),
                    MESSAGE$13(38) BYTE DATA(' AXIS #1                            '),
                    MESSAGE$14(38) BYTE DATA(' AXIS #2                            '),
                    MESSAGE$15(38) BYTE DATA(' AXIS #3                            '),
                    MESSAGE$16(38) BYTE DATA(' AXIS #4                            '),
                    MESSAGE$17(38) BYTE DATA(' AXIS #5                            '),
                    MESSAGE$18(38) BYTE DATA(' AXIS #6                            '),
                    MESSAGE$19(38) BYTE DATA(' AXIS #7                            '),
                    MESSAGE$20(38) BYTE DATA(' EXCESS ERROR                       ');

14 :       DECLARE USART$DATA LITERALLY '0D8H',
                    USART$CMD  LITERALLY '0DAH';

15 :       CO: PROCEDURE (CHAR) PUBLIC;
16 2           DECLARE CHAR BYTE;
17 2           DO WHILE NOT(INPUT(USART$CMD));       /* WAIT TILL TX READY */
18 3           END;

19 2           OUTPUT(USART$DATA) = CHAR;
20 2       END CO;

21 1       CI: PROCEDURE BYTE PUBLIC;
22 2           DECLARE CHAR BYTE;
23 2           DO WHILE NOT(ROR(INPUT(USART$CMD),1));  /* WAIT TILL RX READY */
24 3           END;

25 2           IF (((CHAR:=INPUT(USART$DATA)) AND 07FH) = 13)
26 2               THEN CALL CO(10);
27 2           CHAR = (CHAR AND 07FH);
28 2           CALL CO(CHAR);
29 2           RETURN CHAR;
30 2       END CI;
```

```
31  1   SETUP$9702: PROCEDURE PUBLIC;

32  2       DECLARE STATUS BYTE;

33  2       STATUS = ENCODER$0$STATUS;
34  2       STATUS = ENCODER$1$STATUS;
35  2       STATUS = ENCODER$2$STATUS;
36  2       STATUS = ENCODER$3$STATUS;
37  2       STATUS = ENCODER$4$STATUS;
38  2       STATUS = ENCODER$5$STATUS;
39  2       STATUS = ENCODER$6$STATUS;
40  2       STATUS = ENCODER$7$STATUS;

41  2   END SETUP$9702;

42  1   ENCODER$INPUT$9702: PROCEDURE PUBLIC;
43  2       DECLARE STATUS  BYTE;

44  2       OLD$ENCODER$POSITION(0) = ENCODER$POSITION(0);
45  2       OLD$ENCODER$POSITION(1) = ENCODER$POSITION(1);
46  2       OLD$ENCODER$POSITION(2) = ENCODER$POSITION(2);
47  2       OLD$ENCODER$POSITION(3) = ENCODER$POSITION(3);
48  2       OLD$ENCODER$POSITION(4) = ENCODER$POSITION(4);
49  2       OLD$ENCODER$POSITION(5) = ENCODER$POSITION(5);
50  2       OLD$ENCODER$POSITION(6) = ENCODER$POSITION(6);

51  2       STATUS = ENCODER$0$STATUS;

52  2       IF (STATUS AND 80H)=80H
53  2           THEN DO;
54  3               OLD$ENCODER$MARKER$VALUE(0) = ENCODER$MARKER$VALUE(0);

55  3               MARKER$VALUE(0) = ENCODER$COUNT$0$HIGH;
56  3               MARKER$VALUE(0) = SHL(MARKER$VALUE(0),8);
57  3               MARKER$VALUE(0) = MARKER$VALUE(0) + ENCODER$COUNT$0$LOW;

58  3               ENCODER$MARKER$VALUE(0) = AXIS$POSITION(0)
                                              + FLOAT(SIGNED(MARKER$VALUE(0)
                                              - OLD$ENCODER$POSITION(0)));

/*
                    IF ENCODERMARKER$STATUS(0) = 0FFH
                        THEN DO;

IF (ABS(ABS(ENCODER$MARKER$VALUE(0)
                                - OLD$ENCODER$MARKER$VALUE(0)) - 50000.0) > 0.0)
                            AND (ABS(ENCODER$MARKER$VALUE(0)
                                - OLD$ENCODER$MARKER$VALUE(0)) > 0.0)
                            THEN DO;
                                SERVO$STATUS$BYTE = 018H;
                                CALL EMERGENCY$STOP;
                            END;
                    END;
                                                                            */

59  3               ENCODER$MARKER$STATUS(0) = 0FFH;
60  3               STATUS = ENCODER$0$STATUS;
61  3           END;

62  2       ENCODER$POSITION(0) = ENCODER$COUNT$0$HIGH;
63  2       ENCODER$POSITION(0) = SHL(ENCODER$POSITION(0),8);
64  2       ENCODER$POSITION(0) = ENCODER$POSITION(0) + ENCODER$COUNT$0$LOW;

65  2       AXIS$POSITION(0) = AXIS$POSITION(0) + FLOAT(SIGNED(ENCODER$POSITION(0)
                                              - OLD$ENCODER$POSITION(0)));

66  2       IF (STATUS AND 40H) = 40H
67  2           THEN DO;
68  3               SERVO$STATUS$BYTE = 01FH;
69  3               CALL EMERGENCY$STOP;
70  3           END;

71  2       STATUS = ENCODER$1$STATUS;

72  2       IF (STATUS AND 80H)=80H
73  2           THEN DO;
74  3               OLD$ENCODER$MARKER$VALUE(1) = ENCODER$MARKER$VALUE(1);

75  3               MARKER$VALUE(1) = ENCODER$COUNT$1$HIGH;
76  3               MARKER$VALUE(1) = SHL(MARKER$VALUE(1),8);
77  3               MARKER$VALUE(1) = MARKER$VALUE(1) + ENCODER$COUNT$1$LOW;
```

```
78  3           ENCODER$MARKER$VALUE(1) = AXIS$POSITION(1)
                                        + FLOAT(SIGNED(MARKER$VALUE(1)
                                        - OLD$ENCODER$POSITION(1)));

/*
                   IF ENCODERMARKER$STATUS(1) = 0FFH
                       THEN DO;

IF (ABS(ABS(ENCODER$MARKER$VALUE(1)
                                 - OLD$ENCODER$MARKER$VALUE(1)) - 50000.0) > 0.0)
                          AND (ABS(ENCODER$MARKER$VALUE(1)
                                 - OLD$ENCODER$MARKER$VALUE(1)) > 0.0)
                          THEN DO;
                              SERVO$STATUS$BYTE = 019H;
                              CALL EMERGENCY$STOP;
                          END;
                   END;
                                                                            */

79  3              ENCODER$MARKER$STATUS(1) = 0FFH;
80  3              STATUS = ENCODER$1$STATUS;
81  3          END;

82  2      ENCODER$POSITION(1) = ENCODER$COUNT$1$HIGH;
83  2      ENCODER$POSITION(1) = SHL(ENCODER$POSITION(1),8);
84  2      ENCODER$POSITION(1) = ENCODER$POSITION(1) + ENCODER$COUNT$1$LOW;

85  2      AXIS$POSITION(1) = AXIS$POSITION(1) + FLOAT(SIGNED(ENCODER$POSITION(1)
                                              - OLD$ENCODER$POSITION(1)));

86  2      IF (STATUS AND 40H) = 40H
87  3          THEN DO;
88  3              SERVO$STATUS$BYTE = 020H;
89  3              CALL EMERGENCY$STOP;
90  3          END;

91  2      STATUS = ENCODER$2$STATUS;

92  2      IF (STATUS AND 80H)=80H
93  2          THEN DO;
94  3              OLD$ENCODER$MARKER$VALUE(2) = ENCODER$MARKER$VALUE(2);
95  3              MARKER$VALUE(2) = ENCODER$COUNT$2$HIGH;
96  3              MARKER$VALUE(2) = SHL(MARKER$VALUE(2),8);
97  3              MARKER$VALUE(2) = MARKER$VALUE(2) + ENCODER$COUNT$2$LOW;

98  3              ENCODER$MARKER$VALUE(2) = AXIS$POSITION(2)
                                           + FLOAT(SIGNED(MARKER$VALUE(2)
                                           - OLD$ENCODER$POSITION(2)));
        /*
                   IF ENCODERMARKER$STATUS(2) = 0FFH
                       THEN DO;

IF (ABS(ABS(ENCODER$MARKER$VALUE(2)
                                 - OLD$ENCODER$MARKER$VALUE(2)) - 50000.0) > 0.0)
                          AND (ABS(ENCODER$MARKER$VALUE(2)
                                 - OLD$ENCODER$MARKER$VALUE(2)) > 0.0)
                          THEN DO;
                              SERVO$STATUS$BYTE = 01AH;
                              CALL EMERGENCY$STOP;
                          END;
                   END;
                                                                            */

99  3             ENCODER$MARKER$STATUS(2) = 0FFH;
100  3             STATUS = ENCODER$2$STATUS;
101  3         END;

102  2     ENCODER$POSITION(2) = ENCODER$COUNT$2$HIGH;
103  2     ENCODER$POSITION(2) = SHL(ENCODER$POSITION(2),8);
104  2     ENCODER$POSITION(2) = ENCODER$POSITION(2) + ENCODER$COUNT$2$LOW;

105  2     AXIS$POSITION(2) = AXIS$POSITION(2) + FLOAT(SIGNED(ENCODER$POSITION(2)
                                             - OLD$ENCODER$POSITION(2)));

106  2     IF (STATUS AND 40H) = 40H
107  2         THEN DO;
108  3             SERVO$STATUS$BYTE = 021H;
109  3             CALL EMERGENCY$STOP;
110  3         END;
```

```
111  2         STATUS = ENCODER$3$STATUS;

112  2         IF (STATUS AND 80H)=80H
113  2            THEN DO;
114  3               OLD$ENCODER$MARKER$VALUE(3) = ENCODER$MARKER$VALUE(3);

115  3               MARKER$VALUE(3) = ENCODER$COUNT$3$HIGH;
116  3               MARKER$VALUE(3) = SHL(MARKER$VALUE(3),8);
117  3               MARKER$VALUE(3) = MARKER$VALUE(3) + ENCODER$COUNT$3$LOW;

118  3               ENCODER$MARKER$VALUE(3) = AXIS$POSITION(3)
                                              + FLOAT(SIGNED(MARKER$VALUE(3)
                                              - OLD$ENCODER$POSITION(3)));

/*
                     IF ENCODER$MARKER$STATUS(3) = 0FFH
                        THEN DO;

IF (ABS(ABS(ENCODER$MARKER$VALUE(3)
                                   - OLD$ENCODER$MARKER$VALUE(3)) - 50000.0) ) 0.0)
                               AND (ABS(ENCODER$MARKER$VALUE(3)
                                   - OLD$ENCODER$MARKER$VALUE(3)) ) 0.0)
                              THEN DO;
                                 SERVO$STATUS$BYTE = 01BH;
                                 CALL EMERGENCY$STOP;
                              END;
                        END;
                                                                          */

119  3               ENCODER$MARKER$STATUS(3) = 0FFH;
120  3               STATUS = ENCODER$3$STATUS;
121  3            END;

122  2         ENCODER$POSITION(3) = ENCODER$COUNT$3$HIGH;
123  2         ENCODER$POSITION(3) = SHL(ENCODER$POSITION(3),8);
124  2         ENCODER$POSITION(3) = ENCODER$POSITION(3) + ENCODER$COUNT$3$LOW;

125  2         AXIS$POSITION(3) = AXIS$POSITION(3) + FLOAT(SIGNED(ENCODER$POSITION(3)
                                                   - OLD$ENCODER$POSITION(3)));

126  2         IF (STATUS AND 40H) = 40H
127  2            THEN DO;
128  3               SERVO$STATUS$BYTE = 022H;
129  3               CALL EMERGENCY$STOP;
130  3            END;

131  2         STATUS = ENCODER$4$STATUS;

132  2         IF (STATUS AND 80H)=80H
133  2            THEN DO;
134  3               OLD$ENCODER$MARKER$VALUE(4) = ENCODER$MARKER$VALUE(4);

135  3               MARKER$VALUE(4) = ENCODER$COUNT$4$HIGH;
136  3               MARKER$VALUE(4) = SHL(MARKER$VALUE(4),8);
137  3               MARKER$VALUE(4) = MARKER$VALUE(4) + ENCODER$COUNT$4$LOW;

138  3               ENCODER$MARKER$VALUE(4) = AXIS$POSITION(4)
                                              + FLOAT(SIGNED(MARKER$VALUE(4)
                                              - OLD$ENCODER$POSITION(4)));

/*
                     IF ENCODER$MARKER$STATUS(4) = 0FFH
                        THEN DO;

IF (ABS(ABS(ENCODER$MARKER$VALUE(4)
                                   - OLD$ENCODER$MARKER$VALUE(4)) - 50000.0) ) 0.0)
                               AND (ABS(ENCODER$MARKER$VALUE(4)
                                   - OLD$ENCODER$MARKER$VALUE(4)) ) 0.0)
                              THEN DO;
                                 SERVO$STATUS$BYTE = 01CH;
                                 CALL EMERGENCY$STOP;
                              END;
                        END;
                                                                          */

139  3               ENCODER$MARKER$STATUS(4) = 0FFH;
140  3               STATUS = ENCODER$4$STATUS;
141  3            END;
```

```
142  2      ENCODER$POSITION(4) = ENCODER$COUNT$4$HIGH;
143  2      ENCODER$POSITION(4) = SHL(ENCODER$POSITION(4),8);
144  2      ENCODER$POSITION(4) = ENCODER$POSITION(4) + ENCODER$COUNT$4$LOW;

145  2      AXIS$POSITION(4) = AXIS$POSITION(4) + FLOAT(SIGNED(ENCODER$POSITION(4)
                                                     - OLD$ENCODER$POSITION(4)));

146  2      IF (STATUS AND 40H) = 40H
147  2         THEN DO;
148  3            SERVO$STATUS$BYTE = 023H;
149  3            CALL EMERGENCY$STOP;
150  3         END;

151  2      STATUS = ENCODER$5$STATUS;

152  2      IF (STATUS AND 80H)=80H
153  2         THEN DO;
154  3            OLD$ENCODER$MARKER$VALUE(5) = ENCODER$MARKER$VALUE(5);

155  3            MARKER$VALUE(5) = ENCODER$COUNT$5$HIGH;
156  3            MARKER$VALUE(5) = SHL(MARKER$VALUE(5),8);
157  3            MARKER$VALUE(5) = MARKER$VALUE(5) + ENCODER$COUNT$5$LOW;

158  3            ENCODER$MARKER$VALUE(5) = AXIS$POSITION(5)
                                         + FLOAT(SIGNED(MARKER$VALUE(5)
                                         - OLD$ENCODER$POSITION(5)));

/*
                  IF ENCODER$MARKER$STATUS(5) = 0FFH
                     THEN DO;

IF (ABS(ABS(ENCODER$MARKER$VALUE(5)
                             - OLD$ENCODER$MARKER$VALUE(5)) - 50000.0) > 0.0)
                        AND (ABS(ENCODER$MARKER$VALUE(5)
                             - OLD$ENCODER$MARKER$VALUE(5)) > 0.0)
                        THEN DO;
                           SERVO$STATUS$BYTE = 01DH;
                           CALL EMERGENCY$STOP;
                        END;
                  END;
                                                                         */

159  3            ENCODER$MARKER$STATUS(5) = 0FFH;
160  3            STATUS = ENCODER$5$STATUS;
161  3         END;
162  2      ENCODER$POSITION(5) = ENCODER$COUNT$5$HIGH;
163  2      ENCODER$POSITION(5) = SHL(ENCODER$POSITION(5),8);
164  2      ENCODER$POSITION(5) = ENCODER$POSITION(5) + ENCODER$COUNT$5$LOW;

165  2      AXIS$POSITION(5) = AXIS$POSITION(5) + FLOAT(SIGNED(ENCODER$POSITION(5)
                                                     - OLD$ENCODER$POSITION(5)));

166  2      IF (STATUS AND 40H) = 40H
167  2         THEN DO;
168  3            SERVO$STATUS$BYTE = 024H;
169  3            CALL EMERGENCY$STOP;
170  3         END;

171  2      STATUS = ENCODER$6$STATUS;

172  2      IF (STATUS AND 80H)=80H
173  2         THEN DO;
174  3            OLD$ENCODER$MARKER$VALUE(6) = ENCODER$MARKER$VALUE(6);

175  3            MARKER$VALUE(6) = ENCODER$COUNT$6$HIGH;
176  3            MARKER$VALUE(6) = SHL(MARKER$VALUE(6),8);
177  3            MARKER$VALUE(6) = MARKER$VALUE(6) + ENCODER$COUNT$6$LOW;

178  3            ENCODER$MARKER$VALUE(6) = AXIS$POSITION(6)
                                         + FLOAT(SIGNED(MARKER$VALUE(6)
                                         - OLD$ENCODER$POSITION(6)));

/*
                  IF ENCODER$MARKER$STATUS(6) = 0FFH
                     THEN DO;

IF (ABS(ABS(ENCODER$MARKER$VALUE(6)
                             - OLD$ENCODER$MARKER$VALUE(6)) - 50000.0) > 0.0)
                        AND (ABS(ENCODER$MARKER$VALUE(6)
                             - OLD$ENCODER$MARKER$VALUE(6)) > 0.0)
                        THEN DO;
                           SERVO$STATUS$BYTE = 01EH;
                           CALL EMERGENCY$STOP;
                        END;
                  END;
                                                                         */
```

```
179   3                    ENCODER$MARKER$STATUS(6) = 0FFH;
180   3                    STATUS = ENCODER$6$STATUS;
181   3                END;

182   2            ENCODER$POSITION(6) = ENCODER$COUNT$6$HIGH;
183   2            ENCODER$POSITION(6) = SHL(ENCODER$POSITION(6),8);
184   2            ENCODER$POSITION(6) = ENCODER$POSITION(6) + ENCODER$COUNT$6$LOW;

185   2            AXIS$POSITION(6) = AXIS$POSITION(6) + FLOAT(SIGNED(ENCODER$POSITION(6)
                                                            - OLD$ENCODER$POSITION(6)));

186   2            IF (STATUS AND 40H) = 40H
187   2                THEN DO;
188   3                    SERVO$STATUS$BYTE = 025H;
189   3                    CALL EMERGENCY$STOP;
190   3                END;

191   2        END ENCODER$INPUT$9702;

192   1        DIGITAL$TO$ANALOG$OUTPUT: PROCEDURE(CHAN$NUM,DATA$NUM) PUBLIC;
193   2            DECLARE CHAN$NUM BYTE,
                            DATA$NUM REAL,
                            INT$NUM  INTEGER;

194   2            IF DATA$NUM > 32767.0 THEN DATA$NUM =  32767.0; /* LIMIT OVERFLOWS */
196   2            IF DATA$NUM <-32768.0 THEN DATA$NUM = -32768.0;

198   2            INT$NUM = FIX(DATA$NUM);

199   2            DO CASE CHAN$NUM;

200   3                DO;
201   4                    ENCODER$0$D2A$LOW  = LOW(UNSIGN(INT$NUM));
202   4                    ENCODER$0$D2A$HIGH = HIGH(UNSIGN(INT$NUM));
203   4                END;

204   3                DO;
205   4                    ENCODER$1$D2A$LOW  = LOW(UNSIGN(INT$NUM));
206   4                    ENCODER$1$D2A$HIGH = HIGH(UNSIGN(INT$NUM));
207   4                END;

208   3                DO;
209   4                    ENCODER$2$D2A$LOW  = LOW(UNSIGN(INT$NUM));
210   4                    ENCODER$2$D2A$HIGH = HIGH(UNSIGN(INT$NUM));
211   4                END;

212   3                DO;
213   4                    ENCODER$3$D2A$LOW  = LOW(UNSIGN(INT$NUM));
214   4                    ENCODER$3$D2A$HIGH = HIGH(UNSIGN(INT$NUM));
215   4                END;

216   3                DO;
217   4                    ENCODER$4$D2A$LOW  = LOW(UNSIGN(INT$NUM));
218   4                    ENCODER$4$D2A$HIGH = HIGH(UNSIGN(INT$NUM));
219   4                END;

220   3                DO;
221   4                    ENCODER$5$D2A$LOW  = LOW(UNSIGN(INT$NUM));
222   4                    ENCODER$5$D2A$HIGH = HIGH(UNSIGN(INT$NUM));
223   4                END;

224   3                DO;
225   4                    ENCODER$6$D2A$LOW  = LOW(UNSIGN(INT$NUM));
226   4                    ENCODER$6$D2A$HIGH = HIGH(UNSIGN(INT$NUM));
227   4                END;

228   3                DO;
229   4                    ENCODER$7$D2A$LOW  = LOW(UNSIGN(INT$NUM));
230   4                    ENCODER$7$D2A$HIGH = HIGH(UNSIGN(INT$NUM));
231   4                END;

232   3            END;

233   2        END DIGITAL$TO$ANALOG$OUTPUT;

234   1        LINE$FEED: PROCEDURE(NUM$LFS) PUBLIC;
235   2            DECLARE (NUM$LFS,I) BYTE;
236   2            DO I = 1 TO NUM$LFS;
237   3                CALL CO(10);
238   3                CALL CO(13);
239   3                CALL TIME(10);
240   3            END;
241   2        END LINE$FEED;
```

```
242  1    GENERAL$MESSAGES: PROCEDURE(MESSAGE$NUMBER) PUBLIC;
243  2        DECLARE MESSAGE$NUMBER BYTE,
                      I                BYTE;

244  2        DO CASE MESSAGE$NUMBER;

245  3            DO;
246  4                CALL LINE$FEED(1);
247  4                DO I = 0 TO 37 BY 1;
248  5                    CALL CO(MESSAGE$0(I));
249  5                END;
250  4                CALL LINE$FEED(1);
251  4            END;

252  3            DO;
253  4                CALL LINE$FEED(1);
254  4                DO I = 0 TO 37 BY 1;
255  5                    CALL CO(MESSAGE$1(I));
256  5                END;
257  4                CALL LINE$FEED(1);
258  4            END;

259  3            DO;
260  4                CALL LINE$FEED(1);
261  4                DO I = 0 TO 37 BY 1;
262  5                    CALL CO(MESSAGE$2(I));
263  5                END;
264  4                CALL LINE$FEED(1);
265  4            END;

266  3            DO;
267  4                CALL LINE$FEED(1);
268  4                DO I = 0 TO 37 BY 1;
269  5                    CALL CO(MESSAGE$3(I));
270  5                END;
271  4                CALL LINE$FEED(1);
272  4            END;

273  3            DO;
274  4                CALL LINE$FEED(1);
275  4                DO I = 0 TO 37 BY 1;
276  5                    CALL CO(MESSAGE$4(I));
277  5                END;
278  4                CALL LINE$FEED(1);
279  4            END;

280  3            DO;
281  4                CALL LINE$FEED(1);
282  4                DO I = 0 TO 37 BY 1;
283  5                    CALL CO(MESSAGE$5(I));
284  5                END;
285  4                CALL LINE$FEED(1);
286  4            END;

287  3            DO;
288  4                CALL LINE$FEED(1);
289  4                DO I = 0 TO 37 BY 1;
290  5                    CALL CO(MESSAGE$6(I));
291  5                END;
292  4                CALL LINE$FEED(1);
293  4            END;

294  3            DO;
295  4                CALL LINE$FEED(1);
296  4                DO I = 0 TO 37 BY 1;
297  5                    CALL CO(MESSAGE$7(I));
298  5                END;
299  4                CALL LINE$FEED(1);
300  4            END;

301  3            DO;
302  4                CALL LINE$FEED(1);
303  4                DO I = 0 TO 37 BY 1;
304  5                    CALL CO(MESSAGE$8(I));
305  5                END;
306  4                CALL LINE$FEED(1);
307  4            END;

308  3            DO;
309  4                CALL LINE$FEED(1);
310  4                DO I = 0 TO 37 BY 1;
311  5                    CALL CO(MESSAGE$9(I));
312  5                END;
313  4                CALL LINE$FEED(1);
314  4            END;
```

```
315  3        DO;
316  4            CALL LINE$FEED(1);
317  4            DO I = 0 TO 37 BY 1;
318  5                CALL CO(MESSAGE$10(I));
319  5            END;
320  4            CALL LINE$FEED(1);
321  4        END;

322  3        DO;
323  4            CALL LINE$FEED(1);
324  4            DO I = 0 TO 37 BY 1;
325  5                CALL CO(MESSAGE$11(I));
326  5            END;
327  4            CALL LINE$FEED(1);
328  4        END;

329  3        DO;
330  4            CALL LINE$FEED(1);
331  4            DO I = 0 TO 37 BY 1;
332  5                CALL CO(MESSAGE$12(I));
333  5            END;
334  4            CALL LINE$FEED(1);
335  4        END;

336  3        DO;
337  4            CALL LINE$FEED(1);
338  4            DO I = 0 TO 37 BY 1;
339  5                CALL CO(MESSAGE$13(I));
340  5            END;
341  4            CALL LINE$FEED(1);
342  4        END;

343  3        DO;
344  4            CALL LINE$FEED(1);
345  4            DO I = 0 TO 37 BY 1;
346  5                CALL CO(MESSAGE$14(I));
347  5            END;
348  4            CALL LINE$FEED(1);
349  4        END;

350  3        DO;
351  4            CALL LINE$FEED(1);
352  4            DO I = 0 TO 37 BY 1;
353  5                CALL CO(MESSAGE$15(I));
354  5            END;
355  4            CALL LINE$FEED(1);
356  4        END;

357  3        DO;
358  4            CALL LINE$FEED(1);
359  4            DO I = 0 TO 37 BY 1;
360  5                CALL CO(MESSAGE$16(I));
361  5            END;
362  4            CALL LINE$FEED(1);
363  4        END;

364  3        DO;
365  4            CALL LINE$FEED(1);
366  4            DO I = 0 TO 37 BY 1;
367  5                CALL CO(MESSAGE$17(I));
368  5            END;
369  4            CALL LINE$FEED(1);
370  4        END;

371  3        DO;
372  4            CALL LINE$FEED(1);
373  4            DO I = 0 TO 37 BY 1;
374  5                CALL CO(MESSAGE$18(I));
375  5            END;
376  4            CALL LINE$FEED(1);
377  4        END;

378  3        DO;
379  4            CALL LINE$FEED(1);
380  4            DO I = 0 TO 37 BY 1;
381  5                CALL CO(MESSAGE$19(I));
382  5            END;
383  4            CALL LINE$FEED(1);
384  4        END;

385  3        DO;
386  4            CALL LINE$FEED(1);
387  4            DO I = 0 TO 37 BY 1;
388  5                CALL CO(MESSAGE$20(I));
389  5            END;
```

```
390  4              CALL LINE$FEED(1);
391  4            END;

392  3          END;
393  2        END GENERAL$MESSAGES;

394  1        DUMMY: PROCEDURE INTERRUPT 39;
395  2          CALL CO('I');
396  2          CALL CO('N');
397  2          CALL CO('T');
398  2          CALL CO('3');
399  2          CALL CO('9');
400  2        END DUMMY;

401  1        P8630$SETUP: PROCEDURE PUBLIC;

402  2          DECLARE PIT$CW LITERALLY '0D6H',
                        PIT$0 LITERALLY '0D0H';
403  2          DECLARE FREQ$VALUE$0 WORD;

404  2          CALL SET$INTERRUPT(34,SERVO$LOOP);
405  2          CALL SET$INTERRUPT(33,INPUT$NEW$POSITION$COMMAND);
406  2          CALL SET$INTERRUPT(39,DUMMY);

407  2          OUTPUT(057H) = 90H;    /* SET UP I/O BOARD */

408  2          FREQ$VALUE$0 = 6150;              /* 6150 = 5mS  7373 = 6mS */
409  2          OUTPUT(PIT$CW) = 00$11$0:0$0B;    /* TIMER 0, 2 BYTE, MODE 2,B DAT */
410  2          OUTPUT(PIT$0) = LOW(FREQ$VALUE$0);
411  2          OUTPUT(PIT$0) = HIGH(FREQ$VALUE$0);

412  2          OUTPUT(0C0H) = 017H;
413  2          OUTPUT(0C2H) = 020H;
414  2          OUTPUT(0C2H) = 0DH;

415  2          OUTPUT(0C2H) = 1111$1011B;        /* SET UP PIC FOR 2 INTERRUPT */

416  2          OUTPUT(0CEH) = 99H;

417  2        END P8630$SETUP;
418  1        EMERGENCY$STOP: PROCEDURE PUBLIC;

419  2          DISABLE;

420  2          OUTPUT(055H) = 0H;   /* TURN OFF ENABLE OUTPUT */

421  2          CALL DIGITAL$TO$ANALOG$OUTPUT(0,0,0);
422  2          CALL DIGITAL$TO$ANALOG$OUTPUT(1,0,0);
423  2          CALL DIGITAL$TO$ANALOG$OUTPUT(2,0,0);
424  2          CALL DIGITAL$TO$ANALOG$OUTPUT(3,0,0);
425  2          CALL DIGITAL$TO$ANALOG$OUTPUT(4,0,0);
426  2          CALL DIGITAL$TO$ANALOG$OUTPUT(5,0,0);
427  2          CALL DIGITAL$TO$ANALOG$OUTPUT(6,0,0);
428  2          CAUSE$INTERRUPT(3);

429  2        END EMERGENCY$STOP;

430  1      END;
```

```
DEFN  ADDR   SIZE  NAME, ATTRIBUTES, AND REFERENCES 0000H   28   AXISPOSITION . . . . . .  REAL ARRAY(7) EXTERNAL(4)
      0008H    1   CHANNUM. . . . . . . . .  BYTE IN PROC (DIGITALTOANALOGOUTPUT) PARAMETER AUTOMATIC
      004AH    1   CHAR . . . . . . . . . .  BYTE IN PROC (CI)
      0008H    1   CHAR . . . . . . . . . .  BYTE IN PROC (CO) PARAMETER AUTOMATIC
      001BH   56   CI . . . . . . . . . . .  PROCEDURE BYTE PUBLIC STACK=0004H
      0002H   25   CO . . . . . . . . . . .  PROCEDURE PUBLIC STACK=0004H
      ---CH    4   DATANUM. . . . . . . . .  REAL IN PROC (DIGITALTOANALOGOUTPUT) PARAMETER AUTOMATIC
      0623H  291   DIGITALTOANALOGOUTPUT. .  PROCEDURE PUBLIC STACK=0004H
      0B25H   70   DUMMY. . . . . . . . . .  PROCEDURE INTERRUPT(39) STACK=000CH
      0BE7H  107   EMERGENCYSTOP. . . . . .  PROCEDURE PUBLIC STACK=0012H
      E-0001H   1  ENCODER2DEAHIGH. . . . .  BYTE AT ABSOLUTE
      E-0000H   1  ENCODER2DEALOW . . . . .  BYTE AT ABSOLUTE
      E-0003H   1  ENCODER2STATUS . . . . .  BYTE AT ABSOLUTE
      E-0005H   1  ENCODER1D2AHIGH. . . . .  BYTE AT ABSOLUTE
      E-0004H   1  ENCODER1D2ALOW . . . . .  BYTE AT ABSOLUTE
      E-0007H   1  ENCODER1STATUS . . . . .  BYTE AT ABSOLUTE
      E-0011H   1  ENCODER2D2AHIGH. . . . .  BYTE AT ABSOLUTE
      E-0010H   1  ENCODER2D2ALOW . . . . .  BYTE AT ABSOLUTE
      E-0013H   1  ENCODER2STATUS . . . . .  BYTE AT ABSOLUTE
      E-0015H   1  ENCODER3D2AHIGH. . . . .  BYTE AT ABSOLUTE
```

| | | | |
|---|---|---|---|
| E-0014H | 1 | ENCODER3D2ALOW . . . . . | BYTE AT ABSOLUTE |
| E-0017H | 1 | ENCODER3STATUS . . . . . | BYTE AT ABSOLUTE |
| E-0021H | 1 | ENCODER4D2AHIGH . . . . | BYTE AT ABSOLUTE |
| E-0020H | 1 | ENCODER4D2ALOW . . . . . | BYTE AT ABSOLUTE |
| E-0023H | 1 | ENCODER4STATUS . . . . . | BYTE AT ABSOLUTE |
| E-0025H | 1 | ENCODER5D2AHIGH . . . . | BYTE AT ABSOLUTE |
| E-0024H | 1 | ENCODER5D2ALOW . . . . . | BYTE AT ABSOLUTE |
| E-0027H | 1 | ENCODER5STATUS . . . . . | BYTE AT ABSOLUTE |
| E-0031H | 1 | ENCODER6D2AHIGH . . . . | BYTE AT ABSOLUTE |
| E-0032H | 1 | ENCODER6D2ALOW . . . . . | BYTE AT ABSOLUTE |
| E-0033H | 1 | ENCODER6STATUS . . . . . | BYTE AT ABSOLUTE |
| E-0035H | 1 | ENCODER7D2AHIGH . . . . | BYTE AT ABSOLUTE |
| E-0034H | 1 | ENCODER7D2ALOW . . . . . | BYTE AT ABSOLUTE |
| E-0037H | 1 | ENCODER7STATUS . . . . . | BYTE AT ABSOLUTE |
| E-0001H | 1 | ENCODERCOUNT0HIGH . . . | BYTE AT ABSOLUTE |
| E-0000H | 1 | ENCODERCOUNT0LOW . . . | BYTE AT ABSOLUTE |
| E-0005H | 1 | ENCODERCOUNT1HIGH . . . | BYTE AT ABSOLUTE |
| E-0004H | 2 | ENCODERCOUNT1LOW . . . | WORD AT ABSOLUTE |
| E-0011H | 1 | ENCODERCOUNT2HIGH . . . | BYTE AT ABSOLUTE |
| E-0010H | 1 | ENCODERCOUNT2LOW . . . | BYTE AT ABSOLUTE |
| E-0015H | 1 | ENCODERCOUNT3HIGH . . . | BYTE AT ABSOLUTE |
| E-0014H | 2 | ENCODERCOUNT3LOW . . . | WORD AT ABSOLUTE |
| E-0021H | 1 | ENCODERCOUNT4HIGH . . . | BYTE AT ABSOLUTE |
| E-0020H | 1 | ENCODERCOUNT4LOW . . . | BYTE AT ABSOLUTE |
| E-0025H | 1 | ENCODERCOUNT5HIGH . . . | BYTE AT ABSOLUTE |
| E-0024H | 2 | ENCODERCOUNT5LOW . . . | WORD AT ABSOLUTE |
| E-0031H | 1 | ENCODERCOUNT6HIGH . . . | BYTE AT ABSOLUTE |
| E-0030H | 1 | ENCODERCOUNT6LOW . . . | BYTE AT ABSOLUTE |
| E-0035H | 1 | ENCODERCOUNT7HIGH . . . | BYTE AT ABSOLUTE |
| E-0034H | 2 | ENCODERCOUNT7LOW . . . | WORD AT ABSOLUTE |
| 20A7H | 1396 | ENCODERINPUTS9702 . . . | PROCEDURE PUBLIC STACK=0008H |
| E-0000H | 8 | ENCODERMAP1 . . . . . . | BYTE ARRAY(8) AT ABSOLUTE |
| E-0010H | 8 | ENCODERMAP2 . . . . . . | BYTE ARRAY(8) AT ABSOLUTE |
| E-0020H | 8 | ENCODERMAP3 . . . . . . | BYTE ARRAY(8) AT ABSOLUTE |
| E-0030H | 8 | ENCODERMAP4 . . . . . . | BYTE ARRAY(8) AT ABSOLUTE |
| 0000H | 7 | ENCODERMARKERSTATUS . . | BYTE ARRAY(7) EXTERNAL(3) |
| 0000H | 28 | ENCODERMARKERVALUE . . | REAL ARRAY(7) EXTERNAL(2) |
| 0000H | 14 | ENCODERPOSITION . . . . | WORD ARRAY(7) PUBLIC |
| 2248H | 2 | FREQVALUE0 . . . . . . | WORD IN PROC (P8630SETUP) |
| 0787H | 935 | GENERALMESSAGES . . . . | PROCEDURE PUBLIC STACK=0018H |
| 2002H | | GENERALPROCEDURES . . . | PROCEDURE STACK=0028H |
| 004EH | 1 | I . . . . . . . . . . . | BYTE IN PROC (GENERALMESSAGES) |
| 004DH | 1 | I . . . . . . . . . . . | BYTE IN PROC (LINEFEED) |
| 0000H | | INPUTNEWPOSITIONCOMMAND. | PROCEDURE EXTERNAL(1) INTERRUPT(33) STACK=0000H |
| 2046H | 2 | INTNUM . . . . . . . . | INTEGER IN PROC (DIGITALTOANALOGOUTPUT) |
| 0746H | 65 | LINEFEED . . . . . . . | PROCEDURE PUBLIC STACK=000EH |
| 0000H | | MAINPROGRAM . . . . . . | LABEL EXTERNAL(---) |
| 0038H | 14 | MARKERVALUE . . . . . . | WORD ARRAY(7) |
| 005BH | 38 | MESSAGE0 . . . . . . . | BYTE ARRAY(38) DATA |
| 0081H | 38 | MESSAGE1 . . . . . . . | BYTE ARRAY(38) DATA |
| 01D7H | 38 | MESSAGE10 . . . . . . . | BYTE ARRAY(38) DATA |
| 01FDH | 38 | MESSAGE11 . . . . . . . | BYTE ARRAY(38) DATA |
| 0223H | 38 | MESSAGE12 . . . . . . . | BYTE ARRAY(38) DATA |
| 0249H | 38 | MESSAGE13 . . . . . . . | BYTE ARRAY(38) DATA |
| 026FH | 38 | MESSAGE14 . . . . . . . | BYTE ARRAY(38) DATA |
| 0295H | 38 | MESSAGE15 . . . . . . . | BYTE ARRAY(38) DATA |
| 02BBH | 38 | MESSAGE16 . . . . . . . | BYTE ARRAY(38) DATA |
| 02E1H | 38 | MESSAGE17 . . . . . . . | BYTE ARRAY(38) DATA |
| 0307H | 38 | MESSAGE18 . . . . . . . | BYTE ARRAY(38) DATA |
| 032DH | 38 | MESSAGE19 . . . . . . . | BYTE ARRAY(38) DATA |
| 00A7H | 38 | MESSAGE2 . . . . . . . | BYTE ARRAY(38) DATA |
| 0353H | 38 | MESSAGE20 . . . . . . . | BYTE ARRAY(38) DATA |
| 00CDH | 38 | MESSAGE3 . . . . . . . | BYTE ARRAY(38) DATA |
| 00F3H | 38 | MESSAGE4 . . . . . . . | BYTE ARRAY(38) DATA |
| 0119H | 38 | MESSAGE5 . . . . . . . | BYTE ARRAY(38) DATA |
| 013FH | 38 | MESSAGE6 . . . . . . . | BYTE ARRAY(38) DATA |
| 0165H | 38 | MESSAGE7 . . . . . . . | BYTE ARRAY(38) DATA |
| 018BH | 38 | MESSAGE8 . . . . . . . | BYTE ARRAY(38) DATA |
| 01B1H | 38 | MESSAGE9 . . . . . . . | BYTE ARRAY(38) DATA |
| 0008H | 1 | MESSAGENUMBER . . . . . | BYTE IN PROC (GENERALMESSAGES) PARAMETER AUTOMATIC |
| 2208H | 1 | NUMLFS . . . . . . . . | BYTE IN PROC (LINEFEED) PARAMETER AUTOMATIC |
| 001CH | 28 | OLDENCODERMARKERVALUE . | REAL ARRAY(7) |
| 200EH | 14 | OLDENCODERPOSITION . . . | WORD ARRAY(7) |
| 0674H | 115 | P8630SETUP . . . . . . | PROCEDURE PUBLIC STACK=0002H |
| ---- | | PITA . . . . . . . . . | LITERALLY '0D0H' IN PROC (P8630SETUP) |
| ---- | | PITCW . . . . . . . . . | LITERALLY '0D6H' IN PROC (P8630SETUP) |
| 0000H | | SERVOLOOP . . . . . . . | PROCEDURE EXTERNAL(0) INTERRUPT(34) STACK=0000H |
| 0000H | 1 | SERVOSTATUSBYTE . . . . | BYTE EXTERNAL(5) |
| 2052H | 92 | SETUP9702 . . . . . . . | PROCEDURE PUBLIC STACK=0002H |
| 2047H | 1 | STATUS . . . . . . . . | BYTE IN PROC (ENCODERINPUTS9702) |
| 2048H | 1 | STATUS . . . . . . . . | BYTE IN PROC (SETUP9702) |
| ---- | | USARTCMD . . . . . . . | LITERALLY '0DAH' |
| ---- | | USARTDATA . . . . . . . | LITERALLY '0D8H' |

MODULE INFORMATION:

```
CODE AREA SIZE    = 0C52H   3154D
CONSTANT AREA SIZE = 03D2H   978D
VARIABLE AREA SIZE = 004FH    79D
MAXIMUM STACK SIZE = 0028H    40D
811 LINES READ
2 PROGRAM WARNINGS
2 PROGRAM ERRORS

DICTIONARY SUMMARY:

242KB MEMORY AVAILABLE
    8KB MEMORY USED   (3%)
    0KB DISK SPACE USED

END OF PL/M-86 COMPILATION iRMX 86 PL/M-86 V2.3 COMPILATION OF MODULE SERVOCONTROLLER
OBJECT MODULE PLACED IN SRVPRC.OBJ
COMPILER INVOKED BY:  :LANG:PLM86 SRVPRC.P86 RAM LARGE OPTIMIZE(3) DB OVERFLOW SYMBOLS
```

```
                $TITLE('7 AXIS SERVO CONTROLLER')
                $NOINTVECTOR
   1            SERVO$CONTROLLER: DO;
                /************************************************************
                *                                                            *
                *     MODULE: SERVO$CONTROLLER                               *
                *                                                            *
                *     THIS IS A 7 AXIS SERVO CONTROLLER WHICH ACCEPTS ABSOLUTE POSITION *
                *     COMMANDS FROM THE SUPERVISOR PROCESSOR, READS 7 ENCODERS THROUGH  *
                *     NORTH COAST AUTOMATION ENCODER BOARDS AND CREATES A PROPORTIONAL  *
                *     ERROR FOR THE MOTOR CONTROLLERS FOR EACH AXIS.                    *
                *                                                            *
                *  ))) PUBLIC PROCEDURES IN THIS MODULE:                     *
                *                                                            *
                *  ))) PROCEDURES REFERENCED BY THIS MODULE:                 *
                *                                                            *
                *        ENCODER$INPUT$9702 - INPUTS ENCODER INFORMATION FROM NORTH COAST *
                *                             AUTOMATION 9702 ENCODER INTERFACE BOARDS.  *
                *                                                            *
                *     (C) COPYRIGHT 198_ ROBOTICS RESEARCH CORPORATION       *
                *                    ALL RIGHTS RESERVED                    *
                *                                                            *
                ************************************************************/

/***************************
                *   EXTERNAL PROCEDURES    *
                ***************************/

2   1        DECLARE MAINPROGRAM LABEL PUBLIC;

3   1        LINES$FEED: PROCEDURE (NUM$LFS) EXTERNAL;
   4   2            DECLARE NUM$LFS BYTE;
   5   2        END LINES$FEED;

6   1        GENERAL$MESSAGES: PROCEDURE (MESSAGE$NUMBER) EXTERNAL;
   7   2            DECLARE MESSAGE$NUMBER BYTE;
   8   2        END GENERAL$MESSAGES;

9   1        ENCODER$INPUT$9702: PROCEDURE EXTERNAL;
  10   2        END ENCODER$INPUT$9702;

11   1        P8632$SETUP: PROCEDURE EXTERNAL;
  12   2        END P8632$SETUP;

13   1        SETUP$9702: PROCEDURE EXTERNAL;
  14   2        END SETUP$9702;

15   1        CI: PROCEDURE BYTE EXTERNAL;
  16   2        END CI;

17   1        DIGITAL$TO$ANALOG$OUTPUT: PROCEDURE (CHAN$NUM,DATA$NUM) EXTERNAL;
  18   2            DECLARE CHAN$NUM BYTE,
                            DATA$NUM REAL;
  19   2        END DIGITAL$TO$ANALOG$OUTPUT;

20   1        EMERGENCY$STOP: PROCEDURE EXTERNAL;
  21   2        END EMERGENCY$STOP;

/***************************
                *    PUBLIC VARIABLES      *
                ***************************/
```

```
22  1    DECLARE ENCODER$MARKER$VALUE(7)   REAL    PUBLIC,
                 ENCODER$MARKER$STATUS(7)  BYTE    PUBLIC,
                 AXIS$POSITION(7)          REAL    PUBLIC;

/***********************
          * DUAL PORT VARIABLES *
          ***********************/

23  1    DECLARE SUPERVISOR$POS$COMMAND(7) REAL         AT (1FF04H),
                 CONTROL$BYTE              BYTE         AT (1FF00H),
                 COMMAND$DIVIDE$NUMBER     BYTE         AT (1FF02H),
                 SERVO$STATUS$BYTE         BYTE PUBLIC  AT (1FF01H),
                 LOCK                      BYTE         AT (1FF03H);

/***********************
          * EXTERNAL VARIABLES  *
          ***********************/

24  1    DECLARE ENCODER$POSITION(7)       WORD EXTERNAL;

/********************************
          * MODULAR DATA AND SYMBOLS *
          ********************************/

25  1    DECLARE TRUE           LITERALLY '0FFH',
                 FALSE          LITERALLY '00H',
                 IS             LITERALLY '=',
                 FOREVER        LITERALLY 'WHILE 1',
                 PIC$ADDRESS    LITERALLY '0C0H',
                 NON$SPECIFIC$EOI LITERALLY '20H',
                 I              BYTE;              /* GENERAL LOOP COUNTER */

/***********************
          * LOCAL VARIABLES     *
          ***********************/

26  1    DECLARE AXIS$POS$COMMAND(7)  REAL,
                 AXIS$POS$ERROR(7)    REAL,
                 POS$INCREMENT(7)     REAL,
                 POS$INC$COUNTER      BYTE,
                 POS$LOOP$GAIN(7)     REAL INITIAL (2.2,5.8,4.5,7.2,7.0,2.8,6.7),
                 AXIS$VELOCITY(7)     REAL,
                 VEL$LOOP$GAIN(7)     REAL INITIAL (1.0,1.0,10.0,10.0,1.0,1.0,1.0),
                 OLD$AXIS$POSITION(7) REAL;

27  1    DECLARE EXCESS$ERROR(7)  REAL INITIAL ( 24305.0, 13888.0, 11111.0, 5555.0,
                                                 11111.0, 9722.0, 9722.0       );

28  1    INITIALIZATION: PROCEDURE;

29  2        DO I = 0 TO 6 BY 1;
30  3            AXIS$POSITION(I)          = 0.0;
31  3            AXIS$POS$COMMAND(I)       = 0.0;
32  3            AXIS$POS$ERROR(I)         = 0.0;
33  3            ENCODER$MARKER$VALUE(I)   = 0.0;
34  3            ENCODER$MARKER$STATUS(I)  = 0;
35  3            ENCODER$POSITION(I)       = 0;
36  3            POS$INCREMENT(I)          = 0.0;
37  3            OLD$AXIS$POSITION(I)      = 0.0;
38  3        END;

39  2        POS$INC$COUNTER   = 0;

/* INITIALIZE DUAL PORT VARIABLES */
40  2        DO I = 0 TO 6 BY 1;
41  3            SUPERVISOR$POS$COMMAND(I) = 0.0;
42  3        END;
43  2            CONTROL$BYTE             = 0;
44  2            COMMAND$DIVIDE$NUMBER    = 0;
45  2            SERVO$STATUS$BYTE        = 0;
46  2            LOCK                     = 0;

47  2    END INITIALIZATION;

48  1    ENCODER$MARKER$ALIGNMENT: PROCEDURE;
49  2        CALL ENCODER$INPUT$9702;
```

```
50   2       AXIS$POS$COMMAND(0) = AXIS$POSITION(0);
51   2       AXIS$POS$COMMAND(1) = AXIS$POSITION(1);
52   2       AXIS$POS$COMMAND(2) = AXIS$POSITION(2);
53   2       AXIS$POS$COMMAND(3) = AXIS$POSITION(3);
54   2       AXIS$POS$COMMAND(4) = AXIS$POSITION(4);
55   2       AXIS$POS$COMMAND(5) = AXIS$POSITION(5);
56   2       AXIS$POS$COMMAND(6) = AXIS$POSITION(6);

57   2       ENABLE;

/* ALIGN AXIS 1 TO HOME */

58   2       DO WHILE CONTROL$BYTE () 'Y';
59   3           SERVO$STATUS$BYTE = 08H;
60   3           ENCODER$MARKER$STATUS(0) = 0;
61   3           DO WHILE ENCODER$MARKER$STATUS(0) IS FALSE;

62   4               IF CONTROL$BYTE = 01H
63   4                   THEN POS$INCREMENT(0) = -50.0;
64   4               IF CONTROL$BYTE = 02H
65   4                   THEN POS$INCREMENT(0) =  50.0;

66   4               IF CONTROL$BYTE = 03H
67   4                   THEN POS$INCREMENT(1) = -50.0;
68   4               IF CONTROL$BYTE = 04H
69   4                   THEN POS$INCREMENT(1) =  50.0;

70   4               IF CONTROL$BYTE = 05H
71   4                   THEN POS$INCREMENT(2) = -25.0;
72   4               IF CONTROL$BYTE = 06H
73   4                   THEN POS$INCREMENT(2) =  25.0;

74   4               IF CONTROL$BYTE = 07H
75   4                   THEN POS$INCREMENT(3) = -25.0;
76   4               IF CONTROL$BYTE = 08H
77   4                   THEN POS$INCREMENT(3) =  25.0;

78   4               IF CONTROL$BYTE = 09H
79   4                   THEN POS$INCREMENT(4) = -50.0;
80   4               IF CONTROL$BYTE = 0AH
81   4                   THEN POS$INCREMENT(4) =  50.0;

82   4               IF CONTROL$BYTE = 0BH
83   4                   THEN POS$INCREMENT(5) = -50.0;
84   4               IF CONTROL$BYTE = 0CH
85   4                   THEN POS$INCREMENT(5) =  50.0;

86   4               IF CONTROL$BYTE = 0DH
87   4                   THEN POS$INCREMENT(6) = -50.0;
88   4               IF CONTROL$BYTE = 0EH
89   4                   THEN POS$INCREMENT(6) =  50.0;

90   4           END;

91   3           SERVO$STATUS$BYTE = 01H;
92   3           CONTROL$BYTE = 0H;

93   3           DO WHILE ((CONTROL$BYTE ()'Y') AND (CONTROL$BYTE ()'N'));
94   4           END;
95   3       END;

96   2       CONTROL$BYTE = 0H;

97   2       DISABLE;

98   2       AXIS$POSITION(0) = AXIS$POSITION(0) - ENCODER$MARKER$VALUE(0);
99   2       AXIS$POS$COMMAND(0) = 0.0;
100  2       ENCODER$MARKER$VALUE(0) = 0.0;

101  2       ENABLE;
             /* ALIGN AXIS 2 TO HOME */

102  2       DO WHILE CONTROL$BYTE () 'Y';
103  3           SERVO$STATUS$BYTE = 09H;
104  3           ENCODER$MARKER$STATUS(1) = 0;

105  3           DO WHILE ENCODER$MARKER$STATUS(1) IS FALSE;

106  4               IF CONTROL$BYTE = 01H
107  4                   THEN POS$INCREMENT(0) = -50.0;
108  4               IF CONTROL$BYTE = 02H
109  4                   THEN POS$INCREMENT(0) =  50.0;

110  4               IF CONTROL$BYTE = 03H
```

```
111   4                  THEN POS$INCREMENT(1) = -50.0;
112   4               IF CONTROL$BYTE = 04H
113   4                  THEN POS$INCREMENT(1) =  50.0;

114   4               IF CONTROL$BYTE = 05H
115   4                  THEN POS$INCREMENT(2) = -25.0;
116   4               IF CONTROL$BYTE = 06H
117   4                  THEN POS$INCREMENT(2) =  25.0;

118   4               IF CONTROL$BYTE = 07H
119   4                  THEN POS$INCREMENT(3) = -25.0;
120   4               IF CONTROL$BYTE = 08H
121   4                  THEN POS$INCREMENT(3) =  25.0;

122   4               IF CONTROL$BYTE = 09H
123   4                  THEN POS$INCREMENT(4) = -50.0;
124   4               IF CONTROL$BYTE = 0AH
125   4                  THEN POS$INCREMENT(4) =  50.0;

126   4               IF CONTROL$BYTE = 0BH
127   4                  THEN POS$INCREMENT(5) = -50.0;
128   4               IF CONTROL$BYTE = 0CH
129   4                  THEN POS$INCREMENT(5) =  50.0;

130   4               IF CONTROL$BYTE = 0DH
131   4                  THEN POS$INCREMENT(6) = -50.0;
132   4               IF CONTROL$BYTE = 0EH
133   4                  THEN POS$INCREMENT(6) =  50.0;

134   4            END;

135   3            SERVO$STATUS$BYTE = 02H;
136   3            CONTROL$BYTE = 0H;

137   3            DO WHILE ((CONTROL$BYTE ()'Y') AND (CONTROL$BYTE ()'N'));
138   4            END;
139   3         END;

140   2      CONTROL$BYTE = 0H;

141   2      DISABLE;

142   2      AXIS$POSITION(1) = AXIS$POSITION(1) - ENCODER$MARKER$VALUE(1);
143   2      AXIS$POS$COMMAND(1) = 0.0;
144   2      ENCODER$MARKER$VALUE(1) = 0.0;

145   2      ENABLE;

/* ALIGN AXIS 3 TO HOME */

146   2      DO WHILE CONTROL$BYTE () 'Y';
147   3         SERVO$STATUS$BYTE = 0AH;
148   3         ENCODER$MARKER$STATUS(2) = 0;

149   3         DO WHILE ENCODER$MARKER$STATUS(2) IS FALSE;

150   4            IF CONTROL$BYTE = 01H
151   4               THEN POS$INCREMENT(0) = -50.0;
152   4            IF CONTROL$BYTE = 02H
153   4               THEN POS$INCREMENT(0) =  50.0;

154   4            IF CONTROL$BYTE = 03H
155   4               THEN POS$INCREMENT(1) = -50.0;
156   4            IF CONTROL$BYTE = 04H
157   4               THEN POS$INCREMENT(1) =  50.0;

158   4            IF CONTROL$BYTE = 05H
159   4               THEN POS$INCREMENT(2) = -25.0;
160   4            IF CONTROL$BYTE = 06H
161   4               THEN POS$INCREMENT(2) =  25.0;

162   4            IF CONTROL$BYTE = 07H
163   4               THEN POS$INCREMENT(3) = -25.0;
164   4            IF CONTROL$BYTE = 08H
165   4               THEN POS$INCREMENT(3) =  25.0;

166   4            IF CONTROL$BYTE = 09H
167   4               THEN POS$INCREMENT(4) = -50.0;
168   4            IF CONTROL$BYTE = 0AH
169   4               THEN POS$INCREMENT(4) =  50.0;

170   4            IF CONTROL$BYTE = 0BH
171   4               THEN POS$INCREMENT(5) = -50.0;
172   4            IF CONTROL$BYTE = 0CH
173   4               THEN POS$INCREMENT(5) =  50.0;
```

```
174   4                IF CONTROL$BYTE = 0DH
175   4                    THEN POS$INCREMENT(6) = -50.0;
176   4                IF CONTROL$BYTE = 0EH
177   4                    THEN POS$INCREMENT(6) =  50.0;

178   4            END;

179   3            SERVO$STATUS$BYTE = 03H;
180   3            CONTROL$BYTE = 0H;

181   3            DO WHILE ((CONTROL$BYTE ()'Y') AND (CONTROL$BYTE ()'N'));
182   4            END;
183   3        END;
184   2        CONTROL$BYTE = 0H;

185   2        DISABLE;

186   2        AXIS$POSITION(2) = AXIS$POSITION(2) - ENCODER$MARKER$VALUE(2);
187   2        AXIS$POS$COMMAND(2) = 0.0;
188   2        ENCODER$MARKER$VALUE(2) = 0.0;

189   2        ENABLE;

/* ALIGN AXIS 4 TO HOME */

190   2        DO WHILE CONTROL$BYTE () 'Y';
191   3            SERVO$STATUS$BYTE = 0BH;
192   3            ENCODER$MARKER$STATUS(3) = 0;

193   3            DO WHILE ENCODER$MARKER$STATUS(3) IS FALSE;

194   4                IF CONTROL$BYTE = 01H
195   4                    THEN POS$INCREMENT(0) = -50.0;
196   4                IF CONTROL$BYTE = 02H
197   4                    THEN POS$INCREMENT(0) =  50.0;

198   4                IF CONTROL$BYTE = 03H
199   4                    THEN POS$INCREMENT(1) = -50.0;
200   4                IF CONTROL$BYTE = 04H
201   4                    THEN POS$INCREMENT(1) =  50.0;

202   4                IF CONTROL$BYTE = 05H
203   4                    THEN POS$INCREMENT(2) = -25.0;
204   4                IF CONTROL$BYTE = 06H
205   4                    THEN POS$INCREMENT(2) =  25.0;

206   4                IF CONTROL$BYTE = 07H
207   4                    THEN POS$INCREMENT(3) = -25.0;
208   4                IF CONTROL$BYTE = 08H
209   4                    THEN POS$INCREMENT(3) =  25.0;

210   4                IF CONTROL$BYTE = 09H
211   4                    THEN POS$INCREMENT(4) = -50.0;
212   4                IF CONTROL$BYTE = 0AH
213   4                    THEN POS$INCREMENT(4) =  50.0;

214   4                IF CONTROL$BYTE = 0BH
215   4                    THEN POS$INCREMENT(5) = -50.0;
216   4                IF CONTROL$BYTE = 0CH
217   4                    THEN POS$INCREMENT(5) =  50.0;

218   4                IF CONTROL$BYTE = 0DH
219   4                    THEN POS$INCREMENT(6) = -50.0;
220   4                IF CONTROL$BYTE = 0EH
221   4                    THEN POS$INCREMENT(6) =  50.0;

222   4            END;

223   3            SERVO$STATUS$BYTE = 04H;
224   3            CONTROL$BYTE = 0H;
225   3            DO WHILE ((CONTROL$BYTE ()'Y') AND (CONTROL$BYTE ()'N'));
226   4            END;
227   3        END;

228   2        CONTROL$BYTE = 0H;

229   2        DISABLE;

230   2        AXIS$POSITION(3) = AXIS$POSITION(3) - ENCODER$MARKER$VALUE(3);
231   2        AXIS$POS$COMMAND(3) = 0.0;
232   2        ENCODER$MARKER$VALUE(3) = 0.0;

233   2        ENABLE;
```

```
                /* ALIGN AXIS 5 TO HOME */
234   2         DO WHILE CONTROL$BYTE () 'Y';
235   3             SERVO$STATUS$BYTE = 0CH;
236   3             ENCODER$MARKER$STATUS(4) = 0;

237   3             DO WHILE ENCODER$MARKER$STATUS(4) IS FALSE;

238   4                 IF CONTROL$BYTE = 01H
239   4                     THEN POS$INCREMENT(0) = -50.0;
240   4                 IF CONTROL$BYTE = 02H
241   4                     THEN POS$INCREMENT(0) =  50.0;

242   4                 IF CONTROL$BYTE = 03H
243   4                     THEN POS$INCREMENT(1) = -50.0;
244   4                 IF CONTROL$BYTE = 04H
245   4                     THEN POS$INCREMENT(1) =  50.0;

246   4                 IF CONTROL$BYTE = 05H
247   4                     THEN POS$INCREMENT(2) = -25.0;
248   4                 IF CONTROL$BYTE = 06H
249   4                     THEN POS$INCREMENT(2) =  25.0;

250   4                 IF CONTROL$BYTE = 07H
251   4                     THEN POS$INCREMENT(3) = -25.0;
252   4                 IF CONTROL$BYTE = 08H
253   4                     THEN POS$INCREMENT(3) =  25.0;

254   4                 IF CONTROL$BYTE = 09H
255   4                     THEN POS$INCREMENT(4) = -50.0;
256   4                 IF CONTROL$BYTE = 0AH
257   4                     THEN POS$INCREMENT(4) =  50.0;

258   4                 IF CONTROL$BYTE = 0BH
259   4                     THEN POS$INCREMENT(5) = -50.0;
260   4                 IF CONTROL$BYTE = 0CH
261   4                     THEN POS$INCREMENT(5) =  50.0;

262   4                 IF CONTROL$BYTE = 0DH
263   4                     THEN POS$INCREMENT(6) = -50.0;
264   4                 IF CONTROL$BYTE = 0EH
265   4                     THEN POS$INCREMENT(6) =  50.0;
266   4             END;

267   3             SERVO$STATUS$BYTE = 05H;
268   3             CONTROL$BYTE = 0H;

269   3             DO WHILE ((CONTROL$BYTE ()'Y') AND (CONTROL$BYTE ()'N'));
270   4             END;
271   3         END;

272   2         CONTROL$BYTE = 0H;

273   2         DISABLE;

274   2         AXIS$POSITION(4) = AXIS$POSITION(4) - ENCODER$MARKER$VALUE(4);
275   2         AXIS$POS$COMMAND(4) = 0.0;
276   2         ENCODER$MARKER$VALUE(4) = 0.0;

277   2         ENABLE;

/* ALIGN AXIS 6 TO HOME */

278   2         DO WHILE CONTROL$BYTE () 'Y';
279   3             SERVO$STATUS$BYTE = 0DH;
280   3             ENCODER$MARKER$STATUS(5) = 0;

281   3             DO WHILE ENCODER$MARKER$STATUS(5) IS FALSE;

282   4                 IF CONTROL$BYTE = 01H
283   4                     THEN POS$INCREMENT(0) = -50.0;
284   4                 IF CONTROL$BYTE = 02H
285   4                     THEN POS$INCREMENT(0) =  50.0;

286   4                 IF CONTROL$BYTE = 03H
287   4                     THEN POS$INCREMENT(1) = -50.0;
288   4                 IF CONTROL$BYTE = 04H
289   4                     THEN POS$INCREMENT(1) =  50.0;

290   4                 IF CONTROL$BYTE = 05H
291   4                     THEN POS$INCREMENT(2) = -25.0;
292   4                 IF CONTROL$BYTE = 06H
293   4                     THEN POS$INCREMENT(2) =  25.0;

294   4                 IF CONTROL$BYTE = 07H
```

```
295  4                  THEN POS$INCREMENT(3) = -25.0;
296  4              IF CONTROL$BYTE = 08H
297  4                  THEN POS$INCREMENT(3) =  25.0;

298  4              IF CONTROL$BYTE = 09H
299  4                  THEN POS$INCREMENT(4) = -50.0;
300  4              IF CONTROL$BYTE = 0AH
301  4                  THEN POS$INCREMENT(4) =  50.0;

302  4              IF CONTROL$BYTE = 0BH
303  4                  THEN POS$INCREMENT(5) = -50.0;
304  4              IF CONTROL$BYTE = 0CH
305  4                  THEN POS$INCREMENT(5) =  50.0;
306  4              IF CONTROL$BYTE = 0DH
307  4                  THEN POS$INCREMENT(6) = -50.0;
308  4              IF CONTROL$BYTE = 0EH
309  4                  THEN POS$INCREMENT(6) =  50.0;

310  4          END;

311  3          SERVO$STATUS$BYTE = 06H;
312  3          CONTROL$BYTE = 0H;

313  3          DO WHILE ((CONTROL$BYTE ()'Y') AND (CONTROL$BYTE ()'N'));
314  4          END;
315  3      END;

316  2      CONTROL$BYTE = 0H;

317  2      DISABLE;

318  2      AXIS$POSITION(5) = AXIS$POSITION(5) - ENCODER$MARKER$VALUE(5);
319  2      AXIS$POS$COMMAND(5) = 0.0;
320  2      ENCODER$MARKER$VALUE(5) = 0.0;

321  2      ENABLE;

/* ALIGN AXIS 7 TO HOME */

322  2      DO WHILE CONTROL$BYTE () 'Y';
323  3          SERVO$STATUS$BYTE = 0EH;
324  3          ENCODER$MARKER$STATUS(6) = 0;

325  3          DO WHILE ENCODER$MARKER$STATUS(6) IS FALSE;

326  4              IF CONTROL$BYTE = 01H
327  4                  THEN POS$INCREMENT(0) = -50.0;
328  4              IF CONTROL$BYTE = 02H
329  4                  THEN POS$INCREMENT(0) =  50.0;

330  4              IF CONTROL$BYTE = 03H
331  4                  THEN POS$INCREMENT(1) = -50.0;
332  4              IF CONTROL$BYTE = 04H
333  4                  THEN POS$INCREMENT(1) =  50.0;

334  4              IF CONTROL$BYTE = 05H
335  4                  THEN POS$INCREMENT(2) = -25.0;
336  4              IF CONTROL$BYTE = 06H
337  4                  THEN POS$INCREMENT(2) =  25.0;

338  4              IF CONTROL$BYTE = 07H
339  4                  THEN POS$INCREMENT(3) = -25.0;
340  4              IF CONTROL$BYTE = 08H
341  4                  THEN POS$INCREMENT(3) =  25.0;

342  4              IF CONTROL$BYTE = 09H
343  4                  THEN POS$INCREMENT(4) = -50.0;
344  4              IF CONTROL$BYTE = 0AH
345  4                  THEN POS$INCREMENT(4) =  50.0;
346  4              IF CONTROL$BYTE = 0BH
347  4                  THEN POS$INCREMENT(5) = -50.0;
348  4              IF CONTROL$BYTE = 0CH
349  4                  THEN POS$INCREMENT(5) =  50.0;

350  4              IF CONTROL$BYTE = 0DH
351  4                  THEN POS$INCREMENT(6) = -50.0;
352  4              IF CONTROL$BYTE = 0EH
353  4                  THEN POS$INCREMENT(6) =  50.0;

354  4          END;

355  3          SERVO$STATUS$BYTE = 07H;
356  3          CONTROL$BYTE = 0H;
```

```
357    3            DO WHILE ((CONTROL$BYTE ()'Y') AND (CONTROL$BYTE ()'N'));
358    4            END;
359    3        END;

360    2        CONTROL$BYTE = 0H;

361    2        DISABLE;

362    2        AXIS$POSITION(6) = AXIS$POSITION(6) - ENCODER$MARKER$VALUE(6);
363    2        AXIS$POS$COMMAND(6) = 0.0;
364    2        ENCODER$MARKER$VALUE(6) = 0.0;

365    2        ENABLE;

366    2        OUTPUT(0C2H) = 1111$1001B;    /* SET INTERRUPT MASK FOR 2 AND 4 */

367    2        SERVO$STATUS$BYTE = 0FH;

368    2    END ENCODER$MARKER$ALIGNMENT;

369    1    CALCULATE$POSITION$COMMANDS: PROCEDURE;

370    2        AXIS$POS$COMMAND(0) = AXIS$POS$COMMAND(0) + POS$INCREMENT(0);
371    2        AXIS$POS$COMMAND(1) = AXIS$POS$COMMAND(1) + POS$INCREMENT(1);
372    2        AXIS$POS$COMMAND(2) = AXIS$POS$COMMAND(2) + POS$INCREMENT(2);
373    2        AXIS$POS$COMMAND(3) = AXIS$POS$COMMAND(3) + POS$INCREMENT(3);
374    2        AXIS$POS$COMMAND(4) = AXIS$POS$COMMAND(4) + POS$INCREMENT(4);
375    2        AXIS$POS$COMMAND(5) = AXIS$POS$COMMAND(5) + POS$INCREMENT(5);
376    2        AXIS$POS$COMMAND(6) = AXIS$POS$COMMAND(6) + POS$INCREMENT(6);

377    2        IF POS$INC$COUNTER > 0
378    2            THEN DO;

379    3                POS$INC$COUNTER = POS$INC$COUNTER - 1;

380    3            END;

381    2        IF POS$INC$COUNTER = 0
382    2            THEN DO;
383    3                POS$INCREMENT(0) = 0.0;
384    3                POS$INCREMENT(1) = 0.0;
385    3                POS$INCREMENT(2) = 0.0;
386    3                POS$INCREMENT(3) = 0.0;
387    3                POS$INCREMENT(4) = 0.0;
388    3                POS$INCREMENT(5) = 0.0;
389    3                POS$INCREMENT(6) = 0.0;
390    3            END;

391    2    END CALCULATE$POSITION$COMMANDS;

392    1    CALCULATE$AXIS$VELOCITY: PROCEDURE;

393    2        AXIS$VELOCITY(1) = AXIS$POSITION(1) - OLD$AXIS$POSITION(1);
394    2        OLD$AXIS$POSITION(1) = AXIS$POSITION(1);

395    2    END CALCULATE$AXIS$VELOCITY;

396    1    CALCULATE$POSITION$ERRORS: PROCEDURE;

397    2        AXIS$POS$ERROR(0) = AXIS$POS$COMMAND(0) - AXIS$POSITION(0);
398    2        AXIS$POS$ERROR(1) = AXIS$POS$COMMAND(1) - AXIS$POSITION(1);
399    2        AXIS$POS$ERROR(2) = AXIS$POS$COMMAND(2) - AXIS$POSITION(2);
400    2        AXIS$POS$ERROR(3) = AXIS$POS$COMMAND(3) - AXIS$POSITION(3);
401    2        AXIS$POS$ERROR(4) = AXIS$POS$COMMAND(4) - AXIS$POSITION(4);
402    2        AXIS$POS$ERROR(5) = AXIS$POS$COMMAND(5) - AXIS$POSITION(5);
403    2        AXIS$POS$ERROR(6) = AXIS$POS$COMMAND(6) - AXIS$POSITION(6);

404    2        IF ABS(AXIS$POS$ERROR(0)) > EXCESS$ERROR(0)
405    2            THEN DO;
406    3                SERVO$STATUS$BYTE = 011H;
407    3                CALL EMERGENCY$STOP;
408    3            END;

409    2        IF ABS(AXIS$POS$ERROR(1)) > EXCESS$ERROR(1)
410    2            THEN DO;
411    3                SERVO$STATUS$BYTE = 012H;
412    3                CALL EMERGENCY$STOP;
413    3            END;

414    2        IF ABS(AXIS$POS$ERROR(2)) > EXCESS$ERROR(2)
415    2            THEN DO;
```

```
416  3                    SERVO$STATUS$BYTE = 013H;
417  3                    CALL EMERGENCY$STOP;
418  3                END;

419  2          IF ABS(AXIS$POS$ERROR(3)) ) EXCESS$ERROR(3)
420  2              THEN DO;
421  3                  SERVO$STATUS$BYTE = 014H;
422  3                  CALL EMERGENCY$STOP;
423  3              END;

424  2          IF ABS(AXIS$POS$ERROR(4)) ) EXCESS$ERROR(4)
425  2              THEN DO;
426  3                  SERVO$STATUS$BYTE = 015H;
427  3                  CALL EMERGENCY$STOP;
428  3              END;

429  2          IF ABS(AXIS$POS$ERROR(5)) ) EXCESS$ERROR(5)
430  2              THEN DO;
431  3.                 SERVO$STATUS$BYTE = 016H;
432  3                  CALL EMERGENCY$STOP;
433  3              END;

434  2          IF ABS(AXIS$POS$ERROR(6)) ) EXCESS$ERROR(6)
435  2              THEN DO;
436  3                  SERVO$STATUS$BYTE = 017H;
437  3                  CALL EMERGENCY$STOP;
438  3              END;

439  2      END CALCULATE$POSITION$ERRORS;

440  1      OUTPUT$CONTROL$VECTORS: PROCEDURE;

441  2          CALL DIGITAL$TO$ANALOG$OUTPUT(0,AXIS$POS$ERROR(0) * POS$LOOP$GAIN(0));
442  2          CALL DIGITAL$TO$ANALOG$OUTPUT(1,AXIS$POS$ERROR(1) * POS$LOOP$GAIN(1));
443  2          CALL DIGITAL$TO$ANALOG$OUTPUT(2,AXIS$POS$ERROR(2) * POS$LOOP$GAIN(2));
444  2          CALL DIGITAL$TO$ANALOG$OUTPUT(3,AXIS$POS$ERROR(3) * POS$LOOP$GAIN(3));
445  2          CALL DIGITAL$TO$ANALOG$OUTPUT(4,AXIS$POS$ERROR(4) * POS$LOOP$GAIN(4));
446  2          CALL DIGITAL$TO$ANALOG$OUTPUT(5,AXIS$POS$ERROR(5) * POS$LOOP$GAIN(5));
447  2          CALL DIGITAL$TO$ANALOG$OUTPUT(6,AXIS$POS$ERROR(6) * POS$LOOP$GAIN(6));
448  2          CALL DIGITAL$TO$ANALOG$OUTPUT(7,AXIS$VELOCITY(1) * VEL$LOOP$GAIN(1));

449  2      END OUTPUT$CONTROL$VECTORS;

450  1      SERVO$LOOP: PROCEDURE INTERRUPT 34 PUBLIC;

451  2          CALL ENCODER$INPUT$9702;
452  2          CALL CALCULATE$POSITION$COMMANDS;
453  2          CALL CALCULATE$AXIS$VELOCITY;
454  2          CALL CALCULATE$POSITION$ERRORS;
455  2          CALL OUTPUT$CONTROL$VECTORS;

456  2          OUTPUT(PIC$ADDRESS)=NON$SPECIFIC$EOI;

457  2      END SERVO$LOOP;

458  1      INPUT$NEW$POSITION$COMMAND: PROCEDURE INTERRUPT 33 PUBLIC;

459  2          OUTPUT(0CAH) = 00H;

460  2          DO WHILE LOCKSET(BLOCK,1);
461  3          END;

462  2          IF CONTROL$BYTE = 0FFH THEN CALL EMERGENCY$STOP;
464  2          IF COMMAND$DIVIDE$NUMBER <= 0 THEN CALL EMERGENCY$STOP;
466  2          POS$INC$COUNTER = COMMAND$DIVIDE$NUMBER;
467  2          POS$INCREMENT(0) = (SUPERVISOR$POS$COMMAND(0) - AXIS$POS$COMMAND(0))
                                    / FLOAT(SIGNED(COMMAND$DIVIDE$NUMBER));
468  2          POS$INCREMENT(1) = (-1.0*(SUPERVISOR$POS$COMMAND(1)) - AXIS$POS$COMMAND(1))
                                    / FLOAT(SIGNED(COMMAND$DIVIDE$NUMBER));
469  2          POS$INCREMENT(2) = (SUPERVISOR$POS$COMMAND(2) - AXIS$POS$COMMAND(2))
                                    / FLOAT(SIGNED(COMMAND$DIVIDE$NUMBER));
470  2          POS$INCREMENT(3) = (-1.0*(SUPERVISOR$POS$COMMAND(3)) - AXIS$POS$COMMAND(3))
                                    / FLOAT(SIGNED(COMMAND$DIVIDE$NUMBER));
471  2          POS$INCREMENT(4) = (SUPERVISOR$POS$COMMAND(4) - AXIS$POS$COMMAND(4))
                                    / FLOAT(SIGNED(COMMAND$DIVIDE$NUMBER));
472  2          POS$INCREMENT(5) = (-1.0*(SUPERVISOR$POS$COMMAND(5)) - AXIS$POS$COMMAND(5))
                                    / FLOAT(SIGNED(COMMAND$DIVIDE$NUMBER));
473  2.         POS$INCREMENT(6) = (-1.0*(SUPERVISOR$POS$COMMAND(6)) - AXIS$POS$COMMAND(6))
                                    / FLOAT(SIGNED(COMMAND$DIVIDE$NUMBER));

474  2          SERVO$STATUS$BYTE = 10H;
```

```
475  2         LOCK = 0;
476  2         OUTPUT(0CAH) = 01H;

477  2         OUTPUT(PIC$ADDRESS)=NON$SPECIFIC$EOI;

478  2         END INPUT$NEW$POSITION$COMMAND;

479  1     MAINPROGRAM: DO;
480  2         DISABLE;
481  2         CALL INIT$REAL$MAT-$UNIT;
482  2         CALL P8630$SETUP;
483  2         CALL SETUP$9702;
484  2         CALL GENERAL$MESSAGES(7);
485  2         CALL INITIALIZATION;
486  2         CALL ENCODER$MARKER$ALIGNMENT;
487  2         ENABLE;
488  2             BACKGROUND: DO FOREVER;
489  3                 END;
490  2         END;
491  1     END;
```

| DEFN ADDR | SIZE | NAME, ATTRIBUTES, AND REFERENCES | |
|---|---|---|---|
| 0038H | 28 | AXISPOSCOMMAND | REAL ARRAY(7) |
| 0054H | 28 | AXISPOSERROR | REAL ARRAY(7) |
| 001CH | 28 | AXISPOSITION | REAL ARRAY(7) PUBLIC |
| 00A8H | 28 | AXISVELOCITY | REAL ARRAY(7) |
| 002EH |  | BACKGROUND | LABEL |
| 0DA8H | 32 | CALCULATEAXISVELOCITY | PROCEDURE STACK=0002H |
| 0CF8H | 176 | CALCULATEPOSITIONCOMMANDS | PROCEDURE STACK=0002H |
| 0DC8H | 369 | CALCULATEPOSITIONERRORS | PROCEDURE STACK=0008H |
| 0000H | 1 | CHANNUM | BYTE IN PROC (DIGITALTOANALOGOUTPUT) PARAMETER |
| 0000H |  | CI | PROCEDURE BYTE EXTERNAL(---) STACK=0000H |
| 1HFF02H | 1 | COMMANDDIVIDENUMBER | BYTE AT ABSOLUTE |
| 1HFF00H | 1 | CONTROLBYTE | BYTE AT ABSOLUTE |
| 0000H | 4 | DATANUM | REAL IN PROC (DIGITALTOANALOGOUTPUT) PARAMETER |
| 0000H |  | DIGITALTOANALOGOUTPUT | PROCEDURE EXTERNAL(4) STACK=0000H |
| 0000H |  | EMERGENCYSTOP | PROCEDURE EXTERNAL(5) STACK=0000H |
| 0000H |  | ENCODERINPUT9702 | PROCEDURE EXTERNAL(1) STACK=0000H |
| 00D2H | 3110 | ENCODERMARKERALIGNMENT | PROCEDURE STACK=0008H |
| 0118H | 7 | ENCODERMARKERSTATUS | BYTE ARRAY(7) PUBLIC |
| 2000H | 28 | ENCODERMARKERVALUE | REAL ARRAY(7) PUBLIC |
| 0000H | 14 | ENCODERPOSITION | WORD ARRAY(7) EXTERNAL(6) |
| 00FCH | 28 | EXCESSERROR | REAL ARRAY(7) INITIAL |
|  |  | FALSE | LITERALLY '00H' |
|  |  | FOREVER | LITERALLY 'WHILE 1' |
| 0000H |  | GENERALMESSAGES | PROCEDURE EXTERNAL(0) STACK=0000H |
| 011FH | 1 | I | BYTE |
| 0030H | 162 | INITIALIZATION | PROCEDURE STACK=0002H |
| 1002H | 325 | INPUTNEWPOSITIONCOMMAND | PROCEDURE PUBLIC INTERRUPT(33) STACK=0008H |
|  |  | IS | LITERALLY '=' |
| 0000H |  | LINEFEED | PROCEDURE EXTERNAL(---) STACK=0000H |
| 1HFF03H | 1 | LOCK | BYTE AT ABSOLUTE |
| 0005H |  | MAINPROGRAM | LABEL PUBLIC |
| 0000H | 1 | MESSAGENUMBER | BYTE IN PROC (GENERALMESSAGES) PARAMETER |
|  |  | NONSPECIFICEOI | LITERALLY '20H' |
| 0000H | 1 | NUMLFS | BYTE IN PROC (LINEFEED) PARAMETER |
| 0250H | 28 | OLDAXISPOSITION | REAL ARRAY(7) |
| 0F39H | 149 | OUTPUTCONTROLVECTORS | PROCEDURE STACK=000AH |
| 0000H |  | P8630SETUP | PROCEDURE EXTERNAL(2) STACK=0000H |
|  |  | PICADDRESS | LITERALLY '0C0H' |
| 0120H | 1 | POSINCCOUNTER | BYTE |
| 0070H | 28 | POSINCREMENT | REAL ARRAY(7) |
| 008CH | 28 | POSLOOPGAIN | REAL ARRAY(7) INITIAL |
| 0202H | 46 | SERVOCONTROLLER | PROCEDURE STACK=0034H |
| 0F0EH | 52 | SERVOLOOP | PROCEDURE PUBLIC INTERRUPT(34) STACK=000EH |
| 1HFF01H | 1 | SERVOSTATUSBYTE | BYTE PUBLIC AT ABSOLUTE |
| 0000H |  | SETUP9702 | PROCEDURE EXTERNAL(3) STACK=0000H |
| 1HFF04H | 28 | SUPERVISORPOSCOMMAND | REAL ARRAY(7) AT ABSOLUTE |

```
       TRUE . . . . . . . . .      LITERALLY 'OFF='
  00C4H  28 VELLOOPGAIN. . . . . . . .   REAL ARRAY(7) INITIAL

MODULE INFORMATION:

CODE AREA SIZE     = 1147H    4423D
     CONSTANT AREA SIZE = 0028H      40D
     VARIABLE AREA SIZE = 0121H     289D
     MAXIMUM STACK SIZE = 0034H      52D
     785 LINES READ
     0 PROGRAM WARNINGS
     0 PROGRAM ERRORS

DICTIONARY SUMMARY:

242KB MEMORY AVAILABLE
     7KB MEMORY USED    (2%)
     6KB DISK SPACE USED

END OF PL/M-86 COMPILATION
```

What is claimed is:

1. A method for end effector reorientation between successive goal positions comprising the steps of:
   computing an Eigenvector about which said end effector can be rotated from a current goal position to attain a next goal position;
   computing an Eigenvalue; and
   rotating said end effector about said Eigenvector by an amount prescribed by said Eigenvalue.

2. The method according to claim 1 wherein said Eigenvector is computed by spectral decomposition.

* * * * *